US011443246B2

(12) United States Patent
Gueye

(10) Patent No.: US 11,443,246 B2
(45) Date of Patent: Sep. 13, 2022

(54) METHOD AND SYSTEM FOR FACILITATING PROVISIONING OF SOCIAL NETWORKING DATA TO A MOBILE DEVICE

(71) Applicant: Mamadou Mande Gueye, Washington, DC (US)

(72) Inventor: Mamadou Mande Gueye, Washington, DC (US)

(*) Notice: Subject to any disclaimer, the term of this patent is extended or adjusted under 35 U.S.C. 154(b) by 122 days.

(21) Appl. No.: 16/368,476

(22) Filed: Mar. 28, 2019

(65) Prior Publication Data
US 2019/0303807 A1   Oct. 3, 2019

Related U.S. Application Data

(63) Continuation-in-part of application No. PCT/IB2017/056052, filed on Sep. 29, 2017, and a continuation-in-part of application No. PCT/IB2019/052368, filed on Mar. 22, 2019, which is a continuation-in-part of application No. 15/938,945, filed on Mar. 28, 2018, application No. 16/368,476, which is a continuation of application No. 15/938,945.

(60) Provisional application No. 62/402,401, filed on Sep. 30, 2016.

(51) Int. Cl.
| G06F 16/30 | (2019.01) |
| G06Q 10/02 | (2012.01) |
| G06Q 20/36 | (2012.01) |
| G01C 21/34 | (2006.01) |
| G06F 16/9537 | (2019.01) |
| G06F 16/9536 | (2019.01) |
| G06Q 50/00 | (2012.01) |

(52) U.S. Cl.
CPC .......... *G06Q 10/02* (2013.01); *G01C 21/343* (2013.01); *G06F 16/9536* (2019.01); *G06F 16/9537* (2019.01); *G06Q 20/3678* (2013.01); *G06Q 50/01* (2013.01)

(58) Field of Classification Search
CPC .............. G01C 21/343; G01C 21/3484; G01C 21/3492; G01C 21/3617; H04W 4/029; G06F 3/04817; G06Q 50/01
See application file for complete search history.

(56) References Cited

U.S. PATENT DOCUMENTS

| 2007/0073562 A1* | 3/2007 | Brice ...................... G06Q 10/02 705/5 |
| 2007/0273558 A1* | 11/2007 | Smith ................... G09B 29/007 340/995.1 |
| 2015/0006639 A1* | 1/2015 | Huston ................... H04W 4/21 709/204 |

(Continued)

*Primary Examiner* — Tyler J Torgrimson

(57) ABSTRACT

Disclosed is a system for facilitating provisioning of social networking data to a mobile device. Further, the system may include a communication device configured for receiving at least one location information corresponding to a tour, receiving at least one selection corresponding to a plurality of filtering icons corresponding to a filtered social networking data, and transmitting a travel plan to the mobile device. Further, the system may include a processing device configured for filtering social networking data based on the at least one location information to generate the filtered social networking data, and generating the travel plan based on the at least one selection.

18 Claims, 65 Drawing Sheets

(56) References Cited

U.S. PATENT DOCUMENTS

2015/0127638 A1\* 5/2015 Parks ................. G06F 16/9537
707/723
2016/0260091 A1\* 9/2016 Tobias ............... G06Q 20/3678

\* cited by examiner

500

```
┌─────────────────────────────────────────────────────────────┐
│ Receiving, using the communication device, a game-plan     │ 502
│ comprising indication of a selected event, a selected      │
│ venue, at least one selected member                         │
└─────────────────────────────────────────────────────────────┘
                              │
                              ▼
┌─────────────────────────────────────────────────────────────┐
│ Transmitting, using the communication device, at least one │ 504
│ invitation associated with the game-plan to at least one   │
│ user device associated with the at least one selected      │
│ member                                                      │
└─────────────────────────────────────────────────────────────┘
```

FIG. 5

6100
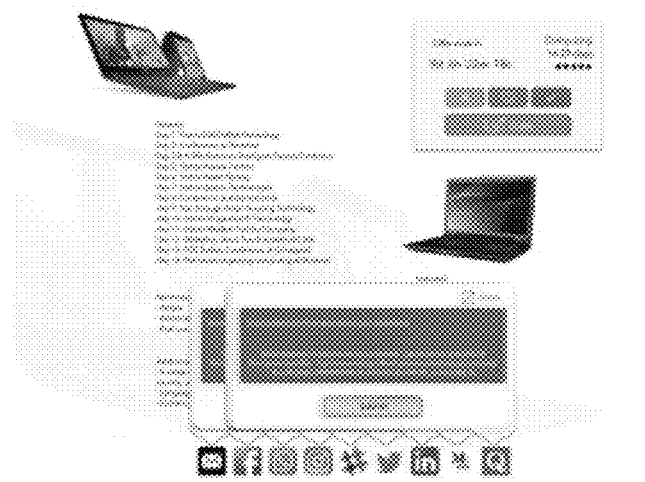
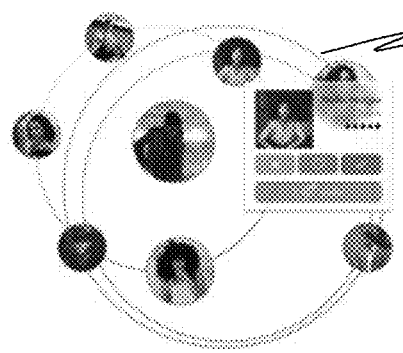
6102
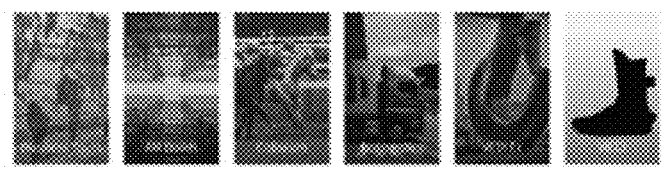
FIG. 61

METHOD AND SYSTEM FOR FACILITATING PROVISIONING OF SOCIAL NETWORKING DATA TO A MOBILE DEVICE

The current application is a continuation-in-part (CIP) application of a U.S. non-provisional application Ser. No. 15/938,945 filed on Mar. 28, 2018.

The current application also claims a priority to the Patent Cooperation Treaty (PCT) application PCT/IB2019/052368 filed on Mar. 22, 2019.

The current application also claims a priority to the Patent Cooperation Treaty (PCT) application PCT/IB32017/056052 filed on Sep. 29, 2017. The PCT application PCT/IB2017/056052 claims a priority to the U.S. Provisional Patent application Ser. No. 62/402,401 filed on Sep. 30, 2016.

FIELD OF DISCLOSURE

The present disclosure generally relates to digital data processing. More specifically, the disclosure relates to methods and systems for facilitating provisioning of social networking data to a mobile device.

BACKGROUND

Currently, there are several mobile applications to facilitate users in carrying out different activities, in particular when on travel. For instance, business persons visiting a city often uses multiple applications to manage their stay. For example, they may use an application to find and meet new people for business opportunities. Further, they may use another application to find service providers in the city to access the various services. Yet further, they may use another application to find interesting events in the city that they may attend. The users may find it challenging to manage such multiple applications. Further, many conventional applications do not allow for personalization. Therefore, the users have to spend additional time in locating and using the required information.

Similarly, there are several social networking applications that enable users to discover and connect with other users. Most such applications allow a User to specify criteria based on which other users are identified and presented to the User for selection. Generally, these criteria include characteristics of other users such as, demographic information, interests, educational and professional background and so on.

However, while such social networking application facilitate forming social connections, most do not offer any features to facilitate the connected users to participate in events. Users are therefore required to access other even management applications in order to search and select events to attend along with their social connections. This creates additional burden on users who wish to attend events along with their social connections.

Further, while some social networking applications may offer information about events, for example, in the form of advertisements, it does not lead to successful participation due to several reasons. On one hand, although socially connected users may share similar general interests, their specific interest in a given event may differ to due time varying factors. Accordingly, an event that may be interesting to a User may not be of interest to other users socially connected to the user. On the other hand, while the user's interest in specific types of events may be shared by other users, a level of compatibility between the User and other users is not considered in presenting the User with potential users with whom the User may attend an event. Further, users currently do not have access to an intuitive User interface that can facilitate selection of both other users (e.g. dates) and events.

Accordingly, there is a need for methods and systems for facilitating provisioning of social networking data to a mobile device, while overcoming one or more of the aforementioned drawbacks.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope According to some embodiments, a system for facilitating provisioning of social networking data to a mobile device is disclosed. Further, the social networking data may be related to a tour of a user of the mobile device. Further, the system may include a communication device configured for receiving at least one location information corresponding to the tour. Further, the communication device may be configured for receiving at least one selection corresponding to a plurality of filtering icons corresponding to a filtered social networking data. Further, the communication device may be configured for transmitting a travel plan to the mobile device. Further, the system may include a processing device configured for filtering social networking data based on the at least one location information to generate the filtered social networking data. Further, the social networking data may include a plurality of event indicia corresponding to a plurality of events, a plurality of venue indicia corresponding to a plurality of venues and a plurality of member indicia corresponding to a plurality of members of a social network associated with the user. Further, the processing device may be configured for generating the travel plan based on the at least one selection.

According to some embodiments, a method for facilitating provisioning of social networking data to a mobile device is disclosed. Further, the social networking data may be related to a tour of a user of the mobile device. Further, the method may include receiving, using a communication device, at least one location information corresponding to the tour.

Further, the method may include filtering, using a processing device, the social networking data based on the at least one location information to generate a filtered social networking data. Further, the social networking data may include a plurality of event indicia corresponding to a plurality of events, a plurality of venue indicia corresponding to a plurality of venues, and a plurality of member indicia corresponding to a plurality of members of a social network associated with the user. Further, the method may include receiving, using the communication device, at least one selection corresponding to a plurality of filtering icons corresponding to the filtered social networking data. Further, the method may include generating, using the processing device, a travel plan based on the at least one selection. Further, the method may include transmitting, using the communication device, the travel plan to the mobile device.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 5 is a flowchart of a method of generating a transmitting an invitation associated with a game plane, in accordance with some embodiments.

FIG. 3500 illustrates a screenshot of a User interface for facilitating provisioning of social activity data to a mobile device based on user preferences that allows a user to establish payment-per hour and for a set time, in accordance with some embodiments.

FIG. 50 illustrates a screenshot of a mobile app for facilitating social networking based on events depicting aggregated date-interest indicator of an event (e.g. party), in accordance with some embodiments.

FIG. 61 is a snapshot of an exemplary user interface of a system for facilitating provisioning of social networking data to a mobile device showing a network of a user, in accordance with some embodiments.

DETAILED DESCRIPTION

Figure 1:
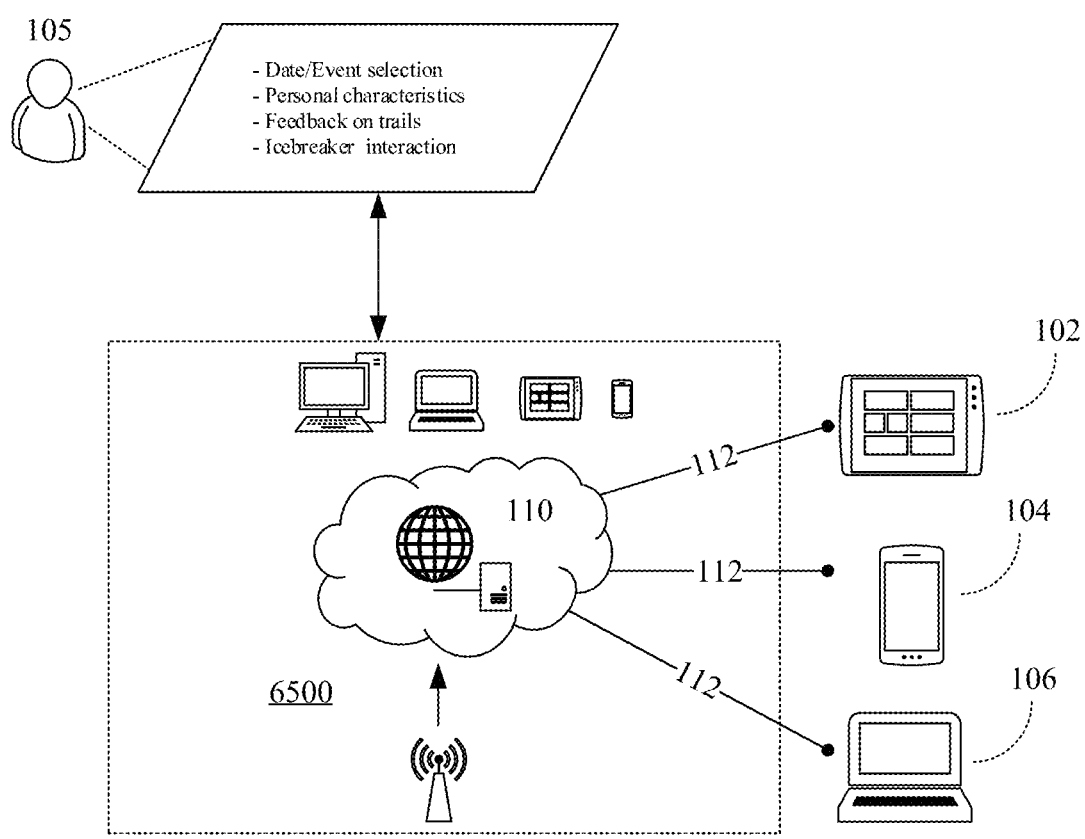
FIG. 1 illustrates a block diagram of an operating environment consistent with the present disclosure.

As a preliminary matter, it may readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, may be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of social networking, embodiments of the present disclosure are not limited to use only in this context.

OVERVIEW

Celeste Symphony—Celeste Symphony is the operating system of several platforms which integrate gamification, augmented reality and a plurality of networking systems to promote and reward productivity in the real world, in real time.

The Celeste Symphony System is operated with an intricacy of layered feedback loops, interconnected software, and a variety of hardware to be synced into the system to feed and receive data. Wherein the system can attain data from a plurality of sources such as; hardware, software or otherwise, and process the data to produce data packets to distribute in totality or as a restricted portion dependent on the recipient(s) level, whereby the distribution system and/or the recipients device can filter, sort, restrict and/or approve the level/amount of data to be transferred.

The Celeste Symphony System receives a plurality of data from a plurality of sources in a plurality of instances wherein the system will then process the data by means of sorting, filtering, categorizing, analyzing, calculating, verifying and the like to ultimately produce a multi-dimensional analysis perspective yet to be provided across industries.

Whereby the system will arrange axiom layers wherein the layers will contain data pertaining to the present task, milestone, mission, challenge or otherwise. These layers can be isolated, combined, manipulated or otherwise, wherein the layers can contain communicable data such as zones, iconic language, visual indicia, codes, toolkits, designs, timelines, projections, calculations, influencing factors, events, happenings, venues, location(s), operational metrics, integrated hardware systems, integrated operational hardware or otherwise and the data therein in expandable and manipulable totality. Wherein the layers can be viewed in a plurality of methods such as via a mobile device, a hardware device, a projection, a holographic image, and/or in adjustable augmented reality or otherwise.

Ultimately, the Celeste Symphony System will utilize gamification systems and methods therein to communicate the necessary objective(s) and moreover to encourage the User(s) successful completion of said objective(s) to enhance and increase overall productivity on micro and macro scales alike. Whereby the dynamic systems can produce with the 'instant gratification' and motivation of a gaming system, whilst producing tangible results and furthering development of skills, industries, the community and the like. The system will provide the User(s) with the sensation of a gaming system by means of the utilization of maps, axiom layers, levels, missions, rewards, teams, hardwares, toolkits, zones, visual augmentation or indicators, icon communicable language, zones and the like wherein the User will check-in to receive updates to their profile, missions, or otherwise and GAT wherein the User can 'zoom out' such as in an open world game, and the like.

All of this can be created with the integration of hardware and software into the operating system to produce an overall, gamified governance system wherein the User(s) will utilize a plurality of productivity enhancing platforms whereby the User(s) will produce tangible results on several levels in both the virtual and the real world.

Some features of the Celeste Symphony System as they pertain to the two exampled platforms (AM Builds and Celeste Suites) operating with the Celeste Symphony System are as follows;

Environmental Leveraging System (ELS)—The ELS is the system of data collection and processing for use in subsequent systems wherein Axiom Layers, and the like will be produced. Meaning; the data collected by the ELS will be processed by the ELS and utilized to formulate comprehensive detailed data layers of the Axiom Mapping System. Wherein the Axiom layers will be indicative of the utility, function, projection, probability, zone or otherwise in a real time and continuous multi-scale. The data therein pertaining to any selection of or complete mission or objective of the ASD.

The ELS will collect data by hardware integration and streamlined data transfer. Whereby the data will be collected by means such as; sensor detection, remote sensing, camera imagery, multi-spectral imagery, geospatial mapping technology, bio-metrics, UV analysis, airborne linear data, elevation point data, solar radiation data, moisture map data, bidirectional data reflection, network data input, feedback systems, reviews and ratings, network and grouping systems, real time feedback systems, and the like whereby the data collected can pertain to the development of spacial analysis, digital surface model(s), zones, activities, scales or otherwise pertaining to developing layered mapping systems wherein a map can refer to a physical map, design map, virtual map, network, or otherwise; in isolation, tandem or selective combination of axiom layers.

The ELS can pertain to a system operating in a system wherein (1) there is a multiplicity of recipients such as one large data cache being distributed across a group of Users and potentially restricted in partiality or totality depending on the User(s) level(s) or (2) the User receives their data packet directly from the ELS and can therefrom mesh their ELS data packet with other User(s) ELS data packets, thereby interacting with the development of the axiom layers.

For Example, where a city park is the Active zone:

(1) The ELS collects data of a city park from a multitude of data collection systems and hardwares wherein the data will be processed and layered into an axiom map including the physical map, social map, Users present, venues, events, challenges, zones, iconic language, icons, geological factors, Code Zones, and the like. Therefrom, the axiom will be distributed to ASD Users in the Active zone and limited to the Users specified clearance: Belt Level.

(2) The ELS feeds a data packet to the User via an axiom map containing the physical and other backend data of the city park and collects data from a mesh of ASD in a city park whereby the ELS will receive data pertaining to the locations, activity, venues, events, happenings, reviews, rewards, networks, and the like, whereby the ELS will enhance an axiom based on the physical and other backend data in combination with data received by the mesh. Thus, producing an axiom based on the activity of the ASD in the Active zone.

Axiom Mapping—Where Map is determined as a map of any applicable variety wherein data can be displayed in a visual representation of location, category, system, process or otherwise and therefrom layered within an axiom structure wherein the data can be categorically represented or otherwise.

Axiom layers are developed by the ELS with the collected data from all connected components within the system and/or network. The axiom layers are a series of layers built out of data pertaining to each layer as it is classified and categorized by means of system analytics and processing, for filters such as; zone, function, utility, trail, location, venue, assignment, connection, chronos, process, task, milestone, mission, event, happenings, team, and the like wherein the layers can be organized into a visual Axiom Map. Whereby the User can view the data in isolated, selected or all layers for a micro or macro perspective of the overall view and the data therein.

Thereby producing a layered visual matrix system of any environment whether it be a physical location, virtual location, networking environment, physical map, development project, augmented landscape, virtual design room, augmented map, interactive reality, social networking structure, or otherwise.

Axiom layers are further categorized with visual indicia, iconic language and/or other visual indicia which can be displayed as augmented reality or otherwise.

Axiom Mapping will provide the ability to ensure that the system is maintained with fluidic accuracy, of: data, analytics, layered metrics and the like. Moreover, the layering menu and control system can manipulate the layer(s) selected and/or all layers with filters and/or selection by which the axiom layers will be isolated, combined, highlighted, or otherwise indicated, to be manipulated, adjusted, developed, integrated, and the like.

Iconic Language—The iconic language is used to communicate to any and/or all Users and/or ASD(s) the point of which it is identifying by purpose, zone, location, structure or otherwise. Further dependent upon any of; the filters, the network, challenge(s), mission(s), development(s), and/or communication. The icons are such as; highlighted indicators with indicative visual cues signaling the reason that the point is being identified, symbols, patterns and the like.

The Iconic Language is herein utilized as a form of communication to, between and for Users and/or ASD(s).

Visual Indicia—In the system, map(s) and/or augmented vision; visual indicia is utilized to identify such as; zones, components, ratings, directions, progress, network, trails, team members, gameplan system, hardware, Belt Level, DMT, axiom layers, filters and the like. Zones can be easily identified with visual indicia to represent universally receivable information quickly and with ease Visual Indicia further identifies gamification aspects described in the platforms in later sections to represent features such as missions, team members, network, Belt Levels, location, augmented instructors, augmented reality, gameplan, ratings, connections, status, success, and the like.

Moreover, visual indicia in combination or isolated from the iconic language is herein utilized as a form of communication between all Users.

GAT Systems

I. SkyView—SkyView provides the User with the ability to essentially 'zoom out' such as in an open world style game where a map is utilized and the game allows the avatar to drop into a selected zone in the map, to explore and/or complete a task or mission. In the augmented gamification of SkyView the User will be able to view the entire 'map' from overhead which can further include map zones, highlighted zones, icons, iconic language indicators, filters, team members, dynamic points, and/or any other visual indicia pertaining to micro and/or macro details of the SkyView perspective. Whereby the User of SkyView can select a component of the 'map' as long as it is: unlocked, by a means of accomplishment, location dependent, Belt Level specific and the like, and/or a layer of the axiom map. Then 'drop in' such as with an 'open world game'. In doing so, the User will be able to see the selected location in real time through a means of hardware, projection, augmentation, events, happenings, who's here and the like by indicia communication, data flow, projection, reality vision, augmentation, Skowl DS overhead view or otherwise.

II. Captains View—The Captains View provides a User who has the appropriate Belt Level clearances the ability to view data, analytics and other ELS data metrics in tandem with the SkyView adding more detailed data and/or in selection or isolation whereby the User can view the data and analytics without the SkyView capabilities. Thereby providing the User with detailed layers of data of static and dynamic quality included in or separate from the SkyView. This setting is only for high ranking Users with appropriate clearance(s).

Active Systems Division (ASD)

The ASD is essentially the category tag applying to all active units of the ASD which can include but is not limited to: User(s), hardware(s), Bot(s), Software(s), System(s) and the like.

Active applies to Users that are active in the parameters indicated, which can pertain to zones such as; a map area, project, mission, group, trail, challenge and the like. To be active, the User will be 'checked-in' to the zone by methods such as; location pin, scanning into a Code Zone, hardware sync, event attendance, network check-in, team check-in and the like. Connecting the User into an active status within the zone. A User can be active in multiplezones simultaneously so long as the User has successfully checked-in to each zone respectively.

Example such as; a physical zone, a task zone, a mission zone, a network zone, a hardware radii and a team zone simultaneously, in this example, a User could scan a QR code in a Code Zone whereby the User will be checked into the physical location, synced into the network, hardware sync and connected with their (the User) assigned task, respectively within an overarching mission, whereby the User will collaborate with other ASD team members to complete the mission, successfully activating one User into six zones with a single check-in point.

Systems active Users will be activated into the Serer System or a sub-system such as the CTO. Wherein the active Users will have access to collaboration, integration, connection, isolation, operation, transition and/or transfer of; data, controls, maintenance, oversight, networking, communications, analytics, logistics and the like. This can include devices that can be online, offline, on-grid, off-grid, isolated, controlled, dark or otherwise. The system runs through the hardware such as the DMT's, and the hardware is connected utilizing a plurality of network possibilities, therefore, the system can continue to run even on the outer edge(s).

Division represents the grouping or collection of active Users in a specified zone, and/or active Users connected to a specified system, wherein a specification is the category in discussion. A User can be active in multiple divisions simultaneously so long as the User is connected to the specified system(s) and/or checked-in to the specified zone(s). Moreover, the division can be created in the back end or by Users themselves, wherein the division can reflect a set categorization as per the back end data or a group of Users interconnected within a mesh respectively.

ASD User Levels

Team—Users with a skill or skills that can be marketed on any and/or all of the Celeste Symphony platforms. Users operating as team members will be vetted and integrated by admission through the SOELL. Therefrom, Celeste symphony will employ the best of the skilled Users seeking to raise their productivity level, Belt Level, experience points, network, unlock new elements, further improve their skills, learn new skills and/or otherwise enhance their productivity abilities. ASD Team Users are the main division of productivity operations on the ground.

TrailBlazer: TrailBlazers are Users who lay the foundation for any combination of challenges, tasks, events, and the like, often but not necessarily linked into a 'trail' for other Users to access or follow. The TrailBlazer can be the scouting or the "First in, last out" position, whereby the User will be encouraged to scout out new experiences, locations, situations, tasks, missions, venues, and the like thereby rating the aforementioned, potentially vetting it for future Users to follow suit whereby the TrailBlazer could receive rewards. The system rewards the Users that take the time to accomplish all tasks, milestones, missions, challenges or otherwise whereby the User will gain experience points (XP) and rewards. TrailBlazers can also apply to: the bots, Skowl DS, programmers, and the like whereby they are the first in, last out and/or the foundation layer and/or otherwise suggestive of trends, events, venues, happening, challenges, and the like.

Conductor: Similar to the conductor of an orchestra the Conductor User in the Celeste Symphony will maintain all components of the production, wherein the teams, individuals, technology, hardware and the like can all be managed with ease, combining all layers of the symphony into a harmonic level of coalescence within the Conductor's determined gameplan. The Conductor has access to several additional systems such as multi-level Axiom Mapping, SkyView, Captains View, Skowl DS, Onyx Panther OS, Shot Caller System (and other DMT), creating groups, creating networks, curating events, creating milestones, creating missions, determining the Code Zones, or otherwise, and the data contained therein. The Conductor is capable of management, oversight, logistics and the like, as they are Users with a high Belt Level, providing them with greater access and opportunity.

Patron: Users with a Patron classification may be categorized as less visibly active with maximum levels of control of projects, filtering systems, events or otherwise.

Patrons are the project owner, commissioner or sponsor, they are the curators, hosts, developers, employers or experience generator, they have the VIP Belt Level, and/or have the greatest amount of loyalty points, ratings, productivity and successes.

ASD Integration Components

Bot—Bot integrations are components capable of operations of any or all of a Team, TrailBlazer or Conductor Users, instructors, or otherwise. The Bot systems can maintain all aforementioned positions with integrated systems configuration, software and programming for the tasks required. Moreover the bots can operate as Chapo UV or otherwise, to establish and/or monitor the site(s).

Instructor—The instructor is a system division focusing on quality, maintenance, success rate, education and the like through Augmented Reality, Axiom systems, programming, and the like. The instructor can be invisible, or active, whereby it can communicate instructions and/or visuals and/or guided operations and the like. Instructors can operate using the CTO system and/or the genie filter.

Meaning; the instructor is a plurality of functions whereby the User will receive data that may or may not be be visible to the User, this data may then be represented as active or background whereby the data may be known or unknown to the User respectively. In the active formation, the instructor will present as a known augmented reality to the User for a plurality of uses. In the later, the instructor will run in the background performing automated functions such as individualization and filtering of the User's experience, oversight and maintenance, feedback and rewards, and the like. Both systems can run simultaneously and/or individually and/or both systems can run individually simultaneously.

For Example: Simultaneously—A User could have the background system running filtering and feedback systems simultaneously with the Users active augmented exploration of an augmented map.

Individually—A User could be driving a vehicle and the patron will rate their performance, feeding into the Users feedback system in the background without the activity of the User.

Individually Simultaneously—A User can be attending an event, whereby the User will be actively networking and following their set plan. At the same time, in the back end the system can be running maintenance of the Users profile adjusting the filters to accommodate the Users future use. Though this may be as consequence of or the cause of, in the present active or visible use, these functions are considered individually operable.

System—The system integration ensures that all tasks, commands, controls, verification, maintenance, analytics, logistics and the like, can be interwoven and connected all into itself in a seamless and fluidic exchange of data, then categorized and redistributed as directions, accomplishments, ratings, feedback loop responses, Belt Level, and the like. The system runs on the Serer Operating System wherein ASD is governed.

Code—The Codes are used as part of the iconic language system wherein the communication amongst all ASDs can be clearly represented in real time through visual indicia or otherwise indicative. The Codes are scanned to transfer data pertaining to the location and/or User and/or event or otherwise. The Codes can be physical, augmented or virtual, they can be projected or posted and can be generated by the system, the ASD, Users or other approved sources. The Codes can be recognized as an icon, a pattern, an image, a space or a variety of standard scannable codes such as barcode, binary, QR and the like.

ASD Hardware Components—

DMT—Decision Making Technology is a series of hardware designed to operate with the Celeste Symphony System and the like, wherein the hardware devices can operate in tandem, in synchronicity or individually. The DMT will be a series of technology designed to aid the User in real time, whether in the real world, augmented reality, or the virtual world.

A few examples as follows:

I. Shot Caller—Shot Caller is the operators gameplan system, utilizing a low-high tech dongle and a multiplicity of technology and hardware integrations whereby the User will have access to any and/or all functions of the system even in extreme conditions. The Shot Caller device can operate as a fully operational device, as an extreme device whereby a secondary screen can be operated to conserve battery and the like, as a location beacon, as a network component, as a communications device as well as a variety of other utility such as a system for establishing and manipulating events, flight paths, travel, outings or otherwise. The Shot Caller has a plurality of settings, functions, modes and the like to ensure that it is always ready for any environment, challenge or lifestyle, even for the more extreme.

II. Skowl DS—Skowl DS is the eyes in the sky and the lay of the land within the Celeste Symphony OS, by integrating a two phase system, the first being the active component and the second, the relay and data collection system for the ELS. By utilizing several drone components, aerial imagery, geographic layering, measurements, identification of any notable detection, and the like, the system can integrate large amounts of activity data directly into the Celeste Symphony OS. Further systems integrated into the Skowl DS will include Governance from Above Tracking Systems (GAT Systems) whereby the Skowl DS will observe via the eye in the sky system (SkyView), the location of all project relevant static and/or dynamic components (Captians View).

The subsequent functions can include SkyView data application, bot supervision and control by means of the Chapo Underground Vision (Chapo UV), Gamification control and the bonus point control therein, Visual Indicia and Belt Level control and/or meters and/or rewards, augmentation development and/or adjustment and/or distribution and/or utility, augmented and/or holographic and/or projection display of iconic language and/or zones and/or probability and/or any other data collection within the OS map displays, inter-connective relay of data and/or system functionality amongst approved and interlaced components within the system, data collection, analytical visuals and the like; being displayed on screen, off screen, in 2D, 3D, 4D, by means of device, attachment, projection and/or hologram. Skowl DS can be controlled by integrated and synced hardware operated by a User with an approved and validated Belt Level.

III. Wristlet—The Wristlet is a dongle technology that can be wearable on the body directly, indirectly or within clothing and therefrom integrated within the system or otherwise connecting the User. The Wristlet can operate utilizing a primary screen, secondary screen or both, a hologram, a projection, which can be seen in augmented reality, real world or otherwise. The Wristlet allows the User to remain connected and can remain visible only to themselves with hardware paring. It is connected to the system and it can operate a plurality of integrated and synced hardware such as; flight paths for Skowl DS.

IV. HISS—The Holes in Soles System is a variety of customizable footwear with a plurality of integrations and possible functions. Moreover, the HISS System aids Axiom Mapping by creating pathways and storing location data to map out zones, enhances production, increases security and safety, aids with the Users health and the like. The HISS is the smart footwear solution to a plurality of problems such as; hazardous work environments, activity performance tracking, high impact training, health issues, security and safety precautions, extreme environments, environmental conditions, difficult terrain, location mapping, travel competitions, verification systems, and the like.

V. GLASS ACT—The GLASS ACT is operational within the Celeste Symphony OS wherein the GLASS ACT operates as a primary device to control, manipulate, view, synchronize and operate the Celeste Symphony OS and the methods, systems, devices and networks therein. GLASS ACT will be used for the utility, maintenance, oversight and operation of the system and the components therein whereby the User can use the device to operate the system, regardless of the Users location.

Whether on-grid or off-grid, the device can be operational including communications and other functions not often available outside of the standard networks. Furthermore, the device can be minimized by means of folding or otherwise even if all surfaces are operational components, touch screens or otherwise active.

Belt Levels—The "Belt" is a visual specification of the Users overall level, visible on the front end, as a feedback based on the eight levels available: White, Yellow, Orange, Purple, Green, Blue, Brown, Red and Black. In addition to these eight levels, eight additional categories are available for different grades of VIP: Bronze, Silver, Gold, Platinum, Crystal, Black Diamond, Onyx, Ghost.

The Belt-Level highlight symbolizes access, purchasing power, network, experience, ASD position, clearance, skills, successes, authority, and the like.

Belt System—Belt Level determines factors such as; what the User can see, how the User operates, what tasks the User is privy to, which categories the User falls into (such as; ASD, mood gauge, spending gauge, network, ratings and the like), which hardware the User can operate and the methods therein.

Belt Level utilizes a type of machine learning system or the like, that will develop challenges specific to the User in the backend, based on the Users interaction with the system beginning with the gauge level or the first interaction whereby the system can attain useful data pertaining to where the User will fit in the system. Utilizing a User grouping system, activity evaluation system, User data repository, mapping data repository, engagement analysis system, generation, and augmentation in response to the aforementioned and/or the like. The Belt Level performs functions such as; filter, organize, categorize, interacting with the gamification component of the overall system and method whereby it may be enacted and the User may be cleared or otherwise categorized.

Dynamic adjustments of system for User dependent on situation or "time" whereby a plurality of different levels for a plurality of different scenarios can be activated dependent on the classification of the User and their determined Belt Level. Therefore, will utilize a predicted challenge level and how the User will respond thereby calculating the system configuration then adjusting the 'difficulty' potentially by means of a non-transitory computer readable storage medium and the like for computer executable instructions for dynamically adjusting parameter(s).

The Belt Level System categorizes Users on the back end so as to produce a plurality of levels, for a plurality of scenarios, with a plurality of expectations/responsibilities/challenges thereby producing a feedback loop system of productivity, evaluation, categorization, responsive and dynamic adjustment to the Users depth of potential activity.

These dynamic adjustments can be utilized to adjust a plurality of scenarios within a single situation whereby one User may have a different level of experience than a plurality of other Users, potentially further repeated for any and/or all other Users to a limitless plurality of User perspectives based on their own individual activity, skill, responsibility, situation, speed, rating, success rate and the like, manifesting as a Belt Level in the front end to tailor the Users productivity to their level and maintained in the backend. Furthermore, the system will utilize a non-transitory computer readable storage medium and/or the like to execute computer readable instructions for the dynamic adjustment to the parameters of the Users level for each new situation, challenge, and/or activity otherwise dependent on the Users potential skill level, success rate, time available and the like.

Productivity Platform: AM Builds Development Productivity: AM Builds provides a platform to encourage productivity and ultimately enhance development and design projects in a multiplicity of industries and applications. Development Productivity can include physical work sites even in extreme, isolated or otherwise difficult environments, concept design and engineering projects of static and/or dynamic quality, mobile modular dynamic construction solutions, emergency response development projects, customization projects, automated building solutions and the like. Wherein Users can interact with the project using a multiplicity of integrated hardware, software and/or systems in tandem or isolation ultimately producing an augmented, gamified experience to enhance and further develop the overall productivity of the User(s) inclusive of a smart rewards feedback system, axiom layering system and the like.

1. Features

AM Builds is an amalgamation of hardware(s), software(s) and operating system(s) (OS) inclusive of designing, projecting, facilitating, managing, overseeing, connecting, calculating, adjusting, surveying, instructing and/or a variety of other developing capabilities all within an interconnected gamefied experience, enhancing productivity, accuracy and efficiency with ease.

Structured Parameters of Network—

Am Builds integrates a plurality of hardware, software and OS, all of which pertain to the overarching utility of the system and the methods therein by which it operates. As a component of the checks and balances integrated, the network utilizes parameters within the system and/or around the system; ultimately ensuring that the system is repetitively connected back into itself, with all components interlaced several times per, and capable of operating as a conglomerate of points and/or independent relaying within the system and can, if desired, secure the connections externally with parameters, operating a maintained system. The ability to configure and regulate enables dynamic distribution of workloads, particularly in the event that a relay link should fail.

Furthermore, due to the demands on the network to be able to function even in remote or isolated sites, the network is capable of operating with on-grid and/or off-grid; over Bluetooth, 3G, 4G, 5G, WiFi, mesh, ad hoc, GNSS, Beartooth and the like. The network(s) will provide Users with the ability to operate even in remote or otherwise difficult environments without having to diminish the service.

Visual Indicia—

Visual Indicia is a ratings system, often utilizing zones where the term zone can refer to a location, environment, element, component, person, structure, trail and the like, all of which can be assumed physical and/or augmented. The visual indicia, in this example, could be color:

Red (no) for a zone with a high level of risk involved, whereby the zone could be considered, hazardous and/or insecure, and/or incorrect and the like.

Yellow (maybe) for a zone that has a notable level of potential risk and/or success, which could be considered a potentially hazardous zone, and/or experimental and the like.

Green (yes) for a positive zone with a high probability of success, and/or a trustworthy zone, and/or task identifier and the like.

The Visual Indicia System has numerous applications within the operating system(s) due to it's dynamic understanding of zone classification.

Meaning; due to the infinite possibilities of zones, the Visual Indicia can analyze, identify, relay, report, notify data received for environments such as any variety and form of: maps, designs, systems, and the like. Moreover, the zones can pertain to both physical and augmented environments furthering utility with the inclusion of augmentation layers to produce the assignment oversight system (CTO).

Control Threshold Oversight (CTO)—

The CTO system maintains the operations for any and/or all ASD in single or multiple ASD(s). Whereby the CTO System ensures that all ASD are properly trained, maintained and/or operating, that all ASD are properly positioned, synced, programmed or otherwise, that all ASD are properly placed, defined, provided the appropriate data, filtered accordingly, and the like. Furthermore, the CTO can interact with the instructor program as a system and/or instructor.

The CTO system displays visual indicators such as highlights, icons, patterns, and other indicative visual prompts for application such as; augmented training, maintenance, suggestions, probabilities and/or other oversight applications whereby the system can improve efficiency, accuracy and productivity. The CTO visual indicators can therefrom be layered into an axiom reality whereby the visual indicia can indicate the CTO parameters, instruction or otherwise. The CTO controls the visual display of the system based on the ASD(s) level (visual theme of display) and/or axiom clearance (which levels of the axiom, if any are unlocked).

Code Zones—The Code Zone is any location whether physical or virtual that a User can check-in at, most notably by scanning a code, such as a QR code, whereby the User will verify their check-in. These Code Zones can be located anywhere and are primarily utilized to present data to those with the appropriate and/or approved Belt Level to scan them. A Code Zone can determine physical location and/or virtual environment.

This can include, for example, in an isolated construction site, a conductor can position several Code Zones around the site, upon arrival, the ASD can scan codes in each or a specific zone, upon scanning, the code can display information messages including: tasks or milestones for that person, a warning message reminding them that their Belt Level is not appropriate for this Code Zone, a series of instructions, a deep link or linket connection, accommodation, challenges, documentation, network, profile information, ratings and the like. The User can then move to their assigned zone, and upon arrival, the User can project a code from their device whereby the ASD members in that zone can verify the User.

Code Zone Verification System (CZVS)—

The CZVS integrates the functionality and utility of the Code Zone(s) namely the integration of a scannable code, QR code, information/data relay point and the like to communicate data pertaining to ASD's (as with open world games wherein the User finds check-in points to determine factors such as mission, location, status etc). The CZVS functions to provide and/or receive data that may or may not be encrypted, in a directional and/or bidirectional transfer, including but not limited to Belt Level, level adjustment, rewards, ratings, removal, elimination, proposing challenges to the User scanning into the CZVS of a utility such as but not limited to tasks, milestones, objectives, cooperative missions, gamified experiences, check-ins, scheduling, task management, labor organization, location and the like.

Ratings—The establishment and emphasis of Ratings assists the system in maintaining structure and order of all elements responsive to any and/or all established feedback systems. Ratings are applied to all data collected and categorized within a set parameter, meaning; if an active system collects data pertaining to a plurality of categories such as; progress, efficiency, operator efficacy, team productivity, bot progress, operation success, skill, development progress, projected timelines and the like; then the ratings system will be stimulated based upon the data coming in, then being sorted into categories then evaluated against factors such as iconic systems, probability, projected values for each category and the ratio by which the success rate and/or probability can be represented as a rating in any of the rating-dependent systems such as the Belt Levels, CTO, ASD and the like. Thereby the ratings can be used to determine and evaluate the ASD productivity and success rate as a whole, as teams, as individual Users and/or as otherwise determined by the axiom system, providing data for projections, status, operations or otherwise quantifiable data pertaining to productivity and the like.

Belt Level—In AM Builds, the Belt Level describes the Users skills, accomplishments, work ethic, efficiency, punctuality, successes, teamwork to the ultimate extent of the Users overall productivity and how the User participates in the network to raise productivity levels.

Example: A User with a higher Belt Level has created more success in their projects, by accomplishing tasks, milestones, missions and challenges the User has been able to raise their skill level and production ratings. Furthermore, the higher the Users Belt Level the more permissions they have, providing them with greater opportunity to further raise their productivity level, by raising their skills, efficiency, success rate, and the like respective to their Belt Level and consequentially, the permissions and clearance provided. With each increase in level comes more responsibility and greater rewards.

As a result of increasing Belt Level, the User will receive new permissions, technologies, benefits, additional access, increase in skills, ability to create tasks, milestones, missions and/or trails, higher ratings, and the like, whereby the productivity and progress are rewarded proportionally to the data recorded.

A User can increase their Belt Level through: accomplishment of tasks, milestones, missions and trails, increase skills, improvement of skills, the higher the success rate the better the rating and the higher the level awarded, ability to follow instructions and work in a team environment, dedication and availability to work overtime or marathons to complete projects, traveling for projects, expanding design skills (if the User is in carpentry construction, learn maintenance, learn architecture, learn infrastructure, learn energy, etc.) using augmented gamification with Belt Level rewards.

The Belt Level System in AM Builds enhances the Users experience by motivating the User to become better versions of themselves by using the gamified systems, instant gratification stimulus replicators and the integrated tools provided to increase the Users skills, productivity and overall success.

GAT Systems—By utilizing integrated hardware and data systems, the User can view maps of any applicable variety including physical, design, virtual, axiom layers and the like. This feature is akin to the open world gaming systems where the player can back out and view the world map therefrom dropping their avatar into a location, mission or otherwise. In Celeste Symphony the User will have access to the data applicable and the view(s) unlocked and/or active within their ASD(s).

I. SkyView—The SkyView feature allows a User to zoom out and view the entire map perspective. The SkyView will allow the User to view the entire map, whether the map is a physical map, axiom map, design, plan, network or otherwise and therefrom select their mission, check in on a location, update their section and the like. The SkyView can be populated with indicators such as; zones, icons, visual indicia, ASD, or otherwise indicative of the components therein.

II. Captains View—The Captains View is only accessible to Users that have a higher Belt Level and proper clearance. As the Captains View allows the User to zoom out to the overall view of the entire map operation this can include a map of any applicable variety, the axiom layers by selection or in totality, the analytics of all or isolated systems, progress, success, projections or otherwise, the ASD and their consequent operations, the network as a whole, the connected team members, ongoing activities, events, hardware, bots or otherwise and the like. The Captains View is the SKyView with analytics, progress, and other logistical data integrated and/or displayed.

SOELL—Smart Operational Experience & Labor Litigation is a smart contract system responsible for but not limited to; producing, monitoring, managing, updating, training, validating, maintaining, terminating smart contracts including progress tracking, training, duration, approval and parameters such as; overtime, marathon compliance, Belt Level, integrated technology allowances, augmented keys, personal skills, trade skills, and the like.

2. Development Planning

Am Builds creates augmented reality development solutions with smart gaming governance to develop micro and/or macro scale projects of industrial, structural, operational, educational, developmental or of manufacturing nature in real world augmented reality, virtual or otherwise. AM Builds utilizes several solution systems as a platform within the Celeste Symphony System and the systems and methods therein to develop: an interactive multidimensional operational system capable of controlling a myriad of development projects, overseeing completion of said projects and all factors inclusive, ensuring fluidic unparalleled clarity for all in axiom layers, interactive reality matrix or otherwise, even on the edge.

Environmental Leveraging System (ELS)—Utilizing the ELS data collected of even the most remote locations. Upon completion of the data capture, processing, distribution and adjustment/rendering processes, the data can then be used in developing an axiom map. Therefrom an augmented landscape enabling the User (of appropriate Belt Level & assigned the respective task) to drag and drop components, structures, materials, designs and fully automated bot packages into triangulated and pre-synthesized locations such as a zone, location, axiom layer, iconic identifier location and the like. Fusing with the augmented computer mapping model by means of Axiom Mapping solutions whereby layers of ELS data are combined into a dynamic plan.

Cameras—ELS utilizes cameras of static and/or dynamic orientation, in variance respective of the intended use of the data; images, video, ground mapping and the like can be obtained via mounted, mobile, drone, micro, body cameras, remote sensing, multi-spectral imagery or otherwise. Cameras support the ELS system with data and therefrom the Celeste Symphony Axiom Mapping System with data of superior quality and accuracy in real time.

Smart Icons—ELS utilizes layer(s) of iconic language throughout the operating system. Including the icons in the SDS, functional icons within the system, identifiers, codified icons, team & communication icons, filtering, modification icons, probability icons and the like. Icons can open icon information, location information, item information, team information, encrypted data packets, deep links, linkets, communication, tasks, milestones, missions, trails, challenges, gameplans and the like. The iconic language is an all in one visual communication system for ALL.

Touch Manipulation—ELS is operated by any approved ASD operator of a task on a variety of operational devices including online, offline, wearable, hand held, mounted, free standing, projected, augmented, virtual, or otherwise fabricated, constructed, viewed, presented or designed. Touch manipulation can affect any of the approved operational devices for any of the approved utility including design, maintenance, manipulation, customization, analytics, logistics, filtration, flight patterns, operations, organization and the like. Touch manipulations and gestures will register in the physical reality, augmented reality and virtual reality realms, ensuring the User is always 'hands on' regardless of the state of reality.

Furthermore, AM Builds utilizes ELS to collect data pertaining to the SDS, whereby the data collected by the ELS can determine factors such as probability, placement, or other indicative factors for design and/or development.

ELS Smart Development Solutions (SDS) Zones are identified within the system by filtering mechanisms displayed with identifiers such as visual indicia, category, utility and the like, based on the data retrieval of the ELS suite. The identified zones can undergo processing and manipulation such as filter, combine, isolate and the like by the layering capabilities. Zones will define an integral part of the ELS due to the necessity of environmental zone identification and the controls enacted therein as well as zones such as team zones, Code Zones, physical zones, virtual zones, augmented integrations and the like.

Probability is calculated within the system analytics based on data gathered and processed by the ELS. Probability is utilized to display the potential solutions for sustainability, energy, operational functionality, structure(s), allocation of resources, priority location(s), hot spot(s), profitable positioning, alternative solutions and the like. Probability will be displayed on the screen within the axiom layers, identified by zones and specified with icons. Icons can be selected to display detailed information regarding the specifics and probability of success vs variables such as required success rate, standards, any other potential options, necessity, modifications and the like.

Icons are identifiers within or outside of zone identifiers. Icons can identify potential locations for specific or general placement, existing placement, mandatory placement, features, suggestions, structures, staff/team, items, loading, check-in, Code Zones and the like. Icons can contain a myriad of data and information including probability, title, function, affiliated zone, alternative opportunities, necessity, chance, modifications, Axiom layers, integration location, procedure and the like.

AM Builds ELS example is such as; An isolated construction site to be surveyed by several camera, laser & image systems in addition to structure layers, design layers, and layers pertaining to factors such as ASD members, happenings, tasks, missions and the like, forming layers of the axiom map for the static and dynamic elements of the axiom. Therefrom, the Axiom Map will receive the processed ELS data and layer the multiple feeds of ELS data regarding the project site(s), structure(s), environment(s), object(s), ASD, task(s)/progress, zone(s), Hardware(s) or otherwise through system processing. These layers will be compressed into a data packet and sent to the applicable hardware or other mediums provided and/or compatible with the selected system(s).

The data collected and visually displayed can have identification points indicated with icons for purposes such as; hazard location(s), area(s) with the most light (solar), area(s) with the best foundation (structure), area(s) with fresh water, area(s) for worksite accommodations, best area(s) to farm, best location(s) to place communications, best location(s) for power storage, best trail(s) for power lines, best trail(s) for roadway access, best location(s) for Code Zones, best location(s) for material storage, best point(s) for security, moving point(s), hardware(s), flight trails, challenges, team members, and the like through an extensive collection of 1000's of potential icon communicators.

Wherein, layers can be combined and/or separated to provide a complete or isolated view respectively. Within isolation, any layer can be defined, expanded and/or modified, including exporting single, multiple or all layers to various system components such as; a Code Zone as a scannable data packet for any of the Active Systems Division (ASD) members that scans in, directly to team members to which it would pertain in respect to their Belt Level, other applicable hardware and/or other mediums provided, connected and/or compatible. In this example, axiom mapping will visually display the ELS data identification of factors such as; natural features, terrain adjustment, sub-terrain infrastructure, supra-terrain infrastructure, environmental factors, atmospheric metrics, blending calculations, task progression, success metrics, ASD data, zone systems and the like into a number of axiom layers with an infinite potential number of additional layers. In this example, the User will have the ability to view and/or manipulate the ELS data collected, processed and distributed within the bounds of their Belt Level.

3. Custom Designs—AM Builds produces an augmented design experience with enhanced live builds and designs. The library framework contains 1000's of options for downloadable designs, templates, pieces or inspiration for custom designs.

Custom Construction—AM Builds is integrated with a customizable building website with 1000's of building toolkits, including prefabricated structures, container buildings, environmentally sustainable buildings, bot building plans, custom designs, toolkits, architecture plans, micro and macro buildings, mobile buildings, designs for all types of equipment, mobiles, technology and the like.

The site is a build-your-own gamified experience, allowing the designer to 'play' custom, augmented build-it, complete with checks and balances to ensure that calculations are accurate and the design can become a build reality. If desired, the User can contact a design engineer online, or schedule a consultation.

Custom Software—Downloadable: Tool kits, Libraries and Frameworks utilizing the interconnected database of the custom web format, to then be pushed to Code Zone relays and/or, interconnected hardware communications and specifications, the communication of plans and instructions are transferred to the Code Zone where the most recent data packet(s) can be stored to provide ASD's with their respective instructions upon scanning. The software allows for customizable designs with 1000's of options in the Build-it gamified experience, making the finalized plans and instructions accessible on hardware by direct transfer or scanning a Code Zone.

Bot Integration—Bot integration into the development process will create a more automated, augmented design experience whereby an operator will be able to download an existing design, and/or customize and finalize a design plan, drag and drop the finalized design into an augmented reality previously finalized as an axiom map with the components therein. Therefrom, the design will be set by the User, directly into the augmented reality then verified by the system and, upon approval finalized, upon finalization, bots can begin operations according to the specific instructions to produce exactly what is determined by the design previously placed, verified and finalized. The bots can scan the Code Zones whereby the data will be updated into the integrated system. Such as; In the isolated construction site example, the bot may be instructed to perform tasks such as clear and level the land, remove debris, perform cutting and/or welding operations, lifting, stacking, securing, and the like. The bots can maintain bidirectional data transfer directly with the integrated technology of the Celeste Symphony OS, the ELS, Skowl DS system, Code Zones, CTO and Chapo UV system(s).

4. Augmented Design—AM Builds, combines elements of system(s), software(s), hardware(s) into augmented reality for utility within use such as; productivity, design, production, creation, organization, maintenance, construction, education, skills building, and the like, all encapsulated in a gamified system with feedback systems, rewards, levels and the like. Whereby a User can operate within an augmented, guided, observable, interactive environment thereby increasing accuracy, efficiency, skills and interconnectivity with other Users including communication, oversight and logistics capabilities.

Augmented Vision—The augmented vision component will allow Users to see or visualize the task and/or design and/or mission and/or overall project with integrated technological displays and functionalities. Moreover, the Augmented Vision system can develop a multitude of visual layers, icons, and other indicia for direction, instruction, identification or otherwise. This can be created through the use of hardware such as the following DMT examples;

I. Skowl DS flies over an area such as; an isolated construction sight to gather images and data regarding the potential zones and possibilities for the location in discussion, this data will be sent to a device, can be viewed by the User with augmented elements such as; visual indicators, zones, icons, structures, drag and drop buildings, and all or any selected layer(s) of the axiom mapping system and the augmented capabilities therein. The receiving device could be the SkyView or the like, and will allow the User to see from above, or an augmented vision of ground level and/or the Users current location/view point augmented.

II. The Shot Caller receives location points of all Users in their respective ASD mission team and enacts the gameplan systems to organize the selected ASD team members to complete the mission, wherein all team members will receive the gameplan in real time, even if off-grid such as; during clearing of an isolated site to place roadways for the transport of materials to an isolated construction site, this increases safety and security, communications, efficiency and oversight capabilities.

With the Shot Caller all Users can know where their team members are, they can communicate and receive data all through the SCS and/or the hardware integrated therein, this data can be displayed in augmented vision using hardware such as the Shot Caller to project augmented holograms and/or elements of the virtual world and the data therein into the Users vision in the real world so as to enhance their abilities to complete tasks, milestones and missions.

III. Users with the Wristlet, receive data from connected systems and/or by scanning in a Code Zone. The scanning of a QR code in a Code Zone will send data to the Wristlet where the Wristlet will communicate with the data regarding the level of the User and what data pertains to them, sort and organize the data and then display the data packet that is approved and tailored to the specific User. This can include data such as; the Users name and work day (time in, time out), the Users assignments (tasks, milestones, missions), the Users team (group of ASD Users on a set task, milestone and/or mission), location to report to, conductor for this User, gameplan, instructions, maps, icons and the like. The augmented vision can display Gameplans, locations, tasks, directions, visual indicia zones, icons, axiom layers, structure levels, operations, source of materials, angle, force, distance, depth, height, feedback systems, operations, security zones, and the like of which can be displayed by hardware integration such as SCS Wristlet projection or connection with other augmented capable hardware.

IV. In design, augmented vision will be used to isolate, combine, identify, replace any of the components, layers, pieces, systems of a design to manipulate, customize, create a design that can be reproduced in the real world with the assistance of this virtual model, augmented into the Users vision for production. This can be exampled in a design of a dynamic operational system of mechanical components capable of dynamic utility including weight bearing, movement, operation, safety, acceleration, and the like, to be designed within the virtual realm, augmented into the real world by methods such as; projection, augmented vision whereby a User can adjust and design in real time, to be sent in a data packet to other Users and hardware components to be utilized within augmented vision and created in the real world.

Augmented Operations a) Instructor System—The Instructor System utilizes augmented reality, and the systems and methods therein to develop and train Users in a skill, method, procedure and the like. This utilizes the augmented vision component to display, using visual cues in an augmented reality, the correct procedure, method and/or steps to follow. It further uses fluidic augmentation, whereby the system can collect data to be applied into analytics, the Users profile, feedback, awards systems and oversight logistics.

Such as; If a User is assigned the task of 1) collecting all materials to assemble a solar panel, the instructor will indicate which materials the User must collect and how many through indicative augmentation by means such as; highlighting, icons, and other cues whereby the User can flawlessly gather the necessary materials and correct amount thereof, 2) assembling the materials collected in the first task to complete the milestone, whereby the augmented instructor will indicate the procedure for accurate assembly in a clean, timely and efficient manner, thereby educating and enhancing the Users skills in the process, 3) combining the assembled solar panel with those of the other team members to complete the overall mission of "Establish solar powered light sources (on the isolated construction site)", whereby each of the team members will have completed steps 1 & 2 individually and simultaneously with their own augmented instructor, producing identical and functional solar panels from the plan (assigned from the library) and directions provided by the instructor, which in this example; was an augmented guide, following the downloaded instructions of a solar panel from the library of designs but in other examples could be a person, or otherwise instructive.

b) CTO Color Threshold Oversight—The CTO system displays indicators such as visual indicia, highlighting, icons and other indicative visual prompts for application such as; augmented: training, maintenance, suggestions and/or other oversight applications whereby the system can improve efficiency, accuracy and productivity.

Such as; the maintenance and oversight of the solar powered light source established in the example in the previous section. Whereby a similar augmented system is used to that of the instructor, in that which the CTO ensures that the User is 1) maintaining the solar panels to code, even so far as to augment the proper methods and tools if the User is struggling or new to this task, 2) building additional or replacement panels to code even though the User may not be in the instructor program for this particular task any longer, thereby ensuring that no User will forget the proper procedure or methods thereof for a task, 3) performing oversight and quality control of the Users procedure and productivity, Also, CTO displays the color view of the system based on the Users Belt Level and/or axiom clearance (which levels of the axiom, if any, are unlocked to the User). Such as;

a) the beginning User who is still in the instructor program will see the minimal amount of data pertaining to the overall project, for example; the User will only see 1-3 layers of the axiom map exclusively pertaining to the User and their directly relevant tasks. If the User is assigned to perform the above assembly tasks (exampled above) then the User will be able to see the axiom levels with: the materials pertaining to the solar panels, the location(s) where the solar power light system will be placed and the ground/base level.

b) IF the User is out of the instructor program and is assigned the above maintenance tasks (exampled above) this User will additionally see the grid lines for the lights and the potential connection to a secondary source of energy such as a battery storage system or a generator, the security grid, the backup systems and the replacement level.

c) Whereas, IF on the same sight (exampled above), the User is given conductor level then the axiom will display copious levels for all connections, operations, procedures, happening, plans, grids, Users, analytics, environment indicators and the like, in the "Establish solar powered light sources (on the isolated construction site)" example the conductor will be able to view the progress of all ASD including tasks, missions and the progress thereof. These three exampled Users have three different Belt Levels and as a result will see three different perspectives of the same mission, further utilizing the gamification elements, these levels will change colors as the User 'levels up', meaning; Belt Levels have different colors, tailoring the design to the User based on their view of the system.

Augmented Point—This system is the augmented Captains View for the Users assigned to take 'point' in the projects, tasks, milestones or other, these include the conductor levels, the instructor levels, and the patron level. Captains View provides detailed analytics, logistics and the overall view of the project throughout any and/or all axiom levels cleared for the point User. Captains View is the view of the project from start to finish in 2D, 3D, 4D, augmented or physical, in real time, in timeline, from overhead, to underground, in isolated components, in synchronicity with virtual and/or physical elements, designs that can be placed in the physical landscape with a drag and drop of the virtual design and the like . . . .

Such as; A conductor level II User is given point of the "Establish & maintain the solar power light sources (on an isolated construction site)". Therefore, the User will be provided with access to the ELS data provided by 1) the Skowl DS airborne data, this can include overhead images, laser grid, geospatial indicators, multi-spectral imagery, elevation point data, zones, icons, or otherwise indicia displayed therein, to identify the best location to place the solar panel light system, 2) Shot Caller displays location and other data wherein the User can send the gameplan and/or other data to the team recipients and/or receive data, even in isolated or off-grid projects wherein the User will not lose contact and gameplans can be established and/or modified in real time on multiple network options, 3) the Chapo UV survey, this can include, underground composition, hazards, lines, lays, slope, and colored zones, icons and indicators thereof, to ensure that the lines of the solar panel light system and/or the panels themselves are not at risk of any form of damage or loss, 4) the User is to set data into the Code Zones for the assigned ASD within the oversight of the User to be able to scan and receive data information, instructions and the like pertaining to that which is transferred via Code Zones, ensuring that all have the proper data downloaded into their DMT(s) (User specific) such as; location of materials, selection of materials, designs for the construction of the solar panels, method of assembly, assigned location of placement, method of connection to other solar panels, method of connection to light fixtures, method of operation, operation of the solar panel light system, integration of backup systems, maintenance and the like, 5) DMT data assigned, collected and displayed, wherein data pertaining to Users of the same or lesser Belt Levels within the current mission and/or entire project can be viewed, monitored, adjusted or otherwise by the User, providing the User with the ability to assign and oversee, providing the cyclical system of assignment, feedback, correction, approval, 6) Axiom will synchronize and categorize all data collected into layers of the axiom map, of which the User is privy to all layers and can manipulate the axiom map by adjusting, isolating, reassigning, combining, filtering and the like, allowing the User to control point of the mission "Establish & maintain the solar power light sources (on an isolated construction site)" from multiple levels and layers of data regardless of whether the User is present on site or not.

Augmented Gamification

All augmentation systems described herein, are equipped and designed with gamification to be; interwoven, underlying and encapsulating, to ensure that productivity is enhanced with the fluidic connection between the rewards system(s), feedback mechanism(s), visual cue(s), to increase strategic skills and/or training efficiency, personal development, efficiency and the like, where the virtual enhancement encourages real accomplishment.

Moreover, these gamification systems are not limited to the scope or practice of worksites, as mentioned, they are further designed to train, increase skills, educate, integrate and enhance User experience wherever they are applied, with the systems and the integration into several hardwares that can all be interconnected and set up with customizable software filters for different utility in combination with a variety of hardware components.

Such as;

(1) Belt Levels create the gamefied experience of levels such that a game could represent the difficulty the User will encounter. In augmented gamification of the Belt Levels the User accomplishes is representative of the level of accomplishment, increasing the clearance of the User and by comparison the difficulty of the Users position, responsibilities, skills and the like, (2) Missions are built out of milestones which are a conglomerate of tasks assigned to User(s) individually and/or in a team which the User(s) will be rewarded for accomplishments and mission success(es), adding to their overall profile, (by comparison a game platform moves a User through levels, missions and with the success the avatar will be rewarded in the manner in which the pertains to the particular game), (3) SkyView provides the User with the ability to essentially 'zoom out' such as in an open world game where a map is utilized and the game allows the avatar to drop into a selected zone in the map, in the augmented gamification of SkyView the User will be able to view the entire 'map' from overhead which could be a physical map, a design map, a virtual map, a location map and the like which can include map zones, colored zones, icons, iconic language indicators, and/or any other visual indicia or communication pertaining to micro and/or macro details of the Sky View perspective, whereby the User of SkyView can select a component of the 'map' and/or a layer of the axiom map and 'drop in' such as with a game.

5. Gamified Productivity

AM Builds utilizes gamification to motivate Users to increase their skills, knowledge, experiences and overall productivity by the means of incentivization of missions, tasks, accomplishments, connections, utility, learning and the like. This is accomplished with levels and rewards wherein the User must meet a set of requirements and criteria to move up, enhancing the productivity environment by gamification motivation and feedback rewards system.

Gamification of AM Builds provides elements for challenges & development, ultimately leading towards the goal: success for enhancement of the User and fluidic design methods for the development systems. The gamification element is primarily tuned to engage, motivate, enhance and develop Users through gamified experiences, triggers, systems, feedback loops, accessibility, rewards, challenges and the like. Some examples of how gamification will increase productivity in AM Builds:

I. A User is at their first day, so the User will receive their DMT(s), and/or other pertinent gear, for this example, the User is arriving to the remote site that just finished establishing the solar powered lighting system, so some gear could be necessary such as the HISS, Shot Caller, Wristlet, and Vicci wear. Upon arrival to the site, the User will check-in at a Code Zone, in this example the User attempts to scan into a Code Zone using the Shot Caller whereby the User receives a message, that this is not the Users assigned zone, thereafter the message will display the assigned check-in point and a highlighted trail to get there using the projection method in the Shot Caller, Wristlet or otherwise. The User will follow the projected trail, even if there is no physical trail, as will be common in remote or isolated sites such as this one. The User reaches the assigned Code Zone, and scans in, the check-in is approved and data is transferred to the Users device(s) whereby the User can view: their profile which includes their ratings, Belt Level, skills and other personal data; in this example the profile will be very basic and beginner because it is the Users first day, it will also include assignment information such as the first task and where to begin (1), the milestone and the task(s) within (2), the mission and any pertaining details thereof (3), as well as any challenges (4) and/or trails (5) and/or ASD members the User is assigned to work with (6), including the potential for an instructor (7); in this example, the User is being assigned to (1) gather materials as listed, whereby the User will be directed by a highlighted path once again and other visual indicia such as icons & indicative zones, (2) The tasks are 1) gather and sort materials as directed 2) assemble sections of a fence line by constructing with the materials in the specified construction zone (a milestone can be every 10 sections), 3) exchange completed fence sections with the transport team, so that the transport team can bring the fence sections to the fence line whereby the digging team has created small trenches to embed the fence sections in (this includes projecting a code from the Shot Caller onto the ground for the transport team to confirm and the system to track the transport and production on both ends of transport), (3) the overall mission between these teams is to establish a fence perimeter around the site, whereby the digging team is given a projected line to follow for the perimeter including the permissions of Chapo UV for safe & effective digging parameters, the transport team is actively using hardware and systems integrations such as Skowl DS for oversight and communications, bots for transport assistance, gameplan for communication within the shot caller system, projections for directions and the visual to view the projections, (4) the challenges could be time constraints, such as bonus rewards if the ASD teams can establish the fence line in under 24 hours, (5) for a new User, trails could be a simple as check-in with the Code Zone, sync up with your ASD team members and complete your first milestone whereby the User could be rewarded upon successful completion verified by the CTO, (6) for this example the ASD will be the team members in the Users construction team that will be indicated initially with color, iconic and visual indicia of where the construction team members are, by extension, the transport team will also be indicated upon completion of fence sections ready for the transport team to pick up—at this time, they too will be indicated, (7) because it is this Users first day they will definitely be in the instructor program, whereby the User will receive instructions via visual indicators in the augmented view with highlighting indicators, iconic communication, and/or other visual indicia to ensure quality and consistency of all. In this example, all that the User accomplished give experience points or 'XP' as well as bonuses, tags, corrections, directions, connections, teams, NEW tasks, milestone, missions in response to the Users success rate, additional permissions based on the Users success rate and the like, ultimately to incentivize productivity with the feedback and rewards systems —gamification.

II. In this example, the User is a Blue Belt ASD team member, skilled in construction of wood structures and framing elements. The User arrives on the remote site with solar powered lighting system and a fence perimeter established and scans into the nearest Code Zone, the User is informed that this Code Zone is only for gold belts and above, and the User therefore follows the indicia to the three potential zones the User could scan into. Once the User scans in, the information is delivered and displayed on the Users device(s) whereby the User sees that a new skill building opportunity is available: beginners welding. The mission for the User is to construct the trusses for the roof of the staff quarters with three milestones: construct the wood paneling, construct the wood trusses, fabricate and attach the metal framework to reinforce the trusses. Tasks pertaining to the milestones will be completed individually within the cooperative efforts of other ASD team members to complete the mission. When learning a new skill, should the User accept, the User can be instructed by the instructor program by any combination of; augmented reality, ASD training including bots, mentors and the like. Once again, accomplishments and successes are rewarded and furthermore, the skill levels can increase with new skill building opportunities for the User, essentially taking the mission productivity of a game, and bringing it to the real world to enhance the Users life with increased skills, XP, Belt Level, permissions, responsibilities and the like. Productivity Platform: Celeste Suites Social Productivity—The Celeste Suites Social Productivity Platform expands the Celeste Symphony into a multiplicity of social productivity solutions ensuring that the system is encouraging and rewarding productivity even in the social aspects of the Users life. Wherein the User can attain the exponential growth in development of skills and success. Whereby a transference of patterns can further enhance their social life whether it be personal networking, business networking, traveling, experiences or otherwise, the integration of Celeste Symphony and Celeste Suites can facilitate the increase in productivity of Users anywhere, anytime. Therein the system will promote User activity towards more productive, and success oriented decisions with direct feedback systems providing rewards, levels, points, contacts, and the like, incentivizing the User to increase their value through increasing their productivity in all areas of their life.

Improvement Networking—The Celeste System promotes Improvement Networking as part of the social productivity platform whereby the User will increase and enhance their productivity through health, activity, food, mood and overall better choices for skill improvement in a networking and socially productive environment. This can occur by integrations with systems that provide opportunities to make healthful changes and improvements such as; those which will encourage exercise and activity by means of betting platforms for personal improvement in a network of Users looking to improve themselves and help others, those which provide healthful solutions for diets and recipes in an open network of Users sharing, rating and using the recipe platform to live healthier, and meshing all of these opportunities and the like into a personalized, augmented and interactive mapping system and network. Overall, integrating the gamefied experience to enhance the Users experience of the previously exampled systems whereby the hardware components will sync into the system to provide dynamic data of the Users activity in respect to the gamefied challenges presented by the system. such as;

I. Challenges for recipes and cooking whereby the User will use hardware such as the Wristlet for sensor data, augmented vision, projections and the like to cook recipes and learn new cooking skills, such as; the Wristlet can recognize the accuracy of the action such as; cutting challenges for speed and cutting technique accuracy or a pancake flip challenge to rate the Users technique and teach new skills.

II. Challenges for Users to reach a certain intensity of activity such as; a sprinting challenge whereby the Users running speed will be detected by the HISS or otherwise and compared to previous trials and/or other Users.

III. Challenges can extend to the network whereby Users can battle other Users personally, in groups, as teams or network wide to all that want to participate. Whereby hardware integrations such as projections, augmentation, DMT(s) and the like will record, report, post, compare, evaluate data from all participants.

IV. Challenges for training can occur whereby the User can bet on themselves in the betting platform, such as; a User wants to lose ten pounds in 30 days, the User can then post this goal and bet on the Users success and/or bet on others. To help the User, the User can utilize services and tools on the platform such as the augmented trainer where the User can have a personal trainer in augmented reality. The hardware/gear will verify the Users progress and determine the probability of success and/or the result wherein the User will be determined as successful or not in their bet/challenge whereby the User will receive or pay the bet respectively. Wherein the hardware integrations such as projections, augmentation, DMT(s) and the like will record, report, post, compare, evaluate data from all participants.

Social Networking—The Celeste System promotes social networking as a part of the social productivity platform whereby the User will increase their networking abilities to elite luxury levels on a global scale. As such the User will enhance their social networking capabilities with fluidic integration of systems creating User connections, experiences and networks. These networks can further expand into systems such as; those which create, promote and/or support events, outings, trails and challenges wherein the User would attend their selected choice(s) accompanied by any selected User(s) that accept the Users invitation(s), systems that provide the User with the opportunity to attend a club event specific to their common interest(s), systems that connect Users around exciting happenings, even to the extent of systems that provide mesh networking, ad hoc networking or similar to the Users so that the network can always remain active. Moreover, the social networking systems will be integrated with the hardware to enhance the experience of the User(s), such as;

I. A User selects two events from the personalized list of events, the User also selects a date to accompany the User to these events, this creates an outing for the selected day and time. In this example, the User could also simultaneously be accomplishing a challenge by attending a promoted event and/or a trail by potentially selecting the two events as a result of trail recommendations, wherein a trail recommendation describes the indicated connection between one or more events or otherwise as a suggested outing. To attend this outing the User may use the DMT(s) or other integrated hardware to communicate and enhance the overall experience for the User(s). In this example, the User uses the Wristlet for augmented projections of the outing, to receive directions, to locate the Users date, to communicate and/or receive indicia communications, to project the code for entrance to the event(s), and the like.

II. A User is interested in yachts and yacht parties, in this example, the User could use the system(s) to connect with other Users interested in yachts and yacht parties whereby the Users could plan events and/or outings for their common interests of yachts and yacht parties. To attend this outing the User may utilize the Skowl DS, or otherwise to communicate, record, and enhance the Users experience at their yacht party.

III. A User is abroad and outside of the city service grid in a small mountain hostel, so the User utilizes the mesh network to operate their device(s) whereby the User can see that there is an event being held in the mountain area the User is currently in and thereby the User can attend the event.

Smart Networking—The Celeste System promotes smart networking as a part of the social productivity platform whereby the User will find smart solutions for networking on a global business scale. Whereby the User will increase their productive networking skills and expand their personal network of business oriented contacts and even form teams. Wherein the User can enhance their activities with systems that provide such as; systems to allow the User to travel internationally and experience all of the necessary services and amenities of home in a single platform, with ease, a system whereby the User can select from a vast variety of business workshops, even to the extent of full business tours wherein the User will travel, receive accommodation, transportation and education/tours regarding the industry/topic selected, systems that provide safe transport, security, surveillance, and secure systems to ensure that the User doesn't have to worry regardless of where their business travels take them. Moreover, the smart networking systems will be integrated with the hardware to enhance the experience of the User(s), such as;

I. A User needs to travel to Paris for a business meeting, the User, is a consultant for a tech company from the US. The User will be able to plan their travel plans all within a single system, in this example, the User requires a flight to CDG airport, accommodations for four days, secure transportation to and from the airport as well as whilst moving around the city (transportation with security services), as well as additional services such as a secretary to assist the User in meetings, a personal chef as the User has allergies and diet specifications not often accommodated in public establishments, a massage therapist as the User has back pain when traveling long distances as well as a translator to accompany the User throughout the city as the User does not speak french and would like to experience the city with ease. Wherein the User can use a single system to book all of the aforementioned for their business trip to Paris, as well as view any suggested events, venues, or workshops happening in the city at the time of the Users travels, such as a tech conference.

II. A User who is successful in supermarkets in Spain would like to invest in manufacturing products to increase the products the Users supermarkets can sell, and thereby increasing the Users profits. The User can explore the system for experiences and business tours wherein the User can travel and learn about the product manufacturing industry in locations that are already successful and be educated by business investors that have done similar or are otherwise knowledgeable. In this example, the User will travel from Spain to India, where the User will spend 14 days, learning in seminars, speaking to business advisors in this industry, viewing several locations operating in this industry, communicate with investors and those otherwise knowledgeable, wherein the User will have accommodation, amenities, services and secure transport every step of the way. The User will be informed of the opportunities to invest in the existing industry and/or begin their own within the industry.

Productivity Networking—The Celeste System promotes productivity networking as a part of the social productivity platform whereby the User will be able to organize all of the finer details of travel, business, purchasing and other services, to suit, anywhere. Including such as; the opportunity to hire services such as a secretary, a driver, security, a personal trainer, and the like to assist the User with their everyday or specific tasks associated with their travels, a system of smart hiring solutions including smart contracts, verification, smart services, sorting systems, and the like ensuring that the User has the opportunity to hire the best suited User to their team members list, a system of smart purchasing such as a multi-currency wallet where all currencies including cryptocurrency can be kept for purchasing including conversion, a system that can provide the User with fast solutions for services, systems, problems, schedules, organization and purchasing. Moreover, the productivity networking systems will be integrated with the hardware to enhance the experience of the User(s), such as;

I. A User is a freelance photographer, the User utilizes the smart hiring system to evaluate and post their profile to potentially be hired. The User is offered a contract to take images and videos for a four day conference being held in Casablanca. If the User accepts this contract the User will be hired by the User (whom extended the contract) via a smart contract wherein the details and payment methods will be specified. The User can utilize hardware components such as; the Skowl DS and the like to complete this contract.

II. A User is a freelance photographer, the User utilizes the smart hiring system to evaluate and post their profile to potentially be hired. The User is looking for a contract to take images and videos for a four day conference being held in Casablanca, however all contracts available require the User to also have skills as a secretary. The User can utilize the tools available on the smart hiring system to increase their skills and become verified in additional skills, industries and the like. The User can utilize hardware components such as; the Shot Caller and the like to complete this contract.

III. The User can hire services they need on-demand, in this example the Users vehicle has broken down during their trip, they can push a request for a tow or maintenance service to come and either tow or repair the vehicle depending on the severity of the issue, the User can also request a car to take them to their destination if they have arrangements with time constraints. All of this can be done with the on-demand services system within the smart hiring solutions system. The User can utilize hardware components such as the Shot Caller, and the like to properly pin their location, connect with the service providers assigned to the Users request or otherwise.

IV. A User is traveling and has a layover in Iceland and would like to purchase a coffee from a vendor, however, the User doesn't carry krona, or have any cash at the time. Using the smart currency wallet, the User can instantly purchase any product by utilizing the order and purchasing system, the scanning system, the currency transfer system, the points based system or otherwise, leveraging any currency for the Users purchase. The User can use any hardware synced into the system(s) such as; the Wristlet, or otherwise to transfer, project scannable purchasing codes, connect, exchange and the like.

Gamified Networking—The Celeste System promotes gamefied networking as a part of the social productivity platform whereby the User will engage in a gamefied environment to increase their productivity, skills, knowledge, network or otherwise. Wherein the User can receive rewards for their accomplishments such as; a system that sets challenges for Users to accept and accomplish, upon success the User will receive a reward whether in points or otherwise, a system wherein the challenges could pertain to events or other network happenings wherein the User could be rewarded for attending, furthermore a system that can link venues, events, challenges or otherwise into a chain of recommendations for a User to follow as a trail wherein the User can be lead by visual indicia, augmentation, suggestions or otherwise to receive rewards either individually or as a team, and/or in competition, a system wherein the User can establish a plan based on their mood, where the system can determine the Users mood and preferences and tailor their experience to their current state/point of view, furthermore a system wherein the User can zoom out and see what is happening in the map, who's present, what's happening, which zones are lit up and for what reasons, which icons are communicating the Users current mood/preferences, suggestions, challenge points, code locations and the like. Moreover, the gamification networking systems will be integrated with the hardware to enhance the experience of the User(s), such as;

I. A User is in a city whereby the User is completing challenges as they travel around the city, these challenges further lead the User to interact with new people and thus build a network and/or team. Therefrom, the User is rewarded with accomplishment and success recognition rewards wherein the User can receive points or otherwise and increase their level, skill recognition, difficulty level or otherwise. The User can interact with this system using any synced hardware such as; the Wristlet and the like.

II. The User is an established User, having checked into several various locations, increased their level and the like, the User is now in a new city and unsure of what to do. The User can utilize a system that can determine the Users most likely predictable choices for venues, events, activities, networks, services and the like. The system will then populate the Users view with the top picks for the User based on any combination of the Users current state, indicated state, predictable decisions, past use data, location, upcoming schedule or otherwise. The User can participate further if the User is looking for something more specific by applying a smart filtering system wherein the User can completely tailor the system to their current preferences inferred and/or filtered. This puts the User in control of their map, allowing the User to determine the zones and select the missions with or without team members, such as with open world games. The User can interact with this system using any synced hardware such as; the Shot Caller, and the like.

III. A User is exploring a city wherein the User is utilizing augmented vision with the augmented smart map. In this example, the User is walking along a highlighted trail, looking for challenges or network happenings or points of interest, then, an icon pops up into the Users vision to the left specifying that the User has encountered a Code Zone, wherein the User can approach this zone and scan the QR code for data. In this example the User scans the QR code to receive the 500 points and an additional challenge, of attending an event later the evening with the pass provided to the User from scanning the code. The User can interact with this system using any synced hardware such as; HISS and the like.

Augmented Networking Environmental Leveraging System—The ELS is the data system synchronizing with the feedback system integrated into individual and/or combined profiles as a personal profile or a network respectively. Thereby the data collected can be resultant of individual use, collective use, filters, activity, backend and frontend data, integrated hardware data collection and the like. Meaning; the data can be collected from the system(s), device(s), Code Zone(s) and the like, bidirectionally determining the systems data cache. The ELS data may then feed into the network that, in part, provided the data to develop the ELS data.

I. A User is walking around a city location wearing the HISS. The ELS collects the location and mapping data from the HISS activity metrics, and therefrom combines the data with other data to produce axiom layers specific to the user.

Axiom Smart Map—The smart map allows the User to experience any location with an interactive lens wherein the User can follow visual indicators such as; icons, highlighting, zones, paths and the like to indicate locations, Users, services, events, or otherwise as per the Users preferences either set or inferred based on the Users data profile. The map collects data from the ELS and therefrom creates Axiom layers describing the multiplicity of static and dynamic metric activity within the parameters being viewed to the extent of a continuous multi-scale system. The map can be viewed on any approved hardware device synced into the system as well as by projections and augmented reality vision of selected or all axiom layers as determined by the filters inferred or selected such as;

I. A User is in their home city, and would like to get out and explore, however, because it's their home city this User thinks that boring. The User utilizes the Wristlet projections for augmented vision to begin walking around the city looking for events, challenges, Code Zones or otherwise. In this example the User is following a trail suggested by the system wherein the User is led to a challenge zone that other Users are currently interacting with. In this example the User has the opportunity to participate in a team based activity in a local park wherein the User will receive points, accomplishments and potentially new network contacts. The User can interact with this system using any synced hardware such as; the Wristlet, and the like.

II. A User wants to customize their experience by manipulating their environment to suit their needs. In this example the User modifies the mood and filtering settings whilst utilizing augmented vision in the smart map to adjust what is seen, what is highlighted, what iconic communication is displayed and which people can be seen, or otherwise. The User can interact with this system using any synced hardware such as; the Shot Caller, and the like.

Zones—The indicia of zones informs the User of the happenings within the indicated parameters, further specified by indications such as; the zone highlighted, the icons present, the code indicators and the data therein when scanned, the Users present, the challenges/happenings/events in the zone, the potential bonuses for being active in the zone or otherwise. The zones can be viewed in the map, and/or in augmented reality and/or on any approved hardware device synced into the system and/or projections or otherwise. Any synced hardware device can establish a zone such as the Code Zone or otherwise, and/or register a User within the zone such as HISS or otherwise.

I. A User views the smart map to see that there is a zone active 150 m from the Users location, the User sees that the zone is highlighted to represent an event, with iconic language describing the theme of the event, in this example the zone can be a purple pattern and the icons represent off-grid network, happening, challenge, activity and social. In this example, the User decides to walk 150 m to see the zone, following the highlighted path projected from the Users Wristlet to arrive at a large green space wherein the Users are engaging in a team oriented activity game on a mesh network provided by the Onyx Panther OS located in the zone, relaying with the Skowl DS overhead, and linking the Users together with their shot caller dongles or otherwise. As the User came alone the system can push out a notification to connect the User with an existing team.

Visual Indicia—The Visual Indicia displayed can indicate the nature of the area, the purpose of the indicator, the communication of the icon, pathways/trails, Belt Levels, ratings, teams, or otherwise. Highlighting can communicate to the User within a map setting, a communication format, a planning system, a networking system, a management system, a purchasing system, a dating system, a traveling system, a business system, an exploration system and the like. The visual indicia can be viewed on any approved hardware device synced into the system as well as by projections and augmented vision, additionally the hardware itself can be visually indicative based on the Users team, ASD(s), Belt Level or otherwise.

I. A User is connected with a team to participate in a zone event wherein the Users will disperse around the zone to accomplish all of the tasks/challenges, the team that does this the fastest, wins. Moreover, because the system is operating on the Onyx Panther OS, overseen by the Skowl DS and verified by the Code Zones, the system can ensure that the codes can appear different to each team that scans them to ensure smooth competition. Meaning; if there are 7 Code Zones and 7 teams, each team will have a different location for Code Zone #1 and so on, so that the teams are dispersed throughout the zones and must operate independently from other teams, this challenge is about team work and efficiency, may the most productive team win. The User can utilize any synced hardware for this challenge.

Iconic Language—Icons are used as the main indicator of communication in the integrated systems, wherein the writing is minimized and replaced by iconic indicators, iconic filters, iconic systems and iconic methods of communication. The system of communicating with icons and visual cues will ensure that the ASD(s) can all communicate effectively anywhere in the world, with anyone, at any time, moreover, that ASD(s) can quickly comprehend the communication. In doing so this communication can be viewed on any approved hardware device synced into the system as well as by projections and augmented reality vision wherein the icons can be superimposed/augmented over reality, enhancing the Users ability to interact with their surroundings.

I. A User is traveling from the US and only speaks English, but is traveling to attend a business tour of the factory industry in Casamance, where English is not the primary language. Therefore, the User can utilize the iconic language to communicate, understand and interpret the physical area. In this example, the User can utilize the Wristlet or otherwise for augmented visions, smart map or otherwise to project or view icons around the User, describing the area, item, function, or otherwise. Thereby the iconic language can be used not only to simplify communication, to streamline understanding but to actually assist in translations and interpretation of even complex topics.

SkyView—Users can use the SkyView feature to access the systems from a wider perspective wherein the User can view the map from above, which depending on the system could mean a city map being viewed from above, a venue map being viewed categorically based on the events, who's there, the itinerary and the like or otherwise, the possibilities of SkyView are not limited to the definition of a physical city map, nor of a view from overhead but rather as a view that takes in all the information with as many visual components as possible. This can combine several hardware components which can belong to any of: the system(s), other Users, the network, the Users synced hardware or otherwise. Moreover, SkyView can be viewed on any approved hardware device synced into the system as well as by projections and augmented vision. Additionally SkyView can be manipulated, adjusted, filtered, used for communication and information or otherwise even if the User is not present in that location.

I. A User is sent a notification on a system wherein the notification is informing the User that several of their network is in attendance of an event being held 8 km from the Users location. The event is utilizing the Onyx Panther OS, Skowl, and the like to set up the event therefore, the User can utilize SkyView to drop in to the event without leaving their location to check out what is happening, who's there and the like. Therefrom, in this example, the User determines that because the event looks exciting and some of the Users network is in attendance, the User can order transportation to join the event, having determined the event to be worth the travel time.

Celeste Symphony—Celeste Symphony is a system with a plurality of applications to a plurality of industries, lifestyles or otherwise as represented with the two exampled platforms. The system is designed to enhance existing real world, virtual world or augmented realities to provide the User with a complete experience by combining the best of, whilst focusing on raising productivity.

Celeste Symphony utilizes a plurality of hardware devices, software programs and systems in combination or isolation whereby the enhancement operations can interact with the User(s) producing an entirely new experience with ease. The system focuses on ensuring that regardless of the platform the User is operating, there will remain the fundamental crux of the system; utilization of data collected by devices, experiences, feedback systems and the like, providing enhancement of development, skills, networking or otherwise to ultimately increase productivity with fluidic inter-connectivity of a mesh of components whether Users, systems, devices, or otherwise and displayed in an interactive and gamified system of axiom map layers communicable with visual indicia and a universal iconic language regardless of the recipient or their location.

This system will further enhance the Users experience by promoting productivity and incentivized success enhancement, skill-building, development of projects or otherwise within a gamified system wherein the User will interact with the real world, virtual world, augmented reality or otherwise to receive rewards, challenges, missions, connections, or otherwise, thereby increasing the Users productivity, skills, network, experiences and in many cases mobility. Celeste Symphony is an Operating System that enhances the productivity of the Users, and their operations, environment or otherwise therein, it is interconnected, intraconnected and maintained utilizing the integrated components whether systems, software, hardware, Users, active devices or otherwise.

Glossary

Ad hoc—A specified network system 'for this' whereby the Users can create a network similar to a mesh network for a specific purpose or function.

ASD—Active Systems Division is the encompassing category for all units that have been activated in a system, thereby being grouped into a division of the active system. Where active indicates activity, progress, happenings etc. and system indicates the governing body of the activity whether that be a zone, parameter, venue, operating system, challenge or otherwise, and units indicating any unit that can check-in to a system and thereby become grouped into a division.

Axiom—Indicating a layering system, whereby data is compiled into packets to be layered in complexity or separated in simplicity.

Axiom Mapping—Referring to the layers of data visually represented in the mapping system whereby map can refer to a plurality of visual data representations.

Axiom Smart Map—Extension of the Axiom Mapping System wherein the data is combined with the activity data collected from the mesh of networks and therefrom able to be filtered or otherwise manipulated manually or automatically.

Belt Level—The Belt Level is the User gamification component whereby the User(s) will be classed into a belt level, which determines the Users clearance, permissions, rewards, network connections and the like. The Belt Level is effected by the User(s) activity and utility whereby the feedback systems will determine and award belt level adjustments based on ratings, past use, successes, patterns of use, and the like. The Belt Level will interact with the systems, hardwares, networks, missions and the like wherein the User will be granted or denied access of select layers of the aforementioned based on their belt level clearance compatibility.

BearTooth—Off-grid network system such as mesh or ad hoc.

Challenge—Describing a plurality of activities, trials, puzzles, events, and the like. Potentially arranged in a series such as a gauntlet or a trail whereby the User(s) will be challenged to accomplish the tasks in a rapid fire series of timed challenges or a 'complete as you go' succession of challenges respectively.

Successful completion of challenges can award XP, rewards, titles, belt level increase or otherwise.

Chapo UV—Chapo Underground Vision is a plurality of sensors, integrations, hardware, bots and the like. Chapo Underground Vision produces data pertaining to the environment, most notably the ground, underground, resources, potential production, hazards or otherwise.

Code Zone—Identifying any radii that can contain a code or check-in point or CZVS.

Continuous Multi-Scale—Defining the boundaries or lack thereof of a visual map, wherein a User can scale and pan.

CTO—Control Threshold Oversight pertains to the operation of the system(s) whereby the CTO maintains ASD and the systems, methods, activities, locations, units, and networks therein. Moreover, the Control Threshold Oversight ensures that the system has a consensus system and logistic oversight whereby standards and consistency are established and maintained.

The CTO can be integrated into systems, operations, hardwares, and the like.

CZVS—Code Zone Verification System is the representation of a point in an open world game wherein the avatar can check-in and update the system profile. The Code Zone Verification System will update and streamline the ASD when scanned or otherwise checked-in/active, transferring all data pertaining to the current and/or future and updating that which existed previously.

Deep Link—Wherein it is required to link the system to the internet.

DMT—Decision Making Technology is a series of hardware devices that can be synced and otherwise utilized within or outside of the system(s). The DMT series can include hand held devices, wearable devices, pairing devices, dongles, remote devices, mobile devices and the like.

ELS simulation—Environmental Leveraging System gathers data to be integrated into layer(s) of an axiom. The ELS operates with hardware, software and systems whereby data is collected and processed to be distributed into systems or otherwise.

Environmental Zone—Identification where environment refers to a parameter of virtual or real world realities whereby environment is further classed by any collection of data within the set parameters, rather than being restricted to the definition of environment as strictly surroundings or conditions, the definition herein is expanded to surroundings, conditions, objectives, components, layers, participants of virtual, real or augmented world realities in combination or isolation.

GAT—Governance from Above Technology systems enables the User to 'zoom out' and view the entire map and the data therein (according to their belt level). The overhead systems ensure data is updated in real time thereby the map can be used to indicate maintenance, operations, progress, projections, adjustments and the like. As exampled by the SkyView and Captains View.

Genie Filter—A filtering system of intuitive value wherein the User can manipulate the filters manually and/or the backend can further customize the system by factors such as; past use, mood, location, network, selection or otherwise.

Hardware—Pertaining to tools, equipment, devices, units and the like that may be integrated, synced, utilized or otherwise.

Instant Gratification Stimulus Replicators—Systems that replicate the instant gratification sensations achieved by successful gaming, or media platforms.

Linket—A series of Deep Link connections.

Map—Pertaining to a plurality of potential map representations wherein 'map' refers to a visual set of information structured in a visual display whether it be a physical map, a geographical map, a directional map, a design map, a distribution map, a social grouping map, a network map, a connections map, axiom map or otherwise, 'map' refers to data organized a visual manner wherein a viewer can see the data laid out.

Mapping System—Describing the connection between the map data, whereby the data can be compiled and potentially layered into the 3D mesh and/or Axiom Mapping and/or Axiom Smart Map systems.

Marathon—An extended period of overtime work such as to meet deadlines, in emergencies, and the like. Marathon completion can be rewarded as a challenge.

Mesh Network—Mesh Networks are relay nodes that can connect to as many other nodes in a LAN directly, dynamically and non-hierarchal in cooperation to route data. Not having to depend on a single node allows for dynamic distribution of workloads and reconfiguration.

Multi-spectral Imagery—Captures image data within specific wavelength ranges across the electromagnetic spectrum where the wavelengths may be separated or combined, including light beyond the visible light range. Further enhanced with imagery such as hyper-spectral imagery wherein every pixel aims to have data.

OS—An Operating System is system software that manages computer hardware and software resources and provides services for programs.

Probability—To the extent of which something is probable, displayed in percentages, ratios or otherwise.

Real Time—The actual time in which something occurs. To be updated in real time is to be updated now, in the now.

Real World—Referring to the immediate physical reality as close to the raw form as permitted.

Remote Sensing—Data gathered remotely, such as remote imagery systems from overhead or otherwise.

Serer System—ASD governance system(s) SDS—Smart Development Solutions, describing the integrated solutions for identifying active data such as zones, icons and probability metrics.

Skowl DS—Skowl Drone System is an overhead operable governance system and data collection.

SOELL—Smart Operational Experience & Labor Litigation is the system of smart contracts, hiring systems, training opportunities, labor organization, HR services and the like.

Software—Programs and other operating information used by a computer type system.

Such as;—The following is an example to describe without limiting the utility of the aforementioned.

Tool Kits—Downloadable data packages that can provide a multitude of tools as they pertain to the kit contents therein. Tool Kits can contain instructions for all ASD formats, however communicable, so that any ASD can receive data instructions to produce consistent quality where applicable.

Virtual—A reality not physically existing as such but made by software to appear to do so.

XP—Experience Points are rewarded for successful completion, discovery, increase or other accomplishments wherein a reward system can be stimulated.

Zone—Pertaining to parameters that can be static and set by the system or ASD or dynamic and determined by the activity or ASD.

3D Mesh—a system of layering data to be visually represented by the axiom layers.

I. Platform Overview

Consistent with embodiments of the present disclosure, an online platform (also referred to herein as "platform" or "social networking platform" or "ArmCandy platform") for facilitating social networking based on events may be provided. This overview is provided to introduce a selection of concepts in a simplified form that are further described below. This overview is not intended to identify key features or essential features of the claimed subject matter. Nor is this overview intended to be used to limit the claimed subject matter's scope. The online platform may be used by individuals or companies to facilitate social networking.

According to some embodiments, the present disclosure provides a social networking app (also referred to as "ArmCandy" herein) executable on a mobile device (e.g. smartphone) that enables users to find matching dates and events.

What is Celeste

The unification of the optimized digital ecosystem simplified onto one open device. Celeste allows the end user to meet the cloud.

The systems demonstrated through the iconic language via color graphic loopwork of 24 API portals. Each round portal or icon if black and white has no effect on the user API if the User activates the Icon the it signals with color, sounds, and light therefore allowing the quickly manipulate their environment around them. Always forming on demand experience with the outer environment. Celeste accomplishes a practical application of the trustless block chain ledger, cloud computational on demand services, and thoughtful integration with the internet of things bring the user the ultimate leverage over the digital environment around them.

Celeste accomplishes interweaving on demand services oriented at todays groups, networks, and organization. Celeste gives simple control over streamlining, managing, organizing, and facilitating processes from your single screen API. All diverse industries that are amassed then compressed out predicated on the desires of the user or user group.

Purpose of Celeste?

Celeste is a tool to be implement on a device be it phone, tablet, computer, lens, watch, wristband, implant or holographic projection. Celeste is designed to mesh several networks in communication via the iconic language. Linking everything on demand transportation, organization, timing and networking tasks in cities all over the world.

Why Using Celeste?

Celeste creates a unique experience for business people who need or want to travel, facilitating everyday tasks like transportation, cleaning services, meetings, calendar setups, events and networking, all in one software.

This way, once a user has established traveling to another city, different options will be ready to ease the journey and make the stay as pleasant as possible. This turns even the hardest business trip into a comfortable adventure.

The app scans the digital ecosystem for the pre determined settings of the iconic language matrix and feeds the users map interphase in accordance to the most optimal experiences, products, and packages for the user.

Invitations

Celeste has two ways of access to the app:
1. Purchasing the app in the AppStore.
2. Invitation or promotional code (50% off).

IF User has purchased Celeste in AppStore, THEN User has to accomplish one of the following goals in order to invite a friend (one per accomplishment):

1. Be an active member in the app for three months.
2. Have spent $10 000 in the app
3. Have spent $30 000 in the app
4. Have spent $50 000 in the app
5. Have unlocked 5 cities
6. Have unlocked 20 cities
7. Accomplished 10 challenges
8. Visited 50 Events
9. Rated with 4 stars 10 times in one month
10. Rated with 5 stars 8 times in one month
11. 25 additional Check-ins Ways to Join Celeste has two different ways to join the app:
1. As a user.
2. As a worker.

Worker will also be able to use the app as a user, with a discount. The discount will unlock the user site of the application, and it's value will depend on the activity level of the worker.

Subscription Model

User can subscribe to different services inside Celeste, and the subscription can be changed every month depending on users needs.

In the apps settings, user can modify the subscription and include the adjacent apps user wants inside users own Celeste.

Depending on what user activates, and which internal plan (each app does have its own subscription model, and user can choose whichever one user prefers), the monthly price for Celeste will go up or down. User only pays for what user uses. Subscription types are inside each adjacent app.

Marketing Strategy

Market Analysis

Celeste's unique activity combines different sectors other apps have covered separately:

Tour
Festivals
Workshops & Trainings
ICO
Documentary
MLM

Celeste creates a user experience based design, to get in contact with partners and potential associates who share location and go to similar events, using a unique time management tool that allows them to share their schedule.

Customer—Celeste targets business-oriented travelers, and nomadic hearted individual.

Product—Creates organization, travel opportunities and facilitates networking within the same industries among people that think alike.

Structures and manages users day with its time management system.
Connects business people with others who think alike.
Connects business people with those who could work with and/or for them.
Connects business people with others who offer their services such as cooking, driving, assistance, etc.
Connects business people with various opportunities and experiences around the world.
All access pass
Earn rewards Communication Silent advertising and discrete images on social media AND silent video images will be key to catch new User's attention without being intrusive nor interrupting the normal flow of targets day.

Invitation System

The Celeste invitation system is divided in two categories:
1. Buy the App in the Apple Store.
2. By invitation (50% off. IF User is active in Celeste THEN increase ability to invite people (See Invitations).

Mapping

The Celeste Map will not only be accurate in therms of locations, but also in timing. Users can know how long it will take for their counterpart to arrive based on type of transportation and current state of traffic.

This, looped in with the follow up feature of the application will make the map market itself.

Referral System

Celeste will have a referral program, mimicking the MLM system, and it will work in three categories:
referring users
referring workers
referring venues
referring products
referring systems Referring Users A User can invite other Users every time User hit one of the accomplishments included in the list above. But every user can choose a sponsor of his liking (a sponsor can have as many people in his downline as he wants, these are not considered invitations).

Every active user who recommends a new user to the app, and gets them to to sign up under him, will receive 3% of their purchases (whether it is buying, booking or dining through the app).

IF User is not active, (does not use Celeste for three months) THEN remove from referral program until app is used for a month again. Percentages will not get payed during this time.

Referring Workers

Worker (Staff) registered in Celeste will also have access to a referral program. Every staff who successfully refers another worker, no matter the category, will automatically receive 3% of what the new worker earns inside the app. Tips are not included in the referral program.

IF Staff has a rating under 4 stars, THEN percentage will drop to 2%.

IF Staff has a rating under 3 stars, THEN worker will get set back in visibility AND percentage drops to 1%

IF Staff gets ratings under 3 stars repeatedly (5 times in a row) THEN decrease hourly price by 10% (for each 5 times) until Staff gets filtered out AND referral percentage freezes. IF Staff gets rated under 2.5 stars 3 times in a row, THEN Staff gets pushed back in visibility AND referral percentage freezes.

Referring Businesses (Venues)

IF a User finds a new Venue (shop, restaurant, theatre, etc) that is not currently listed in Celeste, but is worth including in the app, THEN User will be able to refer the business to the app. The business will have to satisfy several accomplishments (see Venues) to:
Get accepted.
Stay visible.
Stay inside the app.

Venues pay Celeste a fee in order for them to be in the app. Every User that refers a venue successfully, will get payed 3% of that fee automatically.

IF the rating of the Venue drops bellow 4 stars, THEN drop percentage to 2%.

IF the rating of the Venue drops bellow 3 stars, THEN Venue will filter out of the app.

IF the Venue receives a new good rating, THEN User who referred Venue, will become more relevant in network pool.

App Overview

Celeste will work as an independent app, although many apps are integrated into it.

The filtering system hides one integration per icon or icon-group, which will be included in the following list as soon as they are known.
Workout icon—360Box.io
1. Travel icon (jets, yacht, car, driver . . . )—Vedi.io Celeste will be launched in different steps, in the following order: Unique Events
Homepage
Map
Celeste Cloud
  My cities
  Profile
  Helpful hints
  Cancel outing
Events
Venues
Outings page
Rating system
Iconic Language
Networking
  Team page
  Gameplan
  Time planer
  Rating partners
  Location radius
  Inbox
  Date
Ride sharing dynamics
Ride short term leasing dynamic
Uber economy
  Assistant
  Aid
  Rating service staff
  Networking: Who works for me
  Meter
  Tabs
X Clubs
Private traveling
  Unlock cities
  Challenges
  City page
  Check-ins
  Follow up
Smart data DB
Celeste Homepage
Launching Step: 1 (Unique Events)
  1. IF a User is new to application THEN
  a. Initiate SignUp procedure
  b. Submit a Profile picture of Themselves in the Approved Profile format (AND Verify)
  c. Commence walk-through.
  2. IF a User satisfies walk-through THEN open Celeste Homepage.

User will have several options once User is in the Homepage.
MAP
Celeste Cloud
Tabs
Filtering system
Events/Venues
Outings page
Team page Gameplan page
Time planer
Map
Launching Step: 1 (Unique Events)

Celeste has characteristics of a sophisticated executive assistant planning your events every step of the way, whether the events are public ones or the personal events user can input, with the network of people around user AND a smart map that does not only know where user is at the moment, but also collects data about the exact position of people in users network.

In order to make this possible, Celeste mapping needs to solve several problems displayed bellow:

1. Battery life needs to be respected: 1.5% of battery per hour will be consumed.
2. GPS and Wifi should be activated, even if there is no connection. This is due to a combination of cell triangulation, GPS, and wifi triangulation.
3. Phone has to be active, as well as user signed into user's account.
4. Background app refresh will allow user to get continuous data about the location of contacts and partners in real time.
5. Users will be able to find their partners on the map.
6. Users will be able to find Events AND Venues on the map, depending on what they filtered out or/and what they rated with more than 2 stars in the past.
7. Application determines a search radius based on Typography and Urban Environment, User can expand Or contract Radius (pinch and pull), or type in miles radius In Settings.
8. IF in a meeting THEN map displayed in Outings Page updates in real time predicated on low data consumption AND low battery consumption.
IF in Wifi connection, THEN update in real time to assure low data consumption.
9. IF User or Partner is mobile THEN Refresh Map every 50 feet in Outings.
10. Axiom Mapping
11. Circle Moore Cartography real time 3-D mapping
12. Primary concern: privacy. People tend to feel overwhelmed by a smart map that shares location, because they are concerned about their privacy. There are several factors that lower this concern:
  1. Millennials are less worried about privacy.
  2. Instagram and Facebook use public location already.
  3. Nobody outside of users network or inner circle will know the exact location, nor have access to another user prior to first meet up.
  4. User has to approve exact location sharing by adding other users to his circle.
  5. People that could potentially be interesting for user, will be shown in an estimate location, and won't be as accurate before they get to meet up.

Location is the number 1 conversation trigger in text messages. (Where are you?, I'm leaving the office, I'll be there in 10 minutes . . . ). This makes location a very important topic, specially for social activity based on events.
Features:

1. Celeste Map will be able to tell user how long it is going to take a partner or member of user's network to get to the location where the meeting will take place. Once the user has left the current location, it will be possible to let the counterpart know if user is on his way or not, AND it will calculate the amount of time needed to get to set location, based on:
  one of three types of transportation: public, walking, car.
  current traffic situation. (Counterpart will be updated on situation and ETA of User).
2. Celeste Map will display different events in Users surrounding, based on:
  Upload of Events into Celeste landing page. Event promotors and Venue owners create events in the Celeste Landing page (celeste.vip) to set up their event and/or location to be used in the application.
  Users that like and rate (above 2 stars) a certain type of events, will be likely to find those events on the map based on:
  Filtration system.
  Proximity.
  City discovery.
  Creation of a meeting in the calendar (reserved for step 3: networking).
  Existence of Venues on the map. Users that like a certain type of venues, events and outings (with a high attending rate AND good ratings) will be triggering certain Venues and their Events to pop up in their map based on:
  Filtration system.
  Proximity.
  Discover a new city.
  Creation of an event in calendar (reserved for step 3: networking).
  Scrapping from different web pages which main goal is the promotion of events and venues, (such as Showmango.com) to include their locations and events in one centralized map, specifically tailored to the needs and likes of the user and what user looked for in the filtering page.

Celeste Cloud
Launching Step: 1 (Unique Events)
My Cities

The Celeste Map will automatically know users location at any given moment. User will also be able to switch between cities, to see what's going on elsewhere.

The "my cities" list will be displayed in horizontal boxes with a picture of the city AND the name to the right, the current temperature to the left.

Five cities will be displayed at a time. IF user has more cities than 5 THEN allow to scroll down.

IF User tabs on a city in user's list THEN show Homepage map in new city. IF User explores specific "my city", THEN display content:
  Events user could be interested in, based on past events rated above 3 stars AND network attending Events.
  Venues user could be interested in, based in past venues rated above 3 stars AND network attending Events.
  Service Staff tabs
  Team: only "Who works for me" and "Network" will be displayed. "See who's here" will be hidden. Surprise!
  User will also be able to accept challenges in this city, although the city is unlocked already (see Unlock new cities).

However, User can't just jump into any city. Cities have to be unlocked for them to be added to Users list.

Unlock New Cities—Launching Step: 8 (Private Traveling)

IF user tabs on Unlock new cities in the Celeste Cloud, THEN display cities user could like based on:
  Proximity to one of the cities user currently has on his list.
  Invitations received from a member of user's inner circle (network).
  Popularity of the city in the app.
  All the cities existent in Celeste are inside the list.

IF user tabs on "Help me!" THEN send to Helpful hints where user can search cities manually.

The cities will be shown in vertical boxes, where the name of the city is shown at the bottom. Images of the cities are blurry, and will become clear once User unlocks them.

Like in a game, User will be able to unlock cities by:
Accepting challenges.
Attending at least one Event.

CHALLENGES—Launching Step: 8 (Private Traveling)
User can access to challenges by:
Exploring new cities.
Entering cities User already has visited and tabbing on Tell my fortune.
IF User enters challenges by tabbing on Tell my fortune, THEN send to challenge list for the city User accessed through.
IF User chooses a challenge, THEN send to challenge page.

1. At the top the name of the city and the challenge will be shown.
2. Decline challenge will be a link to the left of the name. IF User tabs here, THEN send back to challenge list.
3. Accept challenge will be a link to the right of the name. IF User tabs here, THEN change link to Retire from challenge.
4. A picture of the challenge will be bellow, along with the date at the top left corner of the picture. In the bottom right corner there will be a box with the following information:
Where
What
How
5. Under the image there will be an extract of a map in a horizontal box. IF User tabs on the map, THEN enlarge map towards the top, right under the Celeste cloud.

User can also access to challenges that were accepted by tabbing on the Outing Toggle AND choosing Challenges.

Inbox—Launching Step: 3 (Networking)
IF User tabs on the Inbox THEN send User to the inbox page.

IF user gets in contact with a new connection (=Network II Who works for me II See who's here II Date) THEN new conversation will be opened automatically. Therefore, User won't be able to create a new conversation.

List of conversations will be inside horizontal boxes with the name of the person to the right. IF a conversation has unread messages THEN show a badge with number of unread messages to the left of the box.

Slide from right side inwards to highlight "delete" in red (akin to iPhone mailbox) Tap on message to open Open message as pop up and scroll through info as no message should be too long IF User opens conversation THEN show name in the top center. Link to Answer will be to the right in the same row.

IF User tabs on link THEN display keyboard.

Profile—Launching Step: 1 (Unique Events)
IF User tabs on Profile THEN send to Profile Page. User can:
See personal information
See picture
See end numbers of payment card
See current city (IF User tabs on the city THEN send to city page.)
IF User tabs on edit THEN user can:
Change payment information
Change access information (email OR phone number)
Change Home city.
Edit city (IF User tabs on edit city THEN send to My cities
Save
IF User needs to change name THEN User has to contact Celeste via the Landing Page.

CITY PAGE—Launching Step: 8 (Private Traveling)
IF User tabs on city OR change city (in the profile) THEN send here. User will see:
A picture with the name of the city to the right AND the current temperature to the left.
Horizontal box Explore events. IF User tabs here THEN send to events page.
Horizontal box Set home city. IF User tabs here THEN send back to last page.
Horizontal box Tell my fortune. IF User tabs here THEN send to challenge list for this city.

Helpful Hints (Turn Off/on)—Launching Step: 1 (Unique Events)
To make everything easier for User, Celeste includes a set of helpful hints pages, that change from page to page.

User can turn the helpful hints off and on whenever User feels like it. IF User tabs in Turn helpful hints off/on THEN send to explanation page.

Cancel Outing—Launching Step: 1 (Unique Events)
Although Event can be canceled by tabbing on the Outings button and choosing the Event on the list, Celeste incorporates a quick and easy cancelation system integrated in a accessible place. IF User tabs on Cancel outing THEN send to list with next Events. IF User slides the box to the left THEN display red tab with "Cancel" written.

Check-Ins
Launching Step: 8 (Private Traveling)
User has to check-in in every city. This can be done by accepting a challenge or attending at least one Event in the new city. This is called Unlock cities. Additional Check-ins:
IF User unlocks new city, THEN suggest up to ten different Events based on popularity in the city.
IF User attends all of those ten Events, THEN User gets ten additional Check-ins.
IF User empties out additional Check-in pool, THEN refill with next ten popular Events.
IF User gets ten additional Check-ins THEN push Users popularity in that city.
IF User gets ten additional Check-ins THEN User will be 20% more visible in "See who's here"
of other Users.

For each 25 additional Check-ins, User gets to invite a new person to the App.

Follow Up
Launching Step: 8 (Private Traveling)
IF User tabs here THEN display world map.
User can see:
Where User has traveled
Additional Check-ins collected
Events attended
Venues visited
Connections made
Trajectory
User will be able to take a screenshot of the busy map AND share it in social media. (See marketing strategy)

Tabs
Launching Step: 6 (Uber Economy)
Back in the Homepage map: IF User tabs on the colored tabs to the right, THEN tabs slide into screen:
Transport (Magenta)—Launching Step: 4 (Ride Sharing Dynamics)

IF User tabs on Transport THEN display more tabs with options:
  a. Air
  b. Land
  c. Sea
IF User tabs on one of them, THEN display horizontal tabs:
  a. With driver
  b. Without driver
IF User accomplished this THEN open up list of Service staff that matches requirements set by User.

Six profile pictures will be shown at a time. IF there are more possibilities than six THEN scroll down.

Launching Step: 5 (Ride Short Term Leasing Dynamic)

IF User selected No Driver THEN profile pictures are pictures of the transportation tool.
  1. Four pictures: inside and outside of vehicle have to be shown.
  2. Name
  3. Specifications
  4. Terms
  5. Rent button IF User selected Driver THEN profile has to have three pictures:
  1. Inside vehicle
  2. Outside vehicle
  3. Driver/Owner
Profile has:
Name
Age
Skills
Experience
Hire button. IF User clicks Hire THEN send to Hiring page.

Assistant (Purple)—Launching Step: 6 (Uber Economy)

IF User tabs on Assistant THEN display more tabs with options:
  a. Male
  b. Female
IF User accomplished this THEN open up list of Service staff that matches requirements set by User.

Six profile pictures will be shown at a time. IF there are more possibilities than six THEN scroll down.
  IF User selects profile THEN send to profile page:
  1. Four pictures: One face, two full body, one custom.
  2. Name
  3. Age
  4. Skills
  5. Experience
  6. Hire button. IF User clicks Hire THEN send to Hiring page.

Date (Light Blue)—Launching Step: 3 (Networking)

IF User tabs on Date THEN open up list of Dates.

Six profile pictures will be shown at a time. IF there are more possibilities than six THEN scroll down.
  IF User selects profile THEN send to profile page:
  1. Four pictures: One face, two full body, one custom.
  2. Name
  3. Age
  4. Skills
  5. Date. IF User clicks Date THEN send Date to Gameplan page.

Dates will be shown based on:
Compatibility with User: similar rating of past events, similar attending Events, similar cities.
Proximity
Ratings received from other Users IF User AND Date are in Bluetooth Range THEN prompt message to User's phone ("Is this the person you contacted?") as well as a slide to determine accuracy of the profile pictures. IF Date's profile pictures are constantly rated bellow 70% accuracy, THEN warn Date one time before blocking account.

IF so AND Date wants account back, THEN request ID verification via Email. IF User slides bellow 60% accuracy THEN ask if date should be cancelled. IF yes, THEN cancel date. IF no, THEN continue. IF Date wanders out of radius more than twice per Outing or Once or Twice for more than 15 mins THEN send Push Notification to User "All Is Well With "[DATES NAME]?"

IF "All Is Well with "[DATES NAME]?" AND User clicks YES THEN END prompt, IF User Answers NO THEN, Date Survey Prompted (DNA Rating System) with option to automatically cancel AND replace Date after User has Rated Date. IF Date averaged below a 2.5 out of 5 star rating AND did not cancel THEN OPTION PROMPTED "End Date?"

IF Yes OPTION, "Select new date?" is prompted IF User Selects Yes THEN Invitation is Sent to All Nearby Available Date(s) via Push Notification.

IF Date leaves Users Bluetooth pairing zone 3 times per Outing or for more than 15 mins THEN send Push Notification "Please enjoy your outing with your date!"
  1. Date will no longer rank as high in the data pool in Celeste after consistent Dates Ended. With a continuation of cancellations the User is Suspended. Each cancelation makes Date Less Visible in Dating Pool by 20% in weekly cycle.
  2. IF 3 out of 7 Dates END DATE with specific User THEN ended Dates are prompted to notify Celeste of the issue with that User.

Aid (Dark Blue)—Launching Step: 6 (Uber Economy)

IF User tabs on Aid THEN display more tabs with options:
  a. Cleaning Services
  House
  Dry cleaning
  Special service
  b. Cook
  c. Guide
  d. Masseuse
  e. Security IF User accomplished this THEN open up list of Service staff that matches requirements set by User.

Six profile pictures will be shown at a time. IF there are more possibilities than six THEN scroll down.
  IF User selects profile THEN send to profile page:
  1. Four pictures: One face, two full body, one custom.
  2. Name
  3. Age
  4. Skills
  5. Experience
  6. Hire button. IF User clicks Hire THEN send to Hiring page.

Filtering Language System/Iconic
Launching Step: 2 (Iconic Language)

Celeste uses a sophisticated yet simple set of icons to communicate type of events and locations with the user, who is able to sort his plans by preference.

Iconic languages are visual, easy to understand, don't need much space and call users attention with color and shape, and even movement and light.

Icons of this nature in Celeste, determine what type of event or venue user wants to look for.

Gameplan Icons
1. Restaurant
2. Cafe/Workspace
3. Conferences
4. Shopping
5. Association
6. Gourmet degustation
7. Sports
8. VIP Events
9. Wifi & DataHub
10. Happening
11. Expositions
12. Lounges
13. X-Club (Yacht, Golf, Jet, Cars, Bikes, Tennis)
14. Workshops
15. Extreme Sports (at your own risk)
16. Sightseeing
17. Concerts
18. Workout IF User selects one or more Event type(s) in the filtering system, THEN display Events AND Venues of that type on the map.

IF User pinches and pulls to zoom in or out on the map, THEN display Events and Venues in the new area too. NOTE: Venues or Events of the same type, close to each other in space will be unified in one icon until User zooms in.

X-Club
Launching Step: 7 (X-Clubs)

User will be able to request to join a club that somebody else created first (via the Celeste landing page).

Clubs are managed by Users through the website. User needs to request to join.

User can get one Check-in per city related to an X-Club.

Events
Launching Step: 1 (Unique Events)

Celeste offers a series of different events, within an always growing network of venues throughout the city. This allows users to always have a place to go, and a spot to meet up. An Event is an action, meeting or celebration that needs a physical space to take place, and it requires the assistance of a certain number of users in order for it to be successful. Events can be added to the application:

1. IF a Venue creates an Event AND uses the Celeste landing page to upload it, THEN Event will appear in Event pool in Celeste.

2. IF a User wants to join an Event that is not created yet, e.g. a concert in a certain Venue, THEN User can create the Event in Celeste calendar, and make Event public to his network.

IF Event gets bad ratings, under 2 stars average, THEN User who uploaded Event AND Venue who held Event, will lose up to 5% of their rating.

3. Scrapping through the networks of existent venues online, will provide Celeste with information about upcoming Events that will be uploaded based on:
   Location
   Venue (those with better ratings will be included. No Venue under 3 stars rating will be looked for while scrapping).

Celeste allows user to rate Events and Venues, with different purposes:

a. Events that get a good rating are more likely to be repeated.

b. Events that get a good rating and take place in a Venue with good ratings, will be more visible in the Event pool.

c. Events that get a bad rating will decrease the rating of the Venue by up to 5%.

Venues
Launching Step: 1 (Unique Events)

Venues are places where Events will take place.

Celeste is not responsible for the Venues, nor their association with the app. Venue owners and managers can upload their Venue to the app, facilitating the scrapping through their network. Events that get bad ratings, will also decrease the Venue's rating by up to 5%.

a. Venues that get a good rating will be more visible, AND their events will have more room in the Event pool.

b. Venues that get a bad rating will be less visible to the point where they eventually get filtered out and disappear.

Outings Page
Launching Step: 1 (Unique Events)

IF User tabs on Outing Toggle THEN toggle becomes colorful and sharp. IF User tabs on Outings Toggle THEN open box with two rows:
   Challenges
   Attending Events IF User tabs on Challenges THEN send User to list of challenges User has accepted. IF User tabs on one of them THEN open challenge page a. At the top the name of the city and the challenge will be shown.

b. Retire from challenge will be a link to the right of the name. IF User tabs here, THEN change link to Accept challenge.

c. A picture of the challenge will be bellow, along with the date at the top left corner of the picture. In the bottom right corner there will be a box with the following information:
   Where
   What
   How d. Under the image there will be an extract of a map in a horizontal box. IF User tabs on the map, THEN enlarge map towards the top, right under the Celeste cloud.

IF User tabs on Attending Events THEN send User to list of Events intended to attend ordered chronologically being the first event the most close in time.

At the bottom of the list will be a horizontal box. IF User tabs here THEN send to Explore new Events (without changing the city)

Team Page
Launching Step: 3 (Networking) and 6 (Uber Economy)

Team members are filtered as follows in order of importance:
   Location
   Filter Button (genie lamp)
   Gameplan Icons
   Proximity
   Compatibility in business
   Shared Event Preference
   Network
   Ratings IF User tabs on Team page THEN open a box with three list items:

1. Who works for me (outer circle)—Launching step: 6 (Uber Economy)

2. Network (inner circle)—Launching step: 3 (Networking)

3. See who's here—Launching step: 3 (Networking)

Who Works for Me

IF User tabs on 1. Who works for me THEN send to profile list. Circular pictures will be displayed, 3×2 in a grid. IF there are more options than six THEN allow scrolling down. Under picture will appear role of Service Staff. IF User tabs on a profile THEN send to profile page. Elements:
   a. Pictures
   b. Name
   c. Age
   d. Home city
   e. Role
   f. Time working
Links:
   a. Remove from list. IF User tabs here THEN show message telling User "If you go ahead, this person will no longer work for you, and won't appear in your pool anymore."
   b. Contact. IF User tabs here THEN send to inbox.
   c. End contract. IF User tabs here THEN show message telling User "If you go ahead, this person will no longer work for you, but will appear in your pool the next time you look for somebody with that qualification"
   d. See payment. IF User tabs here THEN send to seeing payment:
      i. How long User has been employing connection
      ii. How much money connection gets per hour
      iii. How much money User has paid connection by now
Network
IF User tabs on 2. Network THEN send to profile list. Circular pictures will be displayed, 3×2 in a grid. IF there are more options than six THEN allow scrolling down.
Under picture will appear role of Network member.
IF User tabs on a profile THEN send to profile page. Elements:
   a. Pictures
   b. Name
   c. Age
   d. Home city
   e. Role
   f. Time working
Links:
   a. Remove from list. IF User tabs here THEN show message telling User "If you go ahead, this person will no longer work for you, and won't appear in your pool anymore."
   b. Contact. IF User tabs here THEN send to inbox.
   c. Don't show. IF User tabs here THEN show message telling User "If you go ahead, this person will no longer appear in the list of people who typically works and/or travels with you."
See Who's Here
IF User tabs on 3. See who's here THEN send to profile list. Circular pictures will be displayed, in a grid similar to a roulette wheel.
   Three of the options (top ones) are to show people User has never seen or interacted with but could be interesting for Users business network.
   Three of the options (bottom ones) are to show people User has already meat and are currently in the same city as user.
   Under picture will appear role of the person (main occupation). IF User tabs on a profile THEN send to profile page. Elements:
   a. Pictures
   b. Name
   c. Age
   d. Industry
   e. Role
   f. Home city
Links:
   a. Remove from list. IF User tabs here THEN show message telling User "If you go ahead, this person will no longer appear in your pool anymore."
   b. Contact. IF User tabs here THEN send to inbox.
   c. Don't show. IF User tabs here THEN show message telling User "If you go ahead, this person will no longer appear in the list of people who could be interesting for you."
Gameplan Page
Launching Step: 3 (Networking)
   1. IF user tabs on Gameplan THEN button will be colored and sharp.
   2. IF user tabs on the date above calendar THEN allow user to set desired date.
   3. IF user has appointments in calendar for chosen date THEN display in calendar AND allow to drag&drop into drag&drop zone.
   4. IF user tabs on "explore events" THEN open Events list based on (in order):
     Location o Users past ratings o User's connections "attending events" o Most used filters
   5. IF user has Staff hired AND/OR Network/See who's here AND/OR Date in Gameplan reels, THEN let user drag&drop desired connections into the drag&drop zone.
   6. IF user has no Staff hired AND/OR Network/See who's here AND/OR Date in Gameplan reels, THEN invite user to look for company by clicking on the plus sign for any of the reels above, depending on mood.
   7. IF user tabs on plus sign for any of the reels, THEN send to profile list.
   8. IF user tabs "finalize" without drag&drop connections in the drag&drop zone, THEN prompt asking if user wants to attend the chosen Event alone.
   9. IF user tabs "finalize" without drag&drop events in the drag&drop zone, THEN ask user to choose an event to invite connections to.
   10. IF user finalizes Gameplan with Events AND connections THEN send requests to all connections invited via INBOX page.
   11. IF invited connections accept THEN send message back to user via INBOX page.
   12. IF User sends invitation to connections THEN connections won't receive any more invitations OR work request for the given time frame until connections decline.
   13. IF connections accept, THEN connection gets inaccessible to other Users AND display with 50% opacity in other Users reel.
   14. IF connection is a Date AND Date gets invited to an Event THEN prevent Date from being chosen in Profile lists OR Date reels of other Users AND display with 50% opacity.
   15. IF Date accepts invitation to Event THEN make Date invisible to other Users.
   16. IF Date accepts invitation to Event THEN send message back to User.
   17. IF Date declines Event THEN prompt message to User asking User to chose a new date OR to attend the Event with other connection.
   18. IF User drag&drops multiple Dates simultaneously THEN pop up "Group Event?".
   19. IF User tabs on Group Event, THEN send message to Dates notifying Group Event.

20. IF Date accepts invitation to Group Event THEN set meter for all participating Dates.

Time Planer

Launching Step: 3 (Networking)

IF User tabs on Live Updates THEN tab slides up until right under the last tab. User will see the title Live Updates AND a link to Create Event To the left User can choose a year. IF User chooses year THEN display tabs so User can choose a week.

IF User chooses a week, THEN years disappear and weeks take the place (small circles on the left side of the screen) AND tabs appear to choose a day.

IF User chooses a day, THEN days appear in the circles to the left.

Complete date will appear under Live Updates AND Events, tasks and activities User has input in the calendar before will appear.

User can also create Events, which lets User choose accurate date. IF User creates an Event THEN send to Gameplan page calendar. User can make an event public and invite multiple people to it.

IF User types in something new into User's calendar, THEN activity or task will appear in the calendar.

Rating System

Launching Step: 1 (Unique Events)

The average of 3 stars is the default in the Celeste Rating System. If untouched, automatic rating of 3 stars will be applied. User can manipulate the rating by sliding up and down the scale, which will have consequences for both user AND Event/Venue.

Everything below 2 stars will be considered bad rating.

IF bad rating is applied repeatedly THEN Event/Venue will eventually get filtered out.

IF user rates Event or Venue with 1 star THEN Event or Venue will become less visible in global event pool.

IF user rates Event or Venue with 2 stars THEN Event or Venue will become less visible in user's networks.

IF user rates Event or Venue with 3 stars THEN Event or Venue will continue being visible in global event pool as well as user's network.

IF user rates Event or Venue with 4 stars THEN Event or Venue will become more visible in user's networks.

IF user rates Event or Venue with 5 stars THEN Event or Venue will become more visible in global event pool.

IF User rates Event or Venue with 1 star THEN User's rating will go down by 2% as well. IF User rates Event or Venue with 2 stars THEN User's rating will go down by 1% as well. IF User rates Event or Venue with 3 stars THEN User's rating will stay the same. IF User rates Event or Venue with 4 star THEN User's rating will go up by 1% as well. IF User rates Event or Venue with 5 star THEN User's rating will go up by 2% as well.

RATING SERVICE STAFF—Launching Step: 6 (Uber Economy)

IF User rates Service with 1 star THEN User's rating will go down by 2% as well. IF User rates Service with 2 stars THEN User's rating will go down by 1% as well. IF User rates Service with 3 stars THEN User's rating will stay the same. IF User rates Service with 4 stars THEN User's rating will go up by 1% as well. IF User rates Service with 5 stars THEN User's rating will go up by 2% as well.

IF User does not rate Service THEN apply default rating of 3 stars AND neutralize rating given to User by Service.

IF User rates Service with 1 star THEN Pop up screen will ask User if he wants to tip. IF User rates Service with 2 stars THEN Pop up screen will ask User if he wants to tip. IF User rates Service with 3 stars THEN Pop up screen will ask User if he wants to tip. IF User rates Service with 4 stars THEN Pop up screen will ask User to tip between 5% and 15%. User has to slide the scale to answer.

IF User rates Service with 5 stars THEN Pop up screen will ask User to tip between 15% and 50%.

User has to slide the scale to answer.

IF User does not tip and rate above 2 on a regular basis (70% of ratings or more) THEN badge will appear in Service view of User's profile, to indicate constant dissatisfaction. IF User tips well and rates above 3 on a regular bases (70% of ratings or more) THEN badge will appear in Service view of User's profile, to indicate gratefulness and generosity.

RATING PARTNERS—Launching Step: 3 (Networking)

Partners are people that are included in the two other networking categories:

Network: People who work for OR with you.

See who's here: People who have worked OR could work for User based on User's industry and connections.

User can rate partners included in See who's here after first meeting.

User can rate Partners included in Network only IF User eliminates Partner from the Network (e.g. ending contract).

IF User decides to keep Partner in User's inner network, THEN include Partner in Network.

IF User rates Partner with 1 star THEN User's rating will go down by 2% as well. IF User rates Partner with 2 stars THEN User's rating will go down by 1% as well. IF User rates Partner with 3 stars THEN User's rating will stay the same. IF User rates Partner with 4 stars THEN User's rating will go up by 1% as well. IF User rates Partner with 5 stars THEN User's rating will go up by 2% as well.

IF User does not rate Service THEN apply default rating of 3 stars AND neutralize rating given to User by Service.

Networking

Launching Step: 3 (Networking)

Celeste gives the User the opportunity to see what's going on in the city, but also facilitates networking with other Users who have the same interests or work in the same industry. User will have three different type of networks:

1. Who works for me (reserved for launch stage 6—Uber economy): includes people User hires inside the application. There are two different types of hiring processes:

a. Time limited contract, where User can hire e.g. a driver for 2 weeks.

b. Meter, where Service gets paid by time worked.

2. Network: People who are with User either partners, coworkers or partners who know User personally.

3. See who's here!: includes people that are not in Users inner network, but that are in the same city as user AND could work with User. Looks like a roulette and there are two different types:

a. Known: three people User has already met in the past, and are currently in the same city.

b. Unknown: three people User has never met before, but could be compatible with User's businesses AND are currently in the same city as User.

Meter

Launching Step: 6 (Uber Economy)

Meters in Celeste are inApp hired people.

IF User hires Staff THEN prompt two options:

1. Set meter. IF Meter is set THEN run times with the price/hour set by Service.

2. Set price. IF Price is set THEN ask for time frame AND calculate price for time frame based on price/hour AND ask User to set price around given number.

EVERY Service staff member has own meter.

Base hourly price is set by Staff member inside a price range set by the Application.

Hourly price can increase or decrease based on ratings and reaction time:

1. IF Staff requests a service AND service takes more than five minutes to respond, THEN reduce hourly price by 1% for every 5 minutes of delay.

2. IF Staff gets ratings under 3 stars repeatedly (5 times in a row) THEN decrease hourly price by 10% (for each 5 times) until Service gets filtered out.

3. IF Staff gets 4 stars repeatedly (5 times in a row) THEN increase hourly price by 10% for each 5 times.

4. IF Staff gets 5 stars repeatedly (5 times in a row) THEN increase hourly price by 20% for each 5 times.

5. IF Staff does not attend 1 in every 50 requests THEN decrease hourly price by 10% AND push Staffs profile 50% back in the Service pool.

6. IF Staff does not attend 1 in every 40 requests THEN decrease hourly price by 5% more AND push Staffs profile 40% back in the Service pool.

7. IF Staff does not attend 1 in every 30 requests THEN decrease hourly price by 5% more AND push Staffs profile to the back of the Service pool.

8. IF Staff does not attend 1 in every 20 requests THEN decrease hourly price by 5% more AND push Staffs profile to the back of the Service pool.

9. IF Staff does not attend 1 in every 10 requests THEN decrease hourly price by 5% more AND push Staffs profile to the back of the Service pool.

Location Radius

Launching Step: 3 (Networking)

1. User unlocks cities on the world map by:
   a. attending events
   b. accepting challenges 2. Once User has unlocked a city on the map, User can see everything that goes on in the city os choice.

3. Radius is set by pinching and pulling the map in Homepage.

Problem: Mathematics

Question Question Central Tendency

For the graph/network concept, see Centrality.

In statistics, a central tendency (or, more commonly, a measure of central tendency) is a central or typical value for a probability distribution. [1] It may also be called a center or location of the distribution. Colloquially, measures of central tendency are often called averages. The term central tendency dates from the late 1920s. [2] The most common measures of central tendency are the arithmetic mean, the median and the mode. A central tendency can be calculated for either a finite set of values or for a theoretical distribution, such as the normal distribution. Occasionally authors use central tendency to denote "the tendency of quantitative data to cluster around some central value." [3][2] The central tendency of a distribution is typically contrasted with its dispersion or variability; dispersion and central tendency are the often characterized properties of distributions. Analysts may judge whether data has a strong or a weak central tendency based on its dispersion.

Question Truth Maintenance Systems

A truth maintenance system, or TMS, is a knowledge representation method for representing both beliefs and their dependencies and an algorithm called the "truth maintenance algorithm" that manipulates and maintains the dependencies. The name truth maintenance is due to the ability of these systems to restore consistency.

It is also termed as a belief revision system, a truth maintenance system maintains consistency between old believed knowledge and current believed knowledge in the knowledge base (KB) through revision. If the current believed statements contradict the knowledge in the KB, then the KB is updated with the new knowledge. It may happen that the same data will again come into existence, and the previous knowledge will be required in the KB. If the previous data is not present, it is required for new inference. But if the previous knowledge was in the KB, then no retracing of the same knowledge was needed. Hence the use of TMS to avoid such retracing; it keeps track of the contradictory data with the help of a dependency record. This record reflects the retractions and additions which makes the inference engine (IE) aware of its current belief set.

Each statement having at least one valid justification is made a part of the current belief set. When a contradiction is found, the statement(s) responsible for the contradiction are identified and an appropriate is retraced. This process is called dependency-directed backtracking. The TMS algorithm maintains the records in the form of a dependency network. The nodes in the network are one of the entries in the KB (a premise, antecedent, or inference rule etc.) Each arc of the network represent the inference steps from which the node was derived. A premise is a fundamental belief which is assumed to be always true. They do not need justifications. Considering premises are base from which justifications for all other nodes will be stated.

There are two types of justification for each node. They are:

Support List [SL]

Conceptual Dependencies (CP)

Many kinds of truth maintenance systems exist. Two major types are single-context and multi-context truth maintenance. In single context systems, consistency is maintained among all facts in memory (database) and relates to the notion of consistency found in classical logic. Multi-context systems support paraconsistency by allowing consistency to be relevant to a subset of facts in memory (a context) according to the history of logical inference. This is achieved by tagging each fact or deduction with its logical history. Multi-agent truth maintenance systems perform truth maintenance across multiple memories, often located on different machines. de Kleer's assumption-based truth maintenance system (ATMS, 1986) was utilized in systems based upon KEE on the Lisp Machine. The first multi-agent TMS was created by Mason and Johnson. It was a multi-context system. Bridgeland and Huhns created the first single-context multi-agent system.

Maintained by color, patterns luminosity, translucency, volumes, forms, dimensionality, perspective, level and facade Modeling Uncertainty How do users retrieve information specific to their immediate impulses; how do we filter and determine behavioral desires; the unknowns=SMART DATA MANAGMENT managing the slush of data.

Warned against the right path by color, patterns luminosity, translucency, volumes, forms, dimensionality, perspective, level and facade=

Belief Revision

Contraction, expansion, revision, consolidation, and merging

In the setting in which all beliefs refer to the same situation, a distinction between various operations that can be performed is made:

contraction removal of a belief; expansion addition of a belief without checking consistency; revision addition of a belief while maintaining consistency; consolidation restoring consistency of a set of beliefs; merging fusion of two or more sets of beliefs while maintaining consistency. Revision and merging differ in that the first operation is done when the new belief to incorporate is considered more reliable than the old ones; therefore, consistency is maintained by removing some of the old beliefs. Merging is a more general operation, in that the priority among the belief sets may or may not be the same.

Revision can be performed by first incorporating the new fact and then restoring consistency via consolidation. This is actually a form of merging rather than revision, as the new information is not always treated as more reliable than the old knowledge.

Maintained by color, patterns luminosity, translucency, volumes, forms, dimensionality, perspective, level and façade.

Intuitionistic Logic

Sometimes more generally called constructive logic, is a system of symbolic logic that differs from classical logic by replacing the traditional concept of truth with the concept of constructive provability. For example, in classical logic, propositional formulae are always assigned a truth value from the two element set of trivial propositions ("true" and "false" respectively) regardless of whether we have direct evidence for either case. In contrast, propositional formulae in intuitionistic logic are not assigned any definite truth value at all and instead only considered "true" when we have direct evidence, hence proof (We can also say, instead of the propositional formula being "true" due to direct evidence, that it is inhabited by a proof in the Curry-Howard sense.) Operations in intuitionistic logic therefore preserve justification, with respect to evidence and provability, rather than truth-valuation.

Unproved statements in Intuitionistic logic are not given an intermediate truth value (as is sometimes mistakenly asserted). One can prove that such statements have no third truth value, a result dating back to Glivenko in 1928. [1] Instead they remain of unknown truth value, until they are either proved or disproved. Statements are disproved by deducing a contradiction from them.

A consequence of this point of view is that intuitionistic logic has no interpretation as a two-valued logic, nor even as a finite-valued logic, in the familiar sense. Although intuitionistic logic retains the trivial propositions from classical logic, each proof of a propositional formula is considered a valid propositional value, thus by Heyting's notion of propositions-as-sets, propositional formulae are (potentially non-finite) sets of their proofs.

From a proof-theoretic perspective, intuitionistic logic is a restriction of classical logic in which the law of excluded middle and double negation elimination are not admitted as axioms. Excluded middle and double negation elimination can still be proved for some propositions on a case by case basis, however, but do not hold universally as they do with classical logic. Several semantics for intuitionistic logic have been studied. One semantic mirrors classical Boolean-valued semantics but uses Heyting algebras in place of Boolean algebras. Another semantic uses Kripke models.

Intuitionistic logic is practically useful because its restrictions produce proofs that have the existence property, making it also suitable for other forms of mathematical constructivism. Informally, this means that if there is a constructive proof that an object exists, that constructive proof may be used as an algorithm for generating an example of that object. Formalized intuitionistic logic was originally developed by Arend Heyting to provide a formal basis for Brouwer's programme of intuitionism.

Constructive Proof

In mathematics, a constructive proof is a method of proof that demonstrates the existence of a mathematical object by creating or providing a method for creating the object. This is in contrast to a non-constructive proof (also known as an existence proof or pure existence theorem) which proves the existence of a particular kind of object without providing an example. Some non-constructive proofs show that if a certain proposition is false, a contradiction ensues; consequently the proposition must be true (proof by contradiction). However, the principle of explosion (ex falso quodlibet) has been accepted in some varieties of constructive mathematics, including intuitionism.

Constructivism is a mathematical philosophy that rejects all but constructive proofs in mathematics. This leads to a restriction on the proof methods allowed (prototypically, the law of the excluded middle is not accepted) and a different meaning of terminology (for example, the term "or" has a stronger meaning in constructive mathematics than in classical). Constructive proofs can be seen as defining certified mathematical algorithms: this idea is explored in the Brouwer-Heyting-Kolmogorov interpretation of constructive logic, the Curry-Howard correspondence between proofs and programs, and such logical systems as Per Martin-Lofs Intuitionistic Type Theory, and Thierry Coquand and Gerard Huet's Calculus of Constructions.

The Digital Trinity

Meronomy in knowledge representation

In formal terms, in the context of knowledge representation and ontologies, a meronomy is a partial ordering of concept types by the part-whole relation. [3]

The classic study of parts and wholes, mereology, has three axioms: [4] the part-of relation is Transitive—"Parts of parts are parts of the whole"—if A is part of B and B is part of C, then A is part of C.

Reflexive—"Everything is part of itself"—A is part of A.

Antisymmetric—"Nothing is a part of its parts"—if A is part of B and A !=B then B is not part of A.

Meronomies may be represented in Semantic Web languages such as OWL and SKOS.

Transitive=AC to Celeste User to Date Date to Meter User to Level 1 Level 1 to Level 8

Reflexive=AC to AC Date is User User is Date

Antisymmetric=AC anti AC AC<AC

AC A is greater than AC B

AC B comes after AC A therefore AC is greater but equal and different (do not recycle rebuild reinvent)

INFO=(Smart Data)

Smart Data is the networking communication software between the front end and back end that will make the Celeste platform go tick tock.

Intake Survey+Daily HP Interaction+Outings Interaction+AC Page+Mood Gauge=INFO INFO=ICEBREAKERS (Smart Data)

Front End INFO>or =Back End info?
    Front end: Intake survey Ac Survey
    Outings Check X Hearted System
    Mood Gauge
    Spending Gauge
    RYG System
    Profile
    DNA Rating System Icon GamePlan
    Back end: Event Analytics Event Management Event Organizing Event Sponsorship
    Outing Frequency Icebreaker Interaction Spending Frequency Spending Patterns
    Collective Outing Trends Business Analytics Sector Cash Velocity User Preferences Date
    Preferences
    Collective consumer appreciation gauge GeoFencing internal mapping
    Trick Question it's a Digital Feed Back Loop & Ecosystem of smart data that translates into a smart experience (eventually an AI)
    INFO+Spending Gage+Number of outings+Joux on Reserve=USER vs. Date
    INFO+Intake Survey+Mood Gage+ICEBREAKER INTERACTION+DNA Ratings+Celeste GAMECENTER Survey Interaction=User Compatibility All icebreakers contribute to the overall customer experience in AC it allows the application the gage the compatibility of user date interaction in live environments and their interactions with the environment.

Ultimately the icebreakers are a yield from the intake survey and influenced and the frequency of outings and location there of moreover events attended on those outings.

the icebreakers generate a feedback loop when interacting with AC Page Game Center to help improve User and Date interactions with people and help keep them up to date on certain upcoming events while interacting with the Red Yellow Green Light System and AC Dating pool.

Reinforced by gradual evolving color, patterns luminosity, translucency, volumes, forms, dimensionality, perspective, level and facade Help
  1. App Walk-Through
  2. Helpful hints
How Celeste Functions User will download FREE Celeste application onto a Smartphone (1) capable of supporting the program and the Bluetooth technology (27) it requires. This application requires connection to a 3G, 4G, LTE or WiFi (2) to connect to the Celeste Network (36).

Once downloaded the first screen will show a "LogIn OR Signup" Pop-up superimposed over the Celeste background. The User will enter in a valid email address less than or equal to 255 characters long following a pattern of \_\_\_\_\_@\_\_\_\_\_.\_\_\_\_\_, User's first name, User's last name, a password that is different than all other submitted information and their date of birth which is a past date greater than or equal to 18 years prior to the current date (3). IF the User has satisfied all of this information THEN tap "LogIn" (47). IF the login is successful then the server should send a Web Token in its response. This token will then be used for further communication with the server. Almost ALL API requests thereon will require this Web Token to be provided in its request (49) otherwise the request will fail and prompt the message "Email or password incorrect" (3). Once the User has finished the initial Sign-up (3) a short survey (5) will be prompted to begin development of the User's Profile (34). The 'Initial Survey' (5) is a short five question survey which displays a series of photographs as the potential options to best describe User's answer to each of the five basic questions. The answers to the survey (5) will begin categorizing (10) the User's perceived personality, interests and intentions (34). This Photo-testing strategy is a window into the active dating intentions to keep the User engaged and interactive in the Celeste approach to social outings. Once the initial survey (5) has set some parameters for the User's Profile (35), page will re-direct to the Celeste application Homepage Map to begin the tutorial (6). The tutorial (6) will give a quick interactive overview of the application including highlighting the point (8) balance on the screen and the five toggles (7) listed horizontally across the bottom of the screen. The Celeste application utilizes the purchase and exchange of points (8). Every User will be given an initial 500 points and therefrom MUST have a minimum balance of 500 points at all times (32). These points are purchased (16) for 9.97 points per $1.00 and are used to distinguish different Dates (31), Events (16), Promotional Items (37), Ticketed Events (45) and services provided by any affiliated companies (44). The Points are Used (16), Gained (32), Rewarded (38) by Point Exchange (46) within the application in a simple smooth transition. Once the Tutorial (6) is completed the User will be asked to select an accurate profile picture (MUST be a photograph of their face) to complete the sign-up process (4). It will be requested that ALL User's (AND Date's) verify (49) all of the photos they submit to avoid misleading anyone AND ensuring proper representation (4). With all of the sign-up procedures completed the User is now ready to use the Homepage (9).

The Celeste Homepage (9) is the far Left Toggle (7) of five horizontally along the bottom of the screen. By taping (47) on the toggle User will be taken to the Homepage Map (9) where all profiles and Events that appear are pre-filtered (10) to compliment any information known about the User (35) and their preferences (34). Initially, the only information will be from the short 'Initial Survey' (5) during the Sign-up procedure (4), as the User begins using the application, more information on their preferences (12) (13) (28) will be collected (34) and the results will continue to be filtered (10) and sorted (35) to meet their desires (36) THIS is the 'User's Profile' (34) within the Celeste System (46) that orchestrates The Celeste Network (36). The Homepage Map (9) is two parallel columns the length of the vertical screen that scroll vertically by dragging a finger along the length of the screen (47). The columns display two separate User's profile photo's along the left (DATE's) for every one Venue displayed along the right (EVENT's) 2:1. IF a User selects a Profile photo by taping the image once (47) the User will be redirected to the Celeste Page (11) where a larger version of the photo will be visible above Red, Yellow and Green blocks from left to right respectively. The Date's Name will be listed along with a points evaluation (31) of how many points Users needs to invite Date to an Event (19) and three small dots beneath the photo to browse the other two (preferably verified (49)) photographs (4) by sliding a finger over them (47) to switch between the three photos (Profile, Fullbody and Choice). IF Date has a Meter (17) THEN a Gold written word "Meter" will be present in the Bottom corner. The User will then have the opportunity to just simply tap the color they rate the Date (12) with their finger (47) AND image will 'swipe' in respective direction (47).

THIS is the revolutionary Red, Yellow, Green Light rating system (12) unique to the Celeste System (46). The light system (12) selections are incorporated into the User's Profile (34) along with any collected patterns of usage (35) regarding common interests of 'HEARTed' Events (13) AND Survey information (5)(28), frequency of activity (34), and social circles (35) to determine most suitable matches (36). By creating the 'light system' (12) Celeste has introduced a revolutionary way to organize users preferences (35) with "yes" "maybe" and "no" as opposed to just "yes" and "no" which opens the platform for the system (46) to combine aesthetic preferences (12) with natural compatibility (36) to create the most appealing scenario possible (36)—rather than completely denying people (RED) (12) you may share high compatibility (35) with. IF User has 80% shared preferences (35) and interests (13)(34) with a Yellow Lit Date (12) THEN Yellow Lit Date will supersede Green lit Date (12) in GamePlan Date Reel (14) Unless Green Lit Date (12) is superior in compatibility (36) to Yellow Lit Date (12) ALSO. These preferences and interests are determined by events 'hearted' (13), Location (27), Interests (34), Intake survey (5), additional surveys (28), AND IceBreakers (24) 'hearted' or answered similarly (36) THEN the system (46) filters (10) the priority to the most compatible (36) combination of desirability (12) and interests (13).

IF User selects (47) the Toggle (7) to the right of the Homepage Map (9) Toggle (7) THEN page will redirect to the Outings Page (13). The Outings (13) page is a verified (49) photograph of an Event beneath a horizontal reel that displays Days to be scrolled horizontally by dragging a finger over the screen (47). The top is an image of the Map Location of the Event determined by Celeste Bluetooth location system (27), the Points (8) required to attend the Event and The bottom are "Check", "heart" and "X" icons to signify "attending", "like" and "dislike" respectively when taped (47). The rating of events (13) increases the information known about the User (34) and the User's Profile System (35) begins to Filter (11) and Categorize (35) with a better specificity (36) for compatibility with other Users (35).

WHEN a User Green OR Yellow Lights a Date (12) AND/OR Checks OR Hearts an Event (13) User is redirected to the Gameplan Page (14). The Gameplan page (14) is two movie reels horizontally parallel across the screen above a third, smaller reel at the bottom. The TOP reel scrolls horizontally across by dragging a finger over the screen (47) to display Events (13) that have been 'Liked', 'Hearted' (13) OR Suggested (37) by the Celeste filtering (11) system (46). The BOTTOM reel scrolls horizontally across by dragging a finger over the screen (47) to display Profiles that have been Green OR Yellow lit (12) DEPENDING on compatibility (35) OR Event selection (37). Next, User will DRAG & DROP (15) the Event(s) AND Profile(s) into the Bottom "Final" Reel by pressing finger to the screen over the image (of Event OR Profile) and sliding finger down to the slot on the bottom. AS the images are added to the bottom reel (15) the "Points" tab will increase respectively to the necessary points (31) required for the selections. IF User requires more points (8) THEN pop-up will signal the User to purchase (32) more in order to finalize (16) the Outing. IF User selects multiple Dates (18) for one Outing, Dates will receive Meters (17) automatically (18).

A Meter (17) is applied to any Date that has confirmed (20) an invitation (19) to an Outing with Multiple Dates (18) OR has High Point rating (31), Star Rating (30), Green Lights (12) AND qualifies for a Metered-Date Incentive Promotion (41). The meter allows for Dates to gain 10% of their Point Value (31) for every hour of the date (22) as opposed to gaining a base sum of points based on the point evaluation (31). IF a metered Date (17) confirms (20) within 24 hours of the Invitation (19) BEFORE the 2 hour cut off (20) THEN User will be charged a metered rate for the Duration of the Date UNLESS the Date 'turns the meter off' (17) in Profile Page (29) at Dates discretion. Outings (23) can be cancelled (33) Prior to the 2 hour cut off in the Profile Page (29) where a Cancel Toggle is located (33) OR IF either Date OR User is unsatisfied with the Outing (23) can be Cancelled (33) with Cancel Toggle (33) in Profile Page (29) to Leave Outing early (26), Points division (32) and Reimbursement (8) will be adjusted by Celeste after Ratings (30) and Evaluations (28) are completed.

OuterNEt

A further component/process of the present disclosure provides the optional retrofit dongle. This is an electronic device dedicated to geolocation. In the invention's preferred embodiment the dongle is approximately the size of a cigarette butt. It will utilize industry-standard geolocation techniques such as WiFi hotspot correlation to narrow the location down to within 5 feet, in the invention's preferred embodiment. Alternative or future embodiments of the invention may utilize Bluetooth and GPS to make the geolocation even more accurate. Importantly, the dongle is closely tied into the AC GNSS system, described later in this disclosure. In addition, the dongle may also have an integrated battery pack. This can aid with the high power drain of the mobile device, and help mitigate the power-draining effects of continually searching and checking for users in proximity even while offline.

A further component/process of the present disclosure provides the optional customized phone case. In the invention's preferred embodiment, this may include geolocation functionality similar to the dongle in the preceding description. In addition, the phone case may also have an integrated battery pack used to recharge the phone, similar to the dongle. As with the dongle, this can aid with the high power drain of the mobile device. A further component/process of the present disclosure provides the AC GNSS system which ties into many of the aforementioned components, described as follows. This provides the ability to connect with other field sensors that emit format data simultaneously with a GPS, so data from multiple sensors can be incorporated into the data-collection application.

All active Users and Dates of the present invention Application will receive the aforementioned phone dongle designed exclusively for the present invention's Network to enhance the present invention's Application experience.

As mentioned the Dongle will have a slim case to fit around the bottom of the mobile device, and is roughly the size of a cigarette butt in the invention's preferred embodiment. The location of the Dongle on the mobile device enables it to double as a "back-up battery life" by holding a 40% charge for the mobile device to be administered through the connection at the bottom of the mobile device. The Dongle itself can be charged by the USB output for wall charging or the solar cells on the back of it by either being outside or leaving it on a windowsill or a table that receives direct sunlight. An additional model will not have solar panels and merely a connection for a USB charger.

Beyond supplying an additional full battery life the Dongle will be able to assist in creating the perfect present invention's experience with the usage of free, offline outernet connection to the GNSS satellite network. The benefits of such a connection are described as follows: First, there is increased safety. This can be subdivided into categories and sub-processes: Further provided is Familiarity. The Dongle creates a predictable familiarity when people are engaging in any the present invention's orchestrated Outings. This is recognized first of all by the trademarked phone Dongle that EVERY member of the present invention's Network will have to ensure validation among people who may be meeting for the first time.

Further provided is Predictability. The accurate GNSS system is designed to override the internal GPS on iOS device with the location data coming from the external GPS so all existing apps using internal location services can benefit from the increased accuracy without any changes to the app. This creates an extremely accurate prediction system for arriving Dates and the orientation of meeting-up with people to engage in the present invention's Outings. There are Parameters. The accurate GNSS system will be able to map out the interior of all Event locations being attended by emitting and receiving data from the satellite networks as well as any devices also on the network. These Parameters are essential to the safety and predictability of the application to ensure that no one gets lost either in the venue or separated from their Date. Further provided is a Separation Radius: The present invention's application enforces the agreement of set radii used during all Outings orchestrated by the present invention. The Dongle is essential for this feature by maximizing the accuracy of the location relative to the radius of the User/Date agreement.

Further provided is an Outing Cessation. To aid in the Safety of the application the Dongles also ensure that the Date has ended and that everyone had a good time. Next, there is the category of Functionality Within the Application.

Further provided is a Precise Search Radius. The present invention's Page is filtered by a search radius and the more accurate the location the more efficient the application becomes. This is most notable with people who are traveling and need their radius updated by the second. Further provided is a Moving Network. As the GNSS Detects movement (traveling) of the Mobile Device the Dates will automatically be filtered as they move into or out of the selected radius set ensuring that only Dates with the proper proximity to the User will be shown. There are New Events: Events will be constantly updated as the mobile signal moves into new areas of the map depending on the proximity to locations for ticketed events as well as businesses affiliated with the present invention.

Further provided is Movement Communication: A Push Notification to state that the search radius for the present invention's Events and Dates had been adjusted because the GNSS system detected a substantial difference in location. "We noticed you've been traveling! You will see NEW Events and Dates for your current Location!" Then Promoted to select "OK" or "Take me Home" which will allow the regular Dates and Events in their Home Location to remain on the feed (assuming that they are heading back home or booking in advance)

Notably, the Filtered Events and Dates will constantly be filtered dependent on movement and other factors. However, the push notification will ONLY show up when a substantial distance has been traveled such as to a new city. Within the City limits, e.g., from East side to West side. The feed will automatically sync without notification. Further provided is Accurate Mapping Data: The GNSS System is integrated into the present invention's Ticketing agency to create accurate parameters and mapping solutions. This is useful both within the application during Event booking and in action for the duration of the Event to provide directions, parameters and suggestions. Further provided is support for Interior Mapping: Interior maps are made for the stadiums, platforms, booths and elite reservations which the ticketing agency will be selling tickets as well as the mapped out interiors of all business locations promoted on the present invention to ensure that the purchaser gets what they are looking for through clear communication about the Event.

Further provided is Exterior Mapping. Exterior mapping shows the street maps around the precise location of every Event available on the present invention's Application. There are Location Directions. As a result of Exterior mapping and the location of the mobile device directions can be provided through the application so that the Event can be found with ease.

Further provided is a Personal Radius process: The Radii set between the Date(s) and User(s) whilst on an Outing to ensure that they don't become separated. Should they do so the safety notification will pop up to ensure that everything is okay and everything is going well on the mobile devices of all parties involved.

Further provided is Push Notification Activation. Push Notifications are activated throughout the day and throughout the duration of any the present invention's Outing. The Dongle will recognize the movement from one location to another, the meeting or separating of peoples as well as the initial arrival and the final separation. As a result, Icebreakers, periodically, Safety Notifications, regarding Date Radius, Arrival Times, location and suggested arrival time and Suggestions, proximity to other Events, Directions, Advertisement etc. will all be activated depending on the data emitted. There are IceBreakers. These are the same IceBreakers described earlier in the disclosure. IceBreakers are initiated at the beginning of every Outing and the Arrival of every event unless they have been manually shut off by both parties. The location of the mobile signals will enable the system to know when to initiate the push notifications for the IceBreakers. Further provided is Arrival Communication. As the Outing is about to begin and the Date is coming to meet the User, Or the User arriving to pick up the Date the arrival time will be sent and the image of the other person will pop up in the application so there will be no problem finding the other if this is a first time outing. Further provided is Direction. As a result of Exterior mapping and the location of the mobile device directions can be provided through the application so that the Event can be found with ease.

Further provided is Safety. The Radius's set between the Date(s) and User(s) whilst on an Outing to ensure that they don't become separated. Should they do so the safety notification will pop up to ensure that everything is okay and everything is going well on the mobile devices of all parties involved.

Further provided is Event Promotion. Events in the proximity of the signal of the mobile device can be promoted during the initial search. But also, push notifications can be sent during an outing if they don't have the "complete Outing" of three Events. For instance if a User has booked one outing at a restaurant and the Application recognizes that based on the GNSS signal they are in very close proximity to a great evening Event the application system will then promote this Event to prolong the evening should the parties be having a good time. The Date would have to accept the additional Event.

Further provided is Quality Assurance. Push Notifications after every Event will be requesting an evaluation of the Event a "Later" button is also available on the push notification. At the end of the evening a full evaluation is prompted for the other party and any unevaluated Events attended.

Further provided is Survey Initiation. Surveys are activated upon the cessation of an Event, the movement around or between Venues and upon Outing completion. Depending on the Data Emitted.

Further provided is Event Survey. Push Notifications after every Event will be requesting an evaluation of the Event a "Later" button is also available on the push notification. To evaluate the quality of the Event location.

Further provided is Date/User Evaluation. At the end of the evening a full evaluation is prompted for the evaluation of all Users and Dates that attended the Outing to evaluate the outcome. These evaluations are pivotal in the calculation of the User/Date's ratings and points. There are Safety Backup Surveys. The Radius's set between the Date(s) and User(s) whilst on an Outing to ensure that they don't become separated. Should they do so the safety notification will pop up to ensure that everything is okay and every thing is going well on the mobile devices of all parties involved.

Further provided is Boredom Recognition. If someone is not notably moving too much and the data mining is collecting signals of mindless browsing, boredom recognition will be activated and promotions or push notifications will be initiated.

There are Location Signals. Based on the GNSS signals of the Mobile device the location can be determined, this aids in the filtering of Dates and Events in the present invention's HomePage Map.

Further provided is a Movement Monitor. The amount of movement detected will help to determine whether someone is sedentary in one place and possibly "bored". Further provided is Data Tracing. In conjunction with data collection of phone usage and "mindless browsing" the application system can determine the availability of the individual or whether or not they may be "bored".

Further provided is Event Promotion. This will stimulate push notifications to promote new events and suggestions for outings that evening.

Further provided is Selective Promotion. Based on movement patterns and data mining regarding data usage the promotions will be pre-selected to what is most likely to be successful. Further provided is a DNA Rating system. This is the same DNA Rating system from earlier; it allows check in check out of locations' push notification. Further provided is WiFi and Network Positioning. For any GPS to work the antennae needs a clear view of the sky. Users of smart phones will frequently be in "urban canyons" or indoors. This is where WiFi and cellular network positioning become necessary. Both of these methods are used by smart phones as indoor positioning systems.

Generally, WiFi positioning is more accurate than cellular network positioning. It uses wireless access points and measures the intensity of the received signal from one or more networks to find the position. Interestingly it doesn't require your device to be WiFi enabled to work. Bluetooth dongle disconnection will trigger geolocation processes.
Platform Architecture The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 200 through 1200 have been described to be performed by a computing device 1600, it should be understood that, in some embodiments, different operations may be performed by different networked elements in operative communication with computing device 1600. Embodiments of the present disclosure may comprise a system having a memory storage and a processing unit. The processing unit coupled to the memory storage, wherein the processing unit is configured to perform the stages of methods 200 through 1200.

Figure 16:
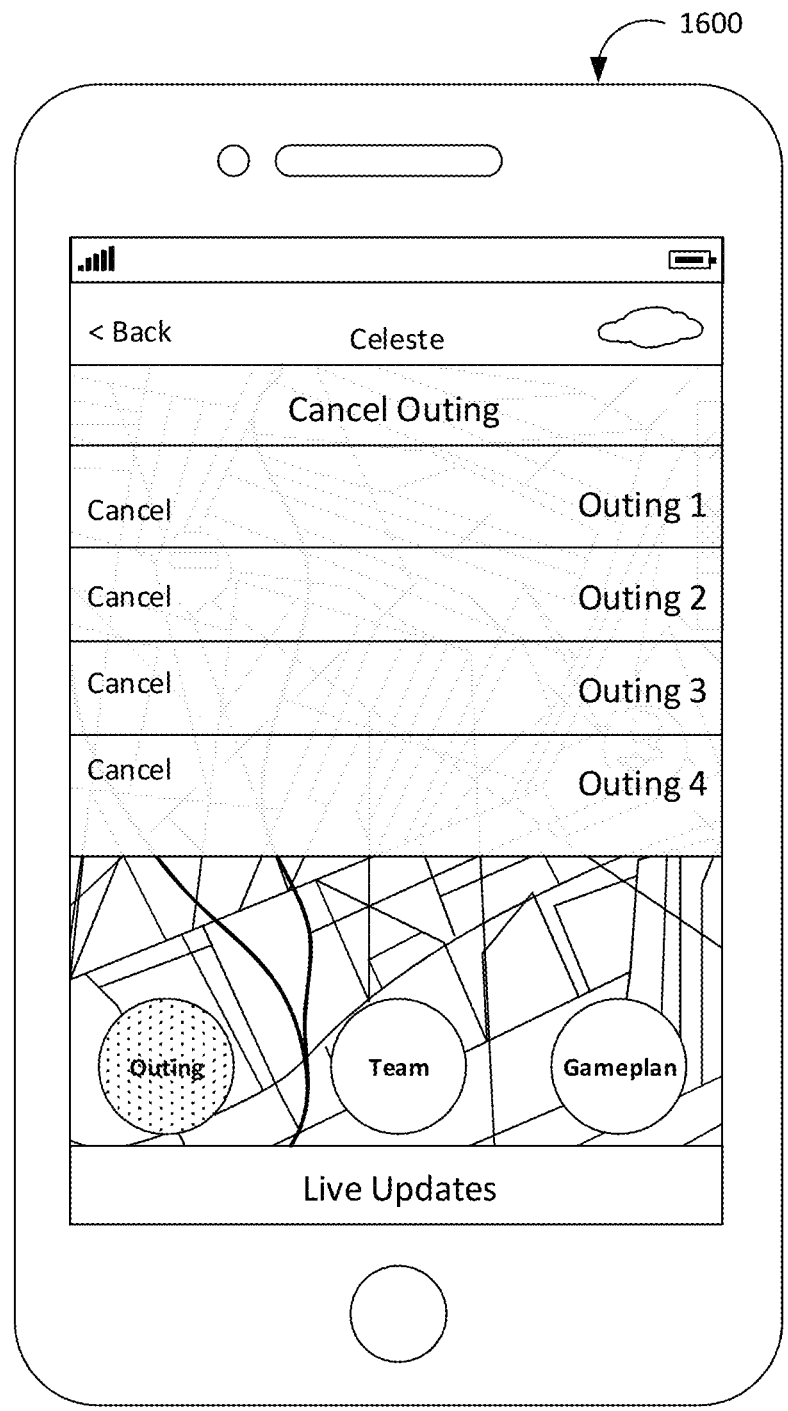
FIG. 16 illustrates a screenshot of a User interface for facilitating provisioning of social activity data to a mobile device based on user preferences that allows a user to cancel outings and change date or time, in accordance with some embodiments.

FIG. 16 is a block diagram of a system including computing device 1600. Consistent with an embodiment of the disclosure, the aforementioned memory storage and processing unit may be implemented in a computing device, such as computing device 1600 of FIG. 16. Any suitable combination of hardware, software, or firmware may be used to implement the memory storage and processing unit. For example, the memory storage and processing unit may be implemented with computing device 1600 or any of other computing devices 1618, in combination with computing device 1600. The aforementioned system, device, and processors are examples and other systems, devices, and processors may comprise the aforementioned memory storage and processing unit, consistent with embodiments of the disclosure.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and nonvolatile, removable and non-removable media implemented in any method or technology for storage of information, such as computer readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media.

Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620) may perform processes including, for example, stages of one or more of methods 200 through 1200 as described above. The aforementioned process is an example, and processing unit 1602 may perform other processes. Other programming modules that may be used in accordance with embodiments of the present disclosure may include image encoding applications, machine learning application, image classifiers etc. Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure. All rights including copyrights in the code included herein are vested in and the property of the Applicant. The Applicant retains and reserves all rights in the code included herein, and grants permission to reproduce the material only in connection with reproduction of the granted patent and for no other purpose.

Screens
1. Sign in/Sign up
2. Sign up questionnaire
3. Survey (5 screens) or Mood Gauge
4. Walk through tutorial
   a. Homepage Map
   b. Outings page
   c. Team page
   d. Game plan
   e. Tabs
   f. Time planer
5. Homepage Map
   a. Filtering system
6. Team page
   a. See who's here (outer circle)—Roulette
   b. Network (inner circle)
   c. Working for me (inApp hiring)
7. Game plan
8. Profile page
9. Mailbox
10. Payment page
11. Invitation page
12. Edit profile
13. Edit payment page
14. Hiring page
15. Profiles
    a. See who's here (outer circle)—Roulette
    b. Network (inner circle)
    c. Working for me (inApp hiring)
16. Profile privacy policy
17. Profile terms and use policy
18. Profile about us info
19. User rating
20. Event rating
21. Time planer
    a. Gameplan itinerary
    b. Create events/task Integrated Applications Ratings in Integrated Applications User will see items that user could like in the app, and will be able to value these items with:
Red: not at all
Yellow: maybe
GreenL Yes!

360Box

360box.io

360Box is the workout plan inside Celeste.

A User who signs up with 360Box will have the ability to use 360box through Celeste, being able to cash in Joux as a payment method.

User signed up with 360Box will have the ability to get personalized fitness and weight management advice, to book a trainer and to communicate with other people of their community.

User who register with 360Box will also have a referral program. Every active user who recommends a new user to the app, will receive 3% of their purchases (whether it is buying supplements, e-books with recipes, or book a personal trainer).

IF User is not active, (does not use 360Box for three months) THEN remove from referral program until app is used for a month again.

Trainer can also be a part of the referral program. Every trainer can sign up trainers under him. A trainer who recommends another trainer under him, will get 3% of what that trainer earns inside the app.

Prices inside the app will depend on the package chosen by user. There will be a minimum payment.

There is also an option for a subscription, which will have different levels:
Get recipes every month
Get workout and recipes plans every month
Get recipes, workout plans and a personal trainer once a week (minimum).

Every user who signs up people under him will get 3% of whatever they spend. 360Box also works as a betting agency. User can bet against other users, backing bets with some parameters (i.e. "I bet this person won't stay in the gym for more than 3 months). If the user wants to accept the bet, user has to equal the amount in order for him to get the money on bet. IF user looses, THEN money will go to charity.

360Box is a city for sport challenges. User can map out the city with Go Pros while working out.

The site will also have its own shop, tied into Purchase, where user can buy sports gear.

Savvanna

Savvanna is a hiring software, training centre and nomadic workshop built for Celeste to find potential staff and train it for it to work inside the application. It works in the backend of Celeste, and won't be visible for user.

The applications Potential Employee Identifier process will be generated by the employer within 20 clicks of qualifier tiles or less. The interactive software on web based platform will allow the specifications of candidate to be selected, as well as the detrimental qualities. The back end system will sort through the dormant qualities required in the applicant to satisfy the employer's requirements.

Savvanna works based on the existence of two types of profile:
a. Company. Looks for employees.
b. Individual. Looks for employers and/or skill training.

Savvanna has five main aspects:
a. Hiring aspect: Savvanna establishes contact between a company and an individual potential employee, facilitating the hiring process between both parties.
b. Skill training aspect: Companies will be able to set up an internal learning platform to train their employees based on their own needs. Employees on the other hand, will be able to increase and perfect their abilities and skills, whether they are currently working or not.
c. Networking aspect: Every user, no matter what type of profile they are represented by, has access to news and stories about events with the following main themes: work, employment, management and development.
d. Team management: Tasklists can be set up and shared, for members and employees of a company to be worked out. In the beginning, the tasklist manager will be implemented through Todoist's API. Later on, Savvanna will have its own tasklist and team manager.
e. Time management: Unique time representation sets up a personal calendar for each individual, whether it's a employer or a potential employee, so time becomes a very simple concept.

Therefore streamlining the employment process on both sides.

Positions posted in Savvanna will have a job application set up, for many this will include a job aptitude test, logic questions, virtual reality scenarios, and third party phone interview (when required).

There are seven different screening mechanisms processes all attributed different weighted values 1-10 based of Savvanna algorithm Binary Resume (4): Is the digital Savvanna profile of the applicant. The profile will be determined by the 7 screening mechanism Employment History (6-10): Short, sweet and simple. Relevant to post according to employer with minimal references, thereby references are confirmed by third party call center.

Job Aptitude Testing (8): Is a basic survey specific to the custom specifications that the employer has input for the job description. The Aptitude test will examine the basic structure of the company as well as the fundamental requirements of the position to create survey questions testing for compatible qualities in the applicant.

Personality Identifier (8): A personality survey is infused into the application survey to help determine a more accurate profile for the applicant. Questions will be on mental functioning, analytical and creative characteristics that which apply directly to job functionality to avoid 'personality prejudice'.

Logic Questions—(4-10) sliding scale depending upon employment: The logic puzzles are designed to test the applicants of advanced placement positions that require a specific level or area of competence. They will be in a puzzle game format and tailored to examine the skills in question. Moreover, the software will develop application 'games' for people to play on their phone (akin to Luminosity) to further develop their skill based profiles.

Virtual Reality Scenarios—4-10 sliding scale depending upon employment sector:

Especially useful in trades or service, virtual reality will create scenarios to assess the applicant on criteria such as procedure and time management skills. There will be a variety of scenarios, as the procedure for an EMT's application will be very different than that of a Retail Sales Representative.

Phone Interview—6-10 sliding scale depending upon position to be filled: Initial interviews are conducted by third party to identify qualifiers for candidates based on the employers request. The top ten ranking applicants will receive notifications to set an appointment for a phone interview with the certified employees at the Savvanna Call Centre. To ensure the Savvanna policy is maintained to the best of our ability the Call Centre will take the calls for the initial interview and score the Applicant against the Employer's professional specifications taking the applicants aptitude compatibility into account. These evaluations will be submitted as the "Percentage of hire" to the employer.

Process

Companies have the ability to order the aforementioned steps by importance, while Savvanna calculates the percentage of compatibility between user and company in each step, plus a general percentage.

IF the general percentage or any of the specific areas is at least 60%, THEN application will be submitted to company.

IF the percentage of any of the specific areas is over 80% AND the mentioned area are not between the first three chosen by the company, THEN application will be pushed anyways. IF the percentage of any of the specific areas is under 45%, THEN the applications will be hold, ELSE IF general percentage is over 70%, THEN push application.

When the Savvanna process is complete the employer receives a number of applications, while the program looks for keywords that match between the individual and the company. The application of those who have a high compatibility with the company, whether it's based on a specific area or a general percentage, will be more visible to the company. The employer will now review applications and ask those who are considered best for the position, to schedule an appointment. The Applicant will receive an E-mail and an SMS text message to notify them that they need to schedule an appointment according to the companies inputted dates.

The Employer will receive the Applicant's digital profile including their overall percentage. It is advisable that the employers choose the highest ranked applicants that our system and the certified Savvanna employee's have deemed them most likely to succeed in the vacant position.

Personal information such as name, picture and address, won't be shared until the (first) interview took place.

SOFTWARE NAME: Savvanna

PURPOSE: The Purpose of Savvanna is to streamline the hiring and employment process moreover break down the barriers that traditional hiring methods have.

Certain applicants are viewed as inferior and are being marginalized during the employment process.

This includes the people who fall into the "over 50% of resume's are thrown out due to their name sounding unappealing" statistic. Also those who are considered to be affiliated with a Race, Religion, Gender, Age, Language or address less preferred by the employer regardless of the applicant's compatibility for the position.

Savvanna will connect directly to e.g Linkedin (or other pools of candidates) as a simplistic one step log in method moreover streamlining the employment application process.

APPLICATION: Savvanna will be a software and an online application centre and eventually become an online staffing agency as a representative providing companies with the applicants most qualified for the position.

The Online component will allow applicants to create an account with Savvanna for free.

Once the applicant has their Savvanna account they can upload their resume to their profile and start browsing job postings which match the search specifications entered.

The Software component will be distributed to the companies as a free subscription model. The Software will enable the companies to create application surveys for the positions they are filling, the ratings charts, the resume browser or simply the statistics that the back end algorithm can pull up on the Savvanna application bank.

APPLICANT: The applicant will sign up for their free Savvanna account online to begin the hiring process, the applicant will never be charged for using Savvanna. The profile will be given a numerical code linking to their profile, this is the key to the secure privacy settings of Savvanna as their personal information will never be revealed until they have actually completed an in-person interview with the employer.

WHY? This ensures that the applicants are being surveyed and selected for the position based on their suitability and whom is truly most qualified for the job.

WHAT? The personal profile is essentially under strict privacy settings until after an interview is held, keeping personal information beyond Education, work experience, any certified volunteer work or extra recognitions and minimum two references (personal, professional or character) hidden.

HOW? The resume essentially becomes a series of key words, patterns and categories all linked to the one binary code of that applicants profile. The Binary resume represents the ghost resume that is circulated throughout the system, broken down into key elements, sorted and stored categorically in the 'potentials' file of compatible positions. The physical resume is kept private to ensure the applicants personal information is kept from open circulation.

WHEN the applicant would like to apply for a position they will select "Apply now" which will prompt the applicant to fill out the employers custom characteristic Application Survey. These Application Survey's are designed with the Savvanna Software that the Employer has and is constantly updated in accordance with company specifications and modified for every new position.

ALSO there will be a 'resume builder' function, and it's completion is mandatory for Savvanna to store keywords and maintain an organized overview of the incoming applications. It creates structure and simplicity for quick easy solution to resume writing.

COMPANY SOFTWARE: The Savvanna Software will enable the companies to build specific customized streamlined employment processes to filter out all the applicants to the ones that are best suited for their position.

WHAT? The Application Survey's are designed by the employers with the specifications of their company values, work schedules and commitments, their social skill requirements, educational requirements, goals and ambitions, workplace environment definitions etc. The Survey length will be indicative of the job's prestige (for example, 'Phd required' will be longer than 'GED required') and will be designed by the employer using the Survey Builder function.

HOW? The Survey Builder is a multidimensional system that implements the Software's predetermined survey questions to deduce the applicants character and basic work ethic in addition to specific codes, questions and requirements added by the employer to further specify exactly what they are looking for in an applicant—to ensure that they are a good fit for the company all around and circumventing the 'key word trap' (where people just use several key words that will link them into the short list). The employers efforts in building the survey is entirely up to them and how specific their customization would like to get, for instance the employer can either list several requirements they would like the applicant to meet-leaving the Software to develop a few questions to deduce such responses or they can develop specific questions they would like the applicant to answer directly (to ensure accuracy the software will create a 'validation question' to basically double check that their answer to the overt question remains consistent).

THEN once the applicant has finished their survey, their binary resume is relocated from the list of 'potentials' in the employers file (determined by resume compatibility) and scored to reveal their overall standing in applicant-position compatibility for that particular company.

IF the applicant scores in the top 10 applicants by the time that the application window is closed then they will be invited to a phone interview with the Savvanna call centre IF requested by the employer. Therefrom the employer will chose the top 3-5 to come in for a personal interview with the employer.

INTERVIEWS: The Savvanna Software will filter the applicants until the top applicants are chosen based on personal and professional compatibility with the company. The top ten applicants will be contacted via email and sms to notify them that they have been selected to interview for the position. Times and dates will be generated by software accordingly. During the interview the employer will be able to pull up the applicants resume, personal and professional compatibility charts apart from the overall "percentage of hiring", which wont be displayed until after the interview has been reviewed by the employer.

Interview Ratings are the employer the 'first thoughts' as to how the interview went to allow for consultation at a later time (to spark memory incase the day was filled with several interviews) when the employer returns to the 'interviews' tab in their page they will see the completed interviews of that day (as well as future interview date and times) and next to the applicants name will now display a 'Percentage of hiring'.

If additional interviews are required then the same process will ensue, with notifications being sent to the applicants to set up a date and time for an interview, the compatibility profile being accessible during the interview (in addition now to any notes from the previous interview(s)).

Value Proposition

What can for Big Business and Society

BENEFITS: The brand Savvanna needs to become a recognizable and trustworthy symbol of job fairness and opportunity for all qualified applicants as well as a system that works to bring employers the most competent employees for all of their job vacancies. Also, since the time and team management have a big role in Savvanna, companies and individuals will be more likely to keep using the platform, even once they have completed the hiring process.

Whether the user finds what he was looking for or not, the platform remains useful, since it is a networking tool that establishes contact between the different parties (working and hiring).

Accuracy

The Savvanna System will work on a back end algorithm that collects and incorporates the information input by the applicant alongside the specifications set by the employer.

20 Clicks

Resume Input

Job Aptitude Scoring

Logic Puzzles and Games

Rating System

The 20 categories for the employers specifications will be _____.

Resume Upload:

Back End Word Categorization:

Resumes will be tracked down for keywords, depicting mindset, attitude, and character of the individual.

Key words representing educational history, certifications, management and leadership positions and previous work experience, will also be stored. These words could include, "Supervisor" "Medicine" "Law" "Food" "Flight" "Reserves" User will be able to choose certain answers from a given list (dropdown selection) rather than writing. This way, the categorization of individuals gets easier.

IF user needs to input a job title that is not on the given list THEN user can create "new entry". IF "new entry"

doesn't differ in at least one word from existing entries THEN use existing ones automatically.

IF resume contains key word in question THEN filter into back-end data base.

IF resume contains ZERO key words specified THEN resume filtered out ELSE IF potential candidates exhibit superior to the curve qualifiers during aptitude examination processes THEN resume results are averaged out with the other screening process results.

IF two words that are previously specified as categorical placement are found in context THEN the same filtering process would apply.

For example "Fine Arts" would filter into the category of any Educational achievement in the Arts, such as (Masters) Degree of FA, Bachelors of FA, PhD in FA . . . etc. This filter would be useful when an employer is looking for an applicant with a degree in Fine Arts of some form for a position in their company.

Key words are helpful, but not novel nor complete. Thus they will be combined with the Job Application, Aptitude Test, Logic Puzzles, Games and more to ensure that accuracy is the ultimate result.

Relocation Sliding Tab:

The relocation filter will control the search radius for job positions to be linked up with.

IF the applicant slides the tab for relocation THEN jobs outside of their immediate radius (50 mile) will be shown.

IF applicant slides the relocation tab to non-relocation THEN only the positions in the immediate current radius will be shown.

IF applicant would like to modify the location radius between 25, 50, 100 or 200 mile radius's THEN change the default (50 miles) in the specifications.

IF applicant would like to modify the RE-location radius's THEN change the default (city) to state, country or global in specifications.

Willing to Travel Sliding Tab:

The willing to travel tab will filter the mobile positions available.

IF the Applicant slides the tab ON for 'willing to travel' THEN allow applicant to LINK to all mobile positions awaiting application.

IF the applicant slides the tab OFF for 'willing to travel' THEN REMOVE all mobile positions awaiting application.

IF the applicant engages the willing to travel filter ON, THEN make ALL mobile positions available to them. BOTH long distance travel (like a country wide sakes rep.) AND local travel (like inner-city delivery).

Availability Specifications

Full-Time Sliding Tab.

IF slid-on or activated THEN full time positions will be filtered in.

IF slid-off or deactivated THEN full time positions will be filtered out.

Part-Time Sliding Tab.

IF slid to on THEN part time positions will be filtered in.

IF slid off THEN part time positions will be filtered out.

BOTH will have sub categories of early morning, day, night, overnight, any to specify their hours of availability.

IF EITHER of the specifications are chosen THEN filter in the positions that correspond.

ei. IF 'Early Morning' is selected alone THEN only filter the jobs that are listed as early morning availability. IF 'Early Morning' and 'Day' are selected together THEN filter the jobs that are listed as either or both.

The specifications are in place to help filter out hours that aren't possible for applicants with other commitments such as children, school hours or other jobs.

Education Requirements:

IF an employer specifies an educational requirement THEN scan the applicants for relevant key words. Most of the educational requirements such as level of education and area, can be automatized by giving the applicant a number of options to choose from.

THEN send the tailored games and questions to the applicants for further compatibility evaluation (LOOP).

IF an employer has left a general EITHER open educational perimeter THEN lessen the value of the Educational filter.

Open Educational requirements THEN filter everyone in. (No Educational Specifications)

General Education requirements THEN filter anyone with a GED or Diploma or Any Educational record that can be found with the keywords.

IF employer specifies an educational requirement that would've required an apprenticeship or residency THEN also scan the resume for those terms and filter based on keywords.

Personality Indicators

Control and Cooperation:

Personality questions such as:

"I prefer to take direction." OR "I work well in a team." OR "I prefer for everyone to see things my way."

Will contribute to the back end data scoring of the applicants personal profile.

The characteristics of control or cooperation will be scored against each other and the job descriptions with the corresponding qualifiers THEN will be filtered in.

Leaders and Enforcers:

Personality questions such as:

"There are always necessary means for breaking the rules." OR "I prefer to lead a large production." OR "I prefer to ensure procedures run smoothly."

Will contribute to the back end data scoring of the applicants personal profile.

The characteristics of a leader or an enforcer will be scored against each other and the job descriptions with the corresponding qualifiers THEN will be filtered in.

Self-Motivated and Motivated by Others:

Personality questions such as:

"I work better on my own than in a group." OR "I prefer to take care of others." OR "I feel more energized when I am helping the less fortunate."

Will contribute to the back end data scoring of the applicants personal profile.

The characteristics of Self-Motivated and Motivated by Others will be scored against each other and the job descriptions with the corresponding qualifiers THEN will be filtered in.

Assertive Persistence and Liberal Refresh:

Personality questions such as:

"I often get completely absorbed in a task I am doing." OR "I prefer new challenges daily." OR "I would rather work long term to perfect a single skill."

Will contribute to the back end data scoring of the applicants personal profile.

The characteristics of Persistence and Refresh will be scored against each other and the job descriptions with the corresponding qualifiers THEN will be filtered in.

Personality Descriptions:

Are the accumulated profiles cross referenced in the back end data pools and categorically sorted into the following general titles.

The Director: Leader, Control, Assertive, Self-Motivated,
The Campaigner: Leader, Cooperation, Assertive, Motivated by Others
The Diplomat: Enforcer, Cooperation, Liberal, Motivated by others
The Logician: Leader, Control, Liberal, Self-Motivated
The Socialite: Enforcer, Cooperation, Assertive, Motivated by Others
The Loyalist: Enforcer, Control, Liberal, self-motivated
-TBC Personal Interest Questions could be added to the games section. Designed like an Icebreaker for themselves? Like Dream Jobs, ultimate goals etc??

Double loaded questions can deduce personal and professional qualities and categorize their answers into respective qualities.

For example:

What gets you up in the morning?

My kids, My nicotine craving, The commitment to my morning jogging group, I'm not a morning person, My school schedule.

This question gains information on personal characteristics such as motivation and is also indicative of possible external schedules (such as school).

Ex. IF the applicant selects 'my nicotine craving' THEN a job with smoke break accessibility could be short listed, BUT not one without to be removed, no discrimination just more availability.

Games—how You Handle Pressure

The games and logic puzzles serve to extract data about the Applicants personal characteristics as well as their functional skills such as time management and ability to handle pressure. With games that require speed and escalating time frames the Applicant will be scored based on their responsiveness to the circumstances and effectiveness for finding the solutions.

Three tentative game ideas:

Speed Direction: The applicant must divert all of the vehicles to their appropriate locations BY opening OR closing blockades to allow the vehicles to reach their appropriate destination (color coded).

The vehicles will begin to move faster and closer to each other increasing the level of difficulty. A game like this would test their responsiveness to pressure, time coordination, management and oversight. The game would give three 'lives' and however long it took to fail three times would contribute to their overall score (longer time, more successful completions). IF the Applicant can successfully connect a vehicle to their location THEN they will be awarded points towards their overall score.

The Memory Table: There will be three memory games, escalating in difficulty.

The initial one will be the basic matching game with a time dependent twist. The bubbles will float up from the bottom with question answer sort of matching icons or comparative matching icons. When matched, the bubbles pop, making more room. As the bubbles build up they will need to increase their speed to pop the bubbles before the screen fills, if it does-game over.

The secondary will be the re-creation of patterns on a grid. The grid continues to multiply so more tiles can be colored in to create more complex patterns to remember. For example, the first will be a four section grid w the upper left colored in, then an eight section grid with three squares colored in, etc.

The third will be boxes that reveal moving icons and the corresponding match must not only be the same shape but also moving in the same way.

Icons can be Faces, Actions, Objects or Words. And the icon will be scored based on those four categories which have the best chance of recognition (maybe some people are clearly better w objects that's faces, or better with words than actions) these patterns of recognition will be computed and categorized into traits such as Faces-Social, Actions-Creation, Objects-Busy or Words-Literary. They will have corresponding qualities of relevance that will contribute to the data profile.

Overall, memory games are indicative of concentration and recall. The three exercises will determine different areas of these qualities and whether or not they are more apt for social analytical or compartmentalization.

Rebound Strategy: Basically combines a slingshot with mini golf in the format of pool. Essentially what happens is that the ball must travel from the launch pad to the end zone in one shot.

The board will continue to change shape with every level, increasing in difficulty. The right amount of pull on the sling shot must be applied for the right amount of corresponding speed, the walls will provide rebound and the end zone can be any shape or size. This will analyze the geometric knowledge, angles as well as the thought process regarding strategic planning.

Tauntine

Tauntine is a network goal oriented crowdfunding platform with voters rights through master nodes, and a roting financing system on the blockchain Tauntine provides each user with a digital multi-currency wallet, able to hold digital and cryptocurrency. The wallet will be able to hold a different number of currencies, and the number increases depending on what users subscribe for.

Tauntine monetizes users assets. Making transaction through a interlaced mesh network, minimizing cost ant transaction time, will increase customers financial freedom. Taking the responsibility from third party entities and putting it back into users hand, makes banking active, allowing full access to users wealth and its steady growth.

Tauntine enables peer-to-peer lending between members.

Tauntine enables staking of the most relevant currencies in the market.

Tauntine enables quick access to fiat currency while keeping the digital currency they where holding before.

For example:

If User has 200 Joux, being the value of each Joux $1.5 at this point in time. User can put those 200 Joux in escrow, and get a loan for $300 in return. Tauntine will then save the Joux safely, and user will get them back as soon as the loan is payed back. User will get back the amount put in escrow, irregardless of the volatility the currency suffered in the meantime. User can tell Tauntine for how long the loan will be active. Therefore, user can tell the system right away, when he intends to pay it back.

The interest for the loan will be set based on the plan user drafted in the beginning, and will be subtracted from the amount to be returned.

IF User exceeds the set lending time, THEN a penalty will be applied and subtracted from the amount to be returned.

The Tauntine network is automated, rated and encrypted.

Users can link together in a network and build per-to-peer lending. User will always be rated with red, yellow and green light.

Red: low activity, tendency to delay payments without explanation, not trustworthy.

Yellow: beginner, medium activity, neutral trust.

Green: long time investor, very trustworthy and honorable.

Tauntine also offers a strong solution for payment management, making banking very easy, by creating tasks and goals for each user to fulfill, saving a set amount a month for expenses, and preprogram what will be done with the rest.

Tauntine allows user to have complete access to their purchasing power, having control not just of what they need, but of what they have. This way, the personal use of the economic system increases its value as it makes it dynamic and growth oriented, fighting stagnation and inflation; as well as designing a network where borrowers and lenders are equally important, as one can't exist with the others absence. Transactions are therefore precise and avoid any loss.

(Whitepaper for Inspiration)

The SALT smart contract credit agreement has several key functions:

Secure Collateral Storage. The blockchain assets underlying each loan are stored in a fully audited, ultra-secure multi-signature architecture throughout the life of the loan.

Key Features Include:
  scalable management of collateral
  mitigated counterparty risk
  streamlined arbitration
  non-custodial escrow; and
  automated loan servicing Automatic Collateral Management. SALT Lending's read-write oracle smart contract is specifically designed for blockchain asset collateral management. The SALT oracle smart contract amalgamates real-time global market price metrics from multiple data channels to assess the mark-to-market valuation of the collateral securing the credit agreement, while simultaneously tracking the borrower's loan balance. If the value of the collateral depreciates below a dynamically determined threshold, a maintenance call notice is issued to the borrower. In the case of a maintenance call, the borrower can either add more collateral, make an extra payment reducing the loan balance, or do nothing and the SALT oracle smart contract will automatically initiate the liquidation of a portion of the collateral in order to re-calibrate the overcollateralization of the loan. Liquidation occurs through an automated trading engine, which utilizes proprietary investment logic to optimize trade execution A Blockchain-Backed Loan is money borrowed for any kind of personal or business use, such as making a big purchase, paying off credit card debt, investing in home improvements, taking a vacation, or paying for business expenses. The loan is collateralized by a blockchain asset, such as Bitcoin.

SALT wants to make things simple for its Members. There are no origination fees, closing costs, or prepayment penalties on the fixed rate term loans arranged through the SALT platform.

to pay off their loans early at no additional cost to them.

This is in strong contrast to terms often offered by conventional lenders. Typically, conventional loans are accompanied by a myriad of itemized fees such as upfront origination fees, which can exceed 5% of the loan balance, and monthly servicing fees that are paid by the borrower on top of the monthly payments to the lender. SALT has opted for a simple model where fees charged to borrowers are rolled into an annual Membership to promote transparency and fairness. elect at any time 3.1 Secured Automated Lending Technology SALT Lending has developed protocol agnostic technology to automatically manage blockchain-backed credit agreements between borrowers and Members may Terms and conditions apply. Subject to suitability, KYC & AML screening. based on a live assessment of available liquidity, order book depth, and price velocity across multiple exchanges via distributed market orders for each currency pair.

Credit Agreement Terms Enforcement. The SALT smart credit agreement performs several loan servicing functions autonomously. It monitors the origination of the loan, directing cash from the lender's bank account to the borrower's bank account, and it tracks monthly payments from the borrower to the lender. If a borrower misses a payment, the technology automatically liquidates a portion of the collateral and gives sale proceeds to the lender as payment on the borrower's behalf. Once the borrower repays the loan in full, the remaining collateral is returned to the borrower.

SALT's smart credit agreements act as a bridge between two historically divided systems: the world of blockchain assets and the world of traditional financial infrastructure. The SALT Lending Platform is structured to provide financial institutions and lenders with the ability to capitalize on this rapidly growing asset class. SALT's technology is designed to systematically quantify and mitigate lending risk, while simultaneously giving borrowers an alternative means of accessing the value of their assets.

If the value of a borrower's blockchain asset increases, then depending on the terms of the loan, the borrower may have the option to (1) add the increased value to the principal of the loan for an additional extension of credit from the lender or (2) withdraw excess collateral. The options available to the borrower depend on the loan terms agreed to at the time of loan origination. There are no prepayment penalties associated with early retirement of debt. Borrowers who are unable to increase the available principal balance of the loan have the ability to repay the loan in full and reapply for a new product, subject to Lender specific borrower eligibility and refinance restrictions. Any appreciation in the blockchain asset collateral is retained by the borrower following the full repayment of all outstanding loan principal, interest and fees.

Example of How a SALT Lending Loan Works*Overcollateralized Loans Origination: As an example, a one year $100,000 loan with a 10.00% annual percentage rate (APR) has twelve scheduled monthly payments of $8,791.59 representing repayment of principal and interest on the loan. At origination, the $100,000 loan balance is secured with $125,000 of bitcoin, which is posted to a multi-signature wallet as collateral. The borrower and lender each retain a private key to the wallet, along with a third-party custodian and our SALT collateral management oracle. In this example, the collateral balance equates to 50 bitcoin valued at $2,500.00 per bitcoin. As a result, the loan has an origination loan-to-value ratio of 80.0%. Stated differently, the loan is overcollateralized by 25%.

Payment: The loan balance is reduced to $92,041.74 following the borrower's first $8,791.59 monthly payment, which represents $833.33 of interest and $7,958.26 of principal. This payment reduces the loan-to-value ratio to 73.6%, creating an improved risk profile for the lender, assuming a static collateral valuation.

Depreciation: Next in this example, the market value of bitcoin depreciates to $2,000.00, causing the approach of a 1:1 ratio between the $92,041.74 loan balance and the new valuation of the 50 bitcoins posted as collateral. The loan-to-value ratio has now *Actual terms, rates, loan-to-value thresholds and available credit are subject to market conditions and suitability, along with KYC & AML screening.

risen to 92%. As a result, the SALT oracle smart contract issues a collateral maintenance notice to the borrower, instructing them to either deposit an additional 7.53 bitcoin to the collateral wallet or make a loan prepayment of $12,041.74. Either option would result in the loan returning to an 80% loan-to-value ratio. The SALT oracle takes reasonable measures to notify the borrower of the notice, via email and SMS communications which include an estimated time allotment to meet the maintenance call. The actual time period allotted to a borrower to meet a call is subject to the velocity of the price decline, and there is no guarantee to the accuracy of the time estimate.

Default: If the borrower is unable to act, or chooses not to meet the maintenance notice, then the SALT oracle initiates a partial liquidation transaction along with the lender and custodian, resulting in the sale of the amount of collateral needed to return the loan-to-value ratio to 80%. In this hypothetical example, a sale order of 30.1 bitcoin would be issued, generating the $60,200.00 needed to reduce the loan balance. After the sale, the remaining loan balance of $31,841.74 would be secured by 19.9 bitcoin at $2,000.00 per, totaling to a dollar value of $39,800.00 and resulting in the loan returning to an 80% loan-to-value ratio. The incremental liquidation process would next repeat if bitcoin continued to depreciate to a $1,739.25 price level.

3.2 SALT's Network of Lenders

Traditional financial institutions have historically avoided the world of blockchain assets because of the challenges faced in adapting to this relatively new technology and asset class. The SALT Lending Platform provides these institutions with a means to loan national currencies to holders of blockchain assets without having to change their internal business models or add to their operational costs. While the barriers to adoption have thus far kept these institutions on the sidelines, the interest and demand for access to this disruptive technology has been steadily growing. SALT meets this growing demand by providing the processes, compliance, security and technology needed to lend against blockchain assets.

SALT's extensive network of lenders is designed to give Members access to capital-on-demand. Qualified Members may select the size, type, and term length of the loan they wish to obtain from the available options listed. Loan applications are then automatically matched with qualified lender capital. Lenders benefit from loan interest in an overcollateralized fixed income vehicle that is automatically managed by SALT's technology and denominated in a national currency of their choice. SALT is built to support the lending of any type of currency with sufficient demand, inclusive of crypto-currencies.

Lenders also purchase Membership to the SALT Lending Platform which gives a Lender access to the network and related services. Financial terms reported on the SALT Lending Platform are determined by qualified Lenders and are subject to each Lender's specific risk tolerance. As a result, annual percentage rates (APR) and loan-to-value (LTV) ratios offered to eligible Members are subject to market conditions. All network participants drive additional demand for access by lending or borrowing capital.

3.3 SALT Membership

SALT Membership is an Ethereum-based Erc20 smart contract representing levels of access to the SALT Lending Platform. It can be redeemed for products and services and other rewards offered through the platform. A total fixed supply of 120,000,000 Membership units exist. Demand for lending and borrowing on the SALT Platform will drive the demand for Membership.

4. How to Purchase Membership

SALT Membership may be purchased with Bitcoin (BTC), Ethereum (ETH) or any cryptocurrency supported by ShapeShift. SALT Membership is priced in United States dollars (USD). Purchase of Membership will be effective only when SALT Lending accepts the application upon multiple confirmations of payment. The purchase of SALT Membership at a discount will end at the earlier of a predetermined end date, or the date at which the sale is either closed or terminated by management in its sole discretion. Applicants will be alerted to whether they were successful in purchasing a Membership by email and an update to their account on the SALT Lending Platform available at https://www.SaltLending.com. The final purchase price is determined when two confirmations have been recorded on the Bitcoin or Ethereum blockchain. No refunds will be issued for accepted Membership redemptions. Membership pricing for the SALT Lending Platform is based on fixed quantity tiers. Digital currency payments that carry inadequate fees may experience an increase in price between their initiation of purchase and SALT Lending's confirmation. If using a payment processor that only allows a single unconfirmed transaction to remain pending at any given time, multiple purchases may result in delayed confirmation. SALT Lending will determine the exchange conversion rate for each purchase by aggregating price feeds from multiple exchanges, adjusting for volume, price variance, statistical outliers and inactivity.

A more complex credit agreement or a unique collateral type will require more SALT from the Lender to account for the computational and development resources required.

If an attempted purchase of Membership is not accepted following screening procedures, those funds will be promptly returned.

SALT Lending has engaged First Bank to hold USD funds. In the event management terminates the sale or doesn't accept a Membership application, any USD tendered by an applicant will be returned net of any outgoing fees charged.

Purchasers of SALT paying in Bitcoin (BTC) or Ethereum (ETH) will direct funds, into multi-signature cold wallets specifically designed for this sale. Each purchaser will be provided a unique purchase destination address for the purpose of acquiring a SALT Membership. In the event management closes the sale or doesn't accept the Membership applications, any Bitcoin (BTC) or Ethereum (ETH) tendered by an applicant will be promptly returned by the multi-signature wallet net of any outgoing fees charged.

4.1 Membership Status

Membership to the SALT Lending Platform is a prerequisite for a Member to access information and obtain the financial products offered through the SALT Lending Platform. In order to purchase a Membership, a person or entity must create an account by providing a username and an email address, among other requirements established by SALT Lending. Satisfactory completion of both Anti-Money Laundering (AML) and Know Your Customer (KYC) screening is required before distribution of any purchase in excess of $2,000.00 (two thousand dollars) USD, and may be required for any other purchase amount, as determined by SALT Lending. Any Member actively looking to obtain a financial product may be required to complete further Anti-Money Laundering (AML), Know Your Customer (KYC) and SALT suitability screening. Membership offers a subscription to the SALT Lending Platform and is used as payment for products and services. An initial purchase of a SALT Membership, in any quantity, results in an immediate redemption representing the purchase of a base annual Membership to the SALT Lending Platform. Members of the platform accumulate status through their acquisition and redemption of SALT Memberships above and beyond each minimum threshold. The cost of Membership replaces most fees charged to borrowers associated with loan origination and servicing. Elevated annual Membership status is achieved when additional memberships are redeemed through the SALT Lending Platform. SALT Membership is available for purchase in any increment depending on available inventory. Premier and Enterprise Membership packages increase the loan product types and maximum available loan balances accessible to Members. As outlined on the next page, products and services are made available to Members in several tiered packages, representing minimum redemption thresholds. Benefits associated with Membership status are based on redeemed SALT. Each tier enables qualified members to gain access to increasingly customizable credit products, ranging from fixed rate term loans to lines of credit and crypto-secured credit cards, all collateralized by blockchain assets. Additionally, SALT can be spent to reduce a portion of the interest rate associated with a financial product underwritten by a lender on our platform. Members have the option to redeem SALT Membership prior to the closing of a newly originated loan in exchange for a reduced interest rate. This is called "buying down the rate", and it permanently lowers the monthly interest payment due for the duration of that loan. Access to the platform API is also denominated in SALT Memberships, as is access to the platform's lender network for institutional accounts. Subject to prevailing market exchange rates. Terms and conditions may apply. offers clients, such as exchanges, wallets, and digital asset custodians, an API subscription service whereby they can access the SALT Lending marketplace to offer credit products to their own customer base, for a subscription access fee. This API plugin is available to them and ultimately utilizes capital arranged via the platform's lender This service network.

Select products and services, such as hardware devices, are available for purchase at additional cost. Loan products available at launch are subject to Lender determined product offerings. SALT Lending anticipates that only bitcoin collateralized US dollar denominated products will initially be available. Annual Membership fees are subject to regular market based price adjustments.

The SALT Network

The attractiveness of the products offered through the SALT Lending Platform increases in conjunction with an increase in the number of participants utilizing SALT Membership, resulting in a classic network effect. SALT Lending's marketplace offers consumer borrowers access to affordable credit, and allows individual and institutional lenders the opportunity to lend against a new class of assets. As both sides of the equation grow, the advantages (reduced risk, lower cost) scale accordingly, attracting even more borrowers and lenders. The increased participant pool generates competitive interest rate dynamics and data, which is used to improve the effectiveness of SALT Lending's risk models. The SALT crypto-secured credit card 5. Sample Platform Use Cases Crypto-Exchange—Integrated Leverage A crypto-currency exchange may desire to offer its clients leverage through their internal interface. SALT Lending is designed to enable this by providing a streamlined API integration whereby, an exchange can utilize the platform and instantaneously offer leverage terms to their customer base without requiring their users to directly interface with the SALT Lending Platform. Capital is arranged by our extensive lender network and seamlessly integrated into the end user's experience. An arrangement of this nature requires the crypto-exchange to purchase an Enterprise Membership package and redeem SALT Memberships for use of the API.

ICO—Business Development Line of Credit

A startup that has completed a token offering may look to use sale proceeds for development of their business. Often these costs require payment in various national currencies and necessitate the liquidation of the digital currency raised. An Enterprise Membership would allow the startup to access a working capital loan or line of credit to help them grow their business, without having to liquidate their blockchain assets.

Miner—Working Capital Loans

Proof of Work mining requires significant fixed and variable capital expenses. A mining operation must be constantly acquiring or developing purpose built computer chips while also purchasing electricity to run their systems. Often these R&D costs require payment to third party suppliers denominated in various national currencies. In order to maintain production, a mining operation must therefore sell their mining reward to reinvest in development. With a SALT working capital loan, a miner can now better manage their capital allocations and opportunistically sell mined inventory when the time is right. The borrowing power made available to Members will be based on either the summation of a single asset's value or that of a portfolio of various blockchain assets.

The SALT crypto-secured credit card is a form of a line of credit that is collateralized by blockchain assets. It will operate on established credit card payment processor networks and allows for payments in national currencies.

Key features of the SALT Oracle:
  Monitoring of both the loan origination and the payments made by the borrower to the lender o Monitoring of the value of the blockchain asset held as collateral
  Generationofalertsifthevalueoftheblockchain asset drops below an agreed upon threshold o Triggering of maintenance calls
  Storageofcollateraluntilloantermsarefulfilled o Dispersal and/or liquidation of collateral according to loan terms 6. The Technology SALT Memberships exist on the Ethereum Blockchain and loan collateral is recorded on its native blockchain. SALT's Secured Automated Lending Technology is a protocol and asset agnostic architecture. Any blockchain asset, including those that exist on permissioned distributed ledgers, can be used as collateral and managed by our smart credit contracts. Our SALT oracle creates multi-signature smart contracts on the collateral's native blockchain or an external blockchain, case depending. Any external transfer of the collateral, whether it be a liquidation event or a reversion to the borrower, will occur on-chain.

The SALT oracle operates autonomously. However, a minimum of three signatures are always required to trigger a liquidation order. This redundancy provides an added level of security. The SALT Lending Platform uses global server redundancy to protect its Members. Servers are distributed across several continents, through third party cloud based web services and hardware devices.

Additionally, SALT Lending takes advantage of fully distributed server systems. SALT Lending's decentralized, blockchain based technology platform automates key aspects of operations, including: the borrower application process, data gathering, underwriting, loan funding, servicing, collateral management, regulatory compliance and fraud detection. This provides a significant time and cost advantage over traditional lending business models and we believe it enables us to provide a superior user experience to both borrowers and lenders.

If the threshold for collateral liquidation is breached, the SALT oracle triggers a liquidation event which is co-signed by other parties. Liquidation events may include fees which are passed along to the borrower. The margin requirements are determined by lenders and agreed to by borrowers. Terms are clearly outlined in each loan agreement.

The SALT collateral wallet is a multi-signature blockchain wallet that stores collateral and automatically enforces lending terms. Throughout the duration of the loan the borrower retains ownership of the underlying blockchain asset and a key to the multi-signature wallet.

The SALT Lending Platform can be directly integrated into hardware wallet devices allowing for additional security for loan collateral.

Members interact with the SALT Lending Platform either through a web and mobile user interface (UI) or via an application program interface (API), which allow seamless integration of the loan platform functionality directly into the backend systems of Enterprise Members. Whether through the UI or API, Enterprise Members are able to offer decentralized leverage products to their own clients via their existing systems.

7. Privacy

The factors that define a Member's participation profile are private by default and are only revealed to other platform participants with the explicit consent of the Member. Data on the platform is held in a distributed way. This is important to avoid the user data breaches that befall centralized databases. With the SALT Lending Platform, loan collateral is independently secured in unique smart contracts associated with individual credit agreements.

Continual development requires developers to have permissioned access to update the software and as a result, the back-end marketplace will be centralized and under the control of SALT Lending as an organization. The platform inherits the trust-sensitive aspects of the protocol tokens which underpin the products offered by SALT Lending. Community has been crucial to our development. The largest discounts are being provided to the earliest Members who provide direct feedback and influence our platform's development, as we move from the prototype phase to launch. The sale environment is designed to gather feedback. SALT Lending is offering participants a discount for helping to improve the systems, interface and network strength. Each SALT Membership will initially retail for $10.00 United States dollars (USD) following the discounted sale period.

The sale will not follow a strict timing mechanism. Instead, a set number of memberships will be available for purchase at a set discount level. Members will be unable to withdraw their SALT Memberships until the discounted sale and independent review is completed, and Memberships have been allocated and disbursed. Following the initial discount, SALT Membership will be available for purchase at full retail price.

9. Business Development

SALT Lending completed a seed capital funding round in early 2017 raising over $1 million USD, for the purposes of capitalizing the company to develop the SALT Lending Platform. All executive members of the team and board members have contributed personal funds to the development of the software and the company. SALT Lending does not intend to liquidate any cryptocurrency generated from Membership revenue. SALT aligns itself with the "hodl" ethos of the crypto community and will SALT is committed to keeping any and all personal information collected from the individuals that visit our website and make use of our platform accurate, confidential, secure and private. SALT is however, required to verify the identity of Members who apply for financial products through the platform.

8. Sale Mechanics

SALT Memberships will initially be distributed in the form of a discounted sale. The purpose of the discounted membership structure is to attract Members early on who can provide feedback on our prototype as we further improved our product. The participation and feedback from the SALT borrow against the company's balance sheet. This is designed to emphasize SALT's business model.

Management intends to use debt to fund further development of the platform. Future expenses may include security and financial audit fees, legal, regulatory and other consultancy fees, retention of talent, acquisitions, future patent registration, systems licensing, and marketing fees. SALT Lending intends to have its financial position reviewed by a top tier accounting firm on a quarterly basis. External and internal software security audits are also an ongoing part of SALT's business model and have been performed by Spirent Communications Inc. The lending and securities industries are highly regulated throughout the world and the business in which SALT Lending operates is subject to complex rules and extensive regulations. Parts of the business are subject to licensing and examination by various regional, federal, state and local government authorities. The ability to serve a global Membership base is key to SALT Lending's business model. As a result, a considerable budget will continue to be allocated towards the on-boarding of new jurisdictions. This process entails meeting legal and licensing requirements to ensure regulatory compliance across continents and international borders. This also often entails establishing regional offices, legal counsel and several service providers. Budgeted Expenses 10. Membership Supply A total fixed supply of 120,000,000 (one hundred and twenty million) SALT Memberships will exist, SALT Memberships are sold in whole integers. The smallest SALT unit is one hundred millionth.

11. The SALT Financial Inclusion Initiative

We intend to set aside two percent of the total sale proceeds for the SALT Financial Inclusion Initiative, which seeks to provide blockchain backed lines of credit to anyone who is currently unbanked and/or is unable to get credit as a result of social exclusion. Loans will be issued to qualifying applicants and collateralized with bitcoin from sale proceeds. Secure accounts will be established for individuals and an education on blockchain-backed loans will be made available to help recipients use credit the right way, creating "good debt".

12. Regulation with a fractional supply in circulation representing only those that have not been redeemed and are now held for sale on the platform.

| Expected Allocation | Memberships | Percentage |
|---|---|---|
| Discounted Sales | 54,500,000 | 45.42% |
| Platform Development | 17,550,000 | 14.63% |
| Employee Discount | 2,450,000 | 2.04% |
| Retail Sales | 45,500,000 | 37.92% |
| Total | 120,000,000 | 100.00% |

Some elements of SALT Lending's businesses are subject to state and federal regulation within the United States and to foreign laws and regulations. Loans arranged through the SALT platform are originated by an SEC registered investment advisor or other on boarded registered banking entities.

SALT Lending Holdings, Inc., and the loans originated through the SALT Platform, must comply with applicable state and federal lending and usury laws, such as: the federal Consumer Credit Protection Act, the Truth-in-Lending Act, the Equal Credit Opportunity Act, the Fair Debt Collection Practices Act, the Dodd-Frank Wall Street Reform and Consumer Protection Act, the Servicemembers Civil Relief Act, the Military Lending Act, the Bank Secrecy Act, the USA Patriot Act, the Electronic Fund Transfer Act, the Electronic Signatures in Global and National Commerce Act (ESIGN) and other federal and state laws governing privacy, data security and prohibiting unfair or deceptive business practices.

As non-bank entities, SALT Lending Holdings, Inc. and its affiliate, SALT Platform, LLC, have developed extensive best practice policies and procedures intended to ensure legal and regulatory compliance.

The SALT wallet will be built into the SALT dashboard. The wallet will give Member's the ability to upgrade their Membership, send additional SALT to the public ETH address currently associated with a Member's account, or choose a different public ETH address in which a Member would like to store and secure their SALT. Direct hardware wallet integration will be available for added security.

We estimate that Member wallets will be available 15 days after the independent review of Membership transactions. The internal review is estimated to require one to three weeks from the close of the discounted sale. For the sake of speed, we will allow access to wallets once the members transactions have been reviewed. Access to the wallet will vary based upon when a member's transactions have been reviewed.

SALT Lending Holdings, Inc. and its affiliate, SALT Platform, LLC, may be subject to examination, supervision and other regulatory enforcement actions taken by the state agencies responsible for monitoring consumer credit, trade, and commerce; and federal agencies, such as the Consumer Financial Protection Bureau and the Federal Trade Commission, that administer the federal consumer protection laws, trade, and commerce in the United States.

13. Brand & Values

SALT Lending's mission is to increase the productivity of digital assets. This will be accomplished by adhering to the core values below: Security: SALT Lending puts security and privacy first—our protocols and practices are designed to keep user information and assets safe and private.

Innovation: SALT seeks to continuously innovate, creating new paradigms for managing the risk in realizing the value of digital assets.

Premium Service: SALT delivers a high quality of service and an exceptional experience to empower the end-user.

Legal & Regulatory Compliance: SALT is committed to maintaining compliance with laws, regulation, and licensing with governing bodies to achieve sustainable growth.

Trust: We earn trust by acting with the highest standards of integrity, honesty, and accountability.

The SALT Brand

The SALT name originated from the historical record of when salt became more than a commodity, as it gained use as a store of value. Used as a medium of exchange for food, clothing, and other general provisions, salt broke the mold of what a commodity could be. With the invention of blockchain technology the boundaries are once again being pushed. We are forced to rethink what defines an asset or currency as well as the ways in which they can be recorded and transacted. SALT is also an acronym for Secured Automated Lending Technology, the name given to our programmed smart loan contract. The efficiencies and security provided by our technology is SALT's competitive edge. Just like its namesake, SALT intends to be a household name, a pillar in the financial market, and a brand that breaks the mold on how secured lending is conducted.

Benchmarks

14. Disclaimer

This material is provided by Salt Technology, Ltd. ("Salt", the "Company"), for informational purposes only, and is not an offer or a solicitation to buy or sell any securities or other financial instruments. The SALT Membership is a consumptive use product permitting access to the services provided by the SALT Lending Platform, as detailed above. Memberships are not intended for speculation and afford the holder no rights in, or claims to, any of the assets of SALT or to in any way share in any profits that SALT may achieve. Interested parties acknowledge agreeing to the Consent to Use Electronic Records, Privacy Policy, Membership Agreement and Terms and Conditions.

This document is subject to change and must be accompanied by the previously agreed to documents, which remains in effect regardless of purchase decisions.

This paper describes the current vision for the SALT Lending Platform. While we intend to attempt to realize this vision, please recognize that it is dependent on quite a number of factors and subject to quite a number of risks. It is entirely possible that the SALT Lending Platform will never be implemented or adopted, or that only a portion of our vision will be realized. We do not guarantee, represent or warrant any of the statements in this paper, because they are based on our current beliefs, expectations and assumptions, about which there can be no assurance due to various anticipated and unanticipated events that may occur.

Please know that we plan to work hard in seeking to achieve the vision laid out in this paper, but that you cannot rely on any of it coming true. Blockchain, cryptocurrencies and other aspects of our technology and these markets are in their infancy and will be subject to many challenges, competition and a changing environment. We will try to update our community as things grow and change, but undertake no obligation to do so. Interested parties acknowledge that the SALT Lending Platform, as described herein, may never in fact operate as intended. A SALT Membership is intended solely as a mechanism for accessing information and using the services offered through the SALT Lending Platform. As such, the SALT Membership may have a value of zero. SALT Memberships are functional utility smart contracts within the SALT Lending Platform. SALT Memberships are not for speculative investment. No promises of future performance or value are or will be made with respect to SALT Memberships, including no promise of inherent value, no promise of continuing payments, and no guarantee that SALT Memberships will hold any particular value. SALT Memberships are not participation in the Company and SALT Memberships hold no rights in said company.

SALT Memberships are sold as a functional good and all proceeds received by Company may be spent freely by Company absent any conditions. Membership to the SALT Lending Platform is intended for experts in dealing with cryptographic and blockchain-based software systems.

For more information visit SaltLending.com, or email Support@SaltLending.com. 2017 © SALT Technology, Ltd.

The SALT Hardware Wallet by KeepKey

Padabla

Padabla is an exchange platform that works on several currencies. IF User opens a Celeste account, THEN ask user to open an account in Tauntine (to manage Joux). This way, Joux earned in Celeste can be used in Vedi, 360Box, Purchase, Menu, Lekk, Katana, waevee and vice versa. Here the Joux earned in applications can be converted to fiat currency, cryptocurrency, gold or silver.

Through Padabla, User will be able to hold Joux in the program, and will also be able to store it (for later use).

Padabla is tied to Savvanna, a team and task management software deeply embedded in the backend of Celeste, that allows Celeste to hire and manage teams, and to pay those teams and staff members with Joux.

Later on in the future, it will also link into the media company, the developer company and the design company, allowing user to spend Joux in development, marketing and branding.

(Whitepaper for Inspiration)

CRPT Token confers no other rights in any form, including but not limited to any ownership, distribution (including but not limited to profit), redemption, liquidation, proprietary (including all forms of intellectual property), or other financial or legal rights, other than those specifically described in the White Paper.

Certain statements, estimates and financial information contained in this White Paper constitute forward-looking statements or information. Such forward-looking statements or information involve known and unknown risks and uncertainties, which may cause actual events or results to differ materially from the estimates or the results implied or expressed in such forward-looking statements. White Paper can be modified to provide more detailed information. This English language White Paper is the primary official source of information about the CRPT Token. The information contained herein may from time to time be translated into other languages or used in the course of written or verbal communications with existing and prospective customers, partners etc. In the course of such translation or communication some of the information contained herein may be lost, corrupted, or misrepresented. The accuracy of such alternative communications cannot be guaranteed. In the event of any conflicts or inconsistencies between such translations and communications and this official English language White Paper, the provisions of this English language original document shall prevail.

Crypterium Whitepaper Version 1.0 L 31.10.2017

1 Crypterium Executive Summary 1.1 The Future of Digital Banking and Cryptocurrencies Over the past decade there has been an explosion in the demand for cashless and digital payments. Global transaction volumes grew by 11.2% from 2014 to 2015 to reach 433 billion, an increase partially fuelled by Emerging Asia1. In the past 24 months this growth has been enhanced by the introduction of mobile contactless payment solutions such as Apple Pay, Google Pay, Alipay and a whole host of other innovative solutions. Between 2015-2020, mobile proximity payment volume (such as Near Field Communication (NFC) and QR codes) is expected to rise by a compound annual growth rate (CAGR) of 80 percent, which would bring mobile proximity payments volume over US$4 trillion by 20202. Similarly, the cryptoeconomy and cryptocurrencies in particular are growing at a phenomenal rate. It is estimated that by 2020 the cryptoeconomy will exceed three trillion dollars3 and that by 2022 it could be equal to 10% of world GDP4. Only time will tell whether these predictions are correct, but what is certain is that cryptocurrencies have passed their point of no return. They are here to stay, and their importance will only increase.

On the other hand, universal transaction processing for cryptocurrency against fiat based goods is practically non-existent. This is an unsatisfied demand across a cryptocurrency capitalization that has already surpassed US$150 billion5.

Crypterium solves this problem with the commercial launch of its global banking transaction processing platform dubbed 'Cryptobank 2.0'. 1.2 What Is Crypterium Providing cryptocurrencies to mainstream everyday users, will require dedicated cryptobanking services. Only once a person is able to use cryptocurrency in the same way that they use any other currency, will all of the benefits of cryptocurrency, such as lower transaction costs, speed of payment, removal of national boundaries and so on, become real. There are already 3 million daily users of cryptocurrencies, a number that is expected to exceed 200 million by 20256. The demand for cryptocurrencies exists now and will grow at an annual CAGR of ~70% for the foreseeable future.

The potential to satisfy this demand is perhaps the most exciting banking development of the past 100 years and the prize for those who are successful is a place on the global banking landscape at a rate of growth and a worldwide presence that can never be matched by any traditional banking development plan.

The Crypterium Cryptobank will be a first step in satisfying this demand. It will be made available for download via the IOS or android marketplace and is planning to be ready-to-use on mobile devices immediately. Unlike conventional mobile banks that take weeks to process and issue cards, the Crypterium Cryptobank provides an instant processing engine for both fiat and crypto based currency transactions while enabling inter-changeability between the two. With Crypterium's digital bank customers will finally be able to use cryptocurrencies to pay for fiat based goods without transaction 1 Cap Gemini World Payments Report 2017

2 IDC Financial Insights' 2014 Consumer Payments Survey

3 Insert footnote

4 Deloitte estimations

5 Coinmarketcap
6 Estimations based on current CAGR (Data from Global Cryptocurrency Benchmarking Study, Dr Garrick Hileman & Michel Rauchs)
5
Crypterium Whitepaper Version 1.0 L 31.10.2017 limits and with low commission on any of the world's existing 42 million payment terminals and many internet stores and payment points. Crypterium's technology platform is developing to be based on algorithms that allow for the most efficient exchange rates matching across natural peer-to-peer flow as well as third party Crypto-exchanges. This is planned to be quickly followed by a range of complimentary banking services from simple Peer to Peer payments to Cryptocurrency backed lending.

Crypterium aims to meet the banking needs of the Cryptocurrency Era. 1.3 ICO Overview Over the past 5 years, the team at Crypterium has been building the platform on which its cryptobanking services will be launched. The next stage in our development will be the release of a cryptobanking payment platform that will in turn will its own cryptocurrency—CRPT, to feed the transactional process. This platform will be ready for the release at the end of Q4 2017-early Q1 2018, and we aimed on developing it in future. This Whitepaper highlights the key stages and features of Crypterium payment solution and the future trajectories in which our products will be developed.

In advance of their use within the Crypterium cryptocurrency bank, Crypterium is offering prepayment of the CRPT token. Crypterium allow for pre-payment up to 210 000 000 CRPT tokens at the initial market value of 0.0001 Bitcoin per CRPT.

Further details of the ICO and the potential benefits of CRPT ownership are provided in this Whitepaper. The binding terms and provision of CRPT Token Sale will be outlined in the Terms & Conditions provided at https://crypterium.io/(the "Website"). Start Date
 Duration of Token Sale
 Price of CRPT token
 Option for early termination
 Technical limit to the number of tokens
 Adjustable distribution
 Further token issues
 Secured methods of token purchase
 Mincap
 Token distribution supported Token activation date
 31ST Oct. 2017, 10:00 AM (UTC-4) 75 days, until 12 January 23:59:59 (UTC-4) 0.0001 BTC
 Yes, upon reaching $47 million USD (hardcap)
 300,000,000 (three hundred million)
 Unsold and unallocated tokens will be destroyed
 No, a single token issue within the ICO
 Bitcoin (BTC), Ethereum (ETH), fiat payments and others
 $3 million USD, all funds will be returned No later than 25th January 23:59:59 (UTC-4)
 25th January (more details at 6.3) 6
 CRYPTERIUM WHITEPAPER VERSION 1.0 L 31.10.2017 Extra bonuses allocation
 Day 1-7: Pre-Sale Bonus (31st October-6th November) Allowance+33% tokens+26%
 tokens From
 10 000 CRPT+23% tokens From
 3 000 CRPT+20% tokens From 1 CRPT
 24/11-27/11 25-28 days+3% tokens
 Min. purchase
 From
 30 000 CRPT
 Day 8-28: 1st Participant Bonus (7th November-27th November)
 Dates Period Allowance
 07/11-13/11 8-14 days+15% tokens
 14/11-18/11 15-19 days+10% tokens
 19/11-23/11 20-24 days+6% tokens
 Minimum purchase amount—1 CRPT
7
Number of Worldwide Non-Cash Transactions (Billions) Forecast of Consumer Mobile Payments 2014 to 2020, Billion USD Cap Gemini World Payments Report 2017 IDC Financial Insights' 2014 Consumer Payments Survey; IDC's New Media Market Model, 2015

Crypterium Whitepaper Version 1.0 L 31.10.2017
2 Introduction
2.1 A Brand New Cryptoeconomy Global demand of cashless payments continues to rise at such a rate that the end of cash as the payment of choice is now a stark reality. The number of worldwide cashless transactions was over 430 billion in 2015 whilst the rise of mobile payments is expected to exceed $3.8 trillion by 20207.

As people change the way that they interact with money, we have also seen the introduction of a brand-new form of money, cryptocurrencies. It is less than 10 years since the creation of the Bitcoin, the world's first digital currency that in turn built a brand new financial ecosystem called the blockchain. Today there are over 1,000 digital currencies8, known as cryptocurrencies, and that number is growing every day. The advantages of cryptocurrencies over traditional fiat currencies are numerous and impossible for fiat currencies to match. Today a transaction between two people in different countries can still take several days and cost the parties a significant share of the money transferred (the average cross border transaction fee is 7.45%) as each party in the chain, of which there are many, requires a small margin for their efforts. This can now be done in seconds using cryptocurrencies via the blockchain for practically zero cost and more securely than ever before. But for many people, even those with a strong interest in new technology and better ways of doing everyday actions, cryptocurrencies are still perceived as an investment instrument. The single most important step in moving benefits from the conceptual and into the practical mainstream is to enable people to use cryptocurrencies in the same way as they can any other currency, and that means 7 IDC Financial Insights 2014 Consumers Payments Survey
8 The website CoinMarketCap lists no less than 1,037 different types of cryptocurrencies,
626 of which have listed market caps of at least $100,000 (referenced August 2017)
9 The World Bank: Remittance Prices Worldwide. URL: https://remittanceprices.worldbank.org/sites/default/files/rpw report march 2017.pdf (2017), (Accessed May 11, 2017)
8
Crypterium Whitepaper Version 1.0 L 31.10.2017 enabling instant payments with their Cryptocurrency as if it were cash or money stored in their digital bank accounts.

Crypterium is building Cryptobank 2.0 for the Cryptocurrency era. People will be able to store, spend, exchange and later borrow practically any Cryptocurrency in the same way as they could any other currency, but in a quicker, cheaper and more secure environment than it is possible in any traditional bank or fiat currency. The Cryptobank will be the decentralized core that interlocks the restricted financial world we live in today and a future Cryptoeconomy with limitless borderless opportunities Most of the technology for this financial revolution already exists: Apple Pay, Samsung Pay, Alipay; the world's biggest banks and payment platforms have already installed more than 42 million contactless payment terminals throughout the world, a number that is growing rapidly. Crypterium will take full advantage of this global contactless phenomenon, but instead of using it for traditional payment cards using fiat currencies, we will use it for cryptocurrencies through personal smartphones. We can skip generations of dedicated development by some of the biggest companies in the world, and adapt that technology to the Cryptocurrency Era within months, or years, but definitely, not decades. We anticipate that soon practically any cryptocurrency can be instantaneously transferred into any local fiat currency anywhere in the world where cashless payments through contactless payments terminals are possible and in turn can be spent. This will be done quicker, cheaper and safer than any fiat currency bank has ever been able to achieve. For the retailer, they are none-the-wiser. As far as they are concerned, they were paid in their currency of choice. It is just a small step from cashless Cryptocurrency payments to additional banking services, such as cross border transactions and eventually Cryptocurrency based loans. Crypterium is aimed on commence operations by delivering one of the best Cryptocurrency mobile banking payment application available today. As adoption increases, additional services are intended to be added.

The team at Crypterium has many years of experience building fintech and mobile payment solutions including the building and launch of one of Eastern Europe's most important and award winning contactless payment platform's PayQR. Further details of the team are presented in Section 9 of this Whitepaper.

9
Crypterium Whitepaper Version 1.0 L 31.10.2017
2.2 Comparing The World's Best Traditional Banks With A New Blockchain Bank With the advent of any new market changing technology, the old world order often struggles to adapt to the new world realities. It will be no different for the current banking giants who even today cannot agree whether or not cryptocurrencies are their future or a passing phase. Whilst they decide, new dedicated blockchain based Cryptobanks will take their place in the Cryptoeconomy.

The following table provides just a few examples of the advantages of a new blockchain bank compared to any leading traditional bank.

|  | LEADING TRADITIONAL BANK | BLOCKCHAIN BANK |
| --- | --- | --- |
| Countries of Operation | Limited by Capital and Regulation | Unlimited, There Are No Country Boundaries |
| Number of Clients | Limited by Systems, Countries of Operations Etc. | Only technical limitations |
| Scalability | Slow and Expensive | Fast and Relatively Cheap |
| International Transfers | Restricted, Slow and Expensive | Unrestricted, Fast and Free |
| Transfer Values | Restricted | Determined by The Individual |
| Cost of Transactions | Up To 5% | As low as 0.5% |
| Speed of Transaction | Potentially Several Days | Minutes/Immediate |
| Withdrawal of Funds | Potentially Several Days (depending on the amount) | Minutes |
| Control | Centralized | Decentralized |
| Control Over Funds | The Bank | The Client |
| Security | Trust to The Bank | Open Source Independently Verified Ledger |
| Integration of New Services And Partners | Difficult and Slow | Easy and Fast |
| Currency Conversion | Up To 5% | As low as 0% |

It is Crypterium's strong belief that no single blockchain bank will dominate the new Cryptocurrency banking sector, but rather that a network of new innovative players will drive the market forward and that within the next 10 years, roughly the same length of time that Bitcoin has been in existence, the leading blockchain Cryptobanks will be challenging the leading traditional banks for control over the Cryptoeconomy. 10
Crypterium Whitepaper Version 1.0 L 31.10.2017 3 the Crypterium Team Crypterium's management team is made up of highly experienced digital payment professionals from some of the most innovative FinTech sectors in Europe, who have spent the better part of 10 years developing digital payment and banking solutions. This team is supported by experienced financial professionals and experienced C-level executives who have developed worldwide.

When combined, the team has attracted more than $50 m of investment into fintech projects they have been responsible for creating and developing, including PayQR (Russia's leading independent contactless payment platform—see further comment below), Workle (a digital sales platform that has over 1.5 m independent users selling everything from credit cards to security alarms) and Bonus Club (a digital loyalty program that is integrated inside leading publishers' web sites).

In 2013, two of the founding partners of Crypterium (Vladimir Gorbunov and Gleb Markov, see below) launched PayQR, a Cypriot based company, its goal being the establishment of a contactless payment platform that works with any smartphone and which does not rely on the current international payment systems or mobile phone manufacturers such as ApplePay. Working with QR codes, the company moved to commercial operations in 2015, and quickly became a leader in the Appstore rankings for Google Play, was named as one of the top 100 Russian start-ups one of the top 50 start-ups with international potential, was awarded the top prizes for its antivirus solutions at the Emerging Challenges Competition and best innovation of the year (2016) at the safety leaders awards in the Financial services category. Further prestigious awards and recognition continued into 2017 including Russia's Ministry of Communications selecting PayQR to showcase at the world Mobile Congress in China. Today, users of the platform include many European banks and technology leaders such as Alipay (for Russia).

3.1 Our story:

2013 Contactless Payment Technologies

First company in Eastern Europe to develop mobile payments solutions based on QR-code scanning. Raised more than $1 m in investments during round A.

2015 Universal tool for daily payments

More than 300 integrations with the most popular e-commerce retail services delivering universal payment application for most common daily needs. Successfully raised $7 m during round B.

2017 Inter-banking direct payment protocol

Creation of a Direct debit protocol that is key to ensuring payment processes can be applied with virtually zero fees, enabling users to focus on their payment experience and rewards.

3.2 Selected Team Members: Steven Polyak

Managing Director, Co-founder

Global emerging markets investment banker, Managing Director for Alor Invest. More than 10 years of experience in capital markets.

Masters Degree in Economics and a Bachelors Degree in international Relations from State University of New York at Buffalo Experienced CEO and international financial services strategist having created and managed companies throughout the world, including Renaissance Insurance Group Russia, a company with over 3,000 employees and almost $1bn in annual insurance premium. Wharton Business School, CEDEP, bachelor of law Certified fintech expert with 7 years of successful work in the industry. Experience in payment laws and regulations in the most significant jurisdictions in the world, passing certification for compliance with the international security standard in the PCI DSS processing of payment data. Internet entrepreneur with extensive management experience for more than 10 years, founded 5 companies with a total capitalization of over $150 millions, including Workle and PayQR, included in the rating "30 under 30" according to RBTHV Crypterium Whitepaper Version 1.0 L 31.10.2017 linkedin.com/in/steven-polyak-4443872

Austin Kimm

IR Director, Co-founder linkedin.com/in/austin-kimm-486b5a22

Gleb Markov

COO, Co-founder linkedin.com/in/gdmarkov

Vladimir Gorbunov

CCO, Co-founder linkedin.com/in/gorbunov-v

Pavel Rasputin

CMO linkedin.com/in/pavelrasputin/Professional with more than 10 years of experience in marketing—from B2B for one of the biggest Russian software developing companies SKB Kontur to international B2C in Aviasales and Jetradar.com 12

Crypterium Whitepaper Version 1.0 L 31.10.2017

Dmitriy Fomin

CTO, Head of Security & QA linkedin.com/in/dmitriy-fomin-95238446/3.3

Advisors

Keith Teare

Executive Chair at Accelerated Digital Ventures https://www.linkedin.com/in/kteare/Roger Crook CEO of Capital Springboard https://www.linkedin.com/in/rogercrook/Elie Galem CIO at Eastmore Group https://www.linkedin.com/in/elie-galam-85414b3

Lead developer of payment and processing structure of PayQR (multichannel settlements, decentralized processing and server infrastructure, high load immediate settlements) Blockchain & smart contracts developer, Fintech experienced Leading figure past and present in many important companies including Archimedes Labs, Minds and Machines Inc, MedCo, EasyNet and RealNames to name just a small few, and was one of the co-founders of Techcrunch Capital Springboard—Singapore's leading peer-to-peer invoice financing platform for SMEs. Former Global CEO of DHL Global Forwarding 25 years of international leadership and operational experience Mathematician and quantitative hedge fund CIO. Advisor to tier one projects bringing Blockchain, ICO, Digital Assets & Cryptocurrencies to Financial ecosystem, including Bancor, Legolas Exchange, and Gimli 13

Katrina Arden

Founder Blockchain Law Group https://www.linkedin.com/in/katrina-arden-70260426/Fabio Tamburrano Board Member Coeclerici Spa https://www.linkedin.com/in/fabio-tamburrano-45b8a216

Andras Kristof

CTO at Yojee, CEO Fembusa linkedin.com/in/dmitriy-fomin-95238446/

Mike Raitsyn

Founder of ICObox https://www.linkedin.com/in/mike-raitsvn-05b5b9b4

Katrina Arden is a blockchain attorney licensed in the State of California, the United States. She is involved in the blockchain community since 2016 and consulted on multiple token sale projects (Cryptonomos, Giga Watt project, ICOBox, and others). Katrina is a founder of Blockchain Law Group, which is consulting in the field of blockchain technology, issuance of product and security tokens, and cryptocurrency matters Global mining company with HQ in Milan, with a strong track record of corporate finance and investment management having learned his trade at companies such as Moody's, Deutsche Bank (VP structured products) and more recently in Russia as a board member of Minmet Financing (Swiss trading company) and Investment Director at Svyaznoy (one of Russia's largest mobile phone providers).

Fembusa Terminals Pte Ltd x—company made headlines when they unveiled Asia's first Bitcoin ATM in Singapore, the Tembusu Prime Bitcoin ATM, and founder and CTO of many groundbreaking companies in Asia.

Experienced strategic consultant in ICO sphere.

Crypterium Whitepaper Version 1.0 L 31.10.2017 14

Crypterium Whitepaper Version 1.0 L 31.10.2017

4 Mobile Cryptobank 4.1 Mobile Contactless Payments

Physical bank branches, plastic payments cards, your personal neighbourhood banker, are all things of the past. Now everything is digital, mobile and contactless. Crypterium is building a new digital solution to Cryptocurrency era, that does mostly the same things as the current mobile bank providers, but faster, cheaper, safer using cryptocurrency on the decentralised blockchain.

As soon as a customer downloads the Crypterium mobile banking App customers will be able to start to make transactions in current VISA, Mastercard or UnionPay infrastructure practically instantly. Gone are the days when you need to apply for a debit card and wait weeks for it to be delivered. Customers will be able to instantly pay in certain major cryptocurrency (at least BTC and ETH) or in ERC20 standard tokens for any product or services at any POS terminals (there are already over 42 million installed throughout the world) that are fitted with NFC (near field communication) via the Crypterium mobile banking App.

Crypterium uses NFC HCE (host card emulation) protocols to tokenise the data on the virtual payment card and in turn the POS terminal reads the connections as if it were a standard plastic card. Practically any NFC payment service, such as Apple Pay, Samsung Pay, Google Pay and a host of other providers, can now be used to pay with cryptocurrencies and as far as the retailer or online store is concerned, they are paid in the currency of their payment order.

This capability possibly extends to ATM cash withdrawals and most other standard banking activities. Today it is practically impossible to pay for your daily coffee, the morning newspaper, or your utility bill with cryptocurrency. Of course, a cryptocurrency owner could make an exchange of cryptocurrency on one of the exchanges, wait for confirmation that it is completed, then wait for the transfer of funds to their nominated account and so on. But who in all reality would do that to buy a coffee? With Crypterium's mobile banking app that changes instantly. The Crypterium mobile banking app does all of that for the customer. From any cryptocurrency that are preselected by the user in Crypterium App, perhaps in different percentages depending on their current trading value, Crypterium does all the communication and ultimately conversion to and payment in fiat without the user having to do anything other than bring up their smartphone to the NFC terminal and press go. Only the exact number of cryptocurrency in the order and ratio prescribed are exchanged to meet the payment needs.

15
CRYPTERIUM WHITEPAPER VERSION 1.0 L 31.10.2017 4.2 Crypterium
Cryptobank Functionality Software for IOS, Android or Windows Phone smartphones or tablets with "standard everyday services", providing opportunity to use (get and transfer certain cryptocurrencies, including BTC and ETH), and conduct settlements related to fiat currencies. Examples of such services are:

Transactions in current infrastructure of trade and services outlets all over the world via international payment system (VISA, Mastercard for example)
Transactions in infrastructure of trade and services outlets connected to Crypterium or being Crypterium partners' infrastructure
Replenishment of personal card or bank account
International transfers to cryptocurrency accounts or bank accounts, including bank cards,
without restrictions (other than those applied for anti-money-laundering purposes)
Special offers for Crypterium's users in Crypterium partner shops This type of functionality is planned to be available for use in December 2017-January 2018

16
Crypterium Whitepaper Version 1.0 L 31.10.2017 5 Crypterium Token—CRPT
5.1 Overview Crypterium token CRPT—is the core of all transactions made in Crypterium banking platform. No payment can be conducted without CRPT, its main goal, regulated by smart-contract, is to stimulate tokenholders to use Crypterium in their daily life, and to attract new users to Crypterium. The only issue of CRPT tokens will be during the ICO, which in fact is the pre-sale of Crypterium services usage opportunity. Crypterium in future is planning to list its tokens on cryptocurrency exchanges to enlarge userbase and fulfil users' expectations to provide the most comprehensive services.
5.2 Decentralised Fuel to Power the Engine Only CRPT tokenholders are able to use the Crypterium cryptobank platform. Every time a person makes a payment, a fee equal to 0.5% of the value of the transaction in CRPT is taken from the CRPT token holder's account and is burnt as fuel for the transaction. Ownership of CRPT creates a reserve that can be used as the fuel for future transactions. Thanks to Crypterium's intelligent proprietary technology, this 0.5% is 100% transparent to the user, carried out immediately, at current exchange rate available. In fact, Crypterium, which is based on robotic algorithms that automatically search for the optimal rate for a given transaction at any given time on all exchanges with which Crypterium has integrated, and the instant formation of a corresponding lot for the purchase or sale of cryptocurrency on the selected currency exchange, will ensure that the customer gets the best conversion rate possible for the whole transaction which will more than likely compensate for the small 0.5% transaction charge that is applied at the time of purchase. Crypterium is naturally aware of services which offer supposedly 0% commission transaction, but this is simply hidden in a wider bid offer spread (it can be as high as 10%) and ultimately the customer will receive a higher real cost than that which is applied by Crypterium. Crypterium is committed to 100% transparency with the customer and in the same way that customers are not fooled by the zero percent commission deals in fiat currency conversion, they will not be fooled by such deals in crypto conversion.

Example:

Bill, who is a CRPT token owner, wants to purchase a cup of coffee costs $10 using his Bitcoins stored inside his Crypterium Wallet. At the time of the transaction, 1 Bitcoin had a best market value of $5,000 and 1 CRPT had a best market value of $4. When Bill makes his payment, by just tapping his smartphone to NFC terminal, he will be charged an additional 0.5% in CRPT. His total is now $10.05 which in turn reduces his Bitcoins by 0.002 BTC ($10/$5000) and reduces his CRPT by 0.0125 ($0.05/$4). 17
CRYPTERIUM WHITEPAPER VERSION 1.0 L 31.10.2017 Utility comparison to purchase a cup of coffee: Without Crypterium To purchase a cup of coffee in a regular coffee shop using cryptocurrencies, users have to top up the balance on the exchange (avg. 20 min. for BTC), exchange their currency, and wait up to three days to top up their fiat accounts. Only then can a user purchase a cup of coffee. With Crypterium technologies Users can make an immediate payment in the preferred cryptocurrency in their Crypterium wallet. However, to conduct the settlement, CRPT tokens should be used. In the event the user has no tokens, he will have to find a token holder that transfers CRPT tokens With CRPT tokens Users just tap the standard NFC terminal with their smartphones. A small of 0.5% CRPT transaction fee is charged and burned. Transaction is done. 5.3 Permanent Loyalty Reward Today all merchants are charged for acquiring services, whether this is Visa, MasterCard, American Express etc., measured as a percentage of the payment they receive. Some of these fees can be as high as 5% to 6%. With Crypterium ecosystem, merchants will pay back 0.5%-1% from their turnover, 0.15% of this turnover will go to the Monthly Loyalty Program to thank purchasers for making transactions. The higher volume of transactions a purchaser makes, the higher loyalty rewards he or she will be given.

We want to reward loyalty because it lowers our marketing expenses. We divide our user base into four categories depending on their willingness to make transactions via Crypterium. The more tokens users acquire during the month, the more transactions they are expected to make in the future (tokens are necessary to fuel transactions). But also, users' monthly activity on Crypterium predominantly determines their loyalty rewards. This can be compared in many ways to the mechanics of current rewards programs like Air Miles.

As previously noted, in order to use the Crypterium platform, the person must own/spend CRPT to complete a transaction. The great the CRPT ownership, the greater the prefunding of future transactions. Therefore, Crypterium recognises 4 groups of loyalty members:

CRPT Tokens owned (continuously during the month) 10%
of the Monthly Loyalty Program available to each loyalty group
Bronze Silver
<1 1 to 8,000
5% 10%
Gold
8,000 to 25,000
35%
Platinum
25,000+
50%

Individuals' rewards under the Monthly Loyalty Program (MLP) are calculated as a proportion of the volume of their transactions with others in their particular loyalty group.
10 Crypterium reserves the right to change the category criteria in line with developing company performance. 18
CRYPTERIUM WHITEPAPER VERSION 1.0 L 31.10.2017 Example:

Merchants paid back $240 million in a given month. Applying a rate of 0.15%, the total Loyalty Program would have $240*0.15%=$360,000. This is in turn allocated to the various loyalty groups as follows: Bronze Silver Share of MLP distributed to 5% 10% members of each loyalty group Cash Equivalent for Example $18,000 $36,000 Gold Platinum

35% 50% $126,000 $180,000

Bill is the owner of 30,000 CRPT and is therefore a member of the Platinum Loyalty Group. The total value of transactions during the month by all members of the Platinum Loyalty Group was $640,000, of which $8,000 was made by Bill. Bill in turn is therefore entitled to his share of the total value of transactions in his Loyalty Group $8,000/$640,000=1.25%. Applied to the total value of the MLP available for Platinum Loyalty members, Bill will be entitled to 1.25%*$180,000=$2,250. The reward will be paid by Crypterium is CRPT tokens or in cryptocurrency at the company's own discretion. In this way our users are motivated not just by the quality of the Cryptobanking services provided, but also by the rewards for using those services and in turn, the enhanced rewards for prepayment of the future transaction fees through the ownership of CRPT. The higher the activity, the greater the ownership of CRPT tokens, the greater the reward. 5.4 Additional Token-holder Benefits ! Priority service for all Crypterium applications and support, including early roll-out for new functionality ! Crypterium is planning to apply a wide range of anti-fraud measures which in turn should place limits on the number of actions users can make in formative period of the company's development. These limits will apply to those users that hold 10,000 or more tokens.

Period of continuous ownership of 10,000 or more CRPT
# of payments per day/per month
Value of payments per day/per month ($m)
# of transfers per day/per month
Value of transfers per day/per month ($m)
# of cash withdrawals per day/per month
Value of cash withdrawals per day/per month ($m)<6 months
o/10,000 0.25/1.0 50/1,000 0.15/0.75 10/300 0.1/0.5 6 months to 18 months 00/00
O/O 150/4,000 1.0/3.0 20/500 0.75/2.0>18 months
0/0 0/0 0/0 0/0 0/0 0/0

Note that for the protection of users, individual users will be able to set their own limits which are lower than those noted above. In addition, inbound operations (updating cryptocurrency purses, the flow of funds from bank cards, cash deposits at ATMs and such like) are never limited.
19
Crypterium Whitepaper Version 1.0 L 31.10.2017

! Whilst many core functions of Crypterium will be free to use for all members, future additional services may incur a fee for use, for example concierge services. Upon launch, token-holders can expect to receive a discount of up to 75% from standard fees (the exact benefits will depend on the service)

! Those token-holders that are also merchants using the Crypterium payment platform for acquiring will be entitled to fee discounts of up to 50% from standard fees (exact details will depend of the date of launch of the acquiring solutions which as per the road map will come after the crypto payments platform)

! As the company develops, additional token-holder product benefits are expected
20
Crypterium Whitepaper Version 1.0 L 31.10.2017
6 Crypterium Ico Token Sale Overview
6.1 Purpose of the ICO Crypterium is offering to potential users of its Crytpobank platform to right to pre-purchase its own CRPT tokens through an ICO event that commences on the 31st October 2017. The CRPT token is based on the decentralised Ethereum market standard smart contract ERC20 token. Formed within the blockchain and subject to automatic execution upon the occurrence of pre-defined criteria and events and subject to certain conditions, CRPT tokens are valid indefinitely and are the property of their respective holders.

Crypterium is registered under the laws of the European Union, with its head office located in Tallinn, Estonia. It is subject to a market best practice audit in accordance with European regulations thereby ensuring total transparency and absolute accountability of all Crypterium activities including the publishing of full company statements. Estonia has been chosen for its favourable climate of digital innovation including e-Residency. Estonia was ranked first on Bitcoin.com in its assessment of countries that support cryptocurrency development, typified by Estonia being the first country to have a Bitcoin-ATM. CRPT tokens bestow on its holder's special product benefits including increased rewards depending on user activity. CRPT tokens are not stocks, securities or their equivalent and therefore do not create the right of ownership or disposal of Crypterium or its assets. CRPT token-holders do not exert any influence over the decision making of the company or its activities.

CRPT tokens will be distributed in direct proportion to the amount paid by the participants during the ICO in accordance with the Terms and Conditions. All organisation and implementation processes connected a successful Crypterium ICO have been prepared in accordance with industry best practices, supported and audited by ICObox. Additionally, Crypterium has employed the services of an escrow account Blockchain Law Group thereby applying an additional level of security and providing further confidence for contributors that the distribution of tokens will be in accordance with Crypterium's smart contract conditions. The funds received as a pre-payment for service fees through the use of CRPT tokens will remain in escrow until the distribution of CRPT tokens to tokenholders. 21
Crypterium Whitepaper Version 1.0 L 31.10.2017
6.2 Fixed Token Value Upon launch, a single CRPT token is valued at 0.0001 BTC (due to the USD equivalent value of a single Bitcoin this is a more convenient measurement of value). For equivalent prices in other cryptocurrencies, the following exchanges will be used; Kraken, Bitstamp, Bitfinex and Poloniex.
6.3 Distribution of Tokens Founders and Team 9% Reserved fund 15% Advisors 3% "Bounty" Campaign 3% Contributors 70%
- 70%: Total ICO distribution to the community
- 15%: Tokens allocated for marketing and loyalty purposes
- 9%: Reserved for the founders and management of the ICO
- 3%: Reserved for ICO partner advisers
- 3%: Reserved for marketing campaign team
- 15% of tokens allocated for marketing and loyalty purposes will be gradually released to enlarge userbase and to fulfil Monthly Loyalty Program.
- Crypterium is focused on delivering those products that support mass scale adoption as quickly and efficiently as possible and thereby simultaneously delivering value to CRPT holders.
- The final 15% of tokens will be distributed amongst the project team, advisors and the participants of 'bounty' campaign.
- Crypterium ensures the existence of tokens in the ownership of people who will purchase tokens no later than 25th January 2018 (23:59:00 UTC-4), in case of providing by that people all the necessary account details. Distribution of tokens can be conducted before 25th January, but tokens will be inactive for usage and transfers. All possible functionality of tokens will be active on 25th January.
- Purchase of tokens via wire transfers will be stopped in 10 days before expected date of ICO completion. People, who intended to use this transfer method should deposit all funds before that date or use other transfer methods (BTC, ETH, LTC)

6.4 'Bounty' Structure
- Support is required for many marketing and expert discussion forums such as bitcointalk, the contribution of opinion leaders, banner ads and participation in selected publications that specialise in Cryptocurrency and blockchain. The exact distribution of CRPT tokens for the marketing campaign is managed by the ICO organisers and adjusted regularly, but under no circumstances will it increase beyond 3% of the total issued CRPT.

22
Crypterium Whitepaper Version 1.0 L 31.10.2017 Crypterium Future Trajectories Crypterium is a part of the fast-growing ecosystem, which constantly develops innovative solutions for users of cryptocurrencies to make their adoption easier and more efficient.

The following products are now in the development and are intended to be available for the use of CRPT token holders in the future.

23
Crypterium Whitepaper Version 1.0 L 31.10.2017 1 Mobile CRYPTOBANK 2.0
1.1 Cryptowallet Crypto asset and currencies are contained in digital smart contract wallets. Using currently available smart contract wallet technology, there is no need for customers to move money out of their wallets and into Crypterium, Crypterium will simply debit the appropriate amount from the wallets in the predefined manner as identified by the payment protocols, and displays the remaining balances to the customer within the Crypterium mobile banking App. In this way, the customer will be able to see all their Crypto assets in one place, whilst at the same time being able to spend them in practically any order or mix of their desire, even if the assets are in different wallets, in the secure knowledge that Crypterium has no access to such assets unless the smart contract triggering payment takes place. Maximum freedom with ultimate security.
1.1.1 CrypteriumSX (Smart eXchange)

Crypterium's technology platform is based on algorithms that ensure the most efficient bid-offer matching across natural peer-to-peer flow as well as third party crypto-exchanges. All historical transactions are stored in a dedicated data-warehouses that continuously analyses the data to enhance risk management and identify predictive behaviours, and in turn enable Crypterium to optimize the cryptocurrency exchange process and better educate the customer on possible payment strategies, for example, it may highlight different payment mixes depending on the current cryptocurrencies valuations. In other words, everything possible is done to ensure that the customer gets the best deal.

24
CRYPTERIUM WHITEPAPER VERSION 1.0 L 31.10.2017

1.2 Crypterium Cryptobank Functionality Standard everyday services will include:
- Buy and sell BTC, ETH, XRP, LTC, Dash, XEM, NEO, MIOTA, XMR and many other cryptocurrencies and tokens
- International transfers to any blockchain wallet's account, including bank cards, without limits or restrictions (other than those applied for anti-money-laundering purposes)

Conversion and exchange between Crypto assets
Direct payment for services such as telephone, utilities, penalties, loans, taxes, internet, etc.
Automatic direct debit payments
Transaction history data (including sorting services such as filters and payment categories)
Fiat currency transactions
Additional launch services will include:
Multi-currency transactions (write-off multiple currencies simultaneously)
Photo-payments—simply take a photo of the invoice and send to Crypterium and we'll do the
rest (this may incur additional charges)
QR payments for Crypterium infrastructure users
Following services is planning to be included:
Traditional banking services (following the acquisition of a banking licence) that will enable classical banking services to co-exist with cryptocurrency services
Peer to peer crypto and fiat currency transfer
Interest earning crypto deposits
Banking statements
Salary accounts

2 Cryptobank for Businesses

2.1 QR Code Payments

There are two equally important sides of the infrastructure required to ensure the rapid adoption of cryptoeconomy. The ability to make payments and the ability to receive payments. The Crypterium Mobile Banking App will process the payments which in turn will utilise the vast resources of the world's biggest payment providers by using digital contactless payment technology through supporting POS terminals to receive payments.

Nevertheless, there are still millions of businesses that for a wide variety of reasons are unable or unwilling to connect to this payment network. For example, you will not find many street traders in Delhi that have a contactless visa terminal.

The Crypterium team has more than 5 years of development in fintech, actively building alternative contactless payment solutions for business covering all areas of business life from key retail sectors such as restaurants and bars, to street traders and the internet stores. Over the past year alone, more than 350,000 payment transactions have been made through payment processing platforms, developed by our team. This knowledge and experience will be embedded into Crypterium enabling it to reach a much wider audience than is possible today.

The Crypterium Cryptobank for business will be a dedicated in-module solution for businesses that can be applied to all sectors. Functions include:
Cryptocurrency exchange and settlements/acquiring in fiat or cryptocurrency no matter how the payment was made
Customised loyalty and cashback programs
Universal web-office with:
  Transaction history
  Payment details managing
  Filter by currencies, payment time, shopping methods etc.
  New store connections
  Crypterium's business banking solutions generates not only the ability for merchants to accept cryptocurrencies, but also:
Conversion between cryptocurrencies and fiat money
Increases the speed of payment, (compared to other than cash)
Reduced costs. On average payments through the Crypterium infrastructure will be 4 to 5 times cheaper than the cost of card acquiring About 0.5%-1% depending on turnover
Flexibility with a wide range of payment solutions
Reliability, all solutions have been tested over years of development and 2 years of usage Crypterium has developed a universal solution that has the ability to replace expensive and restricted POS contactless terminals, or simply act as an alternative to those terminals when the merchant has no access to them or would prefer an enhanced experience. To receive cryptopayments, the merchant has to simply install a special Crypterium App on their mobile device, such as a tablet, which in turn produces QR payment codes containing all of the essential payment details. The purchaser uses their Crypterium mobile banking solution to scan the QR code and the payments are processed practically instantaneously.

This solution has become the overriding leader in many countries, especially China where such methods of payment have almost eliminated the competition. It is estimated that over 70% of payment points are equipped with QR payment solutions, which in turn support the most popular apps Alipay and WeChat. With the support of Crypterium, such mass adoption could easily be extended to cryptocurrencies, for any merchant, anywhere in the world. All they need is an internet connection via a mobile device.

2.2 Crypterium E-Commerce and Automated Services Solutions

Crypterium developed API enables any internet store to display a QR code, which in turn can be read by the Crypterium mobile banking customer to scan that code and make a payment using cryptocurrencies in the same way as they could at any contactless payment point. Not only does it enable the same benefits of the mobile banking app as noted previously, it also simplifies the checkout process by filling in essential payment information such as delivery address, contact phone number etc. when scanning the QR code. This is all done instantaneously at a cost for the merchant which is many times cheaper than they pay today.

Such benefits are also being applied to offline contactless payment points where there is no need for a human interaction, for example to pay for a parking permit or paying for petrol without leaving the car.

3 Crypterium Open Platform

Crypterium believes that the cryptocurrency era will require a much wider development community than just a few leading cryptobanks. For this reason, Crypterium is providing an open platform that enables companies to build their own products using Crypterium API. Many of the features of the mobile platform will be made available for developers to use inside their own payment applications and solutions.

Examples of products and services that can be created and provided through the Crypterium API include:
Cryptocurrency wallets
Cryptocurrency exchanges
Cryptosystems for payments on and off-line
Loyalty programs
Payments with the use of cryptocurrency and tokens
Information retrieval Automated regular payments
Billing
Receive automatic notification of transactions
The following diagram shows the range of modules that will be available for developers.
Crypterium Whitepaper Version 1.0 L 31.10.2017
Please note that solutions described in this section are not guaranteed and may or may not be delivered in the future depending on the market needs, regulations, ability of the team to achieve best technical performance and other risks which may be known or unknown to the team now. The Crypterium Future Trajectories are all planned developments and are presented for informational purpose only to show what the team had been working on and how the entire ecosystem may look like if developed. You should not rely on these solutions when making a purchase of CRPT tokens because these are planned to be bonus features rather than the essential functionality of the CRPT token. 29
Crypterium Whitepaper Version 1.0 L 31.10.2017
4 Crypterium Corporate Vision
4.1 Corporate Culture
Our corporate culture formed by the years of successful development and achievement of planned results is based on following principles. Not less than 50% of all available resources are distributed for scaling and increase of userbase, this trajectory led us to success most of time. No more than 15% of resources is intended to be used to maintain current operational activities including wages of management. The rest part of all available resources is aimed on research and development and search for new stack of technologies.
4.2 Product Development
Product development and further roll-out is naturally affected by our corporate vision. The following are considered to be our current objectives:

Crypterium Cryptocurrency Wallet with Fiat Settlements—we are planning to provide full stack of innovative technological solutions, including Processing Centre, Fiat-to-Crypto and vice versa instant exchanges, NFS payments support (only for Android devices via card emulation), integrations with third-party Cryptocurrency payment infrastructure, P2P transfers in fiat and crypto currencies. Our plans are to spend on the development in this direction at least 9 500 ETH in the nearest 2 years.

Crypterium Mobile Bank 2.0 should be the one the best payment solution in the industry including such technologies as CrypteriumSX, Native contactless payment support (Apple Pay, Samsung Pay, Android Pay and oth.), Partnership with banks or financial institutions in every region of financial activities—to guarantee stability and security of settlements. We estimate that around 14 500 ETH has to be invested to achieve our product vision.

The next big thing is Crypterium own payment infrastructure, which we plan will cover at least 25 000 POS and online stores around the world. It is rather difficult to estimate marginal expenses on every connection of the store, but it is definitely looks like we will spend at least around 50 000 ETH on building all the solutions and expanding our minimal infrastructure. We expect to spend at least 29 000 ETU on creating universal OpenAPI for our products, developing Crypterium in the direction of providing standard banking services and developing complementary services. All rest available funds we will intend to use in R&D for such technology as Credit Subtoken Protocol and others.

Crypterium Whitepaper Version 1.0 L 31.10.2017 5 the Advantages of Crypterium Ecosystem An analysis that compares Crypterium to previously announced cryptobanks based on the intended functionality of the ecosystem once it is complete.

| FEATUES | MARKET STANDARD | INDIVIDUAL COMPANIES | CRYPTERIUM |
|---|---|---|---|
| Wide range of cryptocurrencies and digital assets, not just Bitcoin. | NO | YES | YES |
| In addition to the standard compatibility with existing payment systems, developing its own settlements infrastructure | NO | YES | YES |
| Using payment systems infrastructure for card2card-transfer and withdrawal/depositing cash at ATMs, not just online and offline payments. | NO | YES | YES |
| For buying and selling Cryptocurrency and digital assets, as well as exchanging them with each other to develop a private market | NO | YES | YES |
| Loyalty Cash-back program | NO | YES | YES |
| Ability to use tokens of any completed audited ICO, where those tokens are traded on public exchanges. | NO | NO | YES |
| Payment calculations within 3rd party mobile payment services (Apple Pay, Samsung Pay, Android Pay, etc.), and not just restricted to virtual or plastic cards | NO | NO | YES |
| Compatibility with the payment systems of Asia (the largest Cryptocurrency market in the world) (UnionPay and JCB), not only Visa/MasterCard/American Express. | NO | NO | YES |
| Protocol solutions for the safe automatic withdrawal from authenticated Cryptocurrency storage and digital assets (e.g. third-party wallets), not just ERC20 standard token Standard | NO | NO | YES |
| Own settlement infrastructure supports instant conversion of Cryptocurrency to fiat cash for recipients without further actions by the recipients, not just Crypto 2 Crypto and fiat 2 Crypto options | NO | NO | YES |
| Platform for affiliate partners to showcase their products and services including those that require/have crowd-funding support | NO | NO | YES |
| All product functions and features can be fully implemented inside third-party solutions, not just in proprietary solutions (including affiliate partner product scaling). | NO | NO | YES |
| Open platform for the build of third party solutions, including white label (full OpenAPI). Free, "sandbox", channel distribution and stand-alone products and platform extensions. | NO | NO | YES |

| FEATUES | MARKET STANDARD | INDIVIDUAL COMPANIES | CRYPTERIUM |
|---|---|---|---|
| Separate logical default platform components may be replaced by a more specialist components, including those of completed ICOs (for example, the application of a Bancor protocol or COMIT Network for certain areas of the platform). | NO | NO | YES |
| Growing portfolio of in-house satellite services that together will form a business network based platform (invoicing, code translation patronage, short-term Cryptocurrency value setting, digital assets for deferred payment, a P2P lending scoring logic amongst many other features). | NO | NO | YES |

| FEATURE | Crypterium | TENX | TOKENCARD |
|---|---|---|---|
| Card issue | Instantly | 2 weeks+ | 2 weeks+ |
| Cashback/Loyalty rewards | 0.15% deducted from all merchant fees | 0.1% | 0% |
| Currency exchange/assets | CryteriumSX | N/A | N/A |
| QR-payments for merchants | Yes | No | No |
| The cost of the transaction | 0.5% | 0% 11 | 1% 12 |
| Security of assets | Hosted Wallet and Smart Contract | Hosted Wallet and Smart Contract | Smart Contract |
| Open platform | Yes | Yes | No |
| Work with AmEx. Unionpay and JCB | Yes | No | No |

Crypterium Whitepaper Version 1.0 L 31.10.2017
Date of comparison 28/08/17

Actual fees are higher, as transactions are not based on the lowest exchange rate possible 12 Actual fees are higher, as transactions are not based on the lowest exchange rate possible.

Crypterium Whitepaper Version 1.0 L 31.10.2017 Adherence to all Legal and Regulatory Standards The purchase of any tokens involves a high degree of risk, including but not limited to the risks described below. Before purchasing CRPT Tokens, it is recommended that each participant carefully weighs all the information and risks detailed in this White Paper, and, specifically, the following risk factors.

A. Dependence on Computer Infrastructure

Crypterium dependence on functioning software applications, computer hardware and the Internet implies that Crypterium can offer no assurances that a system failure would not adversely affect the use of your CRPT Tokens. Despite Crypterium implementation of all reasonable network security measures, its processing center servers are vulnerable to computer viruses, physical or electronic break-ins or other disruptions of a similar nature. Computer viruses, break-ins or other disruptions caused by third parties may result in interruption, delay or suspension of services, which would limit the use of the CRPT Tokens.

B. Smart Contract Limitations

Smart contract technology is still in its early stages of development, and its application is of experimental nature. This may carry significant operational, technological, regulatory, reputational and financial risks. Consequently, although the audit conducted by independent third party increases the level of security, reliability, and accuracy, this audit cannot serve as any form of warranty, including any expressed or implied warranty that the CRPT Smart Contract is fit for purpose or that it contains no flaws, vulnerabilities or issues which could cause technical problems or the complete loss of CRPT Tokens.

C. Regulatory Risks

The Blockchain technology, including but not limited to the issue of tokens, may be a new concept in some jurisdictions, which may then apply existing regulations or introduce new regulations regarding Blockchain technology-based applications, and such regulations may conflict with the current CRPT Smart Contract setup and CRPT Token concept. This may result in substantial modifications of the CRPT Smart Contract, including but not limited to its termination and the loss of CRPT Tokens as well as a suspension or termination of all CRPT Token functions.

D. Taxes.

Token holders may be required to pay taxes associated with the transactions involving CRPT Tokens. It will be a sole responsibility of the token holders to comply with the tax laws of the relevant jurisdictions and pay all required taxes.

E. Force Majeure.

Crypterium performance may be interrupted, suspended or delayed due to force majeure circumstances. For the purposes of this White Paper, force majeure shall mean extraordinary events Crypterium Whitepaper Version 1.0 L 31.10.2017 and circumstances which could not be prevented by Crypterium and shall include: acts of nature, wars, armed conflicts, mass civil disorders, industrial actions, epidemics, lockouts, slowdowns, prolonged shortage or other failures of energy supplies or communication service, acts of municipal, state or federal governmental agencies, other circumstances beyond Crypterium control, which were not in existence at the time of Token sale. If such circumstances occur prior to issuance CRPT Tokens and Crypterium is unable to issue CRPT Tokens within 3 months from the projected date, the escrow agent may issue a refund at the request of the CRPT Token purchasers. The refund will be issued in the original form of payment to the same digital wallet or bank account where the funds were transferred from.

F. Disclosure of Information.

Personal information received from CRPT token holders, the information about the number of tokens owned, the wallet addresses used, and any other relevant information may be disclosed to law enforcement, government officials, and other third parties when Crypterium is required to disclose such information by law, subpoena, or court order. Crypterium shall at no time be held responsible for such information disclosure.

G. Value of CRPT Token.

Once purchased, the value of CRPT Token may significantly fluctuate due to various reasons. Crypterium does not guarantee any specific value of the CRPT Token over any specific period of time. Crypterium shall not be held responsible for any change in the value of CRPT Token. Assumptions with respect to the foregoing involve, among other things, judgments about the future economic, competitive and market conditions and business decisions, most of which are beyond the control of the Crypterium team and therefore difficult or impossible to accurately predict. Although the Crypterium team believes that its assumptions underlying its forward-looking statements are reasonable, any of these may prove to be inaccurate. As a result, the Crypterium team can offer no assurances that the forward-looking statements contained in this White Paper will prove to be accurate. In light of the significant uncertainties inherent in the forward-looking statements contained herein, the inclusion of such information may not be interpreted as a warranty on the part of Crypterium or any other entity that the objectives and plans of the Crypterium project will be successfully achieved.

Please note that the Crypterium project CRPT Token may be subject to other risks not foreseen by its team at this time.

Waevee

Waevee is a mesh social network, where user can upload news and media content (pictures, videos, articles, etc) and share it with the world. Each user has to pay a subscription fee, but information will be encrypted and personal information won't be sold.

(Whitepaper for Inspiration)

1. Executive Summary

The emergence of a plethora of powerful personal and business internet applications has transformed how businesses and consumers operate. Explosive growth in internet consumption is being propelled by rapid advancements in internet-related infrastructure and services. Despite the explosive growth, major problems still persist for users to get onto this information superhighway. One of the problems with local providers and local connectivity is that it limits on the go usage. Mobile data plans implement usage restrictions and relatively high fees. WiFi connection problems range from annoying nuances such as localized captive portals and injected advertisement to dangerous issues such as malicious hotspots and open access points where more or less everyone can eavesdrop on your unencrypted traffic. Industry bodies and local providers fail to address the issues of seamless connectivity and roaming.

Why Can't Wifi Just Work Reliably and Securely?

IUNGO is a globally distributed wireless internet service provider built with the help of a worldwide community. We are bootstrapping a community where everyone can assume responsibilities and benefit from the associated rewards for running parts of the service delivery infrastructure. Members can contribute by installing Public Wi-Fi access points on their premises and/or running parts of the service infrastructure.

Our network will rely on the existing physical Internet infrastructure to carry end-user traffic and will form an overlay network with unified end-user identification, authentication and billing systems. We will use the Ethereum network to build trusted, transparent accounting and payment infrastructure. Our mobile applications will enable low granularity service usage accounting and compensation for services rendered. Additionally to the software solution, hardware will be offered as an option, with pre-setup routers available for those seeking a consumer friendly plug and play experience. IUNGO will not limit itself to the technical research and development needed to deploy the network at global scale, but will also build worldwide recognition of the brand.

Wireless Internet

Users

Customers

Travellers

Remote workers (hipsters or professionals working from coffee shops)

Digital nomads

Residents of countries where mobile data plans are expensive and/or poor coverage Heavy youtube users Hardcore garners on the move Benefits Instant, seamless, safe and automated connectivity with hassle-free payments Affordable and transparent accounting with single wallet globally Usage based on preferences (price, speed, quality, reviews) Global providers network with recognizable branding Wireless Internet Service Providers Benefits Additional revenue stream for individuals and businesses Cost savings Access to a global user base Increased engagement, low entry barrier (cheap—free to use, small fee based on revenue) Powerful web based service management tools (network abuse prevention, reports, billing, alerts, captive portals, white label branding) Marketing tools Increased security Reduced legal liability for corporate "visitor" internet access Customers Small and medium-sized businesses (e.g. restaurants, cafes and bars) large enterprises and governments wishing to provide secure public/visitor internet access individuals who live in close proximity to crowded public spaces Airbnb hosts co-working spaces investors interested in providing wireless coverage in a selected area (street, square, block or whole city) MICE organisers (Meetings, Incentives, Conferences and Events/Exhibitions) End users can review ratings of any particular Access Point (AP) and provide ratings by collecting quality metrics (latency, jitter, bandwidth) of connections (AP collected metrics are not enough)

AP providers are placed on the map and businesses can provide descriptions

We are building a community where evangelists can provide introductions to installers and manage troubleshooting if problems involving local competences (distributed labour) arise Anyone competent enough to participate in running core infrastructure components, can take part and benefit from the incentives IUNGO provides complete marketing and brand recognition AP providers can choose to redirect end-user traffic via third parties therefore limiting legal liability exposure AP owners can override the IUNGO recommended price for their location and set their preferred price for the service On one side of the market we have the existing wireless internet companies operating in the field with closed, managed, walled garden proprietary technologies. On the other side we have small and medium businesses running unsecured networks without any controls and without any material marketing opportunities. With open protocols, an incentivized business model and the power of collaboration with blockchain payments, this market is ripe for disruption.

2. Market Opportunity

The Global Internet Service Providers industry is one of the fastest-growing industries in the global economy. Explosive growth is being propelled by rapid advancements in internet-related infrastructure and services, as the emergence of a plethora of powerful personal and business internet applications has transformed how businesses and consumers operate. Rapidly rising demand for broadband internet access and continued investment in wired internet infrastructure have helped propel the industry forward. According to IBIS World research, the annual growth rate between 2012 and 2017 was 8.8%. The majority of Internet service providers are multi billion dollar Telecommunications companies like AT&T, Verizon and China mobile.

GLOBAL ISP
MARKET GROTH 879 783
484
584
620
2013 2015 2017 2019
2021 2023
697

2.1. Regionally Based Providers

Most of these Telcos and ISP's are regionally based with no convenient services for today's new generation of freelance workers, digital nomads, travelers, vloggers etc. It is a significant problem for them to access reliable and sufficient internet services outside of their home country. Wi-Fi password hunting, filling forms in airports and public spaces, unknown security or payment options, poor download and upload speeds and data usage restrictions causing not just inconvenience but a measurable and material waste of time, energy and money.

2.2. Small and Medium-Sized Business Needs

WiFi is now a must have amenity for every consumer-facing business, but for venue owners, providing a reliable WiFi service is difficult. Today's market offers a wide range of guest WiFi solutions, but they are neither cheap nor simple for a small business to use. Hotspot management tools suffer from usage complexity, user base disparity and zero brand recognition. The WiFi experience and monetization models are subpar solutions at best lacking centralized management, operational tools and usage stats. There is no existing service which provides easy Plug & Play usage and marketing tools.

2.3. Network Expansion and Capacity

As the demand for mobile broadband services continues to explode, mobile wireless networks must greatly expand their capacities. Simultaneously, the revenues generated from data traffic are falling. In this context, service providers are calling for network strategies that alleviate the CAPEX burden of satisfying this demand. One effective method of spectrum reuse by which mobile networks may be able to accommodate this exponential growth in demand is to offload certain segments of their traffic onto Wi-Fi networks—which are connected by fixed broadband access lines directly to the Internet. By migrating data traffic from expensive cellular networks to WiFi infrastructure, WiFi Offload implies dramatic savings on infrastructural costs and also enhances the user connectivity experience while providing value-added WiFi services. Wi-Fi offload allows the portion of data traffic emanating from the mobile device that is destined directly for the Internet to be injected immediately into the Internet for routing to its final destination. This traffic never touches the mobile operator's core network. Also Wi-Fi offload uses unlicensed spectra. Further, Wi-Fi has access to a very substantial amount of spectrum—with allocations of several hundred MHz in the 2400 MHz and 5000 MHz bands. Because of the low permitted power of Wi-Fi signals, it is possible to make very substantial reuse of these frequencies. To take advantage of this, many mobile wireless devices are capable of connecting to local Wi-Fi networks in addition to signals from cell towers.

WiFi is now a must have amenity for every consumer-facing business, but for venue owners, providing a WiFi service that adds value beyond connectivity while complying with regulations is difficult. Complete WiFi service packages offer centralized management, and operation from the cloud, easy integration into the service portfolio, compliance with security and regulatory obligations and increased revenue. Revenue could be increased directly by selling WiFi access or upselling it as a part of package. Alternatively, additional charges for WiFi are not applicable in some markets due to the broad availability and competitive prices for LTE. But even in these situations, small and medium companies would benefit from a complete managed WiFi services toolkit for marketing purposes.

3. Business Model

IUNGO will charge a 3% transaction fee from WiFi service providers. Additionally 1% will go to the Service Gateway operator (anyone can operate service gateways). This one percent will be distributed equally between all service gateways in a situation where multiple gateways are involved in the transaction chain. Additionally, 1% may go to local evangelists as a referral bonus. The remaining 95% (or 96% in cases when there is no referrer) of the end user payment will go to the WiFi service provider.

Payments for the service will be made with ING coins within the system. Coins will be available on a variety of exchanges. The service gateway will have integrations with major exchanges to get ING coins instantaneously in real time for a seamless user experience. ING coin owners can either use tokens for the service or sell them on Exchanges. Despite the increasing usage of the IUNGO network and increasing numbers of users, the supply and total number ING coins remains limited t, so the value should grow in parallel with the growth in adoption and usage of the network.

The Wifi Internet price is not directly related to the ING coin price. The price will vary due to a variety of market specifics and other factors. The ING Token will be used as a medium of exchange between fiat currency and the service provided.

4. Marketing and Strategy

Local evangelists, tech support program (Geographically based IUNGO ambassadors affiliate program) will receive 1% of transactions they are involved with. A substantial amount of budget will be allocated for public awareness, consumer marketing and B2B sales and marketing. The HORECA and MICE industries (events, exhibitions) will be a particular area of focus for these campaigns.

We are establishing ongoing cooperation with router manufacturers and firmware developers. With a goal of custom hardware creation after the second funding phase. A bounty program will be established with funds for coverage. Initial coverage on demand.

Different geographical areas will have regional pricing suggested by the IUNGO service gateway, but each provider will be able to overwrite this price creating marketplace dynamics WiFi providers who choose IUNGO will be provided with industry leading tools to generate metrics for the business owner—retention, returning customers, usage stats, abuse counter measurements (web, https, email), bandwidth limitation.

5. Competition

Local evangelists, tech support program (Geographically based IUNGO ambassadors affiliate program) will receive 1% of transactions they are involved with.

5.1. Fon Network

Fon is a carrier WiFi provider and are pioneers of residential WiFi sharing. Fon Solutions offers WiFi products and services. Their management solutions enable service providers to configure, deliver and operate their own WiFi services. Fon Network aggregates residential and premium carrier WiFi footprints creating one coherent global WiFi network. Fon facilitates WiFi interconnection between carriers, provide access deals to interested parties, and enable seamless user roaming. Fon's global clients include British Telecom, the Deutsche Telekom Group, SFR, Proximus, KPN, Cosmote, MWEB, SoftBank, Telstra, and Vodafone.

5.2. Boingo

Boingo Wireless, Inc. is a Wi-Fi software and services provider that makes it easy, convenient and cost-effective for people to enjoy Wi-Fi access on their laptop or mobile device at more than 325,000 hotspots worldwide. With a single account, Boingo users can access the mobile Internet via Boingo Network locations that include the top airports around the world, major hotel chains and coffee shops, restaurants, convention centers and metropolitan hot zones. Boingo and its Concourse Communications Group subsidiary operate wired and wireless networks at large-scale venues worldwide such as airports, major sporting arenas, malls, and convention centers, as well as quick serve restaurants. Price for the service is 39 USD per month for global plan and 9 USD per month for US only plan.

5.3. Hotspot System

HotspotSystem provides hotspot management and billing services for businesses or individuals who want to provide internet access for their customers. Their Cloud-Based Hotspot Management allows customers to manage unlimited hotspot locations from a Control Center. All changes are available in remote locations in real time. The Router Alert feature will alert you if a device goes down. All user activity can be seen when it happens and can also be exported or can be accessed remotely via our API. Features: unlimited locations, customizations, network abuse prevention, router alerts, user management, logs, reports, billing etc. Pricing: 15%-25% transaction fee for accepting payment in hotspot. Payout once a month. Plans without payments limited by sessions and costs 5 USD per location per month for 3000 sessions.

5.4. AIRFY

This is a public WiFi for business solutions. When providing WiFi to your guests without airfy, you are liable for the actions of your guests. Airfy is an internet service provider, therefore not liable for those actions. As soon as you use airfy, you are safe from legal threat. All your guests' data traffic is securely channeled to the internet through the airfy cloud VPN server. Thanks to this technology, you as a WiFi provider are safe. The guests are using the internet as airfy users, so that you are not liable for their actions. All you need to set up is electricity and an internet provider. Cloud-based support. Price for the service is 19 EUR per month for Starter package and 39 EUR per month for Marketing plan with Facebook page promotion features.

5.5. SOCIFY

SOCIFI is a cloud-based platform designed for Wireless Providers to enable the monetization of their networks. In large scale or custom deployments, SOCIFI is capable of also providing a local hosting solution for enterprise infrastructure. A plan with all features for 15000 sessions a month costs 195 USD.

6. Technical Description 6.1. Overview

The IUNGO will provide public Wi-Fi access. Service providers will be deploying Wi-Fi sites by installing and registering access points for public use. Service consumers will be able to use the IUNGO mobile wallet application or the IUNGO website to locate sites providing access to the IUNGO network. When in radio proximity to an active access point, a consumer's device will access internet services and pay for services used. There will be two levels of access security and two payment methods available. High communication security and more flexible payment terms will be available to end users willing to install a IUNGO mobile wallet application. A fallback browser based authentication and payment method will be available via IUNGO cloud wallet for those without the mobile application installed. All payments will be Token based and cleared on the public Ethereum network.

Wi-Fi access will be delivered by Wi-Fi access points installed and operated by service providers (IUNGO community members). Access points will provide customer devices with physical access to the Internet directly, via existing connections to Internet Service Providers or indirectly via transport gateways operated by service providers having carrier status (with legal immunity from liability in respect to content transferred). Due to limited hardware resources, access points will offload all end-user identity verification and payment transaction to service gateways. Service gateways will store configuration and state information of all paired access points/site controllers, and will provide database replicas of all deployment sites, proxy reputation feedback data and in concert with wallets will participate in off-chain state channel based micropayment transactions and will be interacting with the Token contract on-chain. Each service gateway will embed an Ethereum node and will interact with smart contracts on the Ethereum platform on behalf of the wallets. Anyone conforming to the qualification requirements and IUNGO operations rules will be able to operate service gateways and reap the associated rewards. Service gateway operators will be able to define their own schemes for how they compensate service providers for services rendered. IUNGO ORG will be operating the service gateways taking fixed commission from actual payments received from consumers. There is a trust based relationship between the service provider and service gateway operator. Service providers can freely choose which service gateway to pair with. Payments from wallets to service gateways will use zero trust state channel based payments. Payments from service gateways to service providers will rely on trust between them.

You would not be mistaken if the IUNGO service gateway operations looks to you very similar to the Ethereum mining pool operations: you have miners (providers) running mining rigs (access points) contributing work (giving access to internet) to a benefit of a pool (service gateway). The pool (service gateway) operator reaps reward for a block mined (services provided), keeps the commission and distribute rewards to miner(s) (provider(s)). This model enables creative and competitive reward distribution schemes to flourish.

6.2. Wi-Fi Deployment Sites

The deployment site is a physical location where access points will be installed by, or on behalf of the site operator. Access points will provide a physical connectivity layer to the internet. Depending on the size of deployment site, it may take one to many access points to provide a good quality service. To address different deployment site scale requirements, three deployment strategies will be pursued.

In very small sites off the shelf wireless routers running IUNGO provided custom firmware will be directly connected to local internet service provider. A selected set of the wireless router models will be supported by custom firmware to act as IUNGO network compatible access points. For average sized sites up to 8 access points can be daisy chained to cover a larger area. The access points will be able to detect daisy chained neighbours and autoconfigure the bridging mode to relay traffic to the next neighbour while the nearest one to the ISP will function as site controller. Small and normal sized site access points will have a dedicated port to connect the site owner's network devices (like Point of Sale equipment, video cameras etc.) which will be completely isolated from the wireless network. For bigger sites (hotels, exhibition venues) with many access points installed a dedicated IUNGO site controller will be used to manage the site. Only enterprise class access points with original vendor supplied firmware and sufficient capabilities or IUNGO partner provided IUNGO network compatible access points will be supported in big sites to reduce the chances of hard to debug problems. Additionally —subject to compatibility of existing access points/switches in an existing Wi-Fi deployment site—a IUNGO site controller may be installed to add IUNGO network capability to an existing Wi-Fi deployment site. IUNGO network compatible access points and site controllers will be made available for purchase from IUNGO ORG partners. Very small sites will have a single access point paired with a service gateway. Average size sites will have only the access point directly connected to internet service provider and acting as site controller paired with service gateway. On bigger sites only the site controller will be paired.

Two Wi-Fi networks (SSIDs) will be served by each access point: one open/unencrypted network and one authenticated/encrypted network. Only open/unencrypted network announcement beacons will be broadcasted. No network advertisement beacons will be broadcasted by access points until the control channel to service gateway is established to reduce waste of time/battery charge of consumers connecting to a access point without access to internet. Unencrypted wireless network will greet users with a captive portal and will offer users to choose either to install a mobile wallet application (to become able to connect to the secured network) or to connect to a secured IUNGO cloud wallet to pay and continue using unsecured Wi-Fi network service. Authenticated and encrypted network will only serve customers who have a mobile wallet installed.

A custom firmware for wireless routers will run a Linux based environment build on top of OpenWrt project. Wireless interfaces will be managed by hostapd daemon. The IUNGO developed local RADIUS daemon will serve hostapd to authenticate mobile wallet users using an EAP-TLS authentication scheme and will derive encryption keys for each Wi-Fi client session. Each RADIUS server (running in access point or site controller) will have a security certificate installed. A captive portal agent will take over DNS/HTTP traffic on unencrypted wireless network interface and will redirect consumers to the IUNGO wallet page until network access restrictions are lifted. API daemon will expose HTTPS based API used by mobile wallet and cloud wallet to communicate with service gateway serving a site and all other IUNGO services. A control agent will keep live connection to a service gateway and will control user access to the internet based on commands received from the service gateway. A similar set of software will be deployed on the site controller.

Service Provider Risks:

6.3. Accounts & Identities

Mobile and cloud wallets, service providers and service gateways will have self-generated cryptographic pseudo-identities. IUNGO will reuse the identity mechanism employed in the Ethereum network: each entity will generate an Elliptic Curve key pair. A truncated hash of public key will serve as an entity identifier and also as an account number on the Token contract. A key pair will be used to sign and verify signatures, to derive shared session keys for encrypted communications and also to calculate the identifier of the Token holder. All payment messages generated by wallets and relayed to the Token contract on the Ethereum network will be signed to prove the Token holder's intent to proceed with the request described in the message body. The Token contract will be able recover identity information from this signature and will use it to validate received requests. Monthly payments; Cheating/attacks by users (no payment for usage from IUNGO)—solution: constant network improvements, monitoring tools, client support (investigate reported issues);

Single payment gateway for initial V1;

Service gateway takes risks (places customer money into blockchain).

6.4. IUNGO Mobile Wallet

The IUNGO mobile wallet is a dedicated software application which enables seamless connectivity to the IUNGO network. When permitted by the consumer, it will connect to any IUNGO access point or public IUNGO web-service and will download the dataset of any IUNGO Wi-Fi sites available nearby. The downloaded dataset will be cached by the the application for later use. The application user will be able to see all IUNGO enabled Wi-Fi sites and associated information on the map. The IUNGO mobile wallet will be able to login to existing IUNGO cloud wallet accounts using a remote identity or create and use a locally generated identity. The cloud wallet account can also be used to backup/restore encrypted locally generated identities. When use of a local identity is preferred, the application will generate a cryptographically secure pair of keys and will create a self-signed X.509 standard based certificate to represent end-user client identity to TLS servers.

When enabled, the wallet application will start monitoring signal levels of all available IUNGO access points. Wallet users will be able to define automatic connection policies with parameters such as the highest acceptable price per MB/per minute, lowest acceptable bandwidth, whether to give away your verified personal information (like name/surname, e-mail address, age, phone number) in exchange for internet access subsidised by access point operator or to disable automatic connections altogether. When in automatic connection mode the application will track the quality of the currently connected session and the quality of beacons received from other available access points. It will automatically switch over to other access points with better signal/noise ratio and matching connectivity policy when such an access point becomes available within radio reach.

After associating with the preferred access point, the wallet application requests provisioning of internet access by negotiating service/payment terms with service gateway via an API reachable via the access point and by paying each time the previously paid amount is used-up. The mobile wallet tracks session length and the amount of information transferred to share service usage information with the reputation service. When in manual mode, the wallet will present the user with all connectivity choices available and will connect only with the user's consent.

This application will gradually be made available on the majority of popular operating systems and platforms like android, iOS, Mac OS X, Microsoft Windows and GNU/Linux.

6.5. IUNGO Cloud Wallet

The IUNGO cloud wallet is a web service created and operated by IUNGO ORG. The cloud wallet service enables access to the IUNGO powered network when the mobile wallet application is not installed on the consumer's device or mobile wallet application is not available on device's platform. The cloud wallet service will be freely accessible via public internet and via any IUNGO access point. When accessing a service site a consumer will be given the choice to either use an existing wallet account or create a new one by filling in the account registration form. After logging in to an existing or new account, a single page JavaScript app will be loaded to present a graphical user interface. It enables consumers to create additional identities, top-up their Token accounts tied to identities, transfer Tokens between accounts and to pay for access on IUNGO enabled Wi-Fi sites. Users will be able to use this interface to top-up their Token account by purchasing tokens with their credit card and possibly other integrated payment methods. Additionally, a criteria based searchable map of all other IUNGO powered Wi-Fi deployment sites will be available in the webapp.

In case no mobile wallet has been installed on the mobile device, the consumers must explicitly direct their device to connect to the open IUNGO network. When connected a captive portal software running on the access point will redirect all attempts to visit http sites to IUNGO's cloud wallet webpage. After logging in to the secure cloud wallet, the user will be presented with services available on the currently used access point and respective service prices. The consumer will be able to choose their preferred service type (subsidised/paid per time/paid per amount of data transferred) and optionally set a comfortable amount to spend (which automatically limits time available or enforces a data transfer quota). The session duration and data amount transferred will be displayed during the active session. Consumers will be able to stop the service delivery and additional payments at any time with the push of the button. In the background, the web application running in the browser will establish (Cross Origin Resource Sharing) connections to both the Access point API and to the Cloud wallet API. It then will start forwarding encrypted communication messages between the Access Point and Cloud Wallet establishing a relayed communication channel between the two. The cloud wallet will use this communication channel to emulate a mobile wallet and will use the same API on access point to identify and authenticate the deployment site, learn services available, negotiate and pay for services rendered. After all parties are identified and authenticated a direct channel between cloud wallet service and service gateway serving access point may be established to reduce latency overhead of indirect communications.

6.6. Payments Payment Channels

All payments in IUNGO network will be token based. IUNGO ORG will generate IUNGO tokens some time after the ICO event. Tokens will be backed by ERC20 compatible smart contracts on the public Ethereum network. To facilitate faster payment cycles, an of-chain micropayment mechanism will be utilised. In addition to standard ERC20 functions available for invocation, the IUNGO Token contract will expose functions needed to set-up and synchronise one way, zero trust, state channel based, off-chain micropayment channels. To open a payment channel one party will freeze a selected amount of tokens for the benefit of a receiving party. A selected amount can also be equal to zero. This frozen amount can be increased on-chain by the sending party at any time. However, there will be no way to return frozen tokens back to the sender's account. By monitoring events emitted by the Token contract, the receiver can detect payment channel creation events and track the amount of Tokens frozen. When the sending party decides to send an amount to the receiving party, it generates a signed offer confirming an un-revocable intend to part with specified amount of Tokens to the benefit of the receiver and sends this message off-chain to the receiver. The message contains the sender's address, the receiver's address, the per sender-receiver pair tracked serial number of the offer, the amount sent, a hash of previous attributes, the sender's digital signature over hash and an opaque, unsigned bytestring to carry the reason for payment. By reusing a serial number, the sender can increase the amount sent and update the reason for sending until actively requested by the receiver to use new serial number for further payments. To settle the state on-chain the receiver must sign the best offer received from the sender and invoke the Token contract with the countersigned offer as an argument.

When invoked to settle the offer the Token contract will check if the settlement should be processed. First, both signatures are checked for validity and the signers match sender and receiver. Then the offer serial number is checked to determine if it is greater than the last offer processed by the contract to reject repeated attempts to settle the same offer. Subsequently, the frozen plus balance amount of the sender's account is checked to verify it is greater than amount offered. If all checks are passed, the serial number of the offer is saved in the state memory of the Token contract, the commission for IUNGO ORG is calculated, the amount promised is deducted from sender's account and the amount minus commission is deposited to receiver's account. The commission amount is deposited to the benefit of IUNGO ORG. It should be noted that an offer and all signatures are passed as input to settlement function so that the contract can be invoked by any 3rd party willing to pay for the gas used and still produce expected results. Service gateways will act as an intermediary between wallets and the blockchain and will cover transaction gas costs. The zero risk guarantee does not come without some responsibilities on the receiving side. The receiver should always track the amounts frozen and offered by the sender and refuse to accept payment offers not covered by the frozen amount if it expects zero risk of not being payed. The zero risk payment scheme allows the sender to trade the costs of updating the frozen amount (by invoking the contract) on-chain more often for less risk of leaving unused tokens frozen. It also helps to reduce the contract invocation gas costs covered by the receiver by being more time tolerant. The receiver can trade a lower gas price for a longer wait time that the transaction will spend in pending transaction pool without increasing the risk of not being paid. The same payment mechanism can be reused for payment channels based on trust. In a trust based payment channel case the sender does not freeze any tokens. The sender sends signed payment offers in the same way it would be done in the zero trust scheme. It is up to the receiver to track the amount left in the sender's account and select the best time to settle on-chain. In this use case, the receiver is never guaranteed that the sent amount will be available for settlement.

Payment Channel Network

We anticipate that a limited number of parties will be willing to operate service gateway serving a more significant number of deployment sites used by a substantial amount of consumers. The chances of the same consumer consuming services provided by the same provider are too slim to require a direct payment channel between the consumer and the service provider. To reduce the total number of payment channels it takes to pay for the services, it makes sense for consumers to open zero risk payment channels only to the benefit of service gateways. Service gateways will create a zero risk payment channel mesh between themselves to facilitate expedited payments for their users. Service gateways will open trust based payment channels to process these payments to service providers.

Two payment scenarios become possible: direct and transitive. In the direct payment scenario a single gateway has a payment channel to both the consumer's account and the service provider's account open. In case a direct payment is possible it is up to service gateway to decide how the reward will be divided between the service gateway and service provider. In the transitive payment scenario, a serving gateway only has a channel to the service provider and payments from the consumer's account can only be organised with some assistance from the service gateway who has a payment channel with the consumer. The implementation of transitive payments will be based on hashed time lock concept. In case of a transitive payment scenario, a service gateway on the consumer's end can keep a protocol fixed 0.5% commission for assisting payments to come through.

6.7. Services

The IUNGO network's functionality relies on several services. When connected to any of the IUNGO network's access points, the customer's mobile device can interact with some of these services even when internet access is administratively prohibited. The freely available services include site location discovery and mobile wallet.

Site registry service. All access points/site controllers will be paired with SGW's. When an access point or site controller is paired with a service gateway the (geographical WGS84 and street address based) location information of the deployment site and a list of all BSSIDs of each access point in the deployment site is provided by the service provider.

Additionally, all available services and service pricing information is recorded after the pairing procedure is complete. The service provider will be allowed to change service list and pricing information no more often than once in 24 hours. Each service gateway will collect and share site registration data with other service gateways. Every service gateway will collect site registration data from all other service gateways to render a complete list of all deployment sites available around the world. This data will be made available to consumers via site locator service.

Reputation registry. Access points will record user session details like start/end timestamps of each session, the amount of data transferred and will report it to service gateways. The mobile wallet service will also gather same session details and will send it to service gateways for comparison. Service gateways will collect and relay session data collected from deployment sites and mobile wallet users to the IUNGO reputation registry. The reputation registry will run mediation process and will use complete event detection on gathered information to detect and filter out possible reputation fraud. It then will calculate a reputation score (including reputation score error range) for each site. The reputation score for each site will be made available to service gateways.

The Site locator service provides access to the site registry database. It will share detailed information of nearby sites with IUNGO consumers using the mobile wallet or visiting the IUNGO public internet site. Site information includes physical geo location, street address, services available (subsidised, paid per time, paid per MB) and their respective prices, IUNGO reputation score value with error range and a site description supplied by the service provider.

Certificate authority. IUNGO ORG will manage Public Key Infrastructure used to secure access to the network. IUNGO ORG operated Network CA will act as a trust anchor to wallets and mobile device Wi-Fi WPA supplicants to ensure consumer's device is connecting to a legitimate access point (participating in IUNGO network). The Network CA will sub-delegate certification rights to service gateways to issue certificates to access points/site controllers. The certificate lifetime will be limited to one month for access points/site controllers and 6 months for service gateways. Certificate revocation published by Network CA will describe all revoked service gateway certificates.

6.8. Infrastructure Entities

Transport Gateway. Service providers may be limited by service agreements with their internet service providers to not provide service to unknown 3rd parties and also can be held legally responsible for behavior of their end users. To limit exposure to legal risk, service providers may choose to redirect all end user internet traffic through a transport gateway operated by other parties and/or other countries. There are many options with different tradeoffs of what kind of transport protocols should be used and what legal risk types need to be avoided. We will conduct further research on needs and options related to how transport gateways will be integrated into the IUNGO network during the MVP phase.

Service gateways. The service gateway is actually a collection of services acting in concert with deployment site hardware and other service gateways to enable a unified global user experience. It plays a major role in the IUNGO network as a middle ground solution where most of the cost reduction and performance scaling benefits of a centralised service can be had without sacrificing diversity and service availability. Each qualified service gateway operator will have a chance to come up with creative approaches to user onboarding, reward sharing, Token sale and and other value added to stay competitive. Running a service gateway comes with it's costs: operators will need hardware resources to run the software, low latency high bandwidth connection to internet and Ether to pay gas fees for invoking Token contract on Ethereum network. Strict adherence to IUNGO operations rules covering allowed and disallowed operational practices will be enforced by IUNGO ORG in order to protect the legitimate interests of the service consumers. The service gateway will at least run a node of distributed site registry, reputation data collection agent, one to many instances of site-locator service, an intermediate certificate authority, a web based management site for service providers and an Ethereum node. IUNGO will provide open protocol descriptions for all interfaces used and a dual licensed open source reference implementation of all software needed to run basic functioning service gateway. A commercial licence will be available for those seeking to create closed derivatives.

7. Crowdsale Details

The IUNGO crowdsale and the corresponding token creation process will be organized around smart contracts running on Ethereum.

In Total 100 Million IUNGO tokens (ING) will be created.

Participants willing to support the development of the IUNGO Project can do so by sending Ethereum to the designated address, or by contributing throw IUNGO platform. By doing so, they are purchasing IUNGO Tokens (ING) at the rate of 1000 ING per 1

ETH which will be sent to their wallet.

During token sale several rounds (Tiers) will be organised with different Bonus, Discount rates and payment methods.

7.1. PRE-ICO

During the Pre-ICO, participants have an opportunity to get 3× token Bonus. Only 1.3% of total tokens are distributed in this way, representing an excellent opportunity for early participants. The Minimum investment is 0.5 ETH while the Maximum is 50 ETH per investment.

Pre-Sale Funds Will be Utilized for:

7.2. ICO

Participants willing to support the development of the IUNGO Project can do so by sending Ethereum currency to the designated address, or by contributing throw IUNGO platform with other types of payments. By doing so, they are purchasing IUNGO Tokens (ING) at the rate of 1000 ING per 1 ETH which will be sent to their wallet.

During token sale several rounds (Tiers) will be organised with a different Discount rates, payment methods. IUNGO keeps the right to have special negotiated deals and discounts for large stake investors.

Details:

The main currency during the token generation event is Ether (ETH). It can be proposed to participate in other forms of payments too.

Token Creation will be capped ("Soft Cap") for 8 million INGs sold. This amount is subject to change before the Token Creation event.

The Token Creation period will last till 31st of January 2018 or till all created IUNGO tokens will be sold.

If the Crowdsale campaign does not reach its minimal capital goal all funds will be returned automatically to the ING holders.

Product MVP finalization Legal and Consulting Advisors team ICO marketing Token Creation has a Hard Cap: upon achieving this Cap, token creation will stop and no further contributions will be accepted. The Hard Cap is equal to 64 Million INGs. Tokens that are not sold during the Crowdsale rounds will be automatically transferred to the further financing rounds by the smart contract, and will burn at the end of token sale.

Total
100 MILLION ING TOKENS FOR SALE TOKEN SYMBOL
ING TOKENS GENERATED PER ETH SOFT CAP HARD CAP
PERCENTAGE OF TOKENS FOR IUNGO FOUNDERS
IUNGO SERVICE GATEWAY FUND (FOR INITIAL OPERATIONS)
PERCENTAGE OF TOKENS GENERATED TO BOUNTY CAMPAIGN, TEAM, ADVISORS AND PARTNERS
DATE OF CROWDSALE START DATE OF CROWDSALE END 64%, 64 Million ING
ING
1000 ING 8 Million ING 64 Million ING
12%, 12 M (vested up to 18 months) 12%, 12 M 12%, 12 M
7th Of December, 2017 31st of January, 2018
Round Details:
PRE-ICO
Silent
1.3 Million ING (sold out)
ICO PRESALE
12.07-12.21 up to 16M Bonus 50%
ICO TIER 1
12.22-01.12 up to 28M Bonus 35%
ICO TIER 2
01.13-01.21 up to 16M Bonus 15%
ICO TIER 3
01.22-01.31 2, 7M and over Bonus 0%

Shortly after the ICO, IUNGO tokens will be available on major exchanges, and will be used for payments for the wireless network.

Usage of IUNGO services increases ING token usage therefore value should increase with the growth and adoption of the network 7.3. Budget Allocation Exact budgets will be allocated after the funding round.

For example if Etherium is worth 300 USD, ING will be worth 0.3 USD/IUNGO (rate with Ethereum fixed at the 1000 INGs per ETH)

For example if Etherium is worth 450 USD, ING will be worth 0.45 USD/IUNGO (rate with Ethereum fixed at the 1000 INGs per ETH) 10% Other<10%
HR
HR—up to 10% Operations worldwide LEGAL—up to 10% ENGINEERING—30-40% R&D
MARKETING—30-40% Product global awareness, B2B promotion OTHER—10% 30-40% Marketing 30-40% Engineering <10% Legal 7.4. Vesting Ensuring commitment. All tokens distributed to the team, bounty and advisors are subject to vesting. Vesting model ensures more value and security for the token contributors.

Vesting provides more loyalty from the core team towards the project and ensures that ING is not subject to market manipulation and provides stable market development for the ING token. Eventually vesting is a way for the IUNGO team to show the commitment and loyalty for the IUNGO project.

IUNGO introduces the following Vesting model:

ING tokens for co-founders will be locked once Token Sale distribution will end.

1. 1/3 of ING is locked for 6 months from Token Sale distribution
2. 1/3 of ING is locked for 12 months from Token Sale distribution
3. 1/3 of ING is locked for 18 months from Token Sale distribution The vesting model is active for 18 months in total and shall be activated with a smart contract once the token sale is complete.

8. Notice and Disclaimer

This Whitepaper is important and should be read in its entirety. To the best knowledge of the authors, this Whitepaper contains information that is provided only in compliance with the requirements of applicable laws, rules and regulations.

All product and company names are Trademarks™ or Registered® trademarks of their respective holders. Use of them does not imply any affiliation with or endorsement by them. The content of this document includes forward looking statements with respect to IUNGO.network financial and technical viability. The effects of regulation by the governments of countries in which it may wish to operate. Expectations regarding the operating environment and market conditions. Forward-looking statements are sometimes, but not always, identified by their use of a date in the future. Forward looking statements are predictive and involve risk and uncertainty. Forward-looking statements are not guarantees of future performance and are based on assumptions.

ING Tokens issued by IUNGO do not have any rights, uses, purpose, attributes, functionalities or features, expressed or implied. Although ING Tokens may be tradable, they are not an investment, currency, security, commodity, a swap on a currency, security, or commodity or any kind of financial instrument.

Provided definitions apply throughout the document, unless indicated otherwise.

9. REFERENCES ScienceDirect

Expanding mobile wireless capacity: The challenges presented by technology and economics IBISWorld Global Internet Service Providers: Market Research Report Vedi Augmented Travel vedi.io VEDI (Voyages Experiences Destinations International) creates a unique experience for business people who need to travel or those who have a passion for wanderlust.

Working on a subscription based model, VEDI facilitates on demand traveling, transportation, events and hotel stays, integrated with helpful features of the networking, assistance and adventure features of Celeste.

Celeste uses VEDI as a platform for travel, luxurious hosting and transportation with reduced waiting lines.

VEDI's customers are linked into a subscription based service that stores points in User's account monthly, to be applied on the next trip. These points will increase in value as long as they stay in the app. There are five subscription levels, between $100 and $100,000 a month. Points will increase between 1% and 5% according to their level. VEDI also applies a referral program. Users can recommend the admission of other users in the app, and will earn 3% of their subscription as a commission.

VEDI is best to understand in two stages:
1. static stage: the app works as an event planner, a wishlist where user are able to plan thoroughly what they want to do on their trip.
2. dynamic stage: once the trip is finalized, the app becomes dynamic, managing events and giving access to instant bookings and benefits. This makes user interact with the world in an active way.

Todoist

Todoist is a task management software compatible with multiple operating systems, and with an open API to make the integration into Celeste possible.

This way User can assign different tasks and to-do-lists with staff and partners, so teamwork is made a lot easier, and the management of large groups is not just possible, but uncluttered and even enjoyable.

Todoist will be running in the background most of the time, but accessible through the calendar, and an option will be available in all other icons of Celeste, to remind user or partners of a certain task (such as buying tickets, purchasing of picking up items from a store, reserve tables in restaurant, etc.)

ArmCandy

ArmCandy is a networking application which specialized in link people together that like to do the same activities. ArmCandy acts as a database of activities, events and social networks and shows Celeste the way into the more ludic part of users day.

Purchase

Purchase is a social media application in which people can:
1. Create wishlists. Purchase will recommend where user can buy items on wishlist, and if it has to be shipped. Purchase also connects with different discount code providers and activates the codes automatically. If shipments get delayed, gifts will be offered.
2. Social component. Users can follow each other and see what everybody in their network is doing and if they are shopping or in a restaurant, where they are doing so, and even what they are buying or eating.
3. Menu. Menu is tied in Purchase's API, allowing user to order food or find restaurants that have a certain standard.
4. Purchase is also tied into Tauntine, a multi-currency wallet, where user can store different digital and cryptocurrencies. This way, if user needs cash and only has crypto currencies, Purchase will make a request to Tauntine, which lends fiat currency to user while putting the equivalent in a cryptocurrency of choice in escrow. Depending on how long it takes user to pay back the fiat, user has to pay more or less fees. The social network component of Purchase allows users to upload pictures of what they are doing and where they are, like what other people are buying, and see shops user likes or other users are visiting.

Purchase links into the online shops if available.

Purchase links back into Celeste and user can order a car or driver to visit the physical store.

Menu

What is MENU?

MENU is interactive eating. Ordering food in a restaurant without waiting time for customers. Control over employee management and customer care for restaurants, bars, clubs, and everything that has a menu.

How does MENU Work?

MENU connects customers phone with the internal cashing system and prints the order directly to the station(s) available in the establishment.

Customers download MENU on their cellphone. Once they enter a restaurant that uses MENU, customer gets to see the restaurants menu on their phone. Customer chooses, the program sends the order to the centralized cashing system which distributes the order to the different stations available in the restaurant or bar. Therefore, the beverages are printed in one station (bar) and the food is printed in another station (kitchen).

Connection works as follows:
-->Printer kitchen
Phone-->iPad-->
-->Printer bar (might need the kitchen order too)

Why should a Customer Use MENU?

Customers can see hottest restaurants, bars, lounges and clubs with reviews and ratings. Direct upload to IG Top 5 of every category (restaurant, bars, lounge, club, etc) (with icons)

Why should a Restaurant Use MENU?

Manage your restaurant from the distance. Restaurant gets:

1. POS system
2. reserve maximization
3. maximized efficiency
4. waiter metrix
5. customer feedback
6. quantification or what sells best
7. price breakdown
8. cost breakdown
9. analitics
10. comprehensive menu design platform
11. Option to close tap (or maintain open)
12. happy hours to increase costumers
13. Customers can get discounts by coming often (10% off, gift cards for loyalty, each restaurant decides how much they want to give)
14. Different types of billing (email recipe, etc)

What does the Customer Need?
1. Device with Android OR iOS
2. Download the MENU APP
3. Internet connection/mesh network/internal connection (can be restricted to only MENU What does the Restaurant Need?
1. Establishments need a wifi connection for the printers to connect to the intern system.
2. One printer in each station.
3. One centralized iPad or Tablet to collect the orders and send them to the printers.

Payment
  Customers can pay by:
  Credit card
  Paypal
  SEPA
  Cryptocurrency with Tauntine Customer is able to manipulate the tip.

Appearence: Menus
  Frame for the photos. Outline of a drink and food, upload the best pictures to the app. Restaurant can choose.
  Restaurant categories: Restaurants can give themselves one or several categories in order for them to be found in the network if User looks for something in particular.
  Possible buy not exclusive categories are:
  Vegan
  Paleo
  Gluten Free etc
  Restaurant can average out price by customer to show price class when listed.
  10-20
  20-30
  30-40
  40-50
  50-70
  70-100
  100-200
  PURCHASE Shop
  ARMC ANDY
  Happening
  Expositions
  Lounges
  Workshops
  Concerts
  Cafe
  Wifi
  Conferences Movies
  VEDI. io
  Yacht
  Jet Cars Bikes VIP
  Sightseeing
  360Box.io
  Golf
  Tennis
  Workout
  Sports
  Extreme II. Platform Configuration FIG. 1 is an illustration of a platform consistent with various embodiments of the present disclosure. By way of non-limiting example, the online platform 100 for facilitating social networking based on events may be hosted on a centralized server 110, such as, for example, a cloud computing service. The centralized server may communicate with other network entities, such as, for example, mobile devices (such as a tablet computer 102, a smartphone 104, a laptop 106 etc.) over a communication network 112, such as, but not limited to, the Internet. Additionally, the centralized server 110 may include a database configured for storing event related data. Alternatively, and/or additionally, the centralized server 110 may be configured to communicate with other network entities in order to retrieve event related data. Further, the database may be configured to store User related data, such as, personal characteristics of users, history of interactions with the online platform, event trails, User feedback on event trails, points associated with users, icebreakers, event attendance of users and so on.

A User 105, may access platform 100 through a software application. The software application may be embodied as, for example, but not be limited to, a website, a web application, a desktop application, and a mobile application compatible with a computing device 6500. One possible embodiment of the software application may be provided by ArmCandy™ products and services. Accordingly, in an instance, the User 105 may be presented with a plurality of events and a plurality of potential dates based on personal characteristics of the User 105. Further, the User 105 may be enable to select one or more events and one or more potential dates by providing one of an approval, a disapproval and a possibility. Based on the User 105's selection of dates and events, the online platform may prioritize/rank the selected events and/or the selected dates based on various criteria such as, for example, compatibility with respect to the User 105. The prioritized list of potential dates and/or the events may be presented to the User 105 for confirmation and/or subsequent selection.

As may be detailed with reference to FIG. 65 below, the computing device through which the online platform may be accessed may comprise, but not be limited to, for example, a desktop computer, laptop, a tablet, or mobile telecommunications device. As may be detailed with reference to FIG. 65 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

III. Platform Operation

Although methods 600-900 and 4300-5300 have been described to be performed by platform 100, it should be understood that computing device 6500 may be used to perform the various stages of methods 600-900 and 4300-5300. In other words, methods 600-900 and 4300-5300 may be computer implemented methods. Furthermore, in some embodiments, different operations may be performed by different networked elements in operative communication with computing device 6500. For example, server 110 may be employed in the performance of some or all of the stages in methods 600-900 and 4300-5300. Moreover, server 110 may be configured much like computing device 6500.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 600-900 and 4300-5300 may be described in greater detail below.

Figure 2:
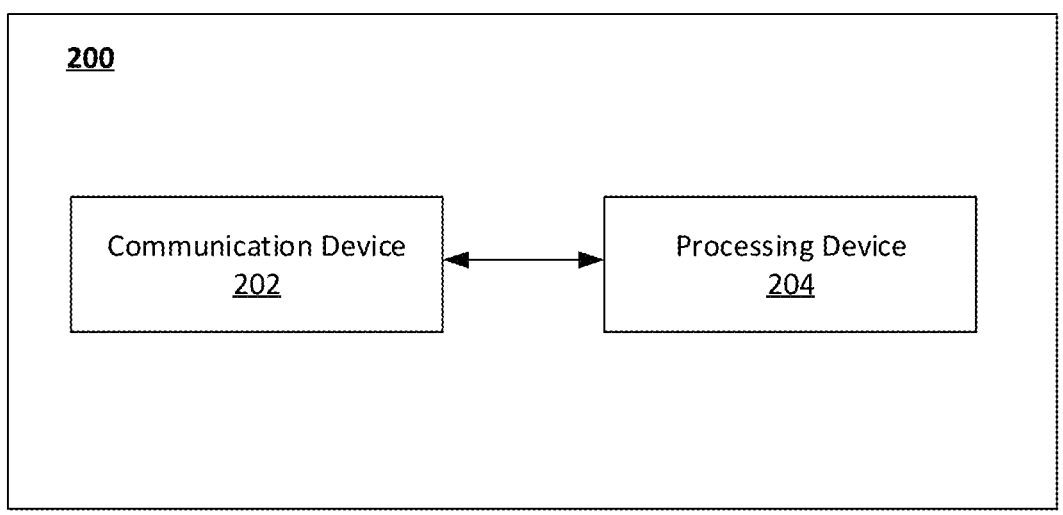
FIG. 2 is a block diagram of a system for facilitating provisioning of social networking data to a mobile device, in accordance with some embodiments.

FIG. 2 is a block diagram of a system 200 for facilitating provisioning of social networking data to a mobile device. Further, the social networking data may be related to a tour of a user of the mobile device. Further, the system 200 may include a communication device 202 configured for receiving at least one location information corresponding to the tour. Further, the communication device 202 may be configured for receiving at least one selection corresponding to a plurality of filtering icons corresponding to a filtered social networking data. Further, the communication device 202 may be configured for transmitting a travel plan to the mobile device. Further, the system 200 may include a processing device 204 configured for filtering social networking data based on the at least one location information to generate the filtered social networking data. Further, the social networking data may include a plurality of event indicia corresponding to a plurality of events, a plurality of venue indicia corresponding to a plurality of venues and a plurality of member indicia corresponding to a plurality of members of a social network associated with the user. Further, the processing device 204 may be configured for generating the travel plan based on the at least one selection.

Further, in some embodiments, the travel plan may include one or more events in the plurality of events, one or more venues in the plurality of venues and one or more members in the plurality of members of the social network associated with the user for each day of the tour.

Further, in some embodiments, the processing device 204 may be configured for booking the one or more events, booking the one or more venues and booking meetings with the one or members.

Further, in some embodiments, the processing device 204 may be configured for using a multi-currency wallet for making payments for booking the one or more events, booking the one or more venues and booking meetings with the one or members.

Further, in some embodiments the communication device 202 may be configured for receiving an indication of hiring a member in the one or members, transmitting a smart contract to the mobile device. Further, the processing device 204 may be configured for generating the smart contract based on the indication.

Further, in some embodiments, the tour may be related to at least one of a business tour and a business workshop.

Further, in some embodiments, the processing device 204 may be configured for performing the filtering social networking data based on a user preference. Further, the user preference may include at least one rating previously provided by the user in relation to at least one of the plurality of events, the plurality of venue indicia and the plurality of member indicia.

Further, in some embodiments, the communication device 202 may be configured for receiving an acceptance of a challenge from the mobile device. Further, the challenge may be related to the filtered social networking data.

Further, in some embodiments, the challenge may include attending at least one event.

Further, in some embodiments, the communication device 202 may be configured for receiving a game-plan. F may include indication of a selected event, a selected venue, at least one selected member. Further, the communication device 202 may be configured for transmitting at least one invitation associated with the game-plan to at least one user device associated with the at least one selected member.

Figure 3:
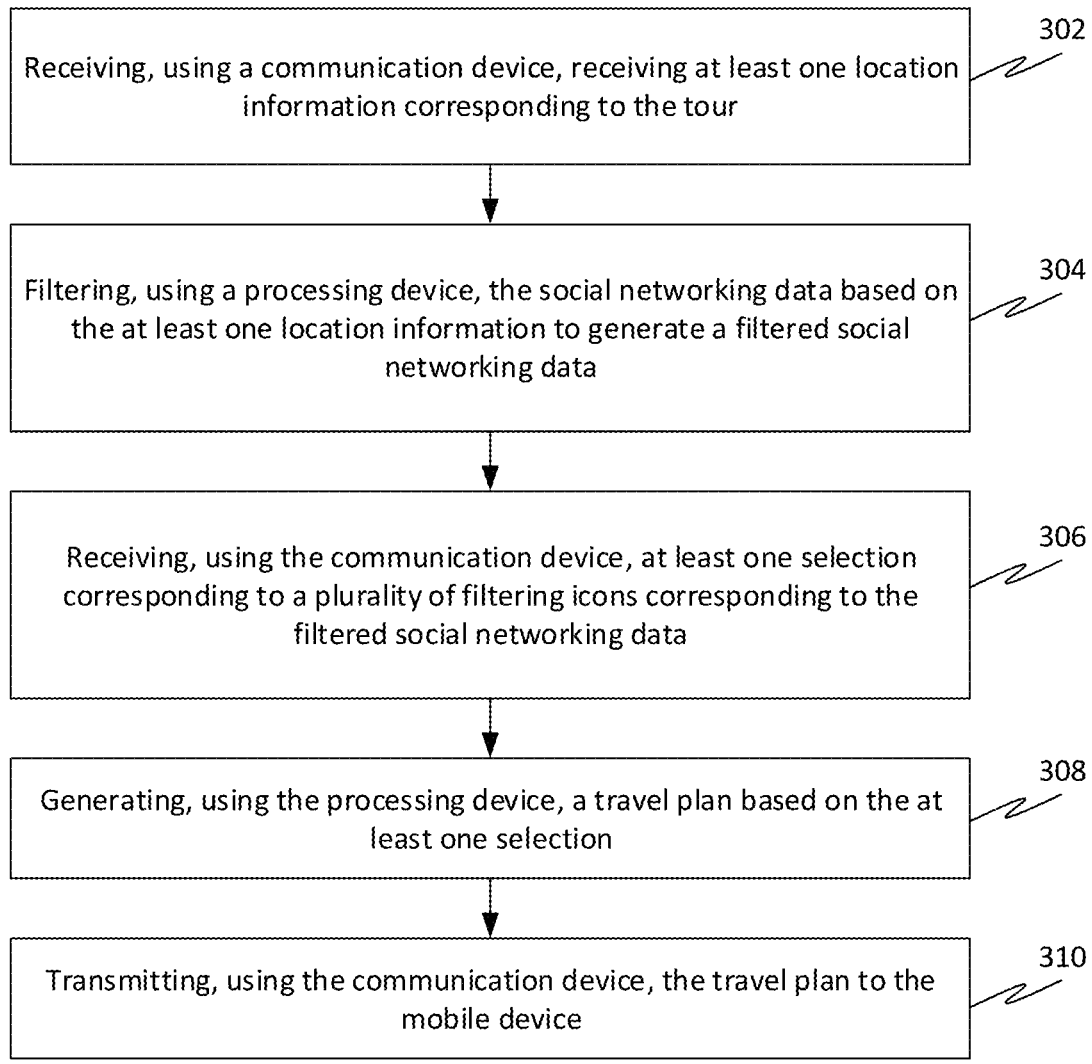
FIG. 3 is a flowchart of a method for facilitating provisioning of social networking data to a mobile device, in accordance with some embodiments.

FIG. 3 is a flowchart of a method 300 for facilitating provisioning of social networking data to a mobile device. Further, the social networking data may be related to a tour of a user of the mobile device. Further, at 302, the method 300 may include receiving, using a communication device, such as the communication device 202, at least one location information corresponding to the tour.

Further, at 304, the method 300 may include filtering, using a processing device, such as the processing device 204, the social networking data based on the at least one location information to generate a filtered social networking data. Further, the social networking data may include a plurality of event indicia corresponding to a plurality of events, a plurality of venue indicia corresponding to a plurality of venues, and a plurality of member indicia corresponding to a plurality of members of a social network associated with the user.

Further, at 306, the method 300 may include receiving, using the communication device, at least one selection corresponding to a plurality of filtering icons corresponding to the filtered social networking data.

Further, at 308, the method 300 may include generating, using the processing device, a travel plan based on the at least one selection.

Further, at 310, the method 300 may include transmitting, using the communication device, the travel plan to the mobile device.

Further, in some embodiments, the travel plan may include one or more events in the plurality of events, one or more venues in the plurality of venues and one or more members in the plurality of members of the social network associated with the user for each day of the tour.

Further in some embodiments, the method 300 may include booking, using the processing device, the one or more events, booking the one or more venues and booking meetings with the one or members.

Further, in some embodiments, the method 300 may include making payments, using the processing device, using a multi-currency wallet. for booking the one or more events, booking the one or more venues, and booking meetings with the one or members.

Further, in some embodiments, the tour may be related to at least one of a business tour and a business workshop.

Further, in some embodiments, the method 300 may include, filtering, using the processing device, the social networking data based on a user preference. Further, the user preference may include at least one rating previously provided by the user in relation to at least one of the plurality of events, the plurality of venue indicia and the plurality of member indicia.

Further, in some embodiments, the method 300 may include receiving, using the communication device, an acceptance of a challenge from the mobile device. Further, the challenge may be related to the filtered social networking data.

Further, in some embodiments, the challenge may include attending at least one event.

Figure 4:
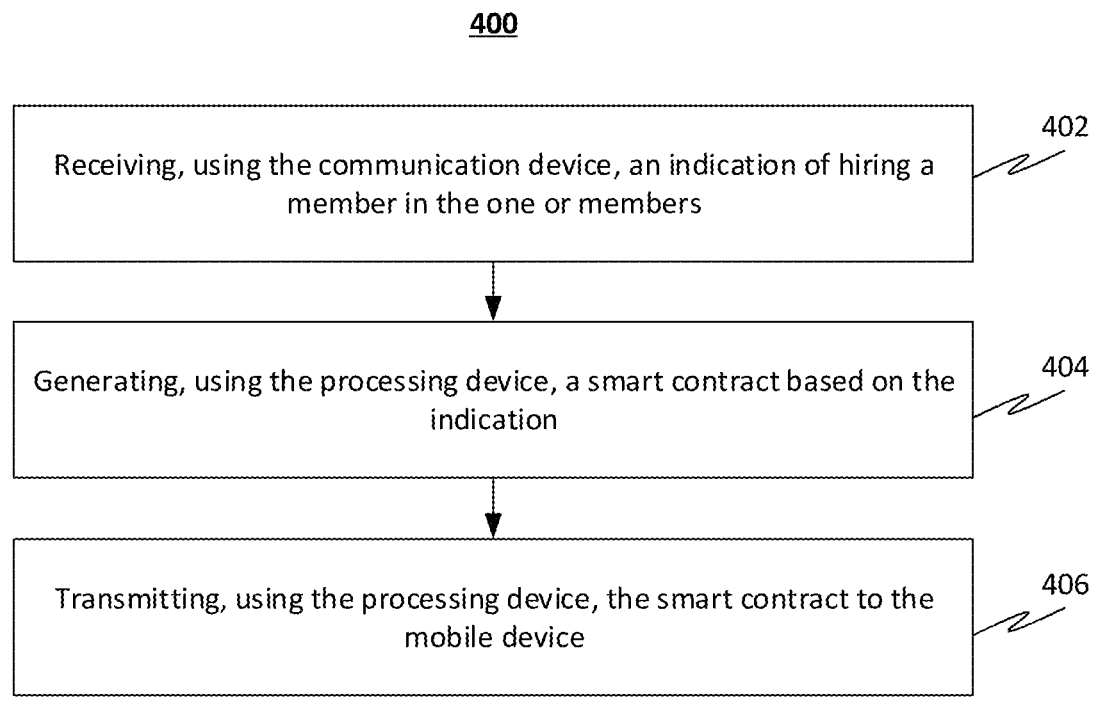
FIG. 4 is a flowchart of a method of generating a smart contract based on an indication of hiring a member, in accordance with some embodiments.

FIG. 4 is a flowchart of a method 400 of generating a smart contract based on an indication of hiring a member, in accordance with some embodiments.

Further, at 402, the method 400 may include receiving, using the communication device, an indication of hiring a member in the one or members.

Further, at 404, the method 400 may include generating, using the processing device, a smart contract based on the indication.

Further, at 406, the method 400 may include transmitting, using the processing device, the smart contract to the mobile device.

FIG. 5 is a flowchart of a method 500 of generating a transmitting an invitation associated with a game plane, in accordance with some embodiments.

Further, at 502, the method 500 may include receiving, using the communication device, a game-plan may include indication of a selected event, a selected venue, at least one selected member.

Further, at 504, the method 500 may include transmitting, using the communication device, at least one invitation associated with the game-plan to at least one user device associated with the at least one selected member.

Figure 6:
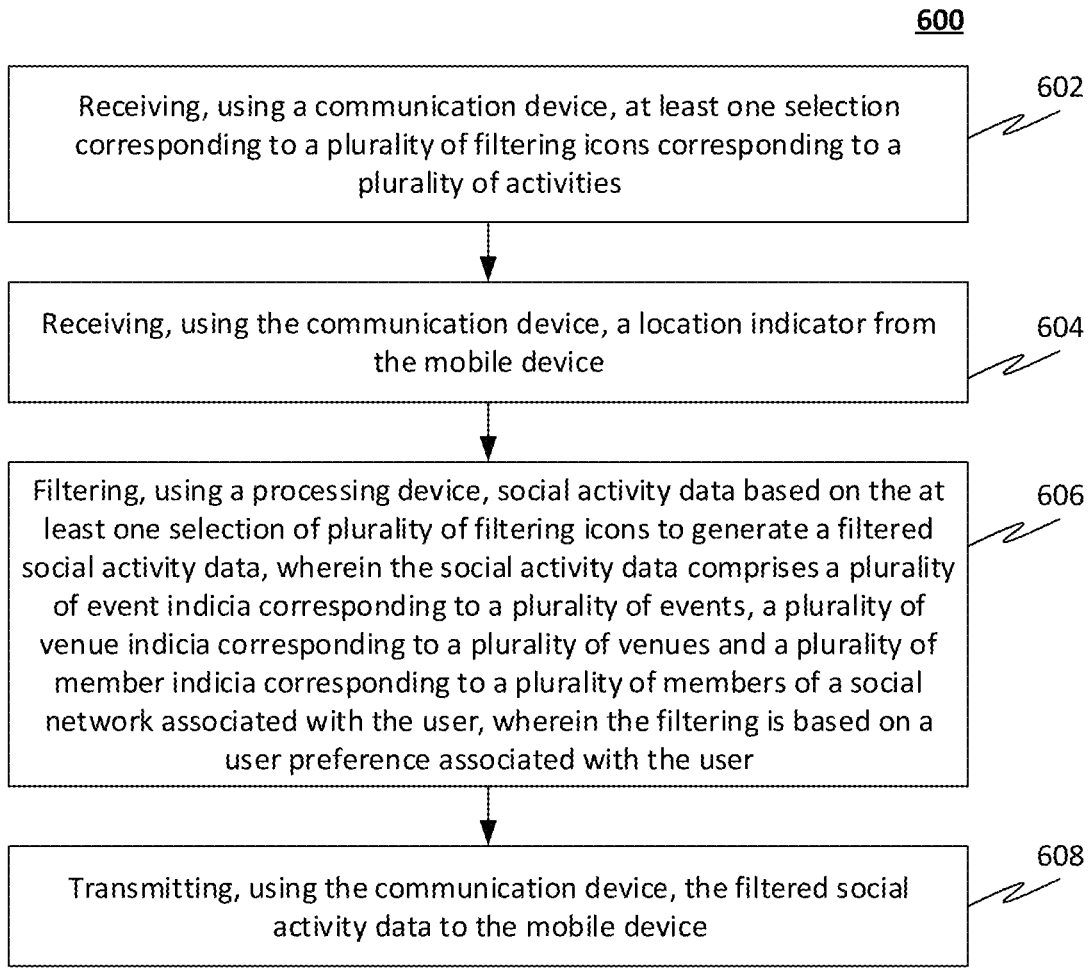
FIG. 6 illustrates a flowchart of a method of facilitating provisioning of social activity data to a mobile device based on user preferences, in accordance with some embodiments.

FIG. 6 illustrates a flowchart of a method 600 of facilitating provisioning of social activity data to a mobile device based on user preferences, in accordance with some embodiments. In some embodiments, the user preferences may include at least one rating previously provided by the user in relation to one or more of the plurality of events, the plurality of venue indicia and the plurality of member indicia. In further embodiments, the at least one rating may include a user-specified threshold rating.

The method 600 may include a stage 602 of receiving, using a communication device, at least one selection corresponding to a plurality of filtering icons corresponding to a plurality of activities.

Further, the method 600 may include a stage 604 of receiving, using the communication device, a location indicator from the mobile device. In some embodiments, the location indicator corresponds to at least one a current location of the mobile device and a location selection provided by the user.

Further, the method 600 may include a stage 606 of filtering, using a processing device, social activity data based on the at least one selection of plurality of filtering icons to generate a filtered social activity data. Further, the social activity data may include a plurality of event indicia corresponding to a plurality of events, a plurality of venue indicia corresponding to a plurality of venues and a plurality of member indicia corresponding to a plurality of members of a social network associated with the user. Further, the filtering may be based on a user preference associated with the user.

In some embodiments, the location indicator may include an origin location and a radius characterizing a geographical region comprising the location. Further, the filtering may be further based on the geographical region.

In some embodiments, the filtered social activity data further may include a plurality of member locations associated with the plurality of members. Further, the plurality of member locations corresponds to locations of a plurality of mobile devices associated with the plurality of members.

Further, the method 600 may include a stage 608 of transmitting, using the communication device, the filtered social activity data to the mobile device.

In some embodiments, the computer implemented method may further include determining, using the processing device, at least one arrival time associated with at least one member of the plurality of members based on at least one transportation mode and traffic condition associated with the at least one member. Further, the at least one arrival time corresponds to an event being attended by the user and the at least one member.

Figure 7:
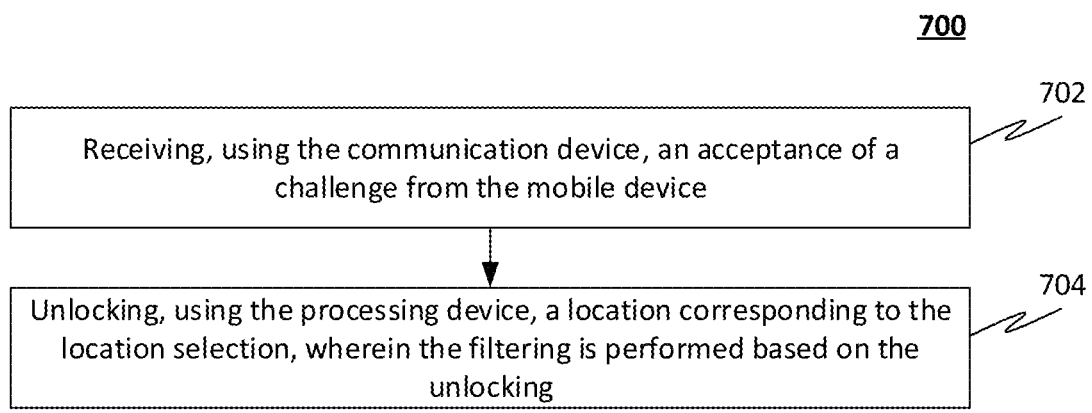
FIG. 7 illustrates a flowchart of a method of unlocking locations for facilitating provisioning of the social activity data to the mobile device based on the user preferences, in accordance with some embodiments.

FIG. 7 illustrates a flowchart of a method 700 of unlocking locations for facilitating provisioning of the social activity data to the mobile device based on the user preferences, in accordance with some embodiments. The method 700 may include a stage 702 of receiving, using the communication device, an acceptance of a challenge from the mobile device. In some embodiments, the challenge may include attending at least one event.

Further, the method 700 may include a stage 704 unlocking, using the processing device, a location corresponding to the location selection. Further, the filtering may be performed based on the unlocking.

Figure 8:
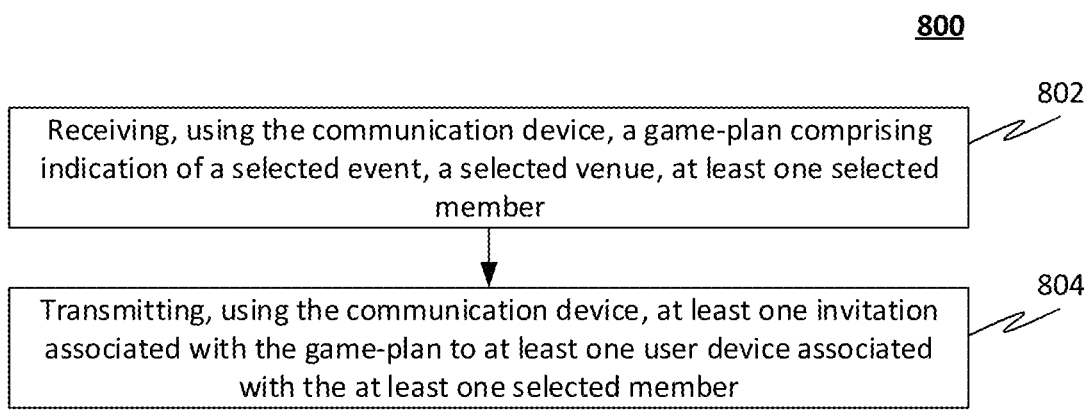
FIG. 8 illustrates a flowchart of a method of sending invitations for facilitating provisioning of the social activity data to the mobile device based on the user preferences, in accordance with some embodiments.

FIG. 8 illustrates a flowchart of a method 800 of sending invitations for facilitating provisioning of the social activity data to the mobile device based on the user preferences, in accordance with some embodiments. The method 800 may include a stage 802 of receiving, using the communication device, a game-plan including indication of a selected event, a selected venue, at least one selected member.

Further, the method 800 may include a stage 804 of transmitting, using the communication device, at least one invitation associated with the game-plan to at least one user device associated with the at least one selected member.

Figure 9:
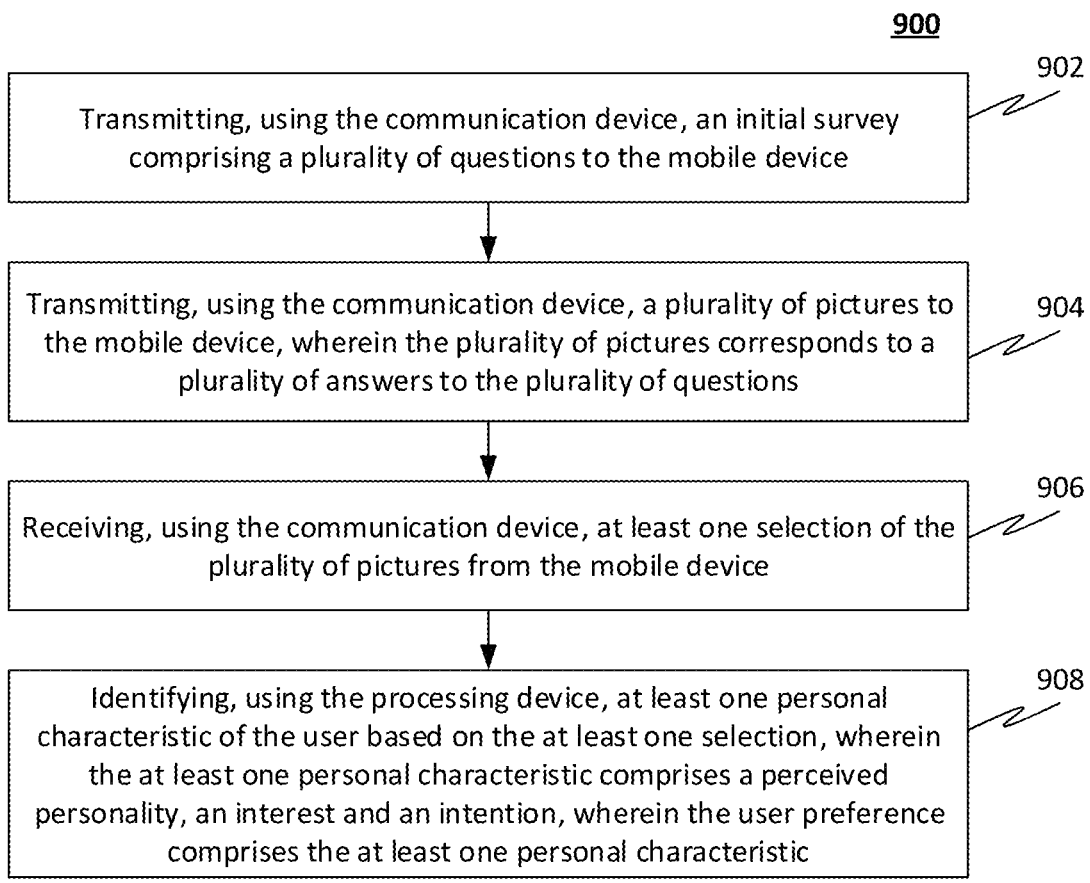
FIG. 9 illustrates a flowchart of a method of obtaining the user preferences for facilitating provisioning of the social activity data to the mobile device based on the user preferences, in accordance with some embodiments.

FIG. 9 illustrates a flowchart of a method 900 of obtaining the user preferences for facilitating provisioning of the social activity data to the mobile device based on the user preferences, in accordance with some embodiments. The method 900 may include a stage 902 of transmitting, using the communication device, an initial survey including a plurality of questions to the mobile device.

Further, the method 900 may include a stage 904 of transmitting, using the communication device, a plurality of pictures to the mobile device. Further, the plurality of pictures corresponds to a plurality of answers to the plurality of questions.

Yet further, the method 900 may include a stage 906 of receiving, using the communication device, at least one selection of the plurality of pictures from the mobile device.

Moreover, the method 900 may include a stage 908 of identifying, using the processing device, at least one personal characteristic of the user based on the at least one selection. Further, the at least one personal characteristic may include a perceived personality, an interest and an intention. Further, the user preference may include the at least one personal characteristic.

In some embodiments, a system for facilitating provisioning of social activity data to a mobile device based on user preferences is also disclosed. The system may include a communication device configured for receiving at least one selection corresponding to a plurality of filtering icons corresponding to a plurality of activities. Further, the communication device may be configured for receiving a location indicator from the mobile device. Further, the communication device may be configured for transmitting a filtered social activity data to the mobile device. Further, the system may include a processing device configured for filtering social activity data based on the at least one selection of plurality of filtering icons to generate the filtered social activity data. Further, the social activity data may include a plurality of event indicia corresponding to a plurality of events, a plurality of venue indicia corresponding to a plurality of venues and a plurality of member indicia corresponding to a plurality of members of a social network associated with the user. Further, the filtering may be based on a user preference associated with the user.

In some embodiments, the filtered social activity data further may include a plurality of member locations associated with the plurality of members. Further, the plurality of member locations corresponds to locations of a plurality of mobile devices associated with the plurality of members.

In some embodiments, the processing device may be further configured for determining at least one arrival time associated with at least one member of the plurality of members based on at least one transportation mode and traffic condition associated with the at least one member. Further, the at least one arrival time corresponds to an event being attended by the user and the at least one member.

In some embodiments, the user preference may include at least one rating previously provided by the user in relation to one or more of the plurality of events, the plurality of venue indicia and the plurality of member indicia.

In some embodiments, the at least one rating may include a user-specified threshold rating.

In some embodiments, the location indicator corresponds to at least one a current location of the mobile device and a location selection provided by the user.

In some embodiments, the communication device may be further configured for receiving an acceptance of a challenge from the mobile device. Further, the processing device may be configured for unlocking a location corresponding to the location selection. Further, the filtering may be performed based on the unlocking.

In some embodiments, the challenge may include attending at least one event.

In some embodiments, the communication device may be further configured for receiving a game-plan including indication of a selected event, a selected venue, at least one selected member. Further, the communication device may be configured for transmitting at least one invitation associated with the game-plan to at least one user device associated with the at least one selected member.

In some embodiments, the communication device may be further configured for transmitting an initial survey including a plurality of questions to the mobile device. Further, the communication device may be configured for transmitting a plurality of pictures to the mobile device. Further, the plurality of pictures corresponds to a plurality of answers to the plurality of questions. Further, the communication device may be configured for receiving at least one selection of the plurality of pictures from the mobile device. Further, the processing device may be further configured for identifying at least one personal characteristic of the user based on the at least one selection. Further, the at least one personal characteristic may include a perceived personality, an interest and an intention. Further, the user preference may include the at least one personal characteristic.

Figure 10:
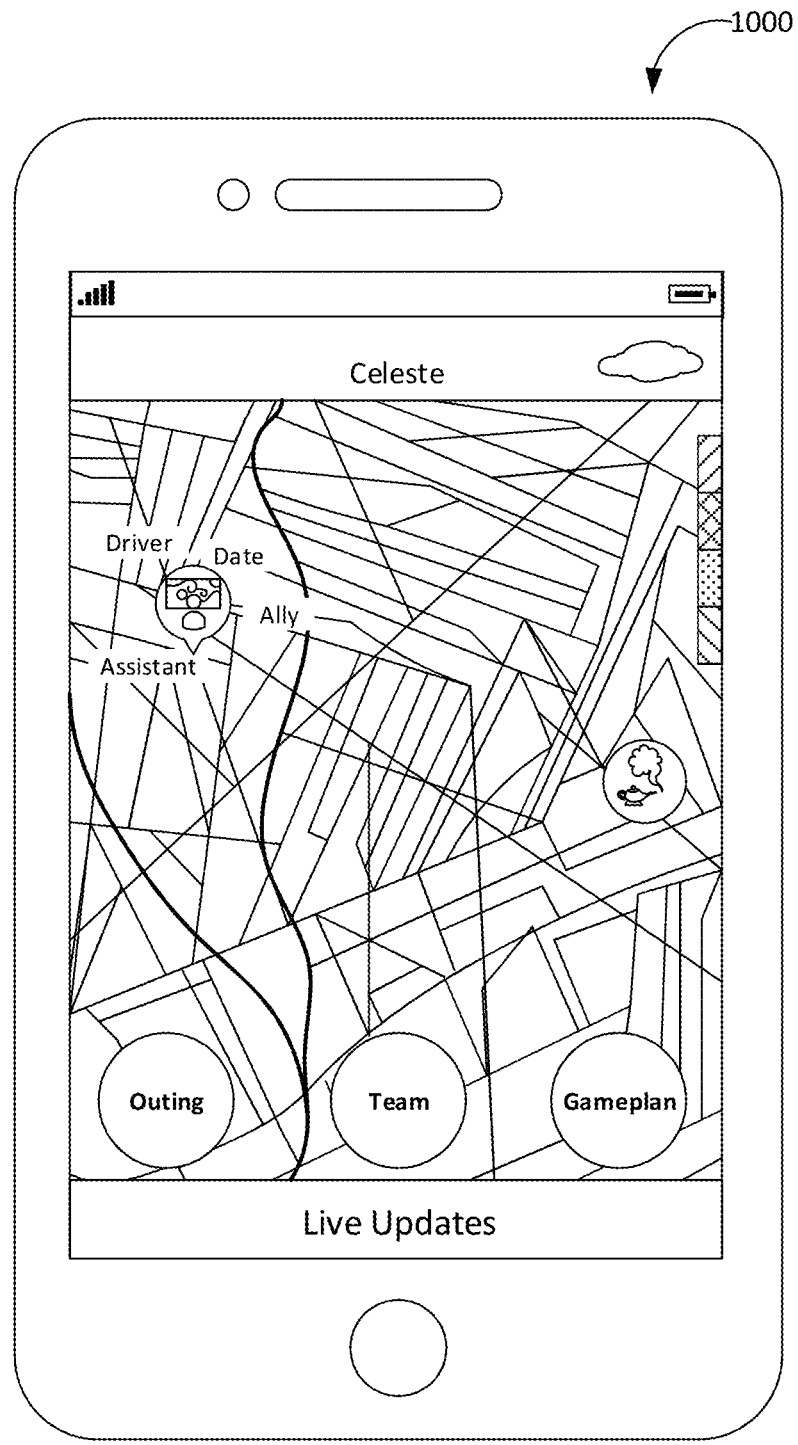
FIG. 10 illustrates a screenshot of a User interface for facilitating provisioning of social activity data to a mobile device based on user preferences depicting a current location of a user on a map, outings option, team option and gameplan option, in accordance with some embodiments.

FIG. 10 illustrates a screenshot 1000 of a User interface for facilitating provisioning of social activity data to a mobile device based on user preferences depicting a current location of a user on a map, outings option, team option and gameplan option, in accordance with some embodiments.

Figure 11:
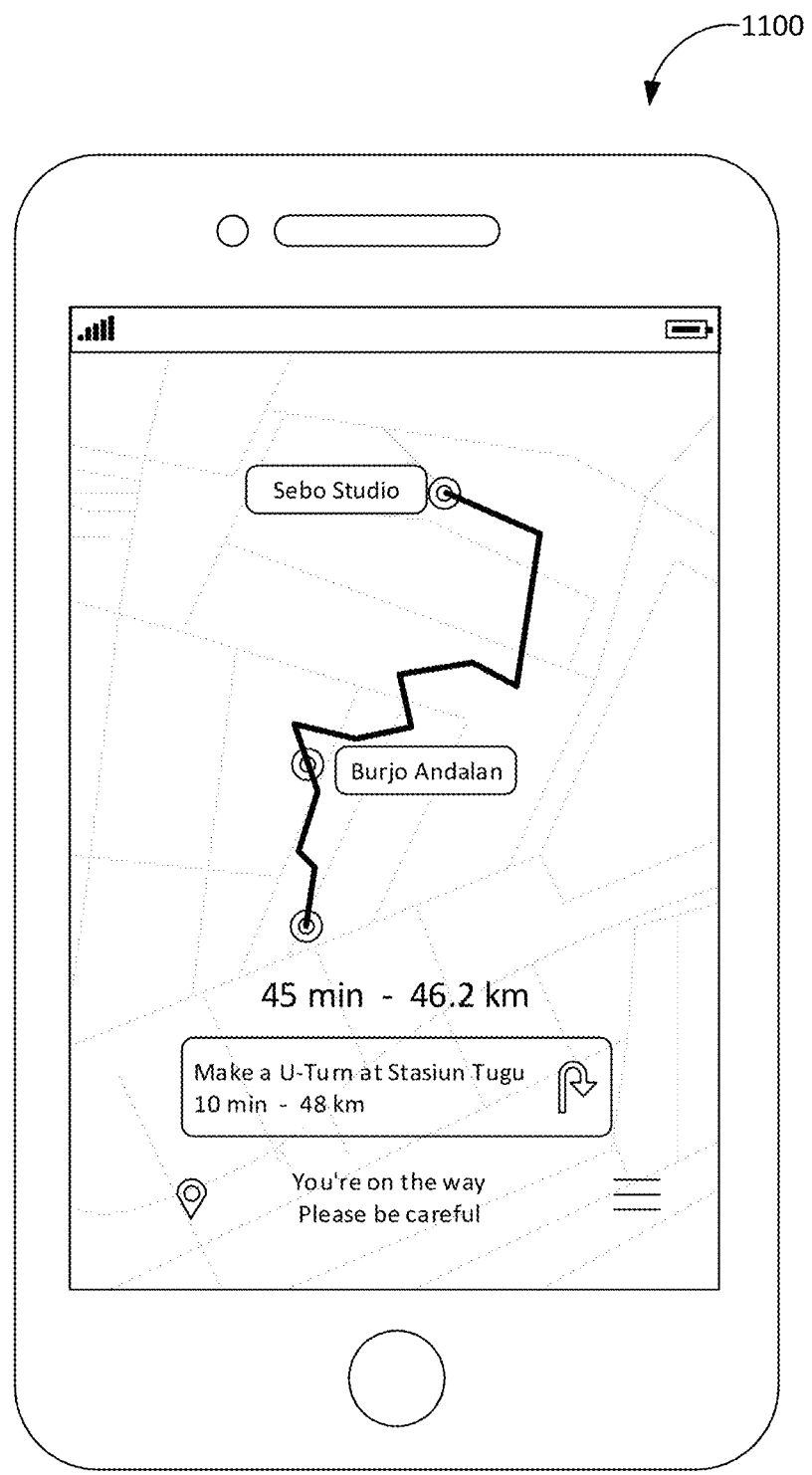
FIG. 11 illustrates a screenshot of a User interface for facilitating provisioning of social activity data to a mobile device based on user preferences that allows user to find network, find venues, find events and navigate to selected venues/events, in accordance with some embodiments.

FIG. 11 illustrates a screenshot 1100 of a User interface for facilitating provisioning of social activity data to a mobile device based on user preferences that allows user to find network, find venues, find events and navigate to selected venues/events, in accordance with some embodiments.

Figure 12:
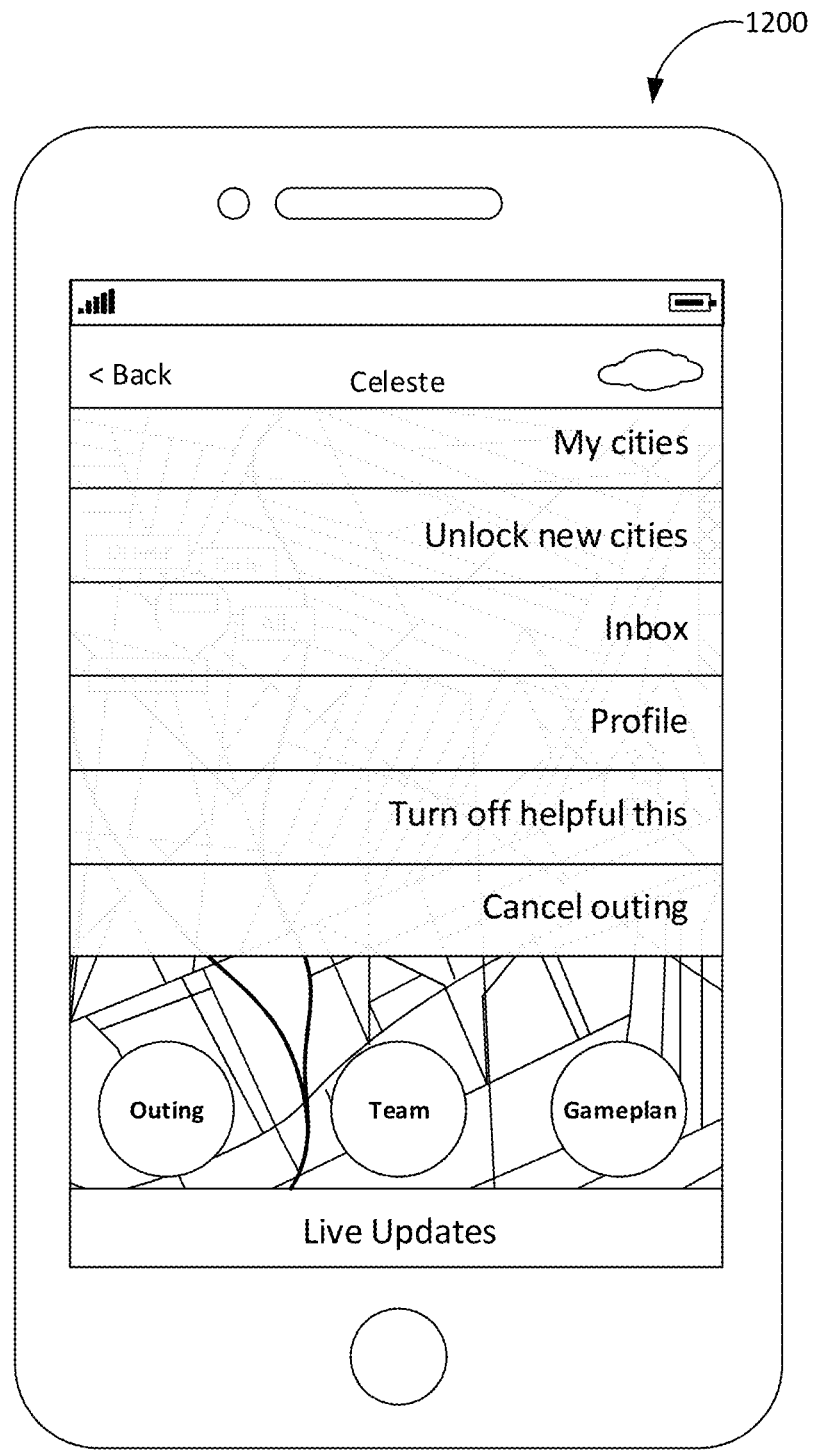
FIG. 12 illustrates a screenshot of a User interface for facilitating provisioning of social activity data to a mobile device based on user preferences that allows a user to see cities, unlock new cities, check inbox, check profile, access helpful hints, turn helpful hints on/off and cancel outings, in accordance with some embodiments.

FIG. 12 illustrates a screenshot 1200 of a User interface for facilitating provisioning of social activity data to a mobile device based on user preferences that allows a user to see cities, unlock new cities, check inbox, check profile, access helpful hints, turn helpful hints on/off and cancel outings, in accordance with some embodiments.

Figure 13:
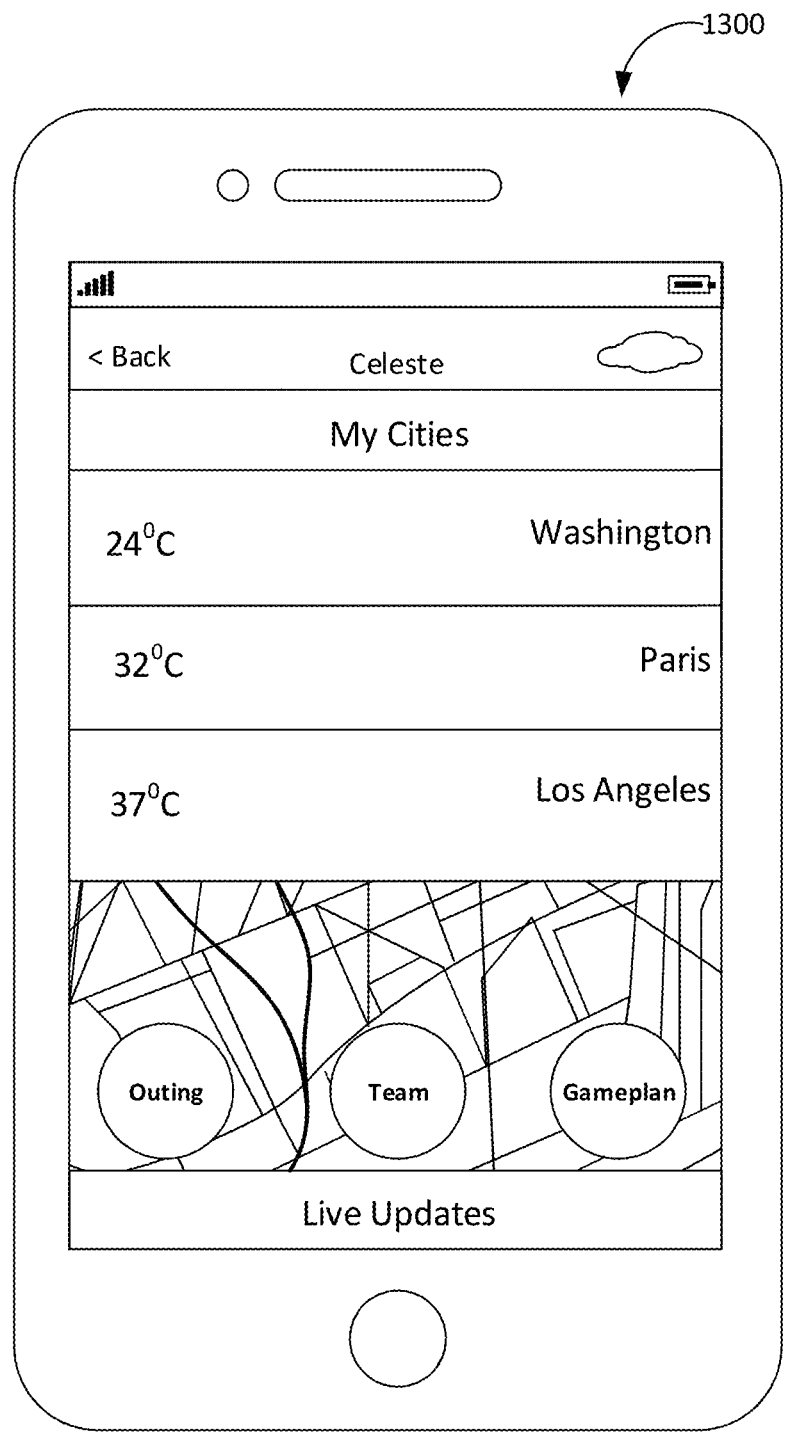
FIG. 13 illustrates a screenshot of a User interface for facilitating provisioning of social activity data to a mobile device based on user preferences that allows a user to see home city, see unlocked cities, rate stay in foreign city and save visit to other city in calendar, in accordance with some embodiments.

FIG. 13 illustrates a screenshot 1300 of a User interface for facilitating provisioning of social activity data to a mobile device based on user preferences that allows a user to see home city, see unlocked cities, rate stay in foreign city and save visit to other city in calendar, in accordance with some embodiments.

Figure 14:
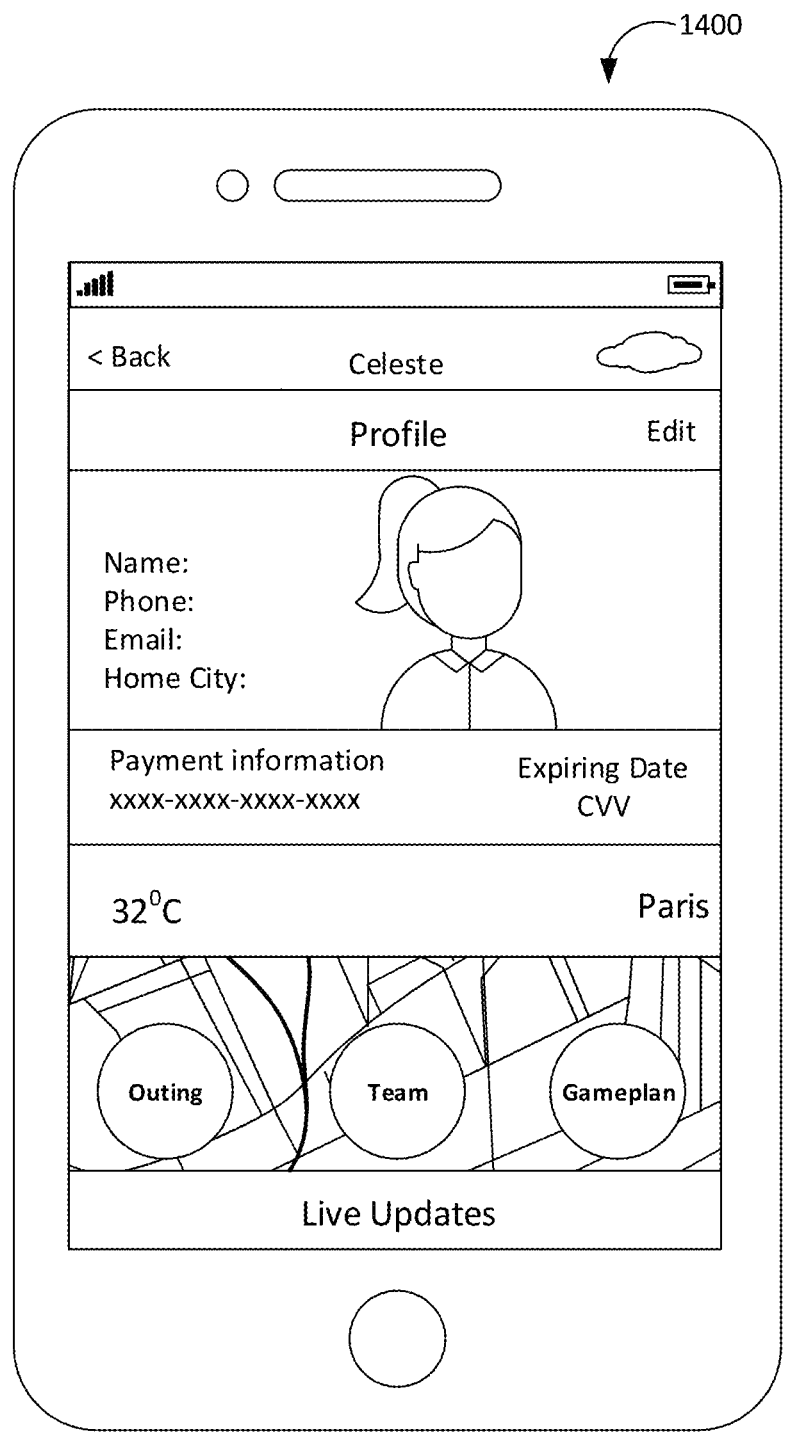
FIG. 14 illustrates a screenshot of a User interface for facilitating provisioning of social activity data to a mobile device based on user preferences that allows a user to see own profile, see information, change payment and change city, in accordance with some embodiments.

FIG. 14 illustrates a screenshot 1400 of a User interface for facilitating provisioning of social activity data to a mobile device based on user preferences that allows a user to see own profile, see information, change payment and change city, in accordance with some embodiments.

Figure 15:
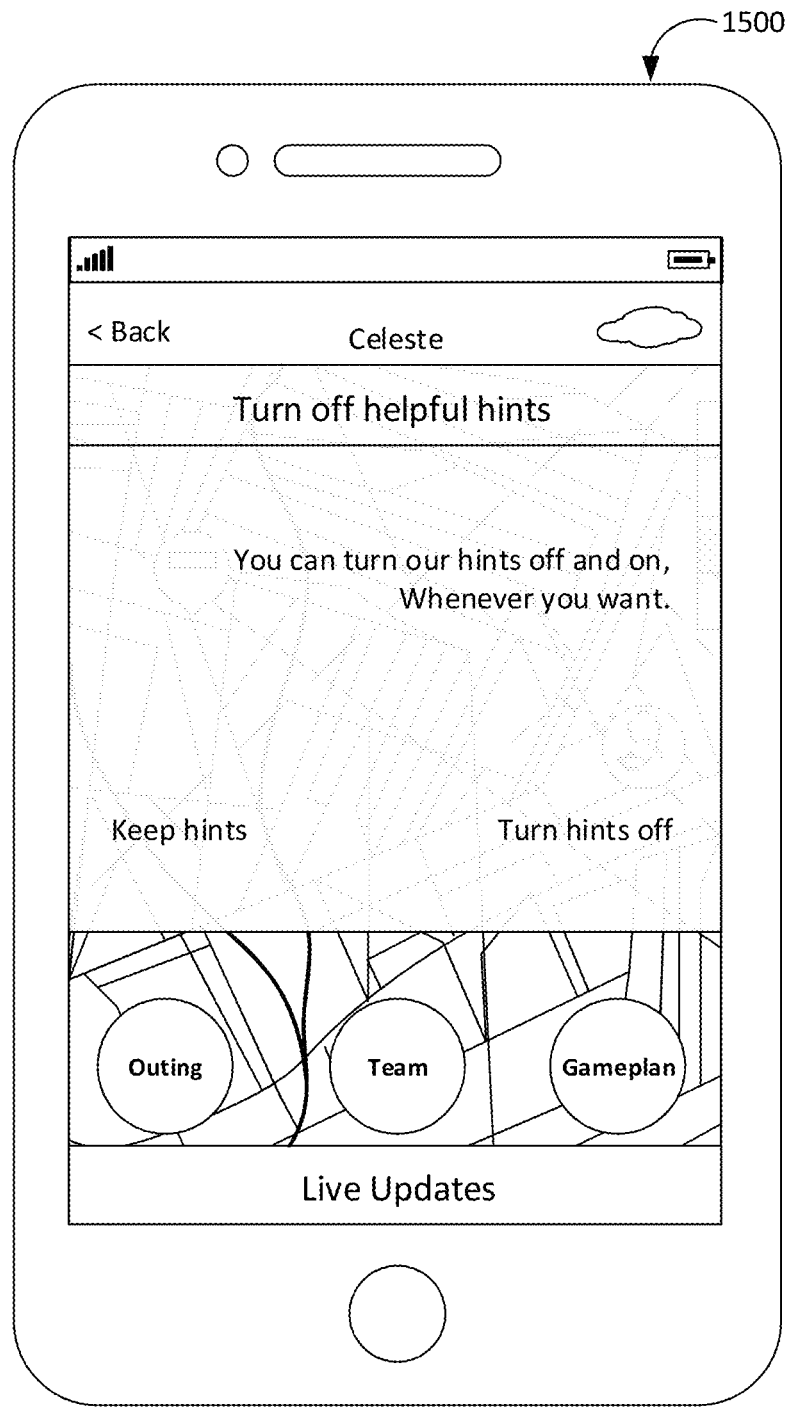
FIG. 15 illustrates a screenshot of a User interface for facilitating provisioning of social activity data to a mobile device based on user preferences that allows a user to turn off helpful hints and turn on helpful hints, in accordance with some embodiments.

FIG. 15 illustrates a screenshot 1500 of a User interface for facilitating provisioning of social activity data to a mobile device based on user preferences that allows a user to turn off helpful hints and turn on helpful hints, in accordance with some embodiments.

FIG. 16 illustrates a screenshot 1600 of a User interface for facilitating provisioning of social activity data to a mobile device based on user preferences that allows a user to cancel outings and change date or time, in accordance with some embodiments.

Figure 17:
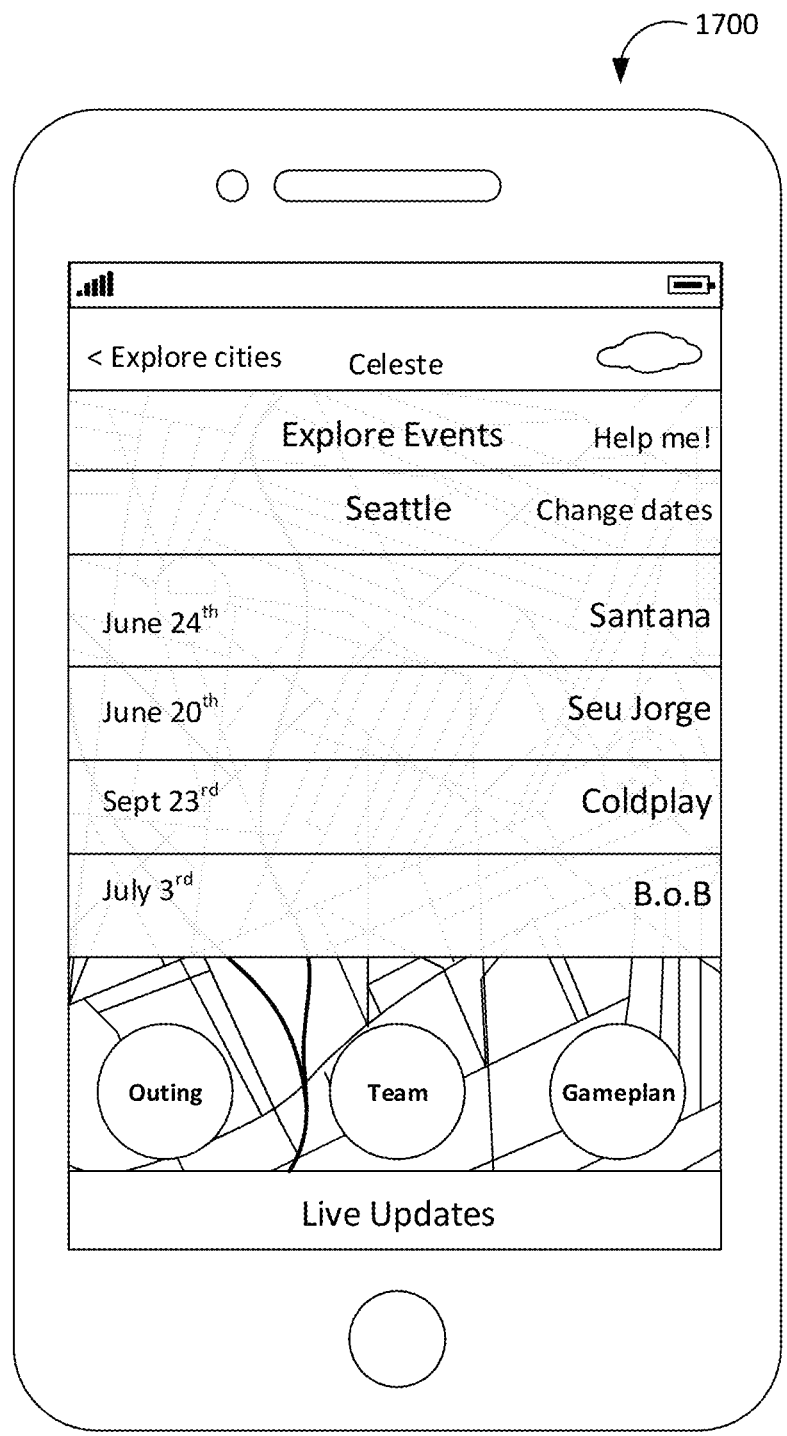
FIG. 17 illustrates a screenshot of a User interface for facilitating provisioning of social activity data to a mobile device based on user preferences that allows a user to explore events, attend events, rate events and save event in calendar, in accordance with some embodiments.

FIG. 17 illustrates a screenshot 1700 of a User interface for facilitating provisioning of social activity data to a mobile device based on user preferences that allows a user to explore events, attend events, rate events and save event in calendar, in accordance with some embodiments.

Figure 18:
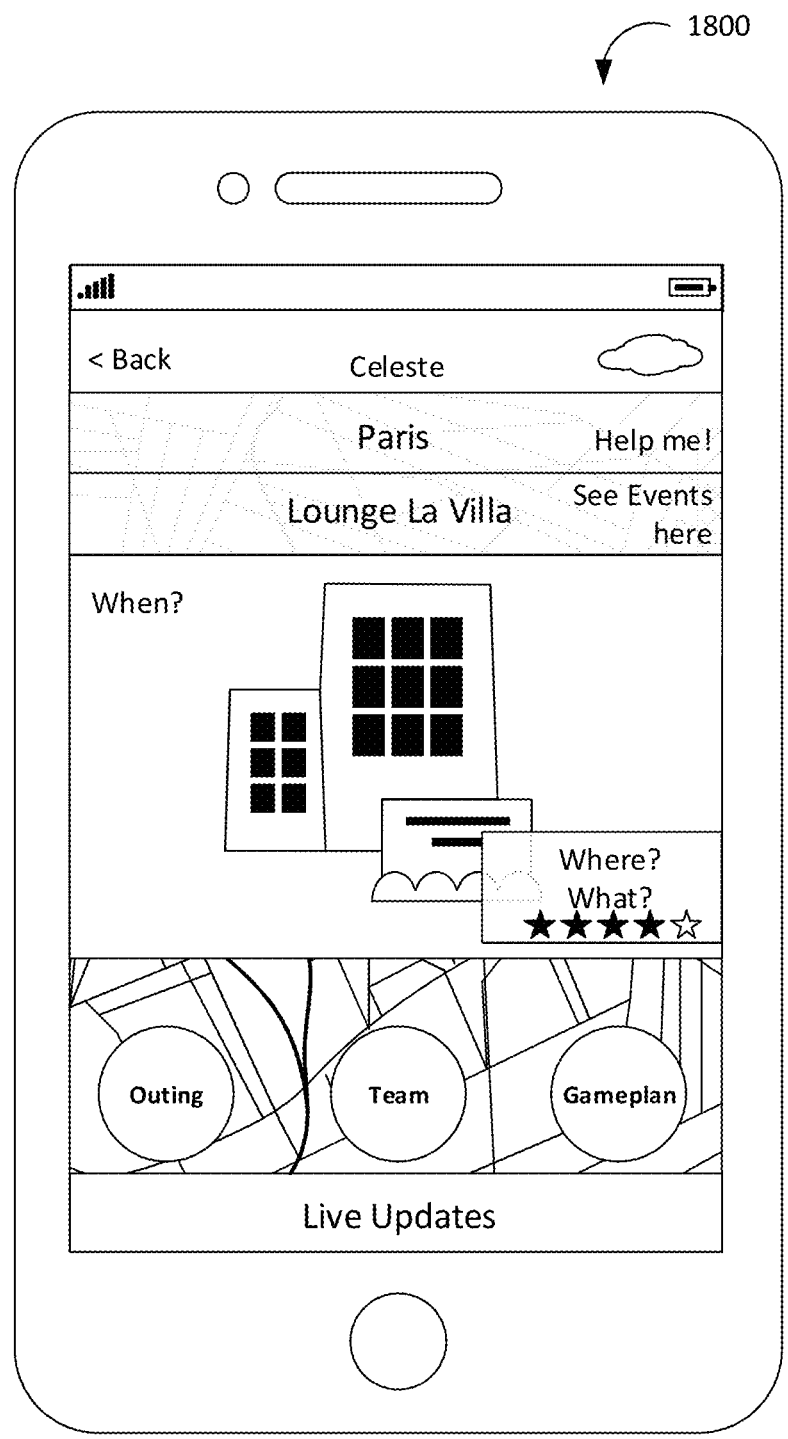
FIG. 18 illustrates a screenshot of a User interface for facilitating provisioning of social activity data to a mobile device based on user preferences that allows a user to see venues, see events associated and rate venues, in accordance with some embodiments.

FIG. 18 illustrates a screenshot 1800 of a User interface for facilitating provisioning of social activity data to a mobile device based on user preferences that allows a user to see venues, see events associated and rate venues, in accordance with some embodiments.

Figure 19:
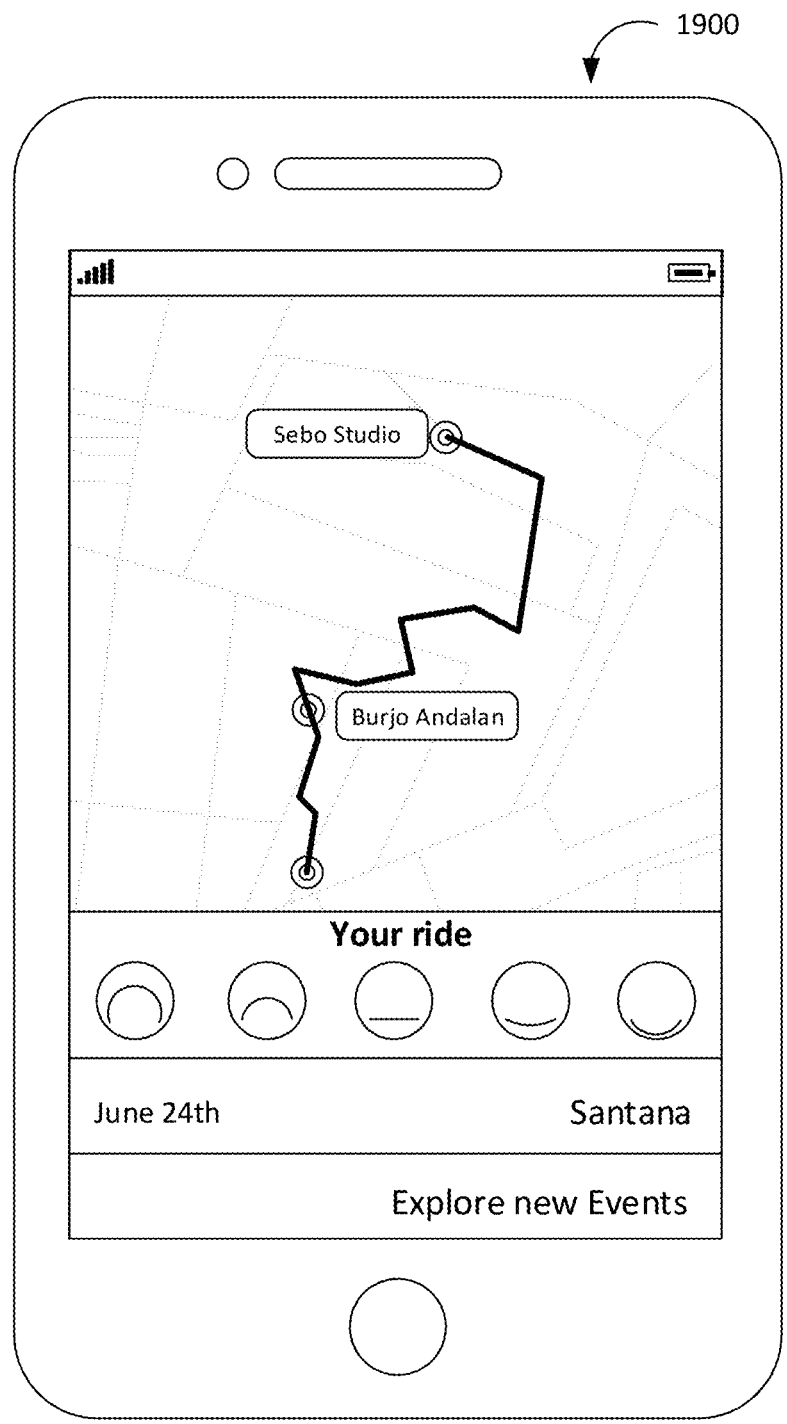
FIG. 19 illustrates a screenshot of a User interface for facilitating provisioning of social activity data to a mobile device based on user preferences that allows a user to see attending events and discard events, in accordance with some embodiments.

FIG. 19 illustrates a screenshot 1900 of a User interface for facilitating provisioning of social activity data to a mobile device based on user preferences that allows a user to see attending events and discard events, in accordance with some embodiments.

Figure 20:
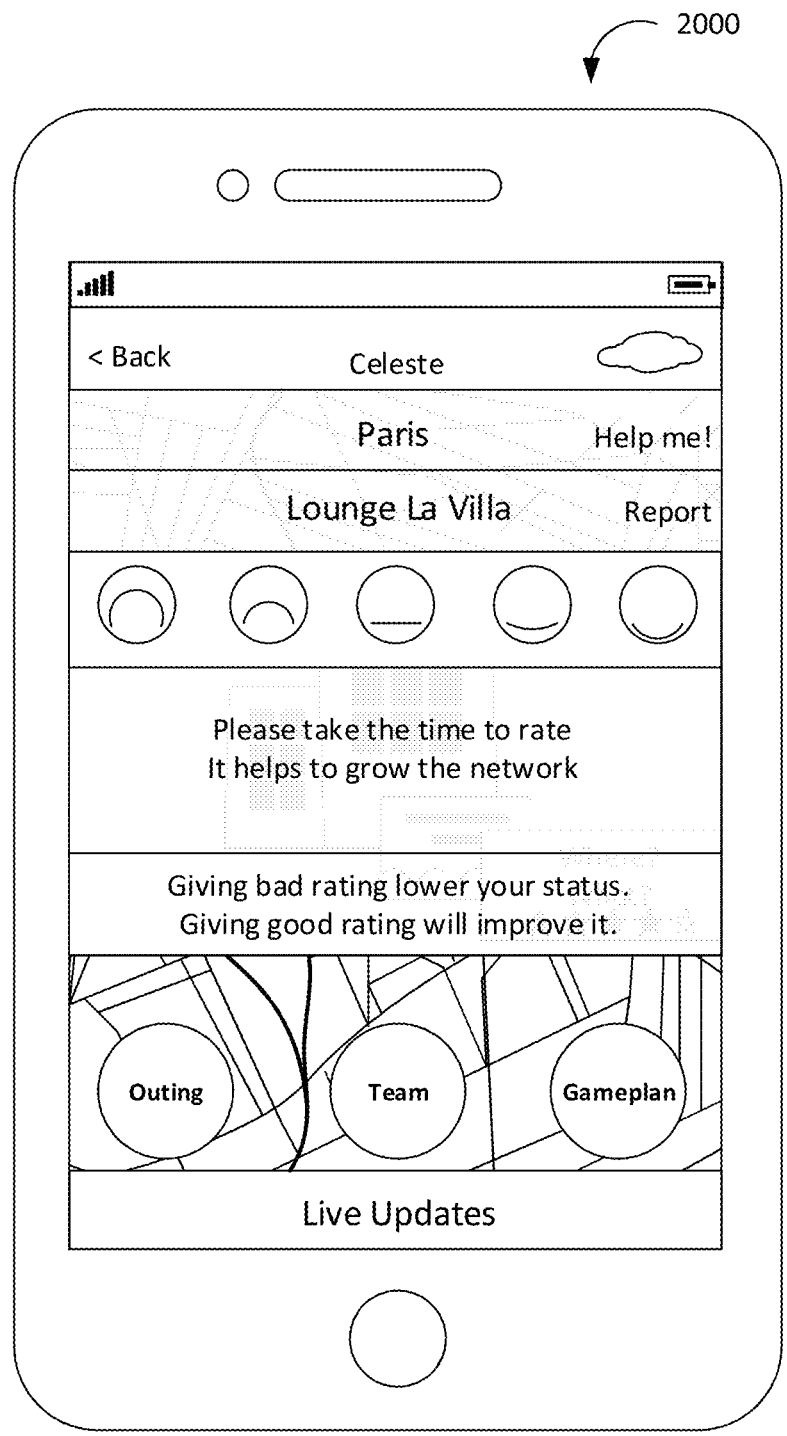
FIG. 20 illustrates a screenshot of a User interface for facilitating provisioning of social activity data to a mobile device based on user preferences that allows a user to rate venues, rate events, rate dates, rate network and rate staff, in accordance with some embodiments.

FIG. 20 illustrates a screenshot 2000 of a User interface for facilitating provisioning of social activity data to a mobile device based on user preferences that allows a user to rate venues, rate events, rate dates, rate network and rate staff, in accordance with some embodiments.

Figure 21:
FIG. 21 illustrates a screenshot of a User interface for facilitating provisioning of social activity data to a mobile device based on user preferences that allows a user to filter events, filter venues and filter X-Clubs, in accordance with some embodiments.

FIG. 21 illustrates a screenshot 2100 of a User interface for facilitating provisioning of social activity data to a mobile device based on user preferences that allows a user to filter events, filter venues and filter X-Clubs, in accordance with some embodiments.

Figure 22:
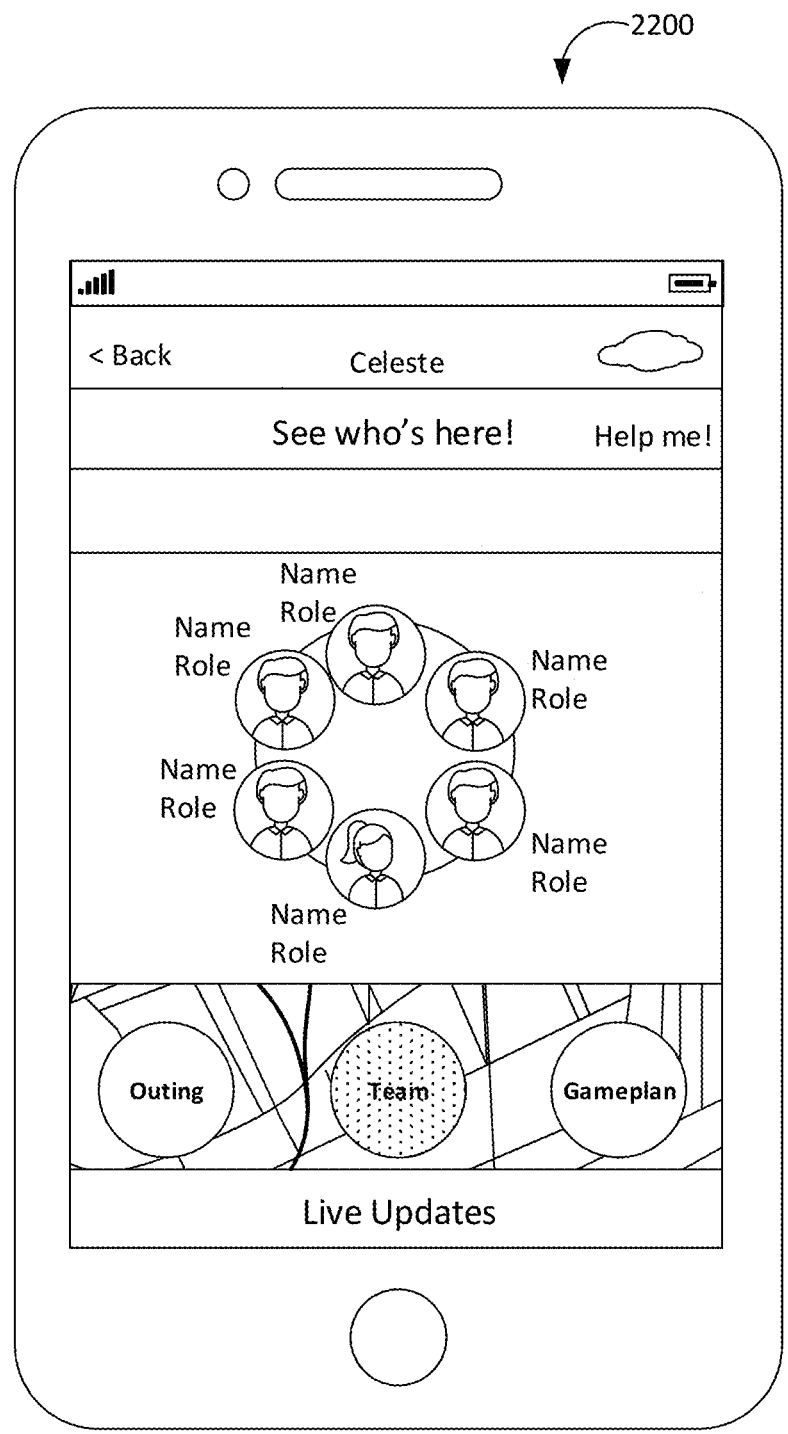
FIG. 22 illustrates a screenshot of a User interface for facilitating provisioning of social activity data to a mobile device based on user preferences that allows a user to see who works for user, see users network, see who's in town, in accordance with some embodiments.

FIG. 22 illustrates a screenshot 2200 of a User interface for facilitating provisioning of social activity data to a mobile device based on user preferences that allows a user to see who works for user, see users network, see who's in town, in accordance with some embodiments.

Figure 23:
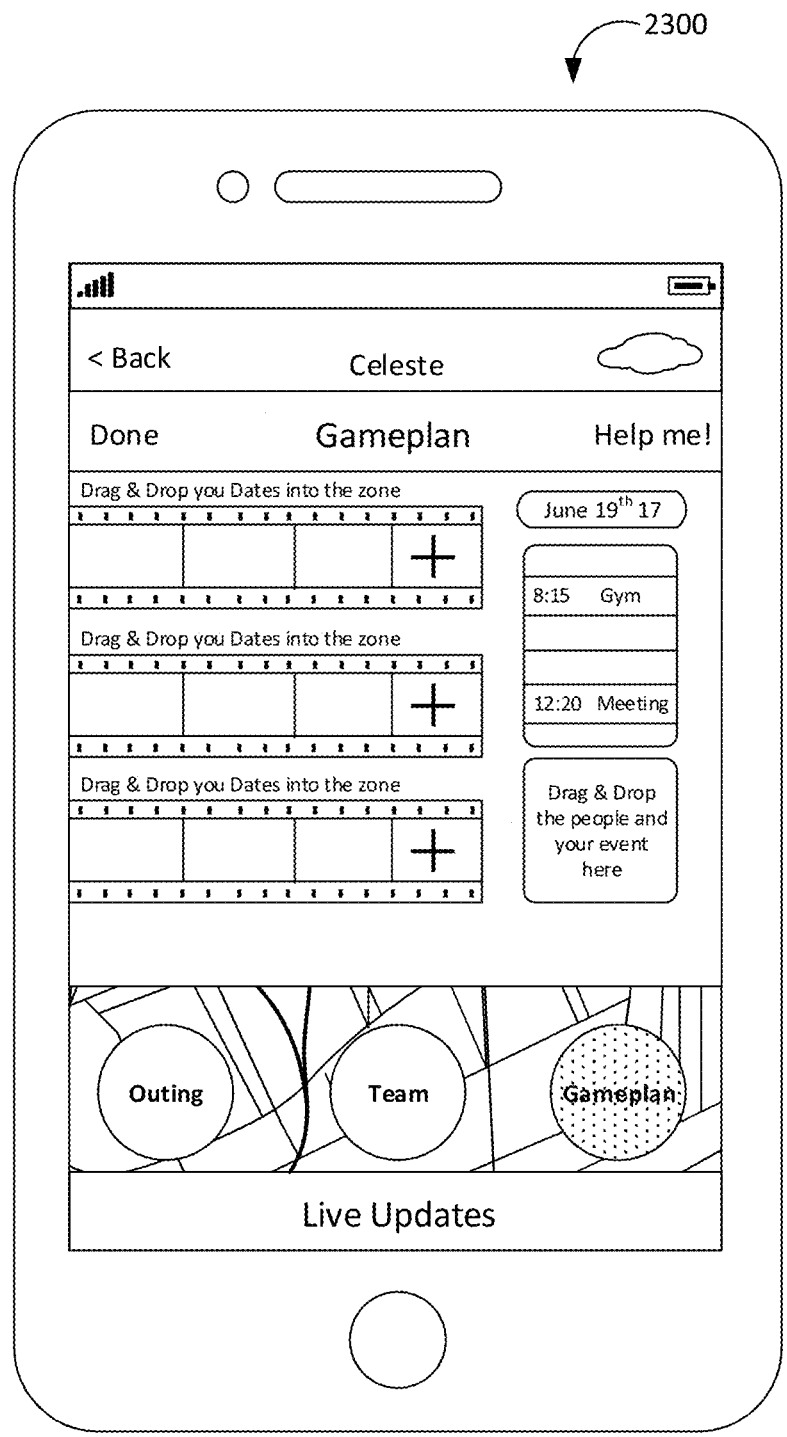
FIG. 23 illustrates a screenshot of a User interface for facilitating provisioning of social activity data to a mobile device based on user preferences that allows a user to invite networks and partners to join, find dates and create events and make them public, in accordance with some embodiments.

FIG. 23 illustrates a screenshot 2300 of a User interface for facilitating provisioning of social activity data to a mobile device based on user preferences that allows a user to invite networks and partners to join, find dates and create events and make them public, in accordance with some embodiments.

Figure 24:
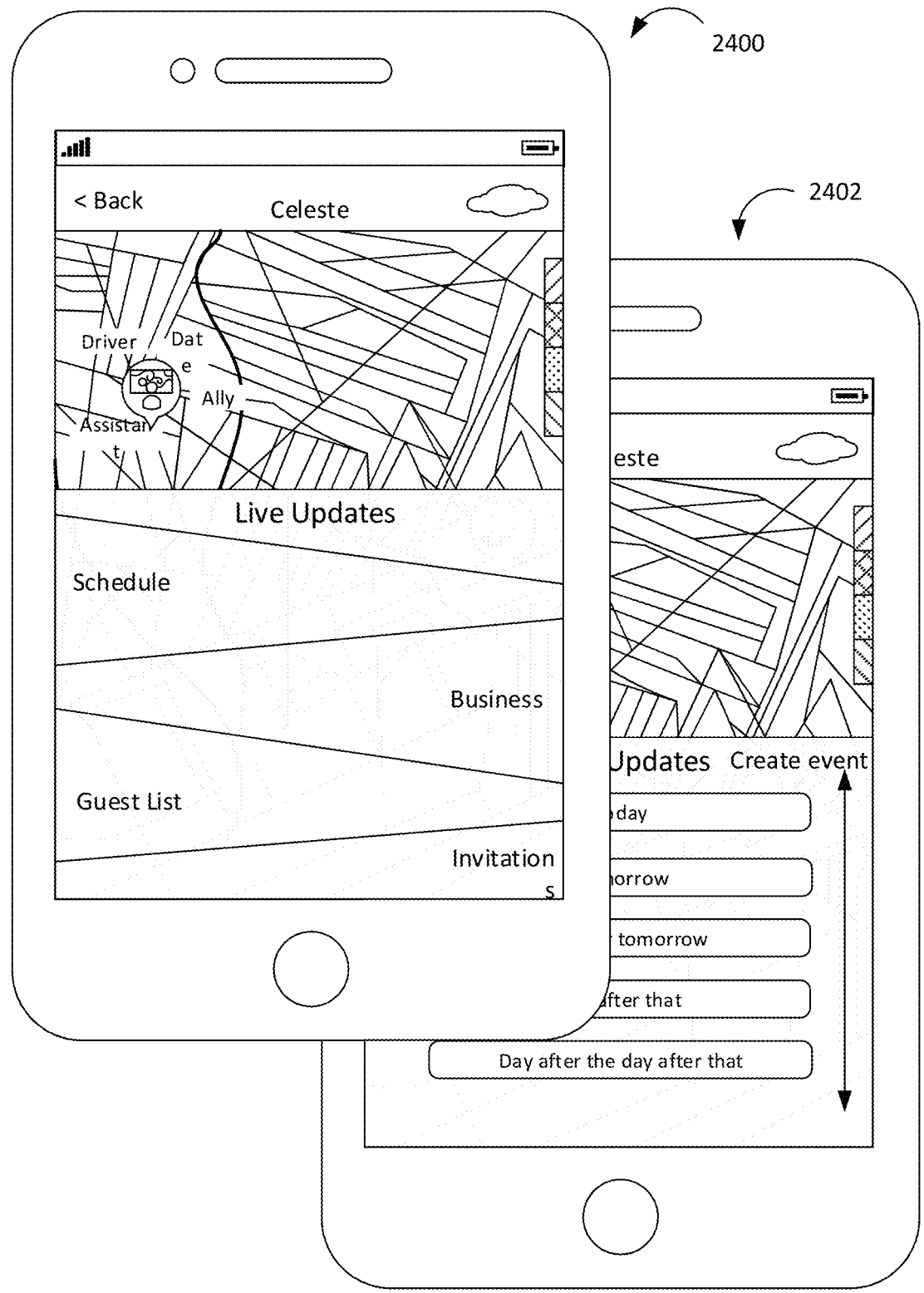
FIG. 24 illustrates screenshot of User interfaces for facilitating provisioning of social activity data to a mobile device based on user preferences that allows a user to manage calendar, see guest list of an event, see invitations and manage schedule, in accordance with some embodiments.

FIG. 24 illustrates screenshot 2400-2402 of User interfaces for facilitating provisioning of social activity data to a mobile device based on user preferences that allows a user to manage calendar, see guest list of an event, see invitations and manage schedule, in accordance with some embodiments.

Figure 25:
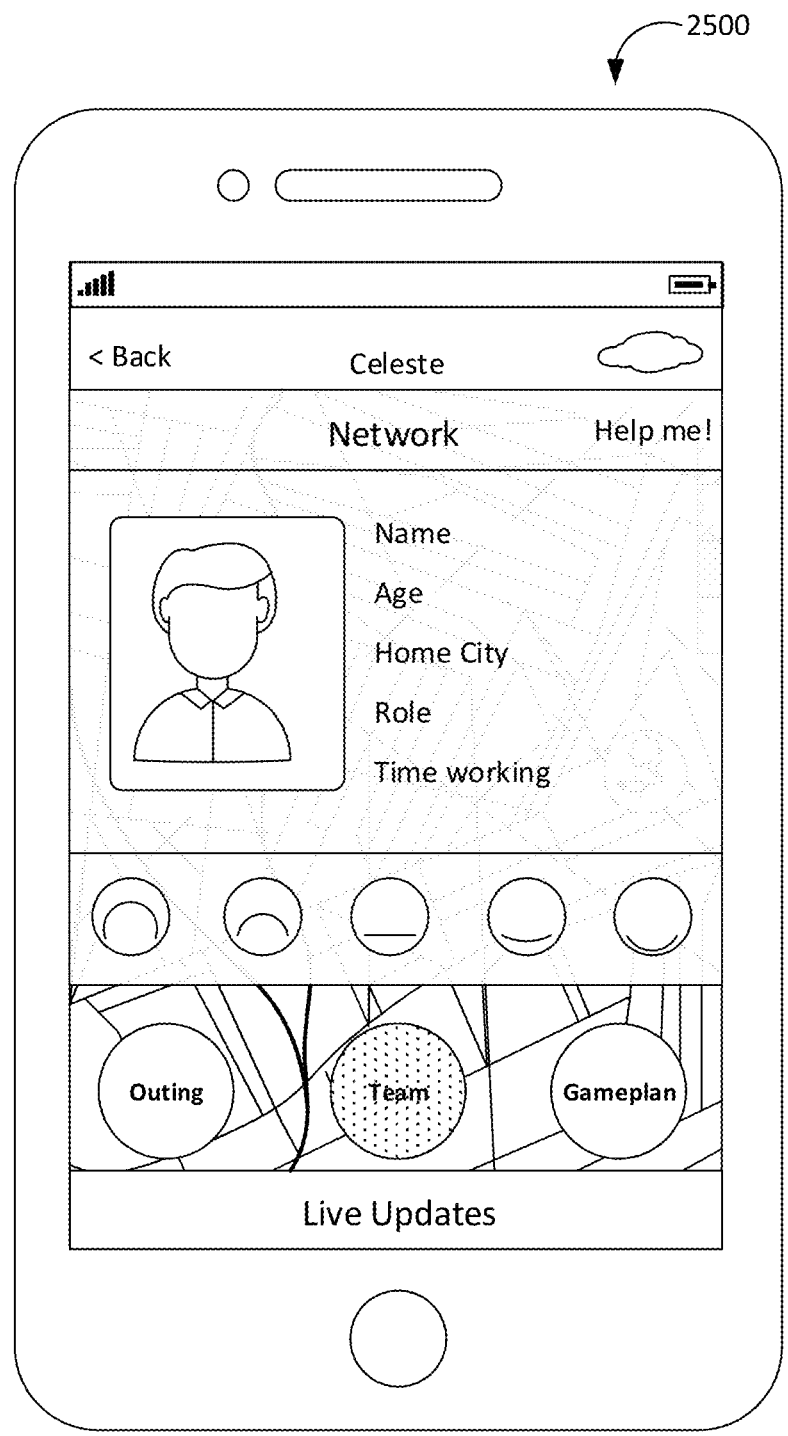
FIG. 25 illustrates a screenshot of a User interface for facilitating provisioning of social activity data to a mobile device based on user preferences that allows a user to rate partners and separate from partner, in accordance with some embodiments.

FIG. 25 illustrates a screenshot 2500 of a User interface for facilitating provisioning of social activity data to a mobile device based on user preferences that allows a user to rate partners and separate from partner, in accordance with some embodiments.

Figure 26:
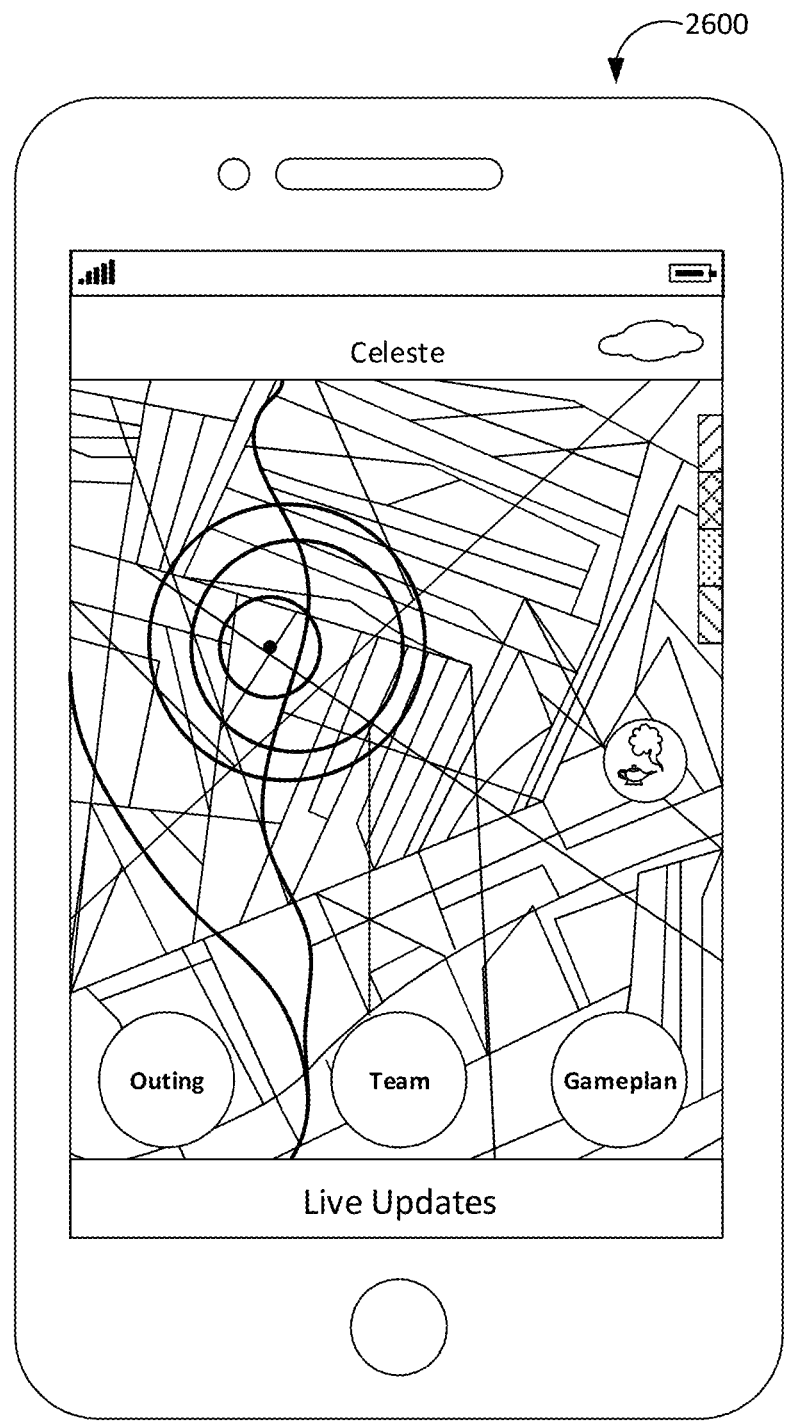
FIG. 26 illustrates a screenshot of a User interface for facilitating provisioning of social activity data to a mobile device based on user preferences that allows a user to expand search radius, find more venues, find more events and expand network, in accordance with some embodiments.

FIG. 26 illustrates a screenshot 2600 of a User interface for facilitating provisioning of social activity data to a mobile device based on user preferences that allows a user to expand search radius, find more venues, find more events and expand network, in accordance with some embodiments.

Figure 27:
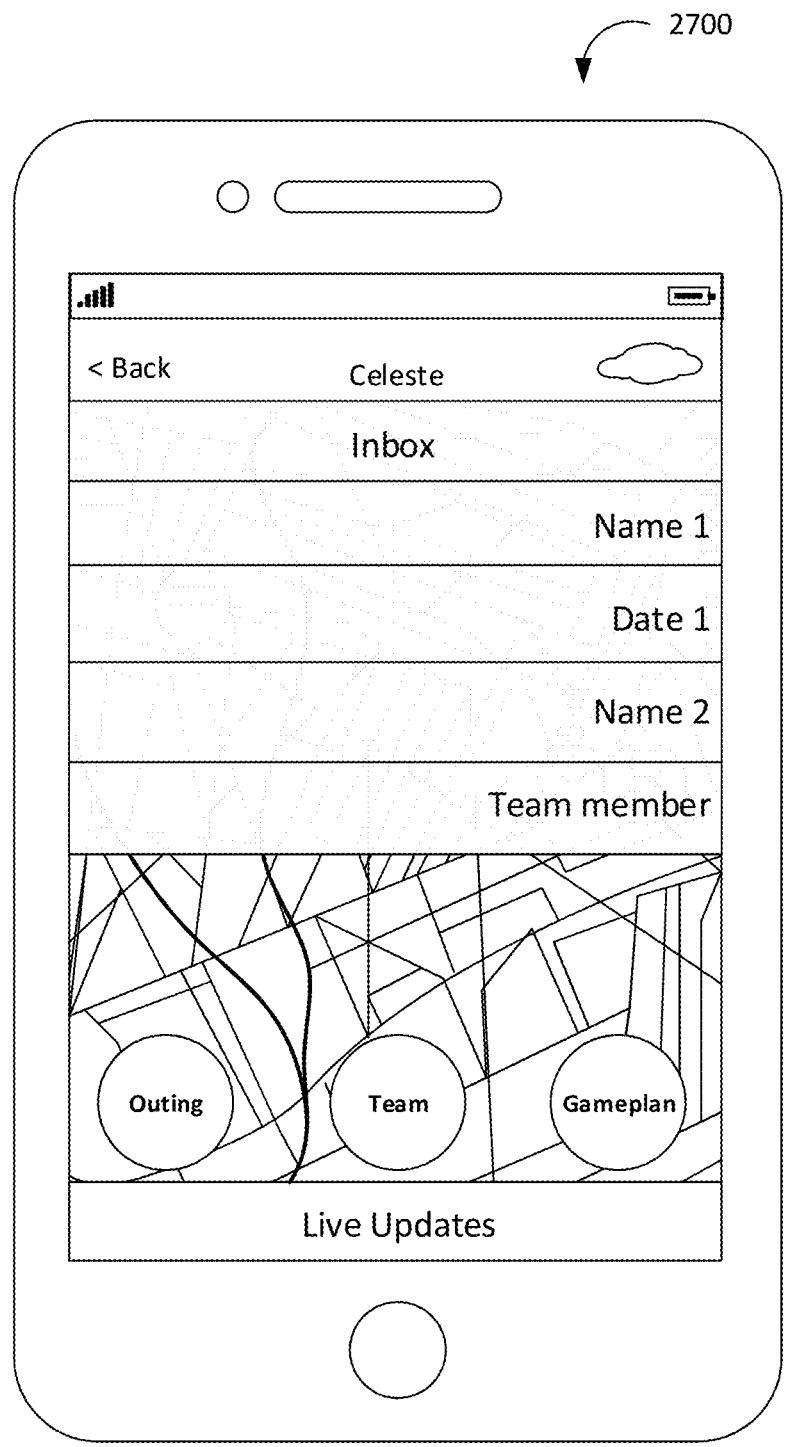
FIG. 27 illustrates a screenshot of a User interface for facilitating provisioning of social activity data to a mobile device based on user preferences that allows a user to see messages and answer messages, in accordance with some embodiments.

FIG. 27 illustrates a screenshot 2700 of a User interface for facilitating provisioning of social activity data to a mobile device based on user preferences that allows a user to see messages and answer messages, in accordance with some embodiments.

Figure 28:
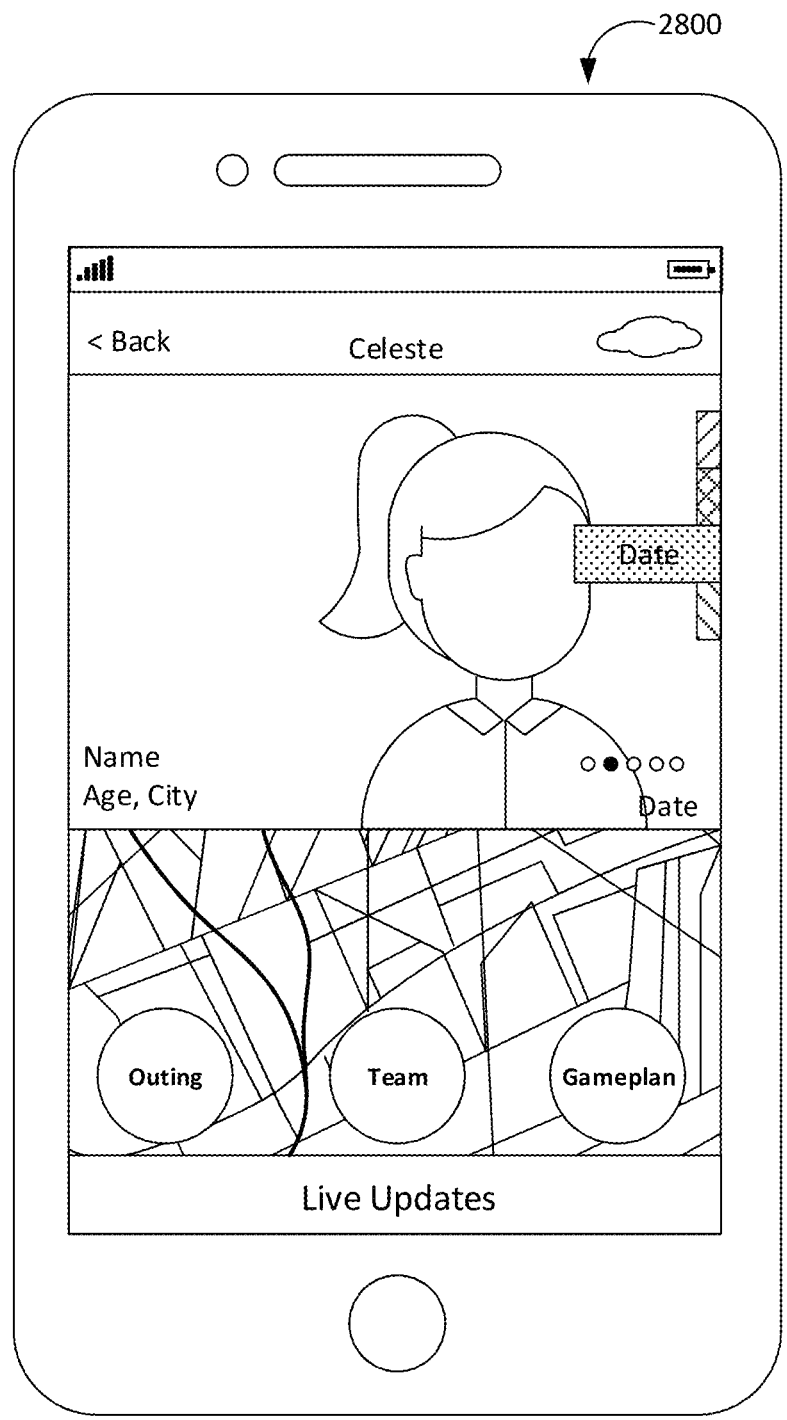
FIG. 28 illustrates a screenshot of a User interface for facilitating provisioning of social activity data to a mobile device based on user preferences that allows a user to explore dating database and meet interesting people, in accordance with some embodiments.

FIG. 28 illustrates a screenshot 2800 of a User interface for facilitating provisioning of social activity data to a mobile device based on user preferences that allows a user to explore dating database and meet interesting people, in accordance with some embodiments.

Figure 29:
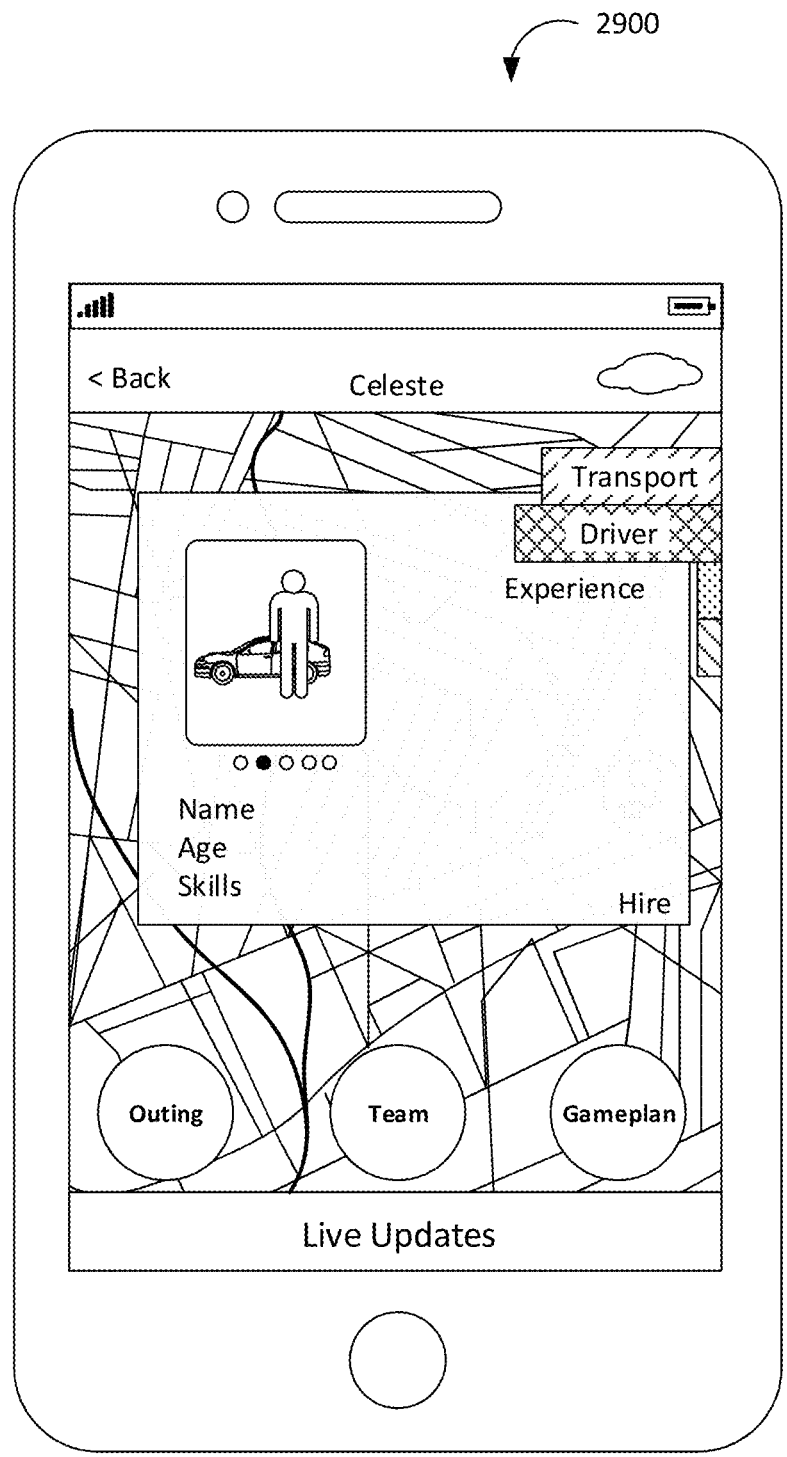
FIG. 29 illustrates a screenshot of a User interface for facilitating provisioning of social activity data to a mobile device based on user preferences that allows a user to find a driver, in accordance with some embodiments.

FIG. 29 illustrates a screenshot 2900 of a User interface for facilitating provisioning of social activity data to a mobile device based on user preferences that allows a user to find a driver, in accordance with some embodiments.

Figure 30:
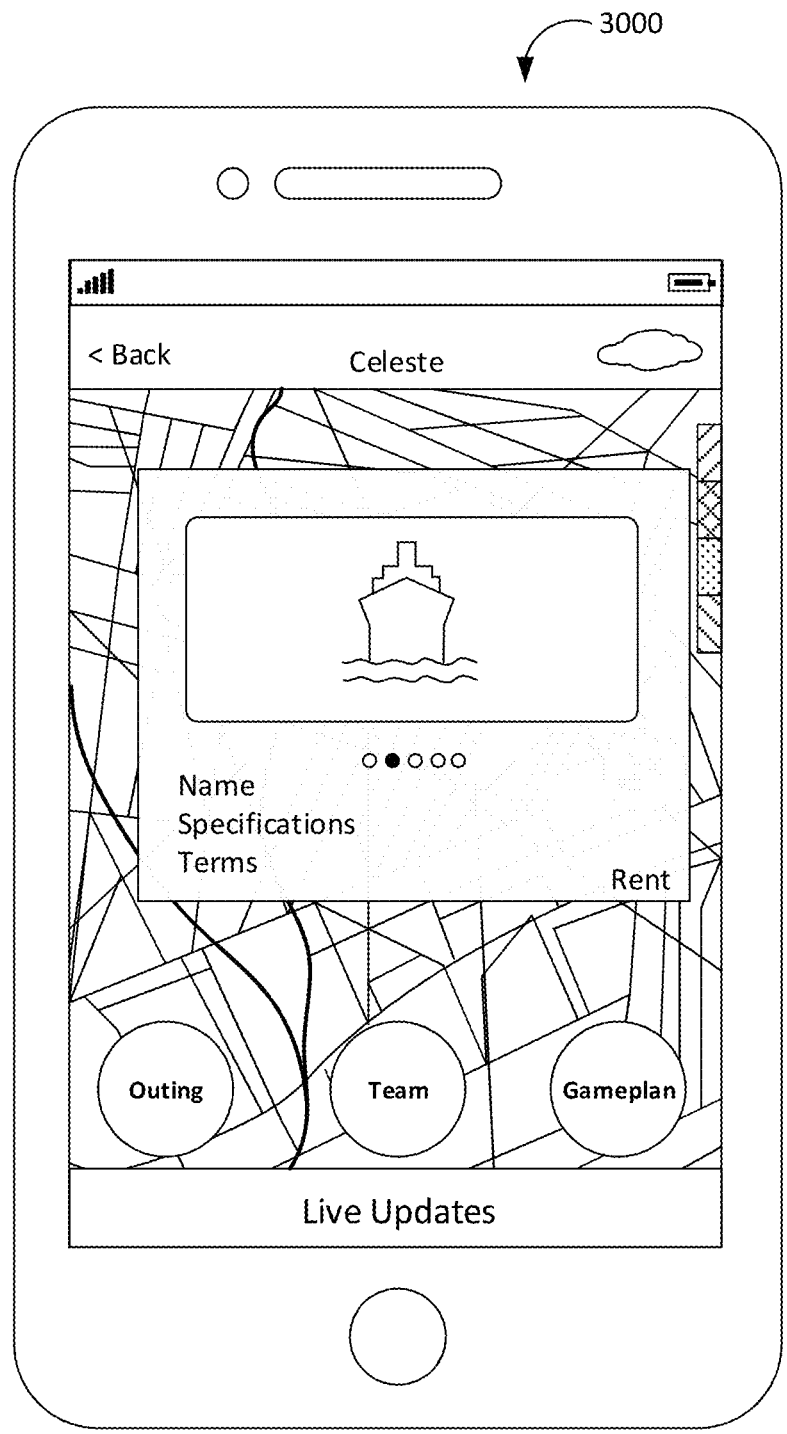
FIG. 30 illustrates a screenshot of a User interface for facilitating provisioning of social activity data to a mobile device based on user preferences that allows a user to rent a car, rent a bike, rent a yacht and rent a jet, in accordance with some embodiments.

FIG. 30 illustrates a screenshot 3000 of a User interface for facilitating provisioning of social activity data to a mobile device based on user preferences that allows a user to rent a car, rent a bike, rent a yacht and rent a jet, in accordance with some embodiments.

Figure 31:
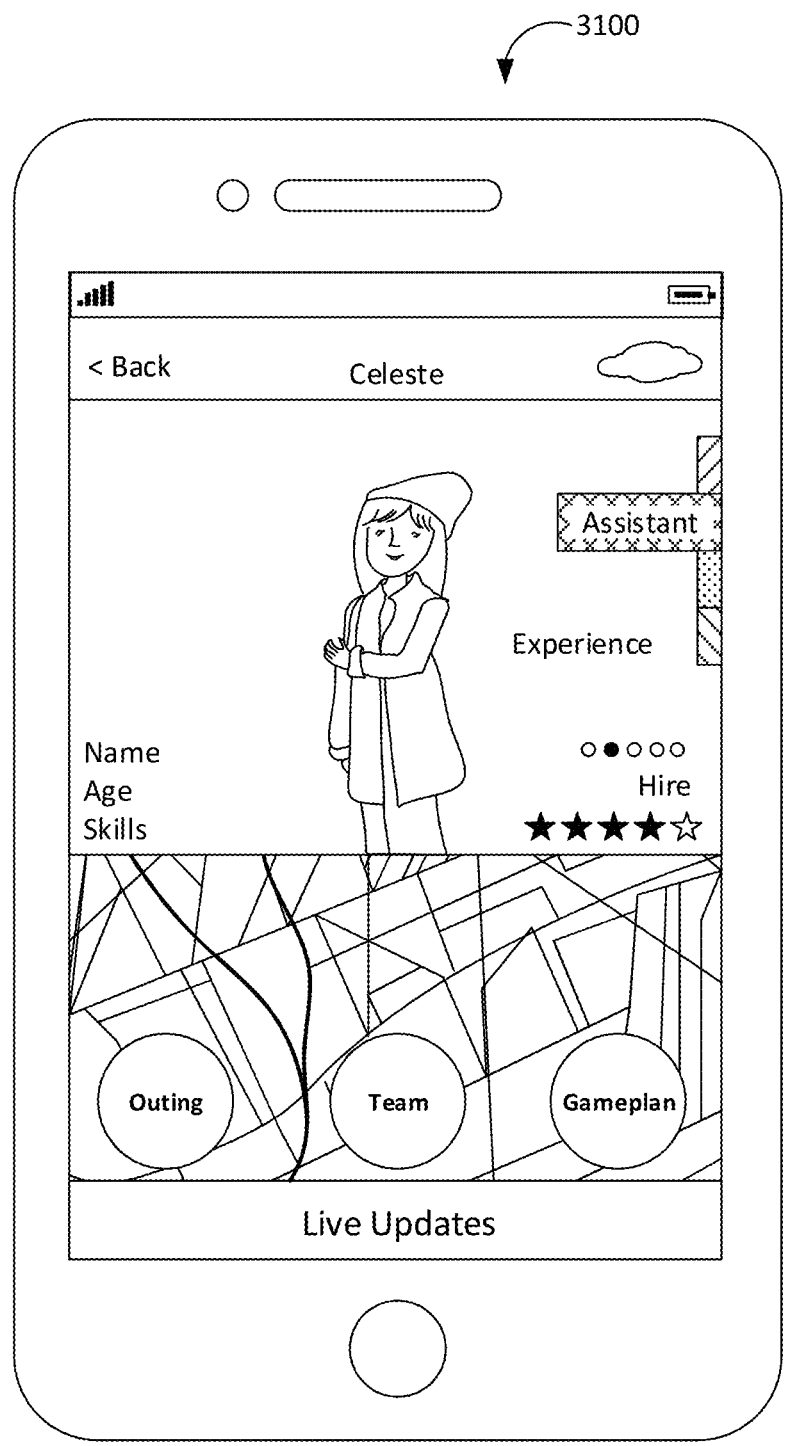
FIG. 31 illustrates a screenshot of a User interface for facilitating provisioning of social activity data to a mobile device based on user preferences that allows a user to hire an assistant, in accordance with some embodiments.

FIG. 31 illustrates a screenshot 3100 of a User interface for facilitating provisioning of social activity data to a mobile device based on user preferences that allows a user to hire an assistant, in accordance with some embodiments.

Figure 32:
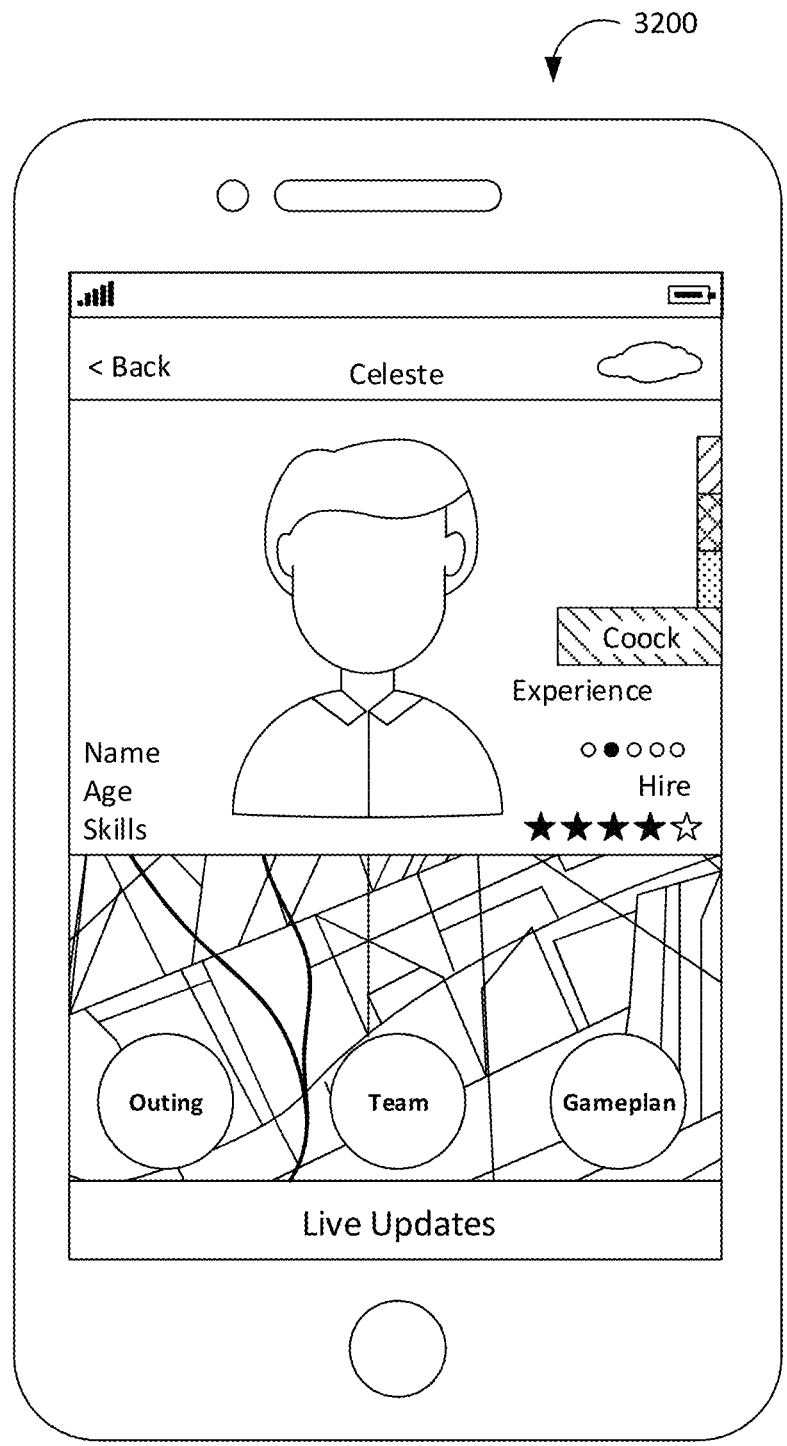
FIG. 32 illustrates a screenshot of a User interface for facilitating provisioning of social activity data to a mobile device based on user preferences that allows a user to find service staff to make life easier, in accordance with some embodiments.

FIG. 32 illustrates a screenshot 3200 of a User interface for facilitating provisioning of social activity data to a mobile device based on user preferences that allows a user to find service staff to make life easier, in accordance with some embodiments.

Figure 33:
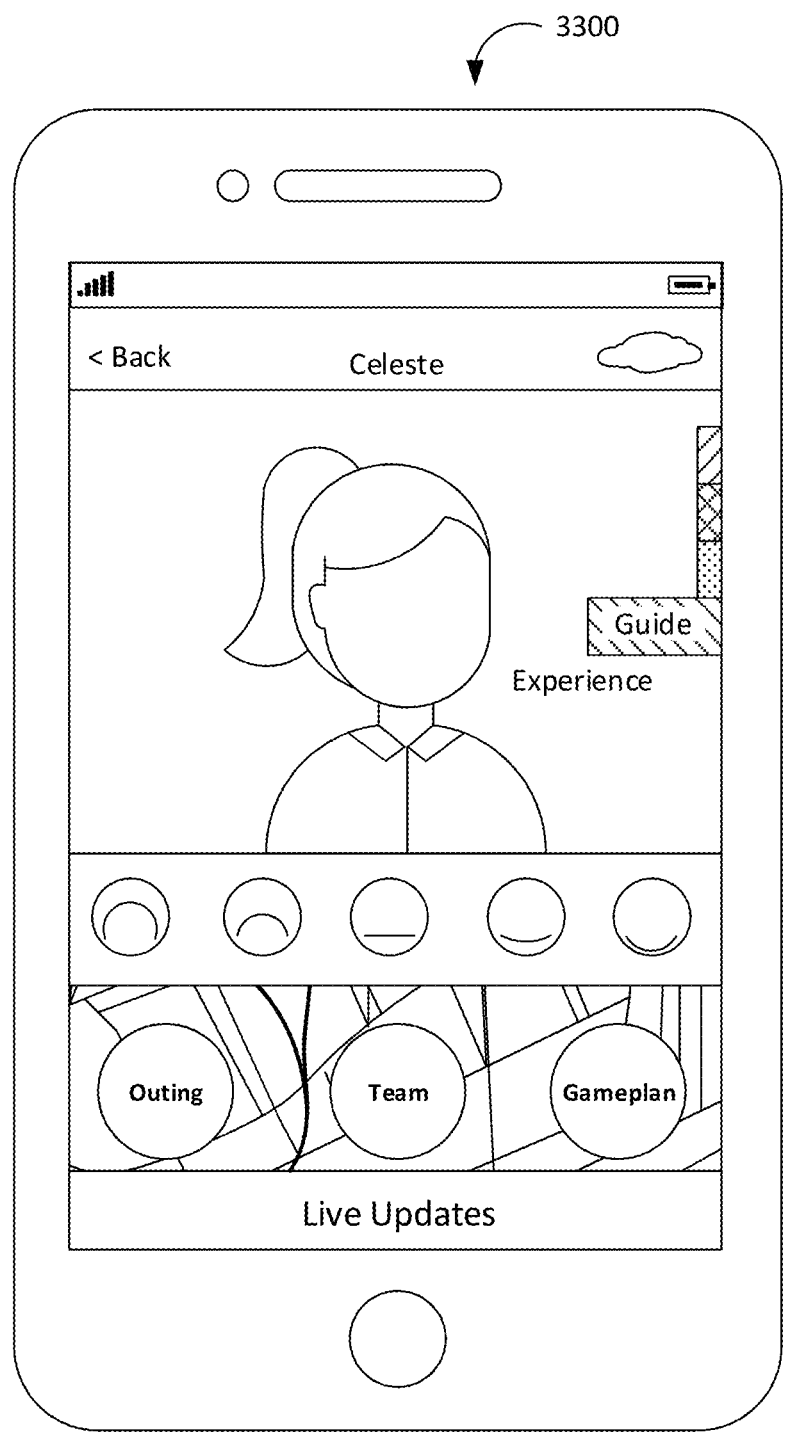
FIG. 33 illustrates a screenshot of a User interface for facilitating provisioning of social activity data to a mobile device based on user preferences that allows a user to rate service staff, in accordance with some embodiments.

FIG. 33 illustrates a screenshot 3300 of a User interface for facilitating provisioning of social activity data to a mobile device based on user preferences that allows a user to rate service staff, in accordance with some embodiments.

Figure 34:
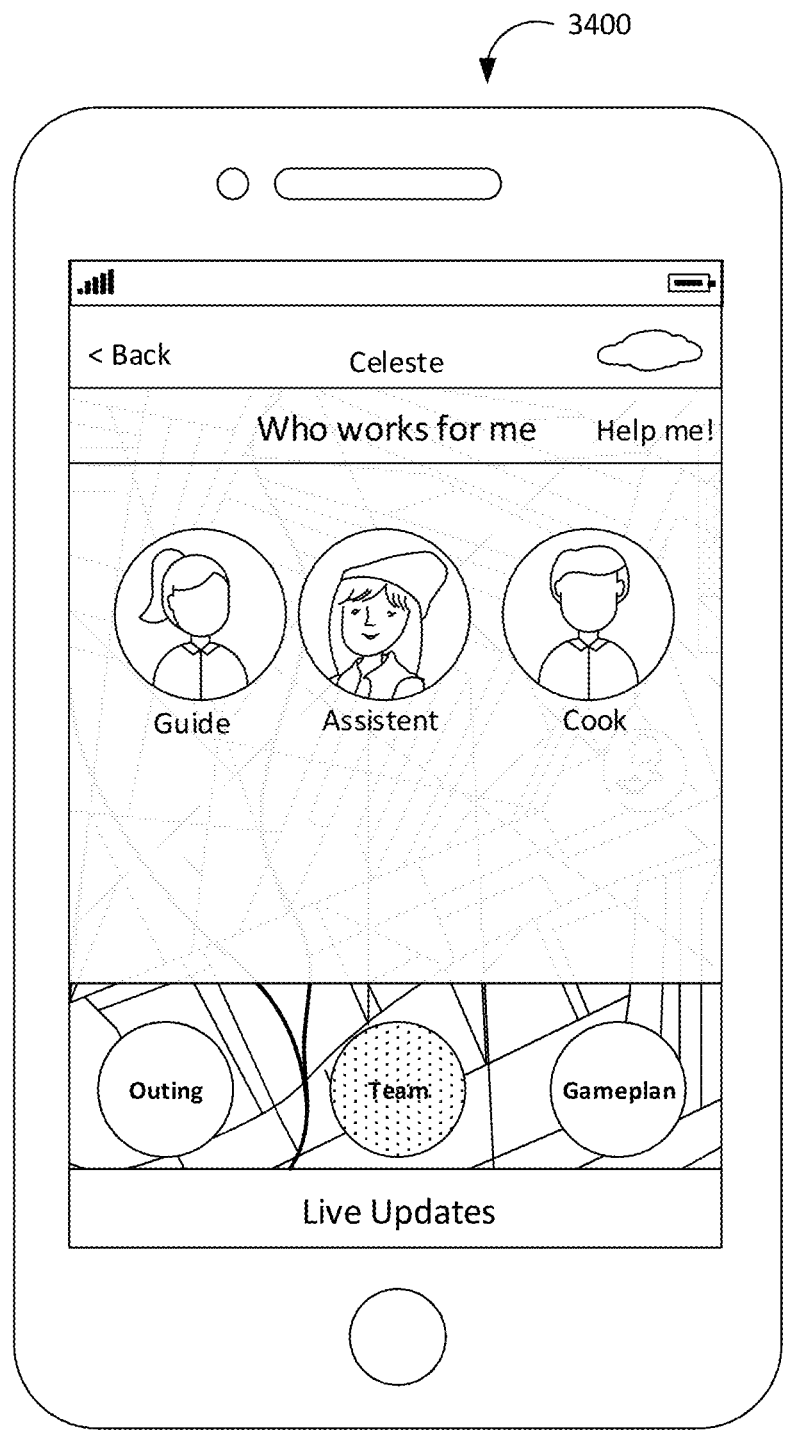
FIG. 34 illustrates a screenshot of a User interface for facilitating provisioning of social activity data to a mobile device based on user preferences that allows a user to manage people who work for the user, in accordance with some embodiments.
Figure 35:
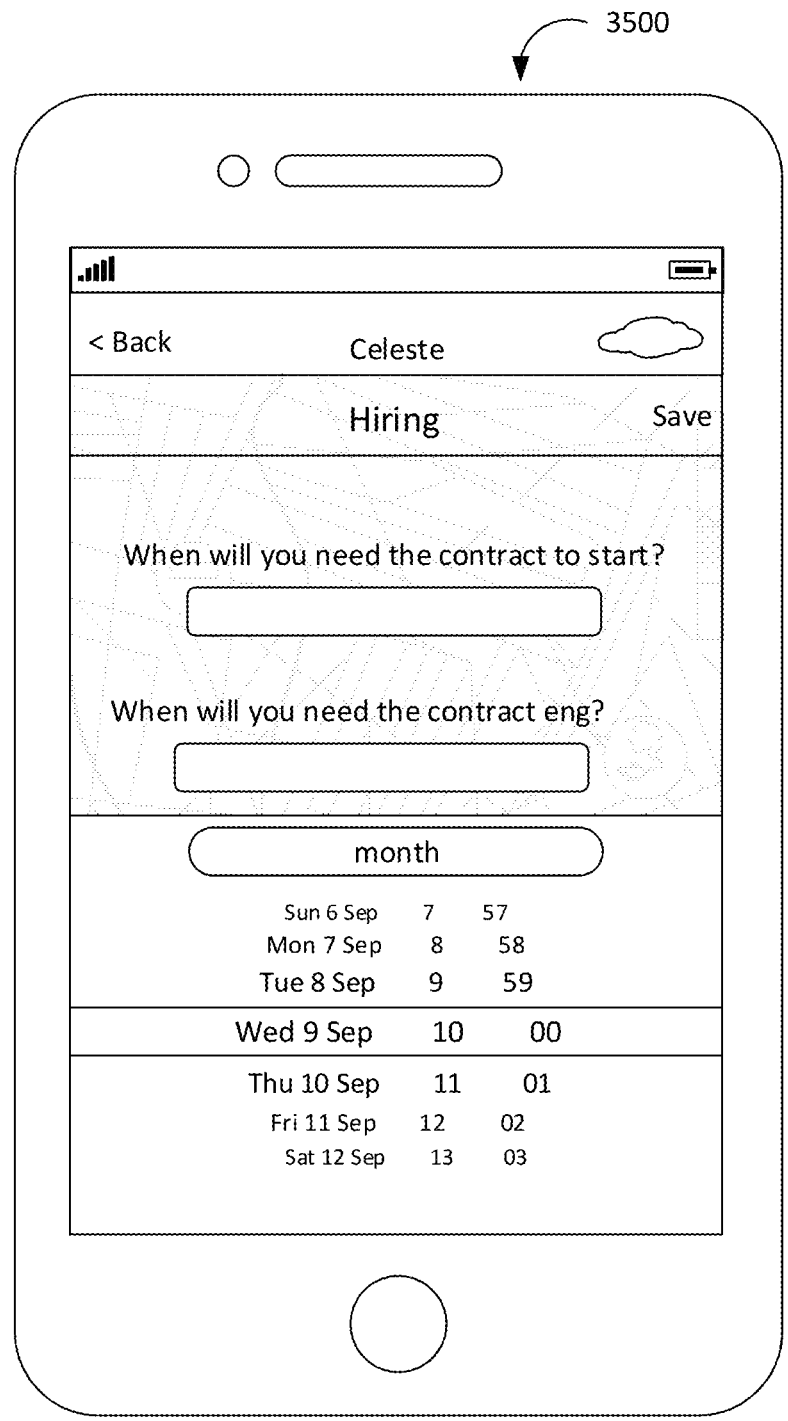

FIG. 34 illustrates a screenshot 3400 of a User interface for facilitating provisioning of social activity data to a mobile device based on user preferences that allows a user to manage people who work for the user, in accordance with some embodiments.

FIG. 3500 illustrates a screenshot 350000 of a User interface for facilitating provisioning of social activity data to a mobile device based on user preferences that allows a user to establish payment-per hour and for a set time, in accordance with some embodiments.

Figure 36:
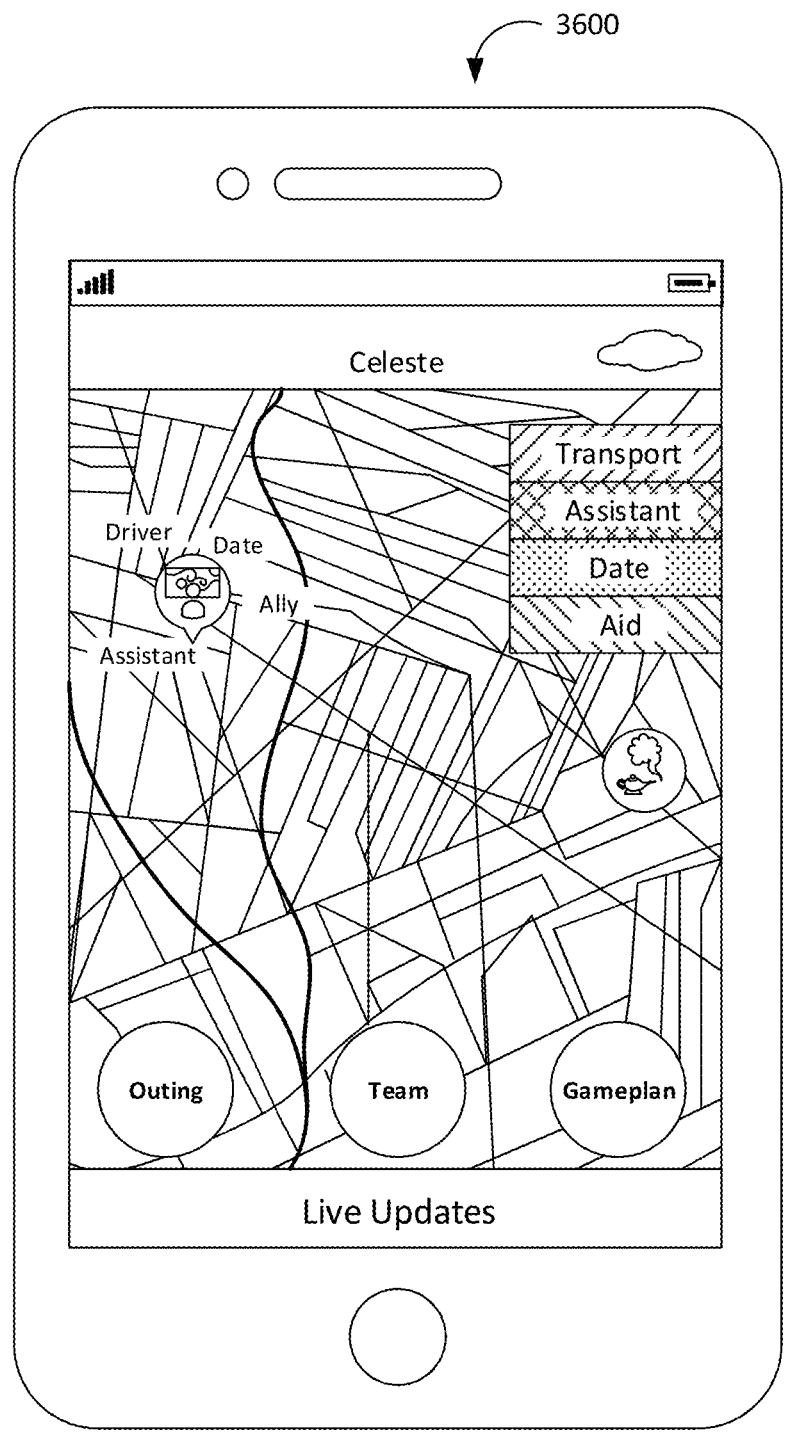
FIG. 36 illustrates a screenshot of a User interface for facilitating provisioning of social activity data to a mobile device based on user preferences that allows a user to find everything to make life easier, in accordance with some embodiments.

FIG. 36 illustrates a screenshot 3600 of a User interface for facilitating provisioning of social activity data to a mobile device based on user preferences that allows a user to find everything to make life easier, in accordance with some embodiments.

Figure 37:
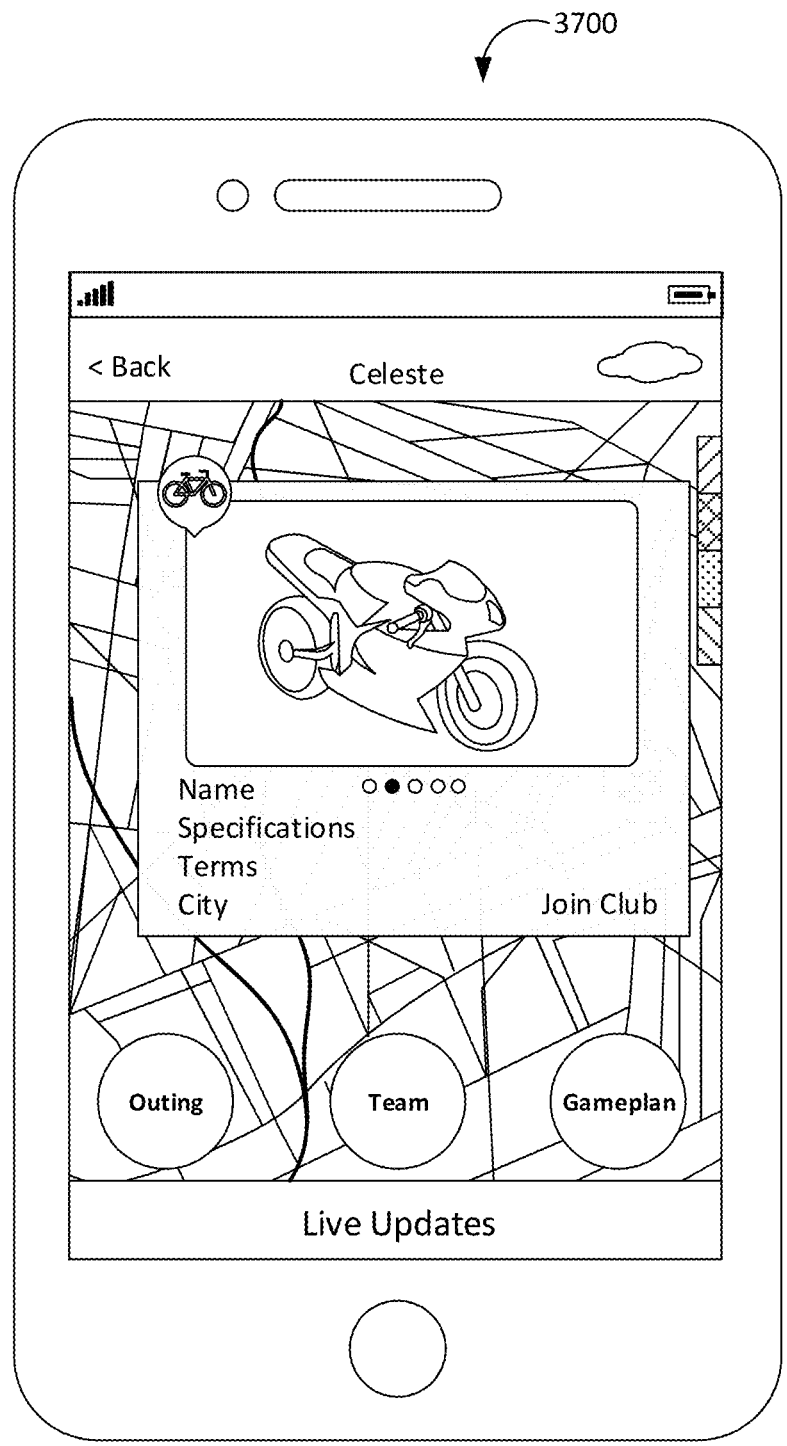
FIG. 37 illustrates a screenshot of a User interface for facilitating provisioning of social activity data to a mobile device based on user preferences that allows a user to find different X Clubs for biking, yachting, cars, jets and sports, in accordance with some embodiments.

FIG. 37 illustrates a screenshot 3700 of a User interface for facilitating provisioning of social activity data to a mobile device based on user preferences that allows a user to find different X Clubs for biking, yachting, cars, jets and sports, in accordance with some embodiments.

Figure 38:
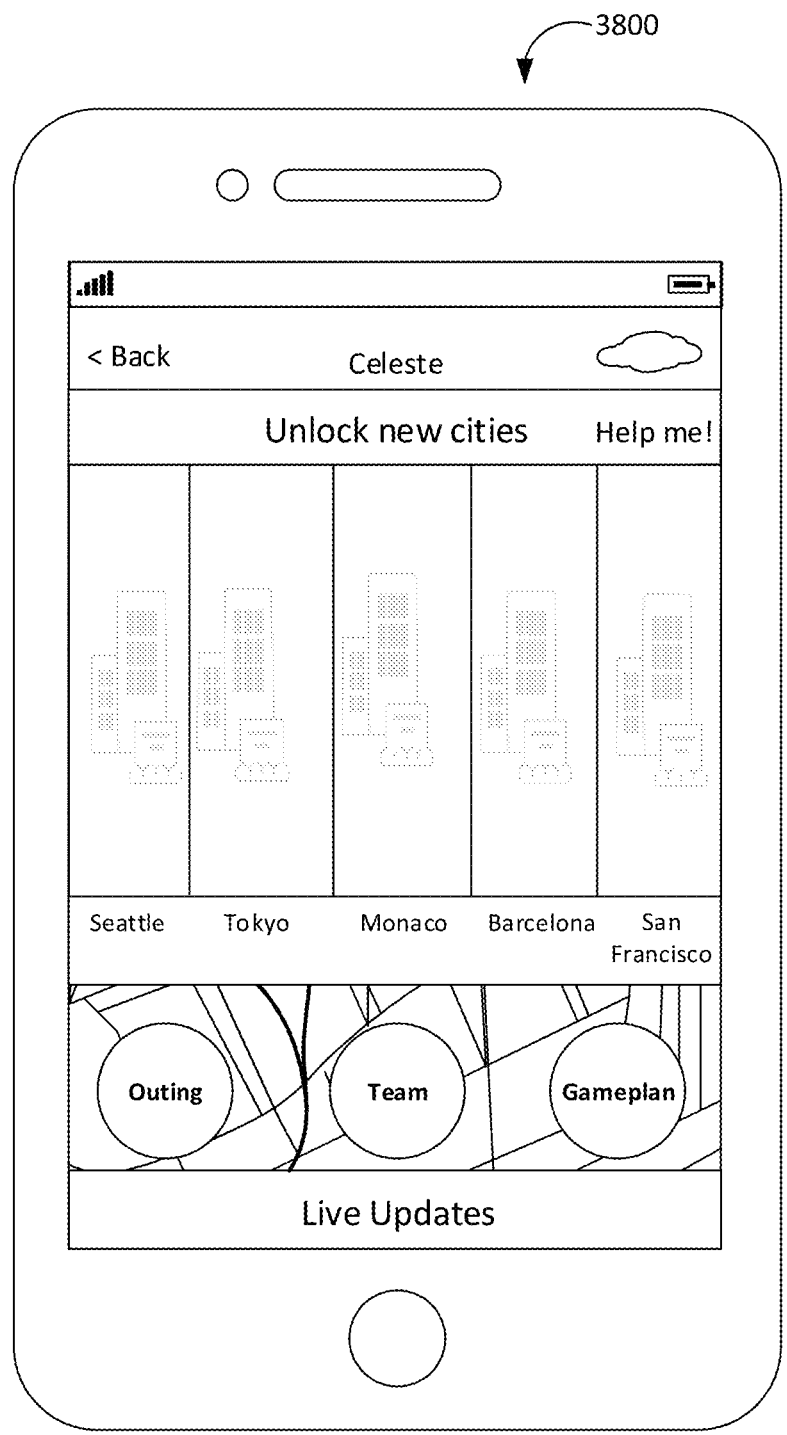
FIG. 38 illustrates a screenshot of a User interface for facilitating provisioning of social activity data to a mobile device based on user preferences that allows a user to unlock new cities by traveling, accepting challenges and attending events, in accordance with some embodiments.

FIG. 38 illustrates a screenshot 3800 of a User interface for facilitating provisioning of social activity data to a mobile device based on user preferences that allows a user to unlock new cities by traveling, accepting challenges and attending events, in accordance with some embodiments.

Figure 39:
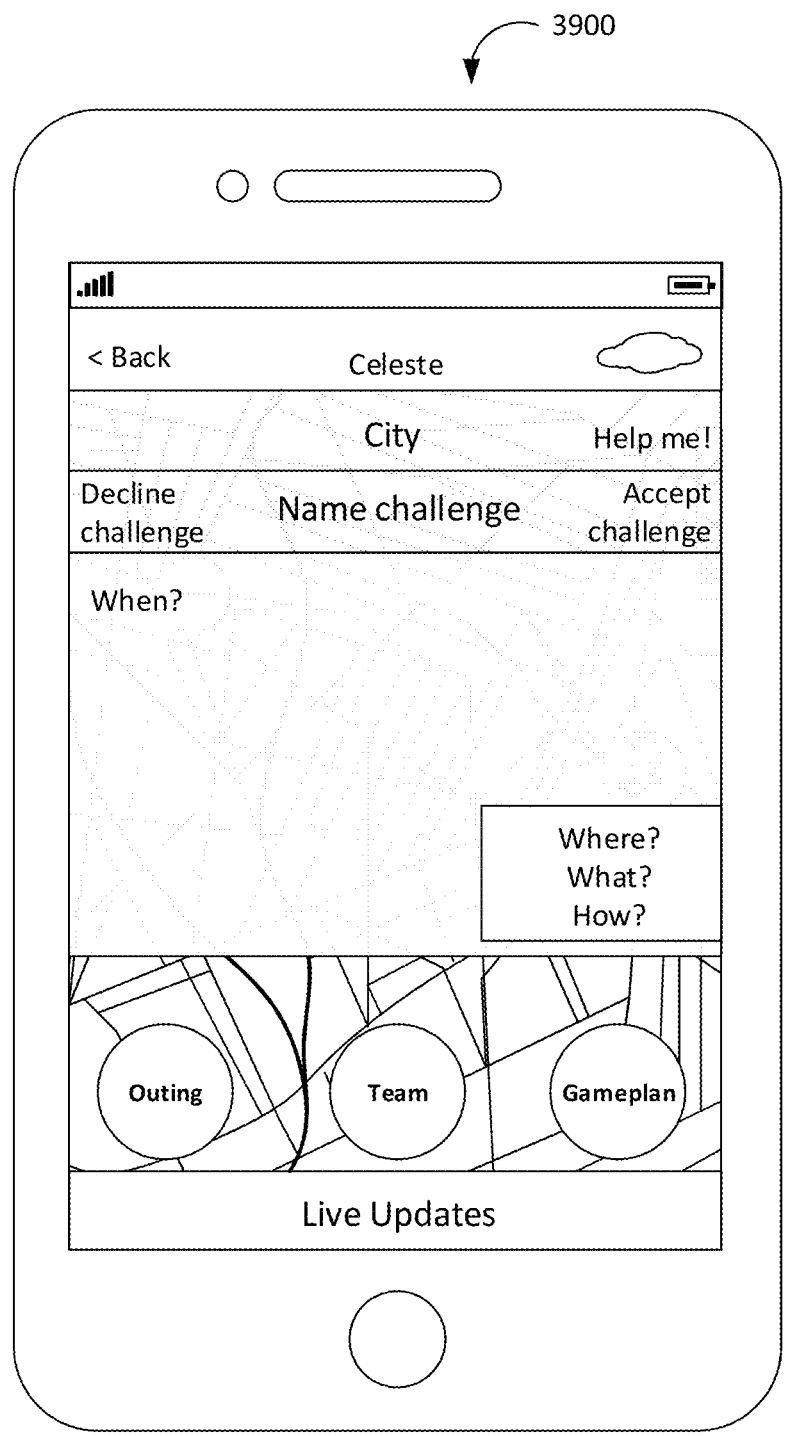
FIG. 39 illustrates a screenshot of a User interface for facilitating provisioning of social activity data to a mobile device based on user preferences that allows a user to accept challenge, decline challenge and dismiss accepted challenge, in accordance with some embodiments.

FIG. 39 illustrates a screenshot 3900 of a User interface for facilitating provisioning of social activity data to a mobile device based on user preferences that allows a user to accept challenge, decline challenge and dismiss accepted challenge, in accordance with some embodiments.

Figure 40:
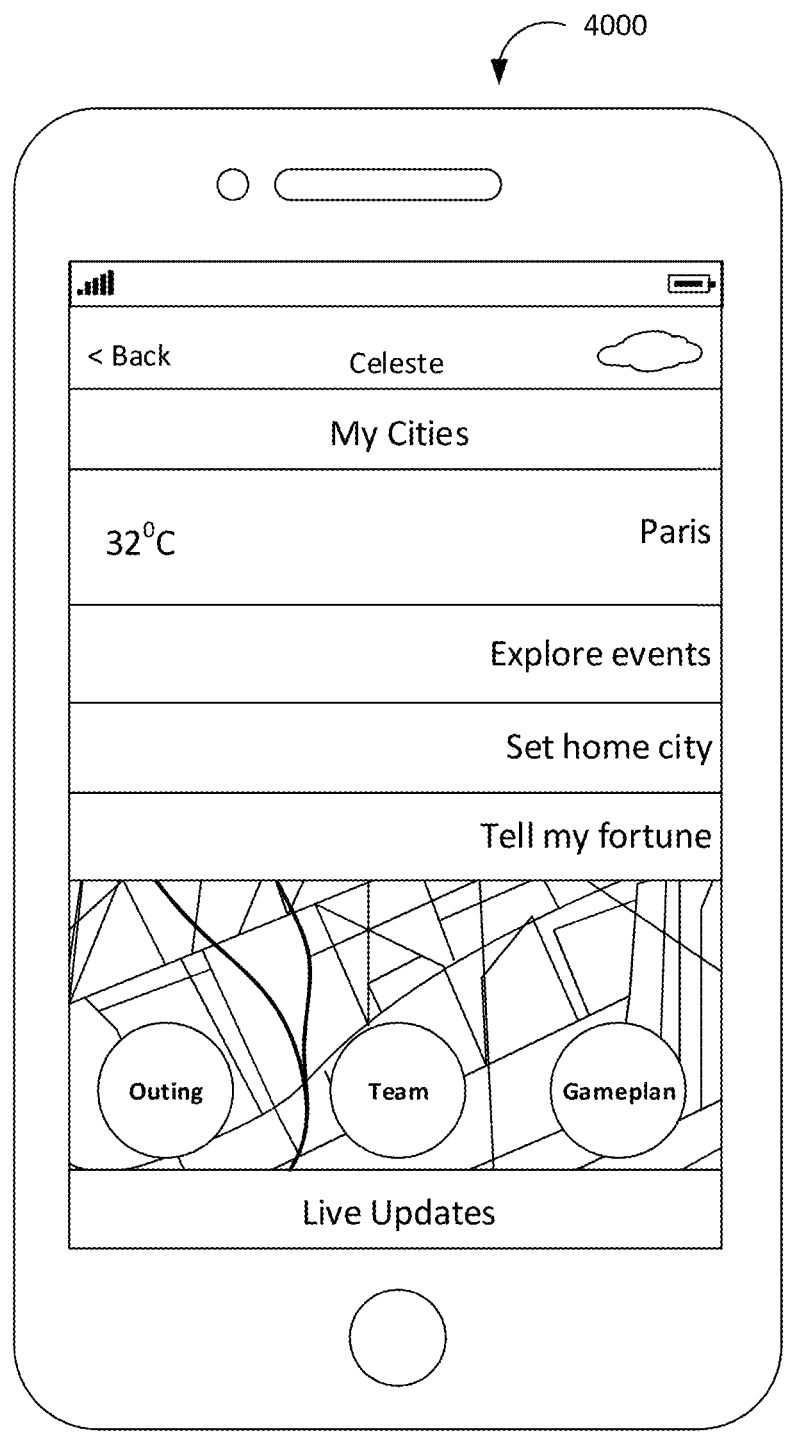
FIG. 40 illustrates a screenshot of a User interface for facilitating provisioning of social activity data to a mobile device based on user preferences that allows a user to explore events, set city to new home city, explore challenges and see temperature, in accordance with some embodiments.

FIG. 40 illustrates a screenshot 4000 of a User interface for facilitating provisioning of social activity data to a mobile device based on user preferences that allows a user to explore events, set city to new home city, explore challenges and see temperature, in accordance with some embodiments.

Figure 41:
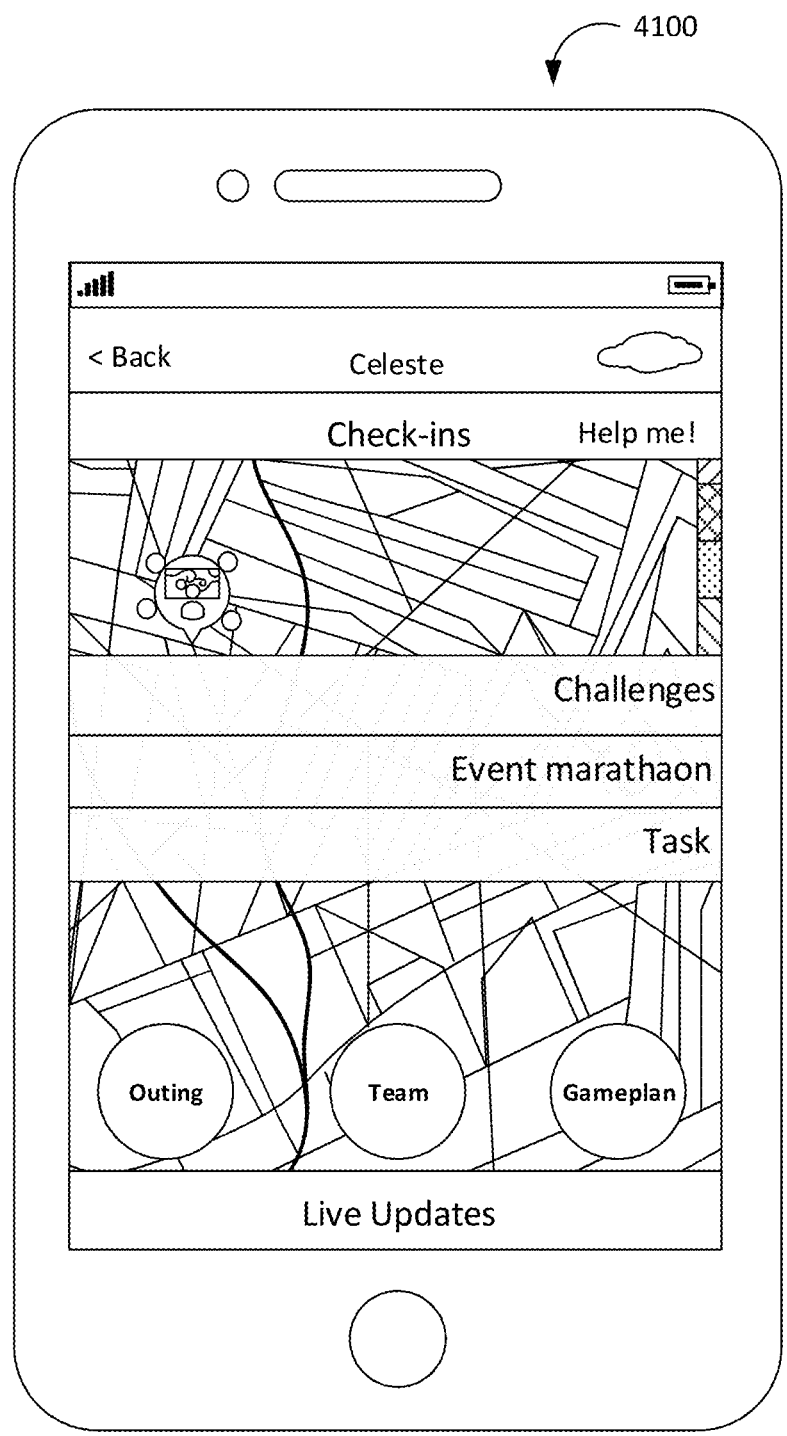
FIG. 41 illustrates a screenshot of a User interface for facilitating provisioning of social activity data to a mobile device based on user preferences that allows a user to accept challenges, accept event marathon and accept tasks, in accordance with some embodiments.

FIG. 41 illustrates a screenshot 4100 of a User interface for facilitating provisioning of social activity data to a mobile device based on user preferences that allows a user to accept challenges, accept event marathon and accept tasks, in accordance with some embodiments.

Figure 42:
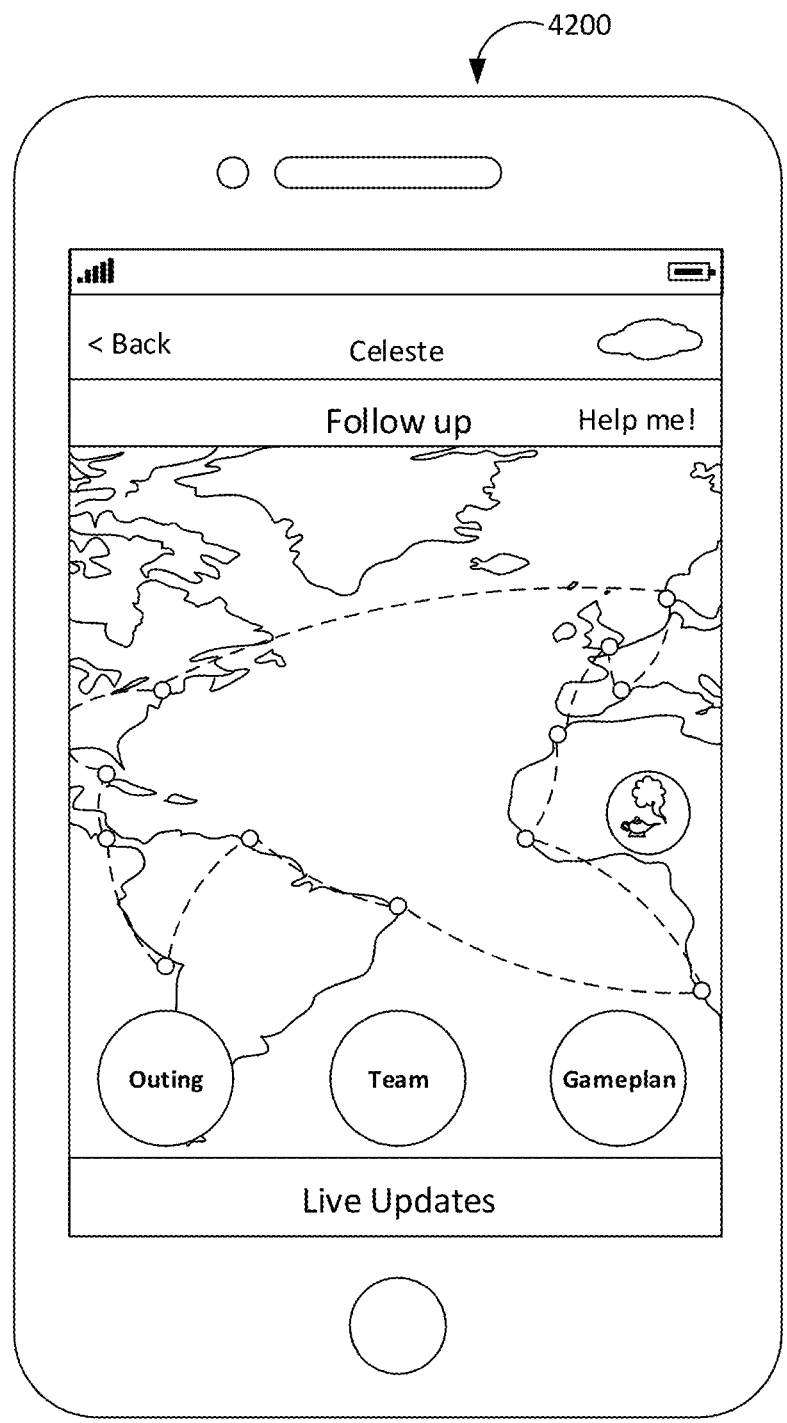
FIG. 42 illustrates a screenshot of a User interface for facilitating provisioning of social activity data to a mobile device based on user preferences that allows a user to see every move from the past, take a screenshot and link directly to social media, in accordance with some embodiments.

FIG. 42 illustrates a screenshot 4200 of a User interface for facilitating provisioning of social activity data to a mobile device based on user preferences that allows a user to see every move from the past, take a screenshot and link directly to social media, in accordance with some embodiments.

Figure 43:
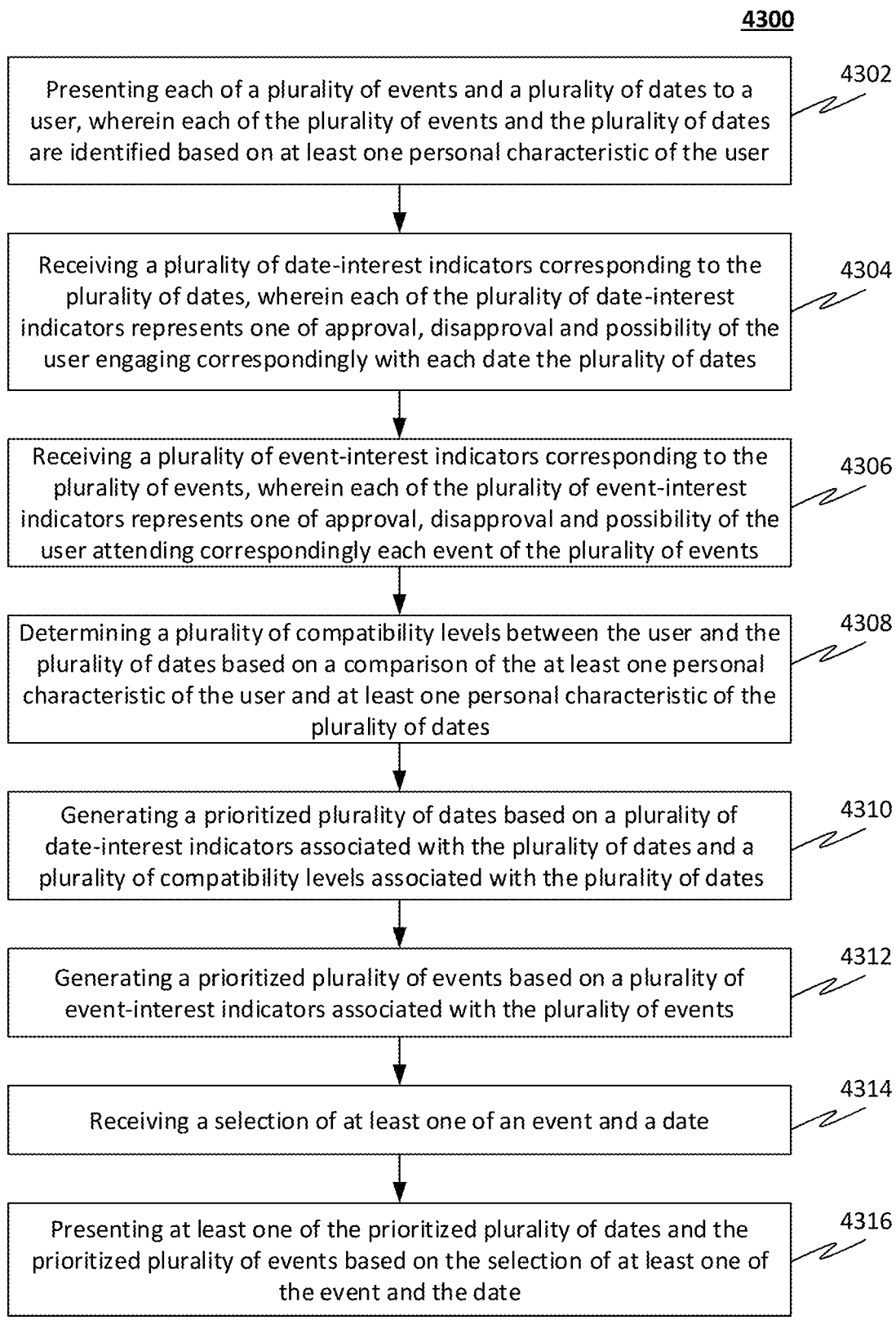
FIG. 43 illustrates a flowchart of a method of facilitating social networking based on events, in accordance with some embodiments.

FIG. 43 illustrates a flowchart of a method 4300 of facilitating social networking based on events, in accordance with some embodiments. The method may include a stage 4302 of presenting each of a plurality of events and a plurality of dates to a user. Further, each of the plurality of events and the plurality of dates may be identified based on at least one personal characteristic of the user.

In some embodiments, the at least one personal characteristic may include a perceived personality, an interest and an intention. In some embodiments, the at least one personal characteristic may be identified further based on one or more of a location of the user, a mood of the user, response to an additional survey, and a spending gauge associated with the user. In some embodiments, the at least one personal characteristic may be identified further based on interaction with other users, icebreaker usage, icebreaker interaction, number of available credits associated with the user, events hearted by the user, events checked by the user, events attended by the user, gameplan icons selected by the user, trails used or created by the user, a Belt-Level obtained by the User and DNA rating scale of the user.

Additionally, the method may include a stage 4304 of receiving, a plurality of date-interest indicators corresponding to the plurality of dates. Further, each of the plurality of date-interest indicators represents one of approval, disapproval and possibility of the Userte engaging correspondingly with each date the plurality of dates. Furthermore, the method may include a stage 4306 of receiving, a plurality of event-interest indicators corresponding to the plurality of events. Further, each of the plurality of event-interest indicators represents one of approval, disapproval and possibility of the User attending correspondingly each event of the plurality of events.

In some embodiments, the method may further include identifying the plurality of events based on a budget associated with the user. In some embodiments, an average cost of attending each event of the plurality of events may be at most 130% of the budget associated with the user.

Additionally, the method may include a stage 4308 of determining a plurality of compatibility levels between the User and the plurality of dates based on a comparison of the at least one personal characteristic of the User and at least one personal characteristic of the plurality of dates. Further, the method may include a stage 4310 of generating a prioritized plurality of dates based on a plurality of date-interest indicators associated with the plurality of dates and a plurality of compatibility levels associated with the plurality of dates. Furthermore, the method may include a stage 4312 of generating a prioritized plurality of events based on a plurality of event-interest indicators associated with the plurality of events.

Figure 56:
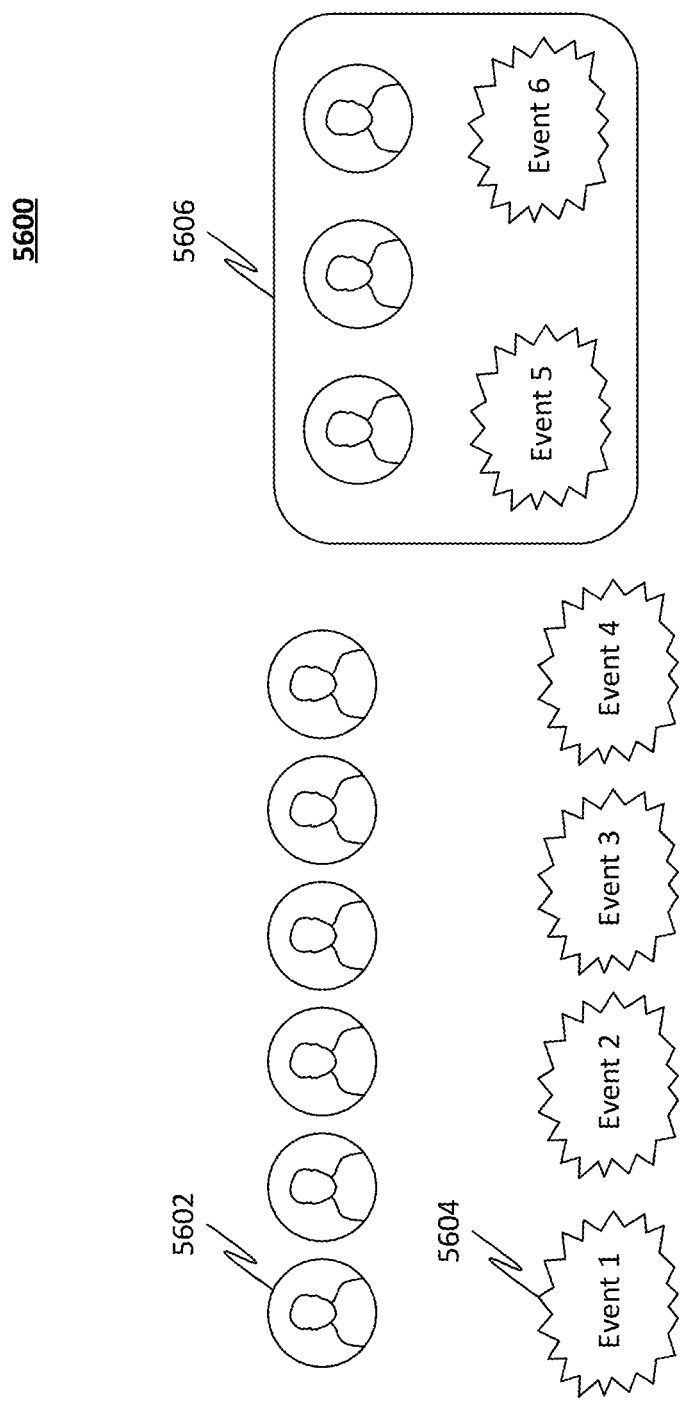
FIG. 56 illustrates a screenshot of a User interface for facilitating social networking based on events depicting a User interface for enabling a User to select at least one date and at least one event, in accordance with some embodiments.

Further, the method may include a stage 4314 of receiving, a selection of one or more of an event and a date. For example, as illustrated in FIG. 56, the User may be presented with a User interface (GUI) 5600 comprising the plurality of dates 5602 and the plurality of events 5604. Accordingly, the User may be able to select one or more dates by clicking and/or selecting dates 5602. Similarly, the User may be able to select one or more events by clicking and/or selecting events 5604. Additionally, in some embodiments, the User interface may include a drop zone 5606. Accordingly, the User may be able to perform a drag operation on one or more of the plurality of dates 5602 and the plurality of events 5604 into the drop zone 5606.

Furthermore, the method may include a stage 4316 of presenting one or more of the prioritized plurality of dates and the prioritized plurality of events based on the selection of one or more of the event and the date.

Figure 55:
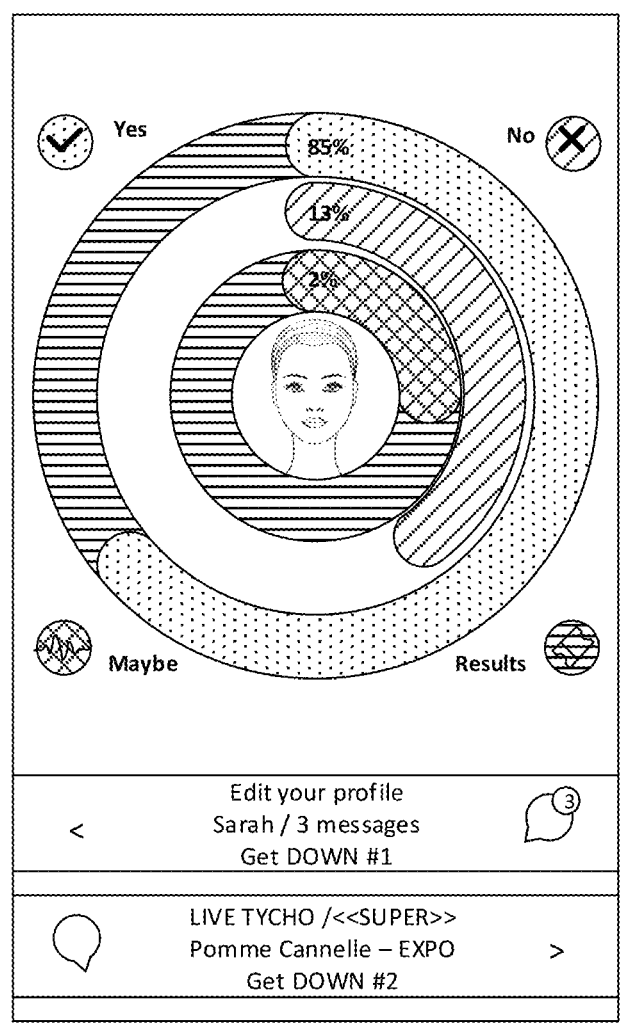
FIG. 55 illustrates a screenshot of a mobile app for facilitating social networking based on events depicting aggregated date-interest indicator of a user, in accordance with some embodiments.

In some embodiments, the method may further include presenting three date-interest-GUI elements characterized by three colors for each date of the plurality of dates. Further, the three colors correspond respectively to approval, disapproval and possibility. Further, receiving the plurality of date-interest indicators may include receiving an interaction with one of the three date-interest-GUI elements from the user. For example, as illustrated in FIG. 55, the User may be presented with User interface 5500 with User interface elements "Yes", "No" and "May be" corresponding respectively to approval, disapproval and possibility to be associated with a date of the plurality of dates.

Figure 50:
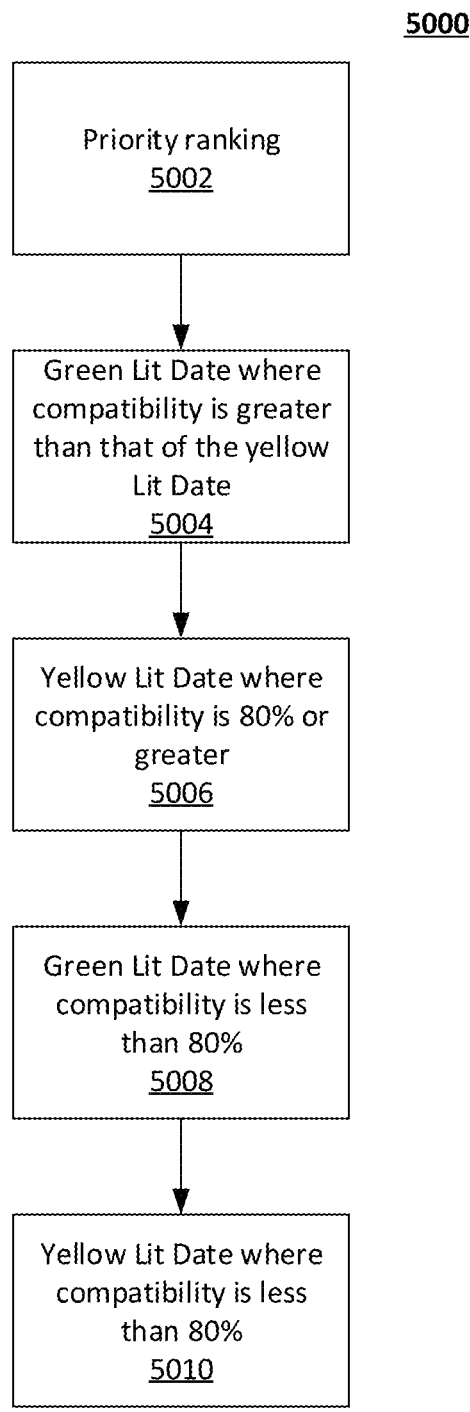
FIG. 50 illustrates a flowchart of a method of facilitating social networking based on events comprising prioritization of dates using compatibility, in accordance with some embodiments.

In some embodiments, the method may further include presenting three event-interest-GUI elements characterized by three colors for each event of the plurality of events. Further, the three colors correspond respectively to approval, disapproval and possibility. Further, receiving the plurality of event-interest indicators may include receiving an interaction with one of the three event-interest-GUI elements from the user. For example, as illustrated in FIG. 50, the User may be presented with User interface 5400 with User interface elements "Yes", "No" and "May be" corresponding respectively to approval, disapproval and possibility to be associated with an event of the plurality of events. Further, each of "Yes", "No" and "May be" may be characterized by different colors.

In some embodiments, the method may further include: generating an aggregated date-interest indicator for the date based on aggregating date-interest indicators associated with the date received from a plurality of users; and presenting the aggregated date-interest indicator associated with the date to the user. For example, as illustrated in FIG. 55, the aggregated date indicator for the date may be graphically rendered, using for example, concentric circular segments with peripheral lengths corresponding to a quantity of associated interest indicator. For instance, as shown, 85% of users provided approval, 13% of users provided disapproval and 2% of users provided a possibility of dating the date. Likewise, in some embodiments, a similar graphical rendering may be performed to depict an aggregated event-interest indicator for an event, as exemplarily illustrated in FIG. 50.

In some embodiments, the method may further include presenting a plurality of points indicator corresponding to one or more of the plurality of events and the plurality of dates. Further, a points indicator corresponding to one or more of an event and a date represents a number of points to be expended by the User in association respectively with one or more of attending the event and inviting the date.

In some embodiments, the method may further include determining a location of the User using a dongle configured to be attached to a mobile device of the user. In some embodiments, the dongle may be further configured to provide backup power to the mobile device.

Figure 44:
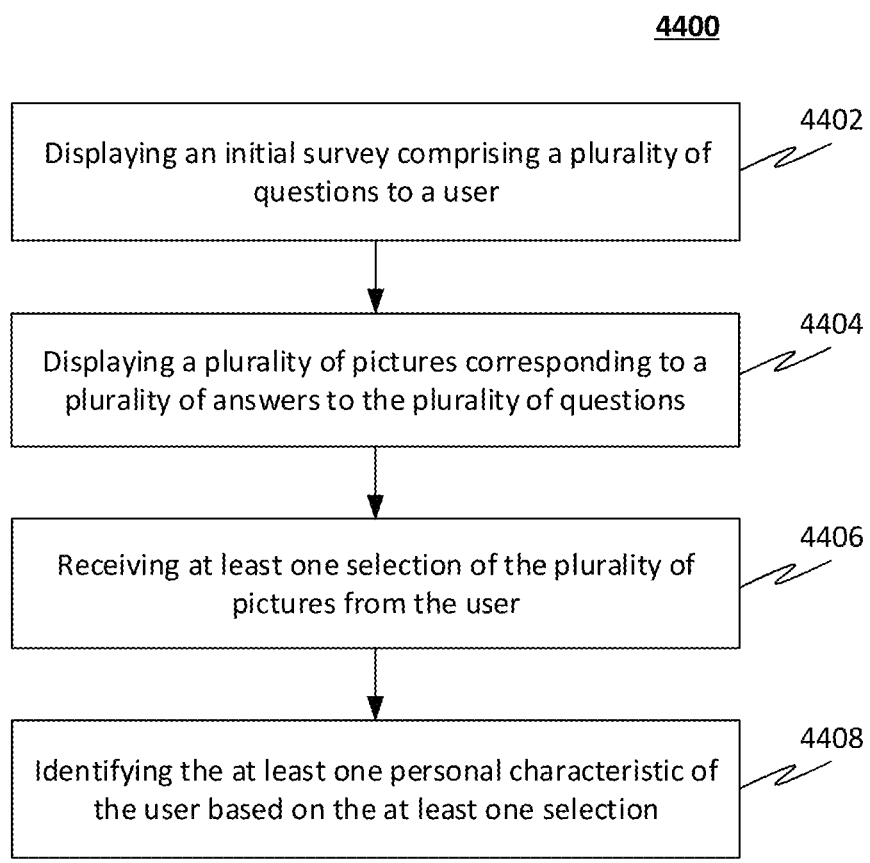
FIG. 44 illustrates a flowchart of a method of facilitating social networking based on events by identifying personal characteristics of a user, in accordance with some embodiments.

FIG. 44 illustrates a flowchart of a method 4400 of facilitating social networking based on events by identifying personal characteristics of a user, in accordance with some embodiments. In some embodiments, the stages of the method 4400 may be performed in addition to the method 4300. Accordingly, the method 4400 may include a stage 4402 of displaying an initial survey including a plurality of questions to a user. Further, the method 4400 may include a stage 4404 of displaying a plurality of pictures corresponding to a plurality of answers to the plurality of questions. Additionally, the method 4400 may include a stage 4406 of receiving at least one selection of the plurality of pictures from the user. Further, the method 4400 may include a stage 4408 of identifying the at least one personal characteristic of the User based on the at least one selection.

Figure 45:
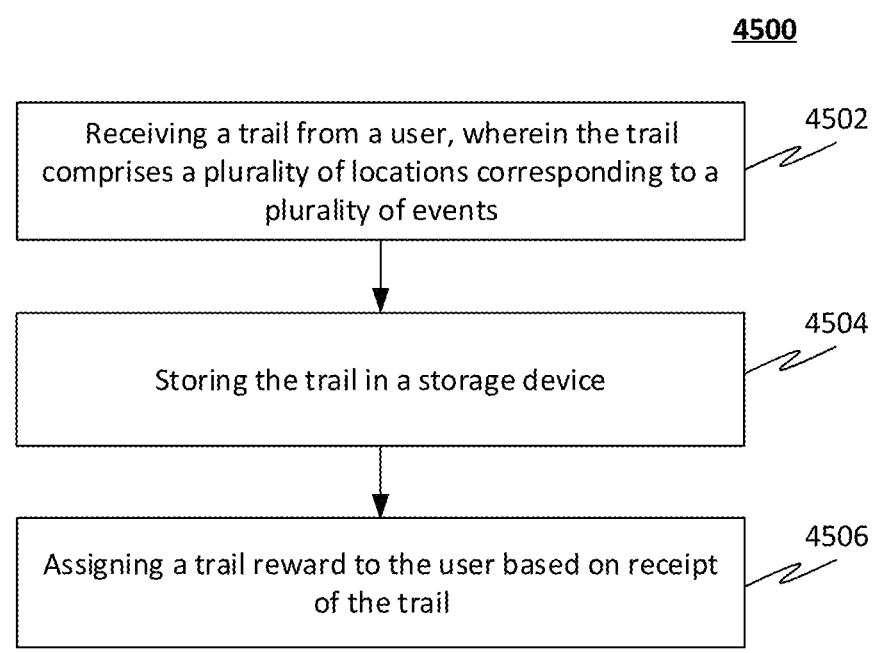
FIG. 45 illustrates a flowchart of a method of facilitating social networking based on events by monitoring event trails of a user, in accordance with some embodiments.

FIG. 45 illustrates a flowchart of a method 4500 of facilitating social networking based on events by monitoring event trails of a user, in accordance with some embodiments. In some embodiments, the stages of the method 4500 may be performed in addition to the method 4300. Accordingly, the method 4500 may further include a stage 4502 of receiving a trail from a user. Further, the trail may include a plurality of locations corresponding to a plurality of events. Additionally, the method 4500 may include a stage 4504 of storing, the trail in a storage device. Further, the method 4500 may include a stage 4506 of assigning a trail reward to the User based on receipt of the trail.

Figure 46:
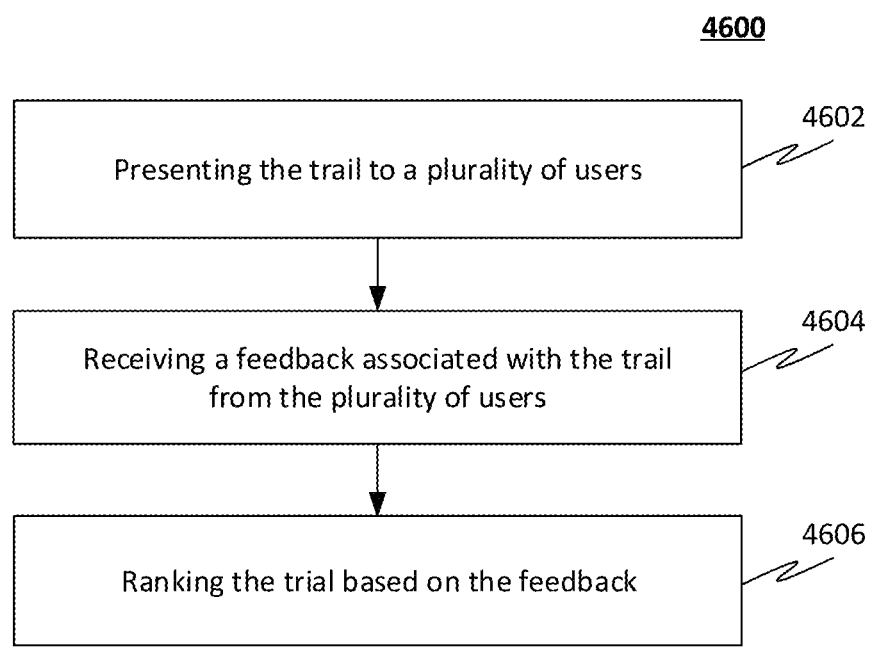
FIG. 46 illustrates a flowchart of a method of facilitating social networking based on events by ranking event trails of a user, in accordance with some embodiments.

FIG. 46 illustrates a flowchart of a method 4600 of facilitating social networking based on events by ranking event trails of a user, in accordance with some embodiments. In some embodiments, the stages of the method 4600 may be performed in addition to the method 4300. Accordingly, the method 4600 may include a stage 4602 of presenting the trail to a plurality of users. Additionally, the method 4600 may include a stage 4604 of receiving a feedback associated with the trail from the plurality of users. Furthermore, the method 4600 may include a stage 4606 of ranking the trail based on the feedback. In some embodiments, assigning the trail reward may be further based on the feedback associated with the trail.

Figure 47:
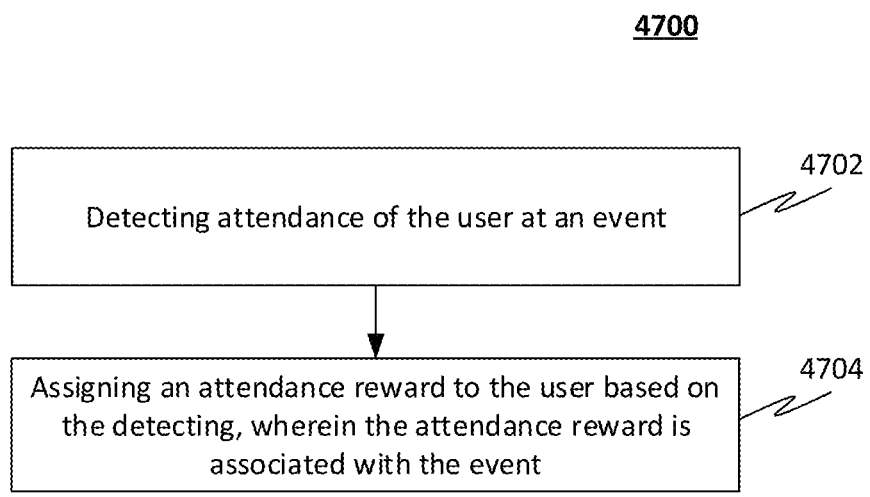
FIG. 47 illustrates a flowchart of a method of facilitating social networking based on events by detecting event attendance of a user, in accordance with some embodiments.

FIG. 47 illustrates a flowchart of a method 4700 of facilitating social networking based on events by detecting event attendance of a user, in accordance with some embodiments. In some embodiments, the stages of the method 4700 may be performed in addition to the method 4300. Accordingly, the method 4700 may include a stage 4702 of detecting attendance of the User at an event. Further, the method 4700 may include a stage 4704 of assigning an attendance reward to the User based on the detecting. Further, the attendance reward may be associated with the event. In some embodiments, the attendance reward associated with the event may be based on a type of event. In some embodiments, the attendance reward may be further based on one or more of an engagement rating received from the date, a frequency of events attended and a number of events attended.

Figure 48:
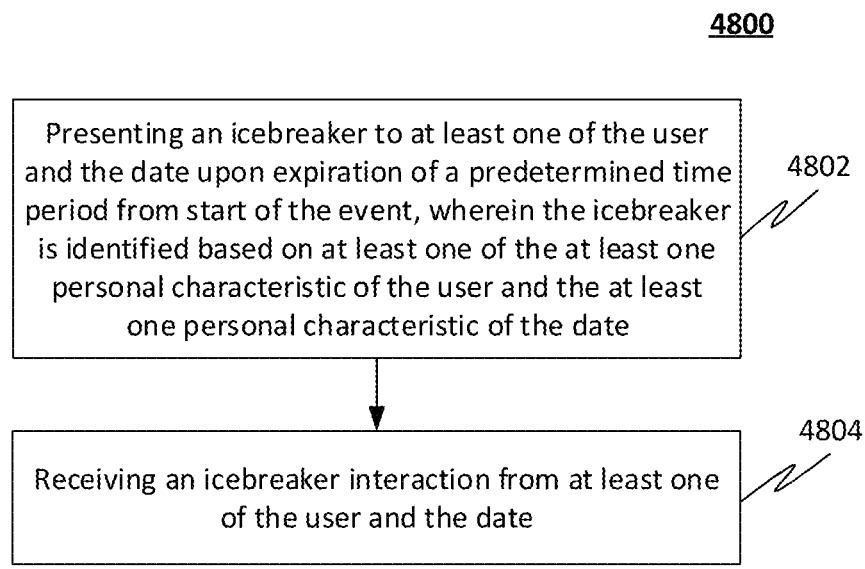
FIG. 48 illustrates a flowchart of a method of facilitating social networking based on events by presenting an icebreaker to a user, in accordance with some embodiments.

FIG. 48 illustrates a flowchart of a method 4800 of facilitating social networking based on events by presenting an icebreaker to a user, in accordance with some embodiments. In some embodiments, the stages of the method 4800 may be performed in addition to the method 4300. Accordingly, the method 4800 may include a stage 4802 of presenting an icebreaker to one or more of the User and the date upon expiration of a predetermined time period from start of the event. Further, the icebreaker may be identified based on one or more of the at least one personal characteristic of the User and the at least one personal characteristic of the date. Additionally, the method 4800 may include a stage 4804 of receiving an icebreaker interaction from one or more of the User and the date.

Exemplary Embodiments

The present disclosure provides an application that synchronizes the compatibility profiles of an in-depth dating service, the indulgence of a rating system in a hook-up application, the independence of a perfectly tailored Event planner and the fast-paced sophisticated procedure of the prefect orchestrator within a personalized intricate data network, streamlined operating system, the revolutionary manipulation reels to organize a perfect Outing and the impossibility of rejection. All built upon four individual revenue streams woven into an extensive system to personalize every experience to each individual User in very little time on any budget.

The present invention combines the need for compatibility with the inclination for desirable company in a fully functional, in-depth active dating environment in conjunction with their own Ticketing Agency, owned and operated by the present invention's managing authority.

No existing system has been able to create a sophisticated human connection service that combines in-depth compatibility with the fast-paced 'just for fun' applications. The present invention's active dating environment is a revolutionary way to connect people by creating a system that gets Users out and actively enjoying social events with congenial company. The present invention's system makes it easy for Users to find exciting Events and plan Outings with ease, by focusing on the Outings and allowing pre-determined User compatibility to ensure that rejection is no longer looming over every attempt to enjoy great events.

Herein follows an overview of the present invention's major steps and processes. A more detailed list and associated descriptions follow after these.

The list follows: An electronic (Smartphone) device capable of downloading the present invention's application with Bluetooth technology, WiFi or Data Network connection, Signup and ensure proper log in, Creation of a profile in the present invention's sign-up page with Information and Photographs required, an Intake survey, Complete tutorial explanation and event promos, complete Mood Gauge Points, Select desirable Dates and Events in the HomePage Map, Gameplan Icon Filtering System, Evaluate Dates in the present invention's ArmCandy Page or Homepage Map, RYG Tech. system, Evaluate Events in the Outings Page with check, heart, x, Select Date(s) and Event(s) in Gameplan Page, Drag & Drop Zone Tech, Finalize Outing. Pricing, 30% increase), Metered Dates, Multiple Dates, Send invitation with push notifications metered notifications with multiples, Send confirmation with 2 hour time advance explanation, Send Reminders with time notifications and tardiness, Time, Duration, Location, Outing Begins, Icebreakers are initiated, Check-ins are initiated, Leave Date early, Outing radius & Bluetooth local, Evaluations and Additional Surveys &points, Profile Page, Star Rating, Point Rating for Dates, Point Bank for all, Cancel Toggle, User's Profile collects information, User's Profile is linked and categorized, Compatibility system gains specify the present invention's Network, Promotion of certain Events and Dates becomes accurate and more frequent Common Outings, combine personal with interest compatibility, create trails, create zones or events and impact Feedback loop rewards User's for Using gains points for spending points, Promotions for great Users to become a date, belt-level impacts Promotional Events and Discounts, Promotions for excellent Dates, Meters, higher point value, more frequently filtered, Solo-mode available, Cash out points, affiliated partnerships % profit, Ticketing Agency an asset, SYSTEM, Mobility and TECH FUNCTIONS, Sync Accounts, and Verification.

Herein follows a brief overview of the Setup and login process.

User may download the present invention's application onto a Smartphone or other mobile device capable of supporting the program and the Bluetooth technology it requires. This application requires connection to a 3G, 4G, LTE or WiFi to connect to the present invention's Network. In the invention's embodiment, the download is free; other embodiments may utilize some form of payment.

Once downloaded the first screen may show a "LogIn or Signup" Pop-up superimposed over the present invention's background. The User may enter in a valid email address less than or equal to 255 characters long following a pattern of _____@_____._____, User's first name, User's last name, a password that is different than all other submitted information and their date of birth which is a past date greater than or equal to 18 years prior to the current date. If the User has satisfied all of this information, then tap "LogIn". If the login is successful, then the server should send a Web Token in its response. This token may then be used for further communication with the server. Almost All API requests thereon may require this Web Token to be provided in its request, otherwise the request may fail and prompt the message "Email or password incorrect". Once the User has finished the initial Sign-up a short survey may be prompted to begin development of the User's Profile. The 'Initial Survey' is a short five question survey, which displays a series of photographs as the potential options to best describe User's answer to each of the five basic questions. The answers to the survey may begin categorizing the User's perceived personality, interests and intentions. This Photo-testing strategy is a window into the active dating intentions to keep the User engaged and interactive in the present invention's approach to social Outings. Once the initial survey has set some parameters for the User's Profile, page may re-direct to the present invention's application Homepage Map to begin the tutorial. The tutorial may give a quick interactive overview of the application including highlighting the point balance on the screen and the Homepage Map. The present invention's application utilizes the purchase and exchange of points. Every User may be given an initial 500 points and therefrom MUST have a minimum balance of 500 points at all times. These points are purchased for 9.97 points per $1.00 and are used to distinguish different Dates, Events, Promotional Items, Ticketed Events and services provided by any affiliated companies. The Points are Used, Gained, Rewarded by Point Exchange within the application in a simple smooth transition. Once the Tutorial is completed the User may be asked to select an accurate profile picture, which must be a photograph of their face to complete the sign-up process. It may be requested that all Users and Dates verify all of the photos submitted to avoid misleading anyone and ensuring proper representation. With all of the sign-up procedures completed the User is now ready to use the Homepage MAP. The present invention's Homepage Map is an interactive map that embodies the available events, trails, zones, and Dates. As the User travels through a city, different Icon interactions may present on the Interactive Homepage Map. Events, trails, zones, and Dates within User radius may be prompted, in accordance with the User's Location, Belt-Level, Points available, Event Attendance, Friends and Allies. By taping one of the mood gauge filtration Icon options the User may be taken to the Homepage Map where all profiles and Events that appear are pre-filtered to compliment any information known about the User and their preferences. Initially, the only information may be from the short 'Initial Survey' during the Sign-up procedure, as the User begins using the application, more information on their preferences may be collected and the results may continue to be filtered and sorted to meet their desires. This is the 'User's Profile' within the present invention's System that orchestrates the present invention's Network. The Homepage Map is consistent of a system of icons. Use of an iconic language illustrates User progress by way of color, shape, shade, movement, dimensionality, and form. The aforementioned iconic values are accessible by tapping a genie bottle button that reveals interactive Icon Screen that filters or modifies the results of your event based upon which icons are selected, pre selected, and de selected. The Gameplan Icon screen may superimpose over The Homepage Map until the modification process is complete, icons that are active may be color filed non active Icons may remain in black and white.

In an instance, as the User progresses through challenges, trails, Outings, and events, corresponding Belt-Levels with different colors may be displayed indicating progress to the User. The application on Homepage Map associated icons may match the color of the associated Users Belt-Level as follows:
1. White Belt=Turquoise Belt Icons Sync
2. Yellow Belt=Yellow Icons Belt Sync
3. Orange=Orange Icon Belt Sync
4. Purple=Purple Icon Belt Sync
5. Green=Green Level Belt Icon Sync
6. Blue=Blue Level Icon Belt Sync
7. Brown=Brown Level Belt Icon Sync
8. Red=Red Level Icon Belt Sync
9. Black=Black Level Icon Belt Sync Further, female users may obtain Ribbons of various colors, representative of levels, such as Bronze, Silver, Gold, Platinum and Black Diamond. Likewise, male users may obtain Bowties such as Bronze, Silver, Gold, Platinum and ONYX respectively from the first bowtie attained to the last Bowtie attained.

The Ribbons or Bowties may represent the notches or degrees of accent towards next Belt-Level. Further, within the application, each interaction may be reinforced by gradually evolving color, luminosity patterns, translucency, volumes, forms, dimensionality, perspective, level and facade.

Additionally, the following non-Gameplan Icons corresponding to various categories may be provided.
Main Decision Based Icons
   1. Checked
   2. Dismiss
   3. Hearted
   4. Little Check
   5. Plus/Addition Add
Action Based Icons
   6. Payment Joux Diamond
   7. Discover/Search Events
   8. Invite Friends
   9. User Belt or Ribbon Status
   10. Memories
   11. Cash Out
   12. Trail
   13. Trail Suitable
   14. Download
   15. Upload
   16. Edit
Personal Profile Icons
   17. Your atom
   18. Your Rating
   19. Notifications
   20. Stats
   21. Block Days
   22. Radius
Main Toggle Icons
   23. Homepage Map
   24. GamePlan Icon
   25. ArmCandy Icon
Internal Filter Icons
Mood Gauge
   26. Active
   27. Relaxing
   28. People
   29. Surprise me
External Filters
Icebreaker Icons
   30. Would You
   31. Improve
   32. Hot or Cold
   33. Questions
   34. Never Have I Ever
Switch on off Icons
   35. Metered Date
   36. Date
   37. Solo Mode
Communications
   38. Invitation
   39. Messages
   40. Friends
   41. Ally
Indication
   42. Timeline
   43. Save
   44. Save email Additionally, the following Gameplan Icons may also be provided:
   1. Restaurant
   2. Cafe
   3. Movie/Theatre
   4. ChillSpot
   5. Recreation
   6. Events (Tickets Required)
   7. Group
   8. Exposition 9. Lounges
10. Sports
11. Relax
12. Activity
13. Happening (Random Events) (User Organized Events)
14. Concerts
15. Nature (Hiking & Walking Trails)
16. Club/Party (Bottle Pop)
17. Monuments
18. Workout
19. Beach (party)
20. Extreme (Rock Climbing, Sky Diving, Motor X, At Your Own Risk)
21. X-Club (subscription) e.g. Muscle Car Club, Yoga Club Basketball Club etc.

All Icons displayed on the Homepage Map represent a potential interaction; icons within Homepage Map are accessible by tapping whereupon a larger more descriptive representation may ensue. The image of a Date Ally or Friend may be displayed within User radius; User Icons may be accompanied by button color values that indicate desired level of interaction, if pressed. By tapping Date, Friend or Ally Icon, a larger more descriptive representation may ensue. In the case of the potentiality of a Date in the Users Homepage Map, Dates can be added to a Users current Outing or User may initiate an interaction with Date and Outing concurrently tap button indicating level of interest. A User selects a Profile photo by taping the image once the User may be redirected to the present invention's Page where a larger version of the photo may be visible above Red, Yellow and Green blocks from left to right respectively. The Date's Name may be listed along with a points evaluation of how many points Users needs to invite Date to an Event and three small dots beneath the photo to browse the other two, preferably verified photographs by sliding a finger over them to switch between the three photos, Profile, Fullbody and Choice. If Date has a Meter, then a Gold written word "Meter" may be present in the Bottom corner. The User may then have the opportunity to just simply tap the color to rate the Date with their finger and image may 'swipe' in respective direction.

Herein follows an overview of the unique rating system. This is the revolutionary Red, Yellow, Green Light rating system unique to the present invention's System. The light system selections are incorporated into the User's Profile along with any collected patterns of usage regarding common interests of 'HEARTed' Events and Survey information, frequency of activity, and social circles to determine most suitable matches. By creating the 'light system'. The present invention's has introduced a revolutionary way to organize users' preferences with "yes" "maybe" and "no" as opposed to just "yes" and "no" which opens the platform for the system to combine aesthetic preferences with natural compatibility to create the most appealing scenario possible —rather than completely denying people (RED) you may share high compatibility with. If User has 80% shared preferences and interests with a Yellow Lit Date, then Yellow Lit Date may supersede Green Lit Date in GamePlan Date Reel Unless Green Lit Date is superior in compatibility to Yellow Lit Date ALSO. These preferences and interests are determined by events 'hearted', Location, Interests, Intake survey, additional surveys, and IceBreakers 'hearted' or answered similarly then the system filters the priority to the most compatible combination of desirability and interests.

If User selects the Genie Bottle Toggle in mid right corner of the Homepage MAP then Gameplan Icons may pop up allowing the User to filter different categories of events, Outings, and zones of interaction in city. If User is on an Outing then, the User may be redirected to the Outings Page. The Outings Page is a verified photograph of an Event, displayed through a horizontal reel that displays the procession of events to be scrolled horizontally by dragging a finger over the screen. An indicator for time may be displayed below the horizontal procession of events. The upper two thirds of the Outings Page is the Interactive Map displaying Location of the Event determined by the present invention's Bluetooth location system, the Points required to attend the Event and at the bottom are "Check", "heart" and "X" icons to signify "attending", "like" and "dislike" respectively when tapped. The rating of events increases the information known about the User and the User's Profile System begins to Filter and Categorize with a better specificity for compatibility with other Users.

When a User Green or Yellow Lights a Date and/or Checks or Hearts an Event User is redirected to the Gameplan Page. The Gameplan page is two movie reels horizontally parallel across the screen above a third, smaller reel at the bottom. The top reel scrolls horizontally across by dragging a finger over the screen to display Events that have been 'Liked', 'Hearted' or Suggested by the present invention's filtering system. The bottom reel scrolls horizontally across by dragging a finger over the screen to display Profiles that have been Green or Yellow lit, depending on compatibility or Event selection. Next, User may drag and drop the Event(s) and Profile(s) into the Bottom "Final" Reel by pressing one's finger to the screen over the image of Event or Profile, and sliding the finger down to the slot on the bottom. As the images are added to the bottom reel the "Points" tab may increase respectively to the necessary points required for the selections. If User requires more points, then pop-up may signal the User to purchase more in order to finalize the Outing. If User selects multiple Dates for one Outing, Dates may receive Meters automatically.

A Meter is applied to any Date that has confirmed an invitation to an Outing with Multiple Dates or has High Point rating, Star Rating, Green Lights and qualifies for a Metered-Date Incentive Promotion. The meter allows for Dates to gain W % of their Point Value for every hour of the date as opposed to gaining a base sum of points based on the point evaluation. If a metered Date confirms within 24 hours of the Invitation before the 2 hour cut off, then User may be charged a metered rate for the Duration of the Date unless the Date 'turns the meter off' in Profile Page at Dates discretion. Outings can be cancelled Prior to the 2 hour cut off in the Profile Page where a Cancel Toggle is located or If either Date or User is unsatisfied with the Outing can be Cancelled with Cancel Toggle in Profile Page to Leave Outing early, Points division and Reimbursement may be adjusted by the present invention after Ratings and Evaluations are completed The present invention's Ticketing Agency is significant in the Applications self-sufficient system as it aids in the Solo Mode, Promotional features, Incentive Rewards and a simple way to engage people in the present invention's System to gain compatibility and find people with common interests in trending Events. The present invention's system Groups and Categorizes the present invention's Network into compatible streams and promotes both trending Events and pre-filtered selections. Once an Outing is selected and Dropped into the Drag & Drop Zone then an invitation is sent to the Date(s) in the form of a Push Notification. The first Date to confirm within the appropriate time frame may be finalized in the GamePlan Reel should the User satisfy all expectations. If Date missed the Invitation Push notification then Date can find all Invites Above the Past Outings in the Past Outings tab in their Profile Page, Reminders may be sent as push notifications to User and Date, and The GamePlan Page may be converted into an Outing(s), Itinerary once Confirmation and Finalization is completed. Once Outing(s) have begun Appropriate Push Notifications may be initiated for connection assistance: IceBreakers and Safety: Check-ins, Outing Radius and possible dissatisfaction: Tardiness, Cancellations, Early finish. Upon Date completion Evaluations may be prompted via Push Notification to help the present invention's System reevaluate the Date or User's Profile, compatibility, relation to other the present invention's members, Incentive Rewards, Points, Point Rating, Star Rating, Promotions for either Date or Users to continue to develop the most personalized experience possible for the present invention's member by pre-establishing filters and respective categories.

SoloMode is the ability for a User to Purchase Tickets for Events shown in the Outings promotion of trending Events in the present invention's Application, Ticketing Agency in the present invention's HomePage. Promotional Events and Discounts are Ticketed Events or deals negotiated with any affiliated partnerships for present invention's Members to engage in the Incentive feedback loop for rewards and benefits.

Point Value may appreciate or depreciate as the present invention's User or Date remains active in the present invention's Network Depending on the Ratings. Any User or Date can cash in their points after the 500 mandatory/complimentary point balance whenever.

Herein follow details on the partnership proposal. The present disclosure provides a Social Enhancement application with revenue streams unlike any other dating app seeking partnerships with companies such as, ridesharing platforms, StubHub, BottlePop, and restoration.

As a result of these partnerships, users may have instant access to a wide variety of options to amplify the ArmCandy experience. These partnerships may establish the connections necessary to make ArmCandy more hospitable to the users by creating better access to numerous restaurants, nightclubs, lounges, bars and special events in the local area while offering incentive rewards and promotions to the User. The ArmCandy App has an intricate points system to encourage users to utilize these additional aspects and in return earn points back that can be translated to rewards and/or cash.

Partnerships with StubHub, BottlePop, Menu, and Uber may enable ArmCandy to create a mutually beneficial agreement to provide ArmCandy Users with the optimal experience and in return bring traffic to these companies.

Stubhub, BottlePop, and Uber may include open APIs which may facilitate integration of interfaces.

The present invention seeks these partnerships to be better equipped for users by having instant access to a wide variety of options to amplify the present invention's experience. These partnerships may establish the connections necessary to make the present invention more hospitable to the users by creating better access to numerous restaurants, nightclubs, lounges, bars and special events in the local area while offering incentive rewards and promotions to the User. The present invention's Application has an intricate points system to encourage users to utilize these additional aspects of the application and in return earn points back that can be translated to rewards or cash.

The present invention seeks partnerships to establish a solid foundation of connections within applications. To utilize and unify with other applications may create a lasting relationship with users, bring traffic to the applications, and secure a lasting foundation with these partnerships.

In the present invention a matchmaking system comprises of: a User Initial SignUp process, a Points System, a DNA Rating System, a Cancellation process, a Home Page Map, an Outings Page, a Shared Event Preference process, the present invention's main page, a set of Green/Yellow Light Properties, a set of Red Light Properties, a Meter process, a Helpful Hints GameCenter process, a GamePlan Page, a API UX, a Spending Gauge, a Belt-Level System, A GamePlan Icon Screen, a Location Radius process, a Profile Page process, an IceBreakers process, a Bluetooth Technology process, a Mapping process, a Calendar process, a Requests process, a Push Notifications process, a Solo Mode process, an All Percentages process, a Compatibility process, a Partnerships process, an Invitations process, and a Help process. In addition, there are optional hardware components, including a retrofit dongle, a customized phone case and an AC GNSS system which ties into many of the aforementioned components.

Notably, many of these components and processes are comprised of other subcomponents/sub-processes, which may be described in detail later this disclosure.

Figure 51:
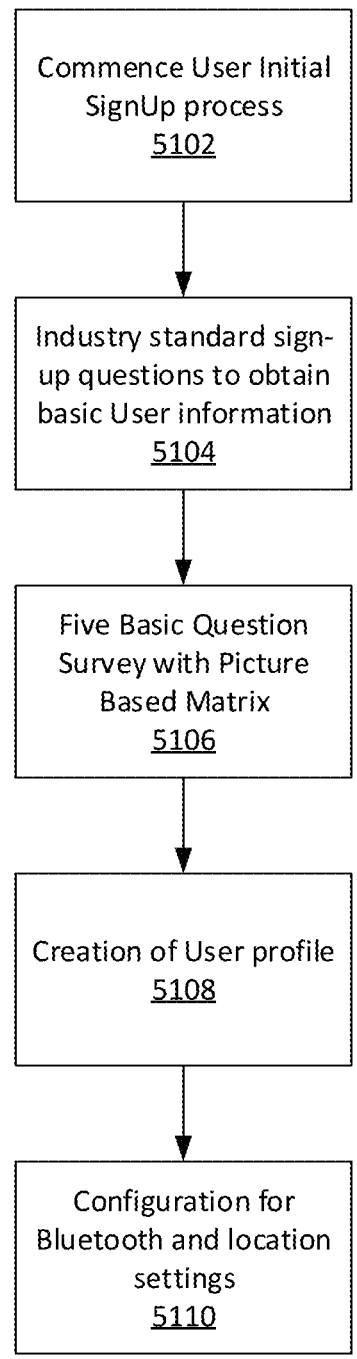
FIG. 51 illustrates a flowchart of a method of facilitating social networking based on events comprising a set-up phase, in accordance with some embodiments.

The first major component/process of the present disclosure provides the User Initial SignUp process. This is depicted in FIG. 51. The signup process commences at 5102. First, this process may ask standard sign-up questions (5104). Fields involved may include but are not limited to: First/Last Name, Gender, Date of Birth, Request for location services on Bluetooth, etc. The process may also request a Verified photograph of the User's face.

In the invention's preferred embodiment, there may also be A Five Basic Question Survey with A Picture Based Matrix of two rows of three displaying various pictures (stage 5106). These questions are set to determine basic preferences and personal characteristics of Users (stage 5108). There may be questions including but not limited to: "What would be your ideal date?" written above 6 pictures describing the possible answers such as a photograph of people dancing with "somewhere to dance" superimposed over the image. In the invention's preferred embodiment, this intake survey is 5 questions long and focuses on keeping the present invention's procedure simple and interactive.

The "User's Profile System" is a collection of information and patterns relevant to classifying and categorizing the User into certain groups of interest, likes, personality traits, and spending gauge.

The location settings and Bluetooth must be on to determine the appropriate radius for the present invention's Network to pull from (stage 5110).

Figure 49:
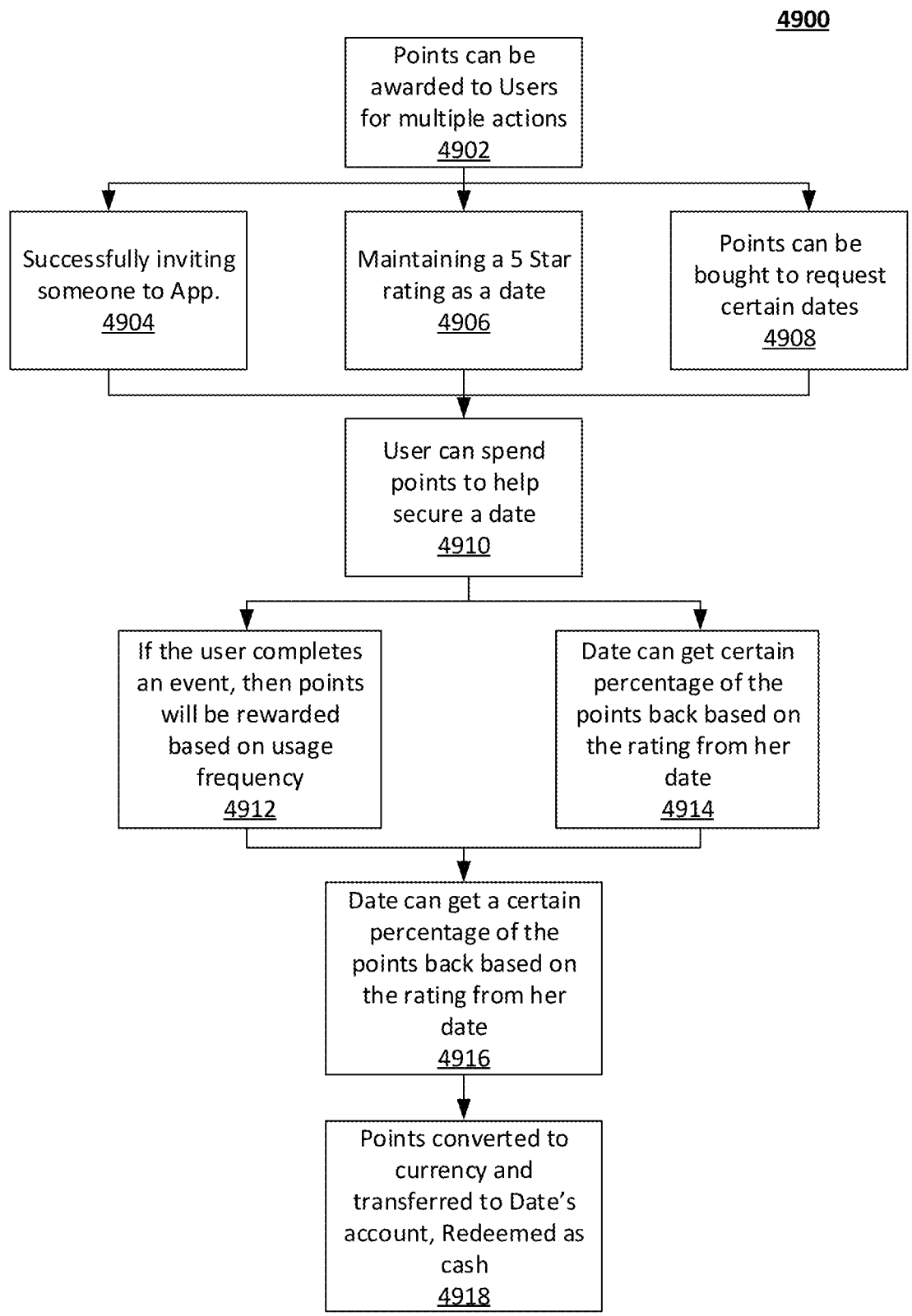
FIG. 49 illustrates a flowchart of a method of facilitating social networking based on events comprising management of points associated with a user, in accordance with some embodiments.

A further component/process of the present disclosure provides the Points System process. This process provides one of the key unique functionalities of the present invention. This is depicted in FIG. 49.

Points can be awarded to Users for multiple actions (stage 4902). These actions include but are not limited to:

Attending Events: If the User attends an Outing, a portion of points may be rewarded back to the User.

Successfully inviting someone to App (stage 4904). This is worth 50 points in the invention's preferred embodiment.

Maintaining a 5 Star rating as a Date (stage 4906). Quality is important and points may be rewarded to the Dates who get perfect ratings.

Using the platform's Partnerships. The present disclosure provides partnering with other companies to create a large Social Outings network with the ease of having everything arranged into a single application. If the User is utilizing the services offered through affiliated companies, then a portion of the points used may be rewarded.

Points can be bought to request certain Dates (stage 4908). Subsequently, the User can spend the Points to help secure a Date (4910). Points cannot be received by merely selecting a Date, for either the User or the User's Date.

No points are required to attend a Ticketed Event, because the present invention application has its own Ticketing Agency. The Ticketed Events can be bought on a monetary basis.

Each event is worth a different amount of points. Points can be returned to User based on Event & Outing expense. Users who regularly attend high caliber Events or choose 3 events per one Outing should never have to Purchase more points, unless User(s) are always attending Outings with 'Metered' Dates or multiple Dates simultaneously. This would increase the spending beyond the points rewarded credit.

High Caliber events or "complex" Outings, defined as 3 events or more, may award the User with more points. Then the User should not need to purchase more if the points awarded cancel out the additional points needed, i.e., if the Date is note metered, etc.

All Users start with '500' points upon signup. Points can be cashed in by Users & Date(s), as long as a balance of 500 points is maintained. Points are exchanged as 9.97 points for every unit of currency, or for every dollar 9.97 points; this entails there are 10.03 points for $1.00 on the exchange.

To reiterate, points can be 'cashed in' at any time so long as a 500-point balance remains.

If the User selects a Date above Users' budgeted "point range," then more points must be bought in order to send Push Notification to Date in GamePlan. Push Notifications are sent to Date(s) by User by double tapping the picture of Date Reel in GamePlan. Notably, the budgeting filter includes Events and Dates 30% above the budget maximum.

If the User selects a Date within point range but does not have the points to satisfy the Date(s), then the User must 'pre-authorize' the total points needed to satisfy the Dates required points and the Meter. Notably, "Meter" only applies to Metered Dates within 30% of Users averaged spending. Should the Date accept, the additional points must be purchased by the User to finalize the Outing.

A popup notification may show up upon the Users' double-tap on the Dates' image in the Gameplan page. "Oops! [DATES NAME] meter is 559 points. Click 0 to get more points for your date tonight!" Alternatively, the User can select a different date.

If the User completes an event, then points may be rewarded (stage 4912). There are several results: Percentages of the total cost are rewarded to the User. Frequent Users get better rates. Users who create full 3 event Outings get better rates. Users who invite multiple Dates get better rates.

In addition, the following rules may be provided:
IF User attends 1 Event per Outing THEN User recovers 2.5% of Points Spent ELSE unless Date is metered.
IF User attends 2 Events per Outing THEN User recovers 5% of Points Spent ELSE unless Date is metered.
IF User attends 3 Events per Outing THEN User recovers 7.5% of Points Spent ELSE unless Date is metered.
IF User attends a Select Event or Outing THEN 10% of points spent are recovered ELSE Unless Dates are Metered.
IF User attends 2 Select Events in One Outing THEN User recovers 12.5% of Points Spend ELSE Unless Date is Metered.
IF User attends 3 Select Events in One Outing THEN 15% of Points Spent are recovered in Joux.

If Date engages in an event, then points may be awarded to the Date based on percentage of satisfaction (stage 4914, 4916).

Dates that receive a 5-star rating may receive 15% of points gained from Outing.

Herein follows the formula used in the invention's preferred embodiment:

Points*(0.15)=x   x+Points=Excellent Rating Bonus Points.

Notably in terms of variable definition, "x" stands for Points recovered from User; these are not the actual amount of points. The process may perform a calculation of points and money spent. Events are $$. If Total Outings in the set of 3 or more are $500 then 300 points $300 for 3 Events=$330*0.15=49.5*0.10=495 Points.

Dates that receive a 4-star rating may receive 12% of points gained from Outing. The formula is: Points*(0.12)=x   x+Points=Excellent Rating Bonus Points.

Dates that receive a 3-star rating may receive 9% of points gained from Outing. The formula is: Points*(0.09)=x   x+Points=Excellent Rating Bonus Points.

Dates that receive a 2.5-star rating or less may receive 5% of points gained from Outing. The formula is: Points*(0.05)=x   x+Points=Excellent Rating Bonus Points.

If User or Date would like to receive monetary exchange for points then Date or User can cash in Points in profile, otherwise the Date(s) can use points towards "checked" Ticketed Events. Points can be converted into an account transfer or a credit to credit card on file conversion exchanged. As mentioned, in the invention's preferred embodiment, this is $1.00 for every 9.97 points: 10.03 points for every $1.00 cashed in.

If Date cashes out points, then amount may be converted to currency and transferred to account (stage 4918).

In the inventions' preferred embodiment, everyone may have a credit card on file verified through their Apple ID or similar service.

Metered Dates have the option to have a banking account set up and verified through secure online banking.

If Date utilizes points for events, then Date can attend event or Outing at a discounted Rate.

If Date receives Excellent averaged 5 star Ratings, then Date accumulates a higher percentage of Spending Gauge Outing points. This is shown in Point 9 above.

If the User requests a Date, then the points may not be taken until User clicks 'Finalize' in GamePlan and confirmation of that Outing is finalized in shopping cart.

If a User utilizes one of the partnerships available, then the User may automatically receive a minimum of 50 points.

The system must determine User from Date based on purchases, points spent vs.

points cashed in, and points used to acquire Dates/Users, request for Outings vs. Invitations for Outings.

The Application does not ask at sign up whether you would like to be a User or a Date.

Rather, the User's Profile information combined with the patterns of usage and the present invention's Network system to determine whether the person is behaving like a User or a Date.

A User is someone who uses the present invention's Application to coordinate Outings with other individuals using the Application.

A Date is someone within the present invention's Network whom is more likely to be invited out via the present invention's Application, the Date must also satisfy the requirements of the lights grading system.

If someone who is currently classified as a User begins to get invited to events, with good ratings, then the User could become classified as a Date as well.

If the User receives 70% or more Green Lights, then User automatically becomes a Date, should User choose to become Date.

If User receives 60% or more Invitations request for Outings, then User sends out via Push Notification and has 60% Green Lights then User becomes a Date.

If User has 60% Green Lights and successfully invites at least 10 people to the application, User becomes Date.

If User has 50% Green Lights and receives 20 or more invitations per week, User becomes Date.

If User has accepted an Invitation Outing Request and other User Finalize then User automatically becomes A Date for 24 hr Cycle.

If a User is invited to an Outing via the Arm Candy Application and Accept, then User becomes a Date and for the duration of the Outing application, may no longer send notifications specific to Users. As an exception, there may be Specials etc. or other forms of notifications still sent.

Any Date confirmed to attend an Outing(s) may be kept "unavailable" for the duration of the Outing(s), and as a result may disappear from the network of Dates for 2 hours prior to first event and 1 hour after the last event.

Also, any User Attending an Outing(s) as a Date may have their account converted to stop "promoting for Users" for the duration of the Outing(s).

Anyone who is extended the offer to go to an Outing with a User has the ability to Decline, whether currently classified as a Date or a User.

The three classifications, User, Date, Metered Date, are correct but there is plenty of room for lateral movement should the individual satisfy the requirements to be in the category of consideration.

If User receives 90% more points than User Spends, excluding reward system for attending events, then User automatically becomes a Metered Date.

If Date Red Lit User then Date may only show up In User(s) Date Reel, if Users' Spending Gauge is 30% more than what Date typically earns in Points or if User has 90% compatibility or more.

If Date is inactive 14 consecutive 24 hr Outing cycles or 14 days, then Dates points request value, points required for User(s) to finalize with Date, depreciates not points accumulated by 10% loop.

Inviting multiple girls out at once guarantees each of them a meter whether the Date(s) are usually a metered date or not. If a Date is usually a Metered Date, then Date does not earn a higher percentage because they are regularly on a meter.

If a User becomes a Metered Date then the Date must attend one Outing a week, have 65% Green Lights or more, have a rating 3 stars or above, 5 Green Lights per date, and have 3 or more invitation request per 24 hr cycle. This is unless accepted one of the first two requests, then the Date can retain the 'metered' status.

A further component/process of the present disclosure provides the DNA Rating System. Notably, ratings are not visible to the general public, only to the individual User in profile page. Date's ratings are the basis of how much a date earns from Outings.

Each Star is equivalent to 20%, thus 5 stars=100%. Everything is on a weighted scale. It may be helpful to think of each Outing as a class, factoring into GPA. Fields may include but are not limited to: timeliness, response to invitation, percentage of responses to invitations, and percentage of responses to invitations is equivalent to class attendance in school which factors into one big equation.

Every Rating is illustrated by a1-5 Star system per each category. There are 4 Categories for User(s) Rating Date(s) which are: Respect, Kindness, Loyalty, and Attentiveness. Alternative or future embodiments of the present invention may include other categories not explicitly listed here.

There are two Categories for Dates rating Users which are: Respectfulness, and Generosity.

There are no categories for Venues, Partnerships; there are just 1-5 Star Pop up i.e. Rate Venue.

If a Date receives Excellent and Superb 5 Star Rating from User, then Date earns a higher percentage of Spending Gauge.

If a Date averages 5 stars in all categories during an Outing then Date receives 15% of total preset Spending Gauge averaged with current Rating and Push Notification sent, Ex. "[USERS NAME] enjoyed the Outing".

If a Date averages 4 stars in all categories during an Outing, then Date receives 12% of preset Spending Gauge averaged with current Rating.

If a Date averages 3 stars in all categories during an Outing, then Date receives 9% of total preset Spending Gauge averaged with current Rating.

If a Date averages 2.5 or more stars in all categories during an Outing, then the Date receives 7% of total preset Spending Gauge averaged with current Rating.

If Date receives Inferior to 2.5 average stars, then Date receives 5% of total preset Spending Gauge and Push Notification is sent, Ex. "Uh-Oh you received a Low Rating".

Users & Dates may experience Rating Pop Up each time application is opened and may need to Rate for any further usage.

Date's Outing Ratings are averaged with Date's current Rating to determine point request value for future requests.

Dates can Increase their average Rating per the present invention's Application independent of Users by 2.5% (of Star Rating Scale) every time Date is on time. Date may be informed via Push Notification that Date has the option to increase their rating, an hour before first Outing, and on the 1st, 3rd, 6th, 12th, 24th, Outing, and every 6th Outing After.

Remind Date of the Outing 2 hours before first event. If Date is late send push notification prompting an "expected time of arrival" sliding meter above a "cancel' button.

If Date Cancels any later than 2 hours prior to the start of the first event, then the Date may drop in ratings. In the invention's preferred embodiment, two hours is the cut-off time for confirmation and cancellation without repercussion.

Push notification when User or Date arrives and prompts other for ETA. If ETA is reached and a no-show occurs, another ETA prompt is sent.

If 'Metered' Date accepts 33% of Invitation Requests from Users, then Date can Boost Ratings per the present invention's Application By 20% Averaged with Past Ratings.

If a metered Date is actively accepting at least ⅓ of invitations being sent, then the process may increase Date's ratings by the average of the past ratings with the current ratings by 20%. This is the average past ratings with current ratings increased by 20%.

If Date accepts 33% of Invitation Requests Date Receives from Users Date, can Boost Ratings per the present invention's Application By 20% Averaged with Past Ratings.

If Date is actively accepting at least ⅓ of invitations being sent, then may increase their ratings by the average of the past ratings with the current ratings by 20%. This is the average past ratings with current ratings increased by 20%.

If Date has 3 Consecutive Outings with Low Ratings, Less Than 2.5 averaged Star Ratings, then move to back of Dating pool queue and Date requires 10% less points loop.

Date may be at the end of the Dating Queue within the application. This is basically the back of the line of available Dates.

If Date receives frequent requests for Outings, then Date acquires 'meter' in the form of the present invention's logo in Gold signifying 'meter'.

If Metered Date has averaged rating below 3 stars and less than 5 Invitations per 24 hr Outing Cycle, then automatically remove meter.

Dates can increase their average Rating by 5% per the present invention's

Application by accepting User within 5 mins of the initial Push Notification from User to Date. The Date may be informed via Push Notification that Date has option to increase their rating by responding promptly.

When User is leaving a venue during Outing, then User can Rate the Venue with 1-5 stars via Pop up.

Else User does not rate each venue during the Outing then User may be prompted via Pop up notification to rate all Venues visited throughout the Outing. There is a 30 min delay before the Rating pops up after Outing has ended else next time application is opened.

If User is unable to rate the Venues at the time of the Pop up then User may be prompted to do so Next Time User Opens Application, before other use of Application. Display in the form of an Itinerary Receipt with all venue(s) and Date(s) is to be evaluated.

If User is leaving last Outing then User can rate Date Based on 4 categories via Pop Up, 30 mins after. User must Rate Date Next Time User Opens Application before any other use of application.

If User cancels Date while on Outing, Leaves Outing Early, then User may Rate Date based on 4 categories: Respect, Kindness, Loyalty, Attentiveness. Alternative or future embodiments of the invention may utilize other categories not explicitly listed here.

If Date Cancels while on Outing with User, leaves Outing Early, then DNA Rating System Pops up and must be answered Before Date can cancel.

If Date has 3 Consecutive Outings with Low Ratings Less Than 2.5 averaged Star Ratings, then move to back of Dating pool queue and Date requires 10% less points loop.

Dating Pool Queue, field which states the filtered line-up of profiles best matched to the User. If the Date is sent back in the Dating Pool Queue it means that Date, then moves to the back of the line of available Dates.

If Date gets cancelled by Users during back-to-back Outings, Twice, then point value is decreased by 10% and Rating Decreased by 10% loop.

If Date is leaving last Outing and did not cancel then Date rates User on 1-5 stars based on two categories: Respectfulness, and Generosity.

30 mins after Date leaves Last Outing, if Date does not respond to Pop Up then Date must Rate User, next Time Date opens Application.

If Outings exceeds or equals 7, then DNA Rating System is activated. DNA Rating System is utilized but does not go into effect until 7 Outings.

DNA Rating system is highly personalized based on the data recorded throughout the duration of time it took the User to get to the 8th Outing. It is the point where suggestions and filtering may become more automated, such as Netflix movie selections.

If after 10 dates User rates at least 70% of Dates 1.5 stars less than Dates average rating, then User is prompted to email the present invention's managing authority to tell us what's wrong.

A further component/process of the present disclosure provides the Cancellation process. If Date cancels before the Outing is over, then Spending Gauge earnings are forfeited and half the points are deducted.

If a User cancels 15 minutes after Finalized Outing was scheduled to begin due to fault of Date i.e. because of no show or Tardiness, defined as being 15+minutes late, then send additional Push Notifications via Pop Ups allowing User(s) to communicate without chatting, i.e. "[DATES NAME] is on her way and may be there in (15) mins (5-45 mins sliding scale adjustable by User or Date in Push Notification)."

2.5% of Users and Dates general points are deducted for Tardiness and Rating decreased by 5% and Date is less visible in Dating Pool.

If User cancels on Date after 'Finalize' prior to first Outing, then points required to accumulate Date are forwarded to Date and Date is again visible in Dating Pool and can accept Invitations from other Users.

If a User cancels, then there is no refund of events already attended, but the events later can be refunded depending on partnership agreements.

When on an Outing the Game Plan page may become your current date. Therefore, it may show the Date you are with, the Outings with the times attending, the presumed spending gauge, the amount of points used and CANCEL OUTING, CANCEL DATE.

Cancel Outing—may be if you do not want to go to that location anymore, or want to end the night early.

Cancel Date—may be if you do not like the Date and aren't enjoying the evening and want to stop.

If a User cancels because of their Date during Outing, then User can only be refunded half the points used to acquire Date and User may receive Push Notification Pop Up asking if User wants another Date (Display Dates In Pop Up) and send Push Notification to All Dates User Double Taps in Pop-up. First Date to Accept replaces annulled Date.

If User wants to go out with another Date then User sees Display Options for night Out in Pop Up, Nearby Date in Location within the radius in HomePage Map or GamePlan. If Date accepts User in Push Notification Pop Up or double taps User in GamePlan Date Reel then send Push Notification to both User and Date setting meet location or Uber Pick up location. Meeting location is User's current location or next scheduled location If not changed in Gameplan.

If User requests another Date after cancellation Date, then send Location Based Push Notifications to nearby Dates prioritize User Request in Dating Pool and reduce points cost for next Date(s) by 20% to replace User(s) annulled Date.

If Dates responds OnDemand then Dates may receive 20% of Spending Gauge averaged out with current Rating and Rating on Date.

The present invention may absorb the missing profit to ensure that the User enjoys the Outings with a new Date and the new Date may receive a 20% increase in Rating averaged with past rating.

Dates may always receive a higher percentage of Spending Gauge & Points, based on response Time and acceptance rate of User Invitation Request.

A further component/process of the present disclosure provides HomePage Map process. If User has yet to satisfy the present invention's Red, Yellow, Green Light System, then Populate Events in HomePage Map based upon User. Factors include but are not limited to: Intake Survey, Location and Display Dates Based on Past Invitation Acceptance, Availability, online Status of Dates, 'Hearted' Events, 'Checked' Events, and Attended Outings. Notably, all of the information collected about the User is applied to the Filters within the present invention's system.

If User has yet to satisfy the Outings Page, then the process may populate the HomePage Map based on factors including but not limited to: Location, Intake Survey, trending events based on Location, Select Events, Belt-Level.

If the User clicks on an Event which the User still has no heart, then the User can click on the Event, then go to Outings Page to a preview of the Event.

The Outing (s) if checked, it may appear in Events Reel in Gameplan.

The User can enter solo mode if wanted.

If User or Date heart or check an Outing, then encouraged, but not required to take any action to Green or Yellow light the date.

In HomePage Map, Events/Iconic Language take Display precedence over Dates in the Homepage Filtering system.

Dates are displayed next to an Event a Date has 'hearted' or 'checked' in Users HomePage Map. If multiple Dates, 'hearted' or 'checked' an event, then populate based on compatibility and other filter mechanisms.

Events appear in Users Homepage Map based on interests, location and trending events with compatibility to the User's Profile System.

If Date 'Hearted' or 'Checked' Event, then display Date in User(s) HomePage Map next to event.

Certain trending events are prioritized based upon partnership agreements. Must be an open ended system to promote affiliated partners and ticketed events available in the present invention's Ticketing Agency.

The present invention's ticketing: In events page, if a ticketed event is selected the toggles to scroll down may be selected for "section" and "number of tickets".

Seat options may be generated and those available may appear in a third scroll down toggle, i.e. section 3 and 2 tickets could generate options in third scroll such as 3Aa+ 3Ab $210.00-3Ff+3Fg $180.00 etc.

SEATMAP may be accessible where the map is typically displayed over all events, in Outings Page and can be panned and viewed as the regular map does, then if User clicks on the upper map area, then map may enlarge as it does to Pan in regular Outings listings two dots may appear below the image to switch from external map to internal map.

EXTERNAL MAP is the location map provided in Outings Page for all events whether ticketed or not.

INTERNAL MAP is the seating chart for any Events requiring seating selection.

The present invention may also have a Website for the Ticketing Agency to operate out of If a Ticketed Event is selected, then User may be redirected to the present invention's Ticketing Agency to proceed with the purchase of the Ticketed Event.

The present invention's Ticketing Agency Website is also for Direct purchase without needing full the present invention's arrangements such as in Solo Mode.

Emails can be sent to Users/Dates to promote Trending Events, Ticketed Events, Select Events, Promotions and Discounts with hyperlinks to open the app directly to the Gameplan page with the promoted event in the primary of the event reel.

Date's Home Page may be populated with various factors, including but not limited to: Users that Date Green Lit in the present invention's page, Users with hearted similar events, User(s) that Date(s) accepted but did not 'Finalize' with in time first Date to confirm is awarded the Outing.

Users that meet 60% or more compatibility requirements.

If a User or a Date Green Lights or Yellow Lights each other with 60% compatibility or more then both are more likely to show up in each others' HomePage Map contingent upon location radius.

If User clicks on Date in HomePage Map and User has Satisfied the Green

Yellow Red Light System buttons adjacent to image icon of Date and clicks add Button adjacent to icon representation image of date picture of date, then User can Add Date to current Outing. If User clicks on Green Yellow Red Light System, then bypass the present invention's ArmCandy Page and send direct to GamePlan.

The Homepage Map is populated by a series of profiles, venues, events, and interactive zones that show compatibility with the User's desires and preferences, concluded by the ratings the User awards to certain Dates or Outings, and the User's pattern of activity as concluded by the ratings of Past events, Date evaluations, Spending gauge, Type of event etc.

Friends & Allies

In an instance, within the Soul-Phi Radius, a User can have up to 3 friends and 6 allies. Further, friends may be visible within the city if they are online. Moreover, Users may have the option to add everyone as an ally first then after parameters have been satisfied, they may become a friend. Allies are temporary and can fall out of the User's radius. For example, a member of the User's basketball team may be considered and further reflectively allies may be added during a group activity or participant interaction. Further, Users may give a global rating to allies during competitive matches, activities, and group or community events.

IF Ally has been Ally for three consecutive months to User THEN prompt option to add to friends. IF User wants to add friend as already has 3 THEN User must remove friend. Further, User has option to add User As Ally after rating User. IF User is traveling then friends and allies can convert to respective territory. IF the User rates an Ally THEN Ally can see ratings in memories but not specific just lines. Friends and allies use matching software. Accordingly, IF User and User both adds each another THEN add to allies. IF User and User link up within the month they remain an Ally. IF User and User link up more than 3 times within a month User has option to add Ally to friend. IF User and User have 90% or more common interest THEN prompt option to add as Ally after rating. IF friendliest is full THEN prompt User to remove User. IF User gives ally under a rating under 2.5, automatically remove from allies.

Further, filtration of Users may be performed based on one or more of the following factors:
a. Age
b. Location
c. Gender
d. Sexual Orientation
e. Intake Survey
f. Mood Gauge
g. Filter Button (genie lamp)
h. Gameplan Icons
i. IceBreakers
j. Zones
k. Proximity
l. Compatibility
m. Shared Event Preference
n. Belt-Level
o. Ribbon/Bowtie Degree
p. Ratings
q. Block Days
r. Allies
s. Friends
Link-Up User(s) can invite Date(s) on Outings; on the other hand, User(s) Link-up with other User(s) at the Outing or event location. This may render a User an Ally for the duration of the interaction, or beyond IF User adds User to Allies THEN display User in Soul-Phi Radius Joux can be exchanged between users and allies and allies can split payments of certain Outings or exchange Joux.

A further component/process of the present disclosure provides the Outings Page. If User has 'hearted' 10% of Events listed in Homepage Map via the Outings Page Rating System, then Gameplan Toggle is illuminated.

If User has similar interest expressed in 70% or more 'hearted' or 'checked' events comparable to Date(s) in Dating Pool, then potential Date(s) may be prioritized in Users HomePage Map. Alternative or future embodiments of the invention may have different cutoff points. One possible embodiment is depicted in FIG. 50.

If Date 'hearts' events in Outings Page, then Dates are visible next to events in Users HomePage Map.

To make it easy for User's to know which Dates want to go to certain Events.

If User has 'checked' represents attending more than three events Chronologically Synchronized in the Outings Page within a 24 hr cycle, then pop up for GamePlan is prompted. Users are directed to Event Reel.

User can select three separate Events to comprise a single Outing so long as the selected Events are not of the same time frame. The Events must be listed in proper chronological order in order to finalize.

If Events are for different 24 hours periods then may not appear in the Gameplan together, i.e., Friday night lounge and Saturday night club table.

If a Date is compatible with User by 70% or more based on multiple factors including but not limited to: Location, 'Hearted' & 'Checked' events In Outings, IceBreaker Consumption, IceBreaker Interaction, Belt-Level, Trails Created or Rated, Points Available, Events Attended, User Survey, Date has Minimum Rating of 3 Stars on DNA Rating Scale, Date clicks 'Check' on any event in Outings Page, then send Push Notification to all Users nearby who Green or Yellow lit Date and meet compatibility percentage. "Do you want to take '[DATES NAME]' out?"

If a Date wants to go to a particular Event on a certain day then select the 'Check' in the Outings Page to send a Push Notification to all Users who match the appropriate compatibility criteria, including the price range with an overhead of a 30% variable increase.

If a Date is compatible with User by 60% or more based on multiple factors, including but not limited to: Location, 'Hearted' & 'Checked' events In Outings, IceBreaker Consumption, IceBreaker Interaction, Points Available, Events Attended, User Survey, Gameplan Icon Interaction, Belt-Level, Trail Interaction, Spending Gauge, Date has Minimum Rating of 3 Stars on DNA Rating Scale, Date clicks 'Check' on any event User HEARTed or CHECKed in Outings Page, then send Push Notification to all Users nearby who Green lit the Date and meet compatibility percentage. "Do you want to take '[DATES NAME]' out?"

If Date is compatible with User by 60% or more based on factors including but not limited to: Location, 'Hearted' & 'Checked' events In Outings, IceBreaker Consumption, IceBreaker Interaction, Points Available, Events Attended, User Survey, Gameplan Icon Interaction, Belt-Level, Trail Interaction, Spending Gauge, Date has Minimum Rating of 3.5 Stars on DNA Rating Scale. Date clicks 'Check' on a Select Event which is trending, then send Push Notification to all Users nearby who Green lit the Date and meet compatibility percentage. "Do you want to take '[DATES NAME]' to ( ) Event?"

If User clicks Accept, then take to GamePlan for Finalize and bypass Drag & Drop.

If Date accepts Push Notification Pop Up, which looks like a classy invitation with Who, What, Where, When, How much, then Date's GamePlan Date Reel invitations are visible one by one.

If Invitation is sent to Date and no response has come from Date prior to the 2 hour Cut off time, then the Gameplan is ready to send NEW invitations to New Dates.

The User may be prompted to send for replacement Dates with high response rate timing for a Last Minute Date request.

If the original Date responds and confirms BEFORE any replacement Dates have responded then original Date can attend, or If User doesn't send invitations to anyone else and original Date responds then User can take original Date out.

If Original Date 'gets the Outing' after the 2-hour time cut off then "late Date" consequences, to encourage prompt responses in the future.

If Outing is a Last Minute Outing there must be 30 min notice and the window for tardiness is relaxed.

If Date establishes GamePlan then it may Display Picture of User, one User at a time, Users Spending Gauge, & Events to be Attended with User. If Date has not already accepted Users Invitation Request in Push Notification Invitation, then Date can double tap User's image to accept.

If Date goes to Gameplan page Date can click all photos to go to their respective pages If User has requested an Outing with Date, it may be displayed IN GAMEPLAN.

Herein follow the steps for the user. Put border around the photos or Shade or fade the photos to 40% opacity to prompt the Date to select their photo to see the invite, or have a notification board accessible by the little number bubble, akin to Apple notification signals, in the upper left section of the screen or have invites posted in the Dates profile page and have the profile toggle illuminated when there are invites unanswered to prompt them to go and check the invites in their profile page, Listed above past Outings, in the Past Outings tab.

The General Operating Statistic for Compatibility is 60%.

If Users want to go out with multiple Dates, then User must Request Group Outing and Dates Accept 'Group Outing'. If Dates accept Group Outing, then Dates automatically receive 'meters' in Group Outing.

If a User wants multiple dates for an Outing then Group Outing, all going out as a group.

All those requested to attend the group Outing may receive invitations as usual for Basic Dates the difference may be that Dates may be informed that this is going to be a group Outing and that Dates may be placed on a Meter, which is mandatory for all group dates, to ensure the cost of the evening is covered appropriately.

Herein follow descriptions of changes to normal procedure: every date is on a meter and every date is notified that it may be a group Outing before then agree to attend. All other details of the invitation/gameplan process remain unchanged.

It's easier to think of GamePlan as a proposition and interactive event planner. If User(s) selects Event(s) & Date(s) by double tapping which Event(s) Users would like to propose to Date(s) in Event Reel and Users double tap Date(s) in Date Reel then send Date(s) Push Notifications.

If Date does not accept invitation request from User within 24 hrs then Date(s) disappear from Users GamePlan Date Reel. Users can book no further in advance than 7 days.

Select Events bought through the present invention's Ticketing Agency are not bought with points therefore the Tickets CAN be bought further in advance. If the User buys Tickets to an Event further in advance than 7 days, then User may have to wait to make arrangements for that Event.

If Date does not accept invitation request within 2 hours of the first event with 24 hr cycle, then Date(s) disappears from Users GamePlan Date Reel. Unless User is booking within 2 hours of first Event and Event is time sensitive.

Dates must confirm attendance before the 2 hour mark prior to the start of the first event in the Outing(s). Prompt responses receive incentive rewards and a lack of responses, 10 in a row may push the Date to the bottom of the Dating pool within the present invention's Network System.

User(s) cannot book event without adequate half hour time buffer unless Date is already attending event. Else User inputs ETA, i.e., User inputs ETA for all day festival, club Outing, etc. If User Drag & Drops accepted Date(s) into Drag & Drop Zone, then Illuminate 'Finalize' in Green.

If User wants Select Event then User can buy tickets before confirming Date to avoid ticket sell out.

If User confirms purchase after clicking finalize then processes in shopping cart.

If purchase is confirmed by User, then Push Notification invitation is Pushed to all parties displaying Outing.

If Date receives requests for Outings too frequently then Date acquires 'meter' in the form the present invention's logo in Gold signifying 'meter'.

User(s) must check enough venues or events to have 3 Event Outings that are chronologically sound within 24 hr cycle. Users can pick 2 or 1 events to attend but Application always prioritizes 3 illustrated through points recuperated.

If User clicks the check in Outings Page At least 3 Outings that chronologically synchronize then Illuminate GamePlan Toggle.

If events do not chronologically synchronize then Error message for conflicting event times appears.

The 'perfect User' may have 3 events in their timeline. Each event has to occupy a different time slot than the others, i.e., ChillSpot, Concert, Club.

If a User only wants to book Dinner for their Outing that is fine. The App may promote more events in accordance with Users Mood Gauge, Dates, Friends, Allies, and Gameplan Icons interaction within Homepage Map; for a more complete experience the app may prompt to user to "complete the Outing".

Promotion of more events and Tips and Hints to help secure the perfect Outings for every User of the present invention.

A further component/process of the present disclosure provides the Shared Event Preference process. If Users 'heart' or 'attend' same events, then this may show correlation of interests through a Supporting Filter.

If Users 'heart' the same IceBreakers, then this may show a correlation of interests. Through a Supporting Filter.

If Users have the same frequency and pattern of application use, then this may show correlation of interests.

A Priority Filter is also utilized. If User & Date(s) Rate Venues in similar patterns, then this shows correlation of interest.

If User shares 70% or more compatibility with Date(s) then Date(s) become prioritized and a Yellow Lit Date can supersede A Green Lit Date in GamePlan Page.

Higher Compatibility may take precedence over a yellow light rating thus bumping it up to an equal color priority of that of a Green Light prior to compatibility assessment.

If Date 'Checked' an Event in Outings Page that Date would like to attend then Users that ALSO 'Checked' that Event may be sent a push notification to advise that the User take Date out to that Event.

If User Green lights a Date and Date has NEVER Green, Yellow, or Red Lit User then Date appears in Users Homepage MAP.

If User & Date have at least 60% similar interests, Similar HEARTed Outings, Compatible Intake Survey Preferences and Compatible patterns of Use as determined by the information collected in the present invention's Network System then filtered into precedence on Homepage Map.

A further component/process of the present disclosure provides the present invention's main page. If User exhausts the Dating Pool in Green/Yellow Light System, then Send To GamePlan to refine search or finalize Events and Dates.

If User selects Red, then the button may illuminate and the image may swipe left.

If User selects Yellow, then the button may illuminate and the image may swipe down.

If User selects Green, then the button may illuminate and the image may swipe right.

If User or Date has a 'Meter' then it is displayed by the present invention's logo in Gold in bottom right corner of the present invention's Page.

If Date requires more points than User has then display Dates no more than 30% out of Users averaged Spending Gauge interaction.

If User has no previous Outings, then send to GamePlan to adjust Spending Gauge.

If User is a Date, then Date can only RED light 10% of the Dating Pool.

If Date maxes out of RED lights, then POP UP may appear "I'm sorry, you've exceeded maximum amount of RED lights for the Day."

If a Date is Metered, then Date can only RED light 25% of the Dating pool. If User maxes out of RED lights, then POP UP may appear "I'm sorry, you've exceeded maximum amount of RED lights for the Day."

If a Date has 25% of the Red Lights remaining, then a POP UP may appear.

Percentage compatibility displayed in bottom left corner of Date the present invention's Page in reference to the User.

Percentage compatibility displayed in bottom left corner of User the present invention's Page in reference to the Date.

A further component/process of the present disclosure provides the set of Green/Yellow Light Properties as illustrated in FIG. 50. If User Green or Yellow lights Date(s), then Date(s) may appear in GamePlan. Ordered by compatibility based on User's Profile cross referenced with the present invention's Network System. Factors include but are not limited to: Ratings, IceBreaker Usage, Location, Average Outing Request, Acceptance Response Time, Events Date HEARTed, CHECKed Events.

If User has 80% shared preferences and interests with a Yellow Lit Date then Yellow Lit Date may supersede Green Lit Date in GamePlan Date Reel unless, Green Lit Date is superior in compatibility (Over 80%) to Yellow Lit.

These preferences and interests are determined by User's Profile cross referenced with the present invention's Network System, comparing factors including but not limited to: Events HEARTed, Location, Interests, Intake survey, IceBreakers 'hearted' or answered similarly.

If a User receives a substantial amount of Red lights 65% or more from the general community and User has NOT purchased an Outing, then User may Filtered to the bottom of the present invention's Network Dating pool.

If User receives 80% Red Lights, then User may be invisible to Dating Pool unless User purchases points or Outings Once A Month.

This does not take effect until after the User's first two weeks as the first fourteen days are considered 'probation' for learning and the repercussions for inactivity may not be administered immediately.

If a User receives a substantial amount of Green lights (85%) from the general community in a short amount of time, and Requests for Outings then the User may become a Date.

Any User can become a Date should User satisfy the necessary requirements.

If a User and Date Green Light or Yellow Lights the other, then both are more likely to show up in each other's HomePage.

If User Green Lit 25 Date(s) or has 60% compatibility with 10 Dates, then Illuminate GamePlan toggle.

If User Green lights a Date and Date Green Lights User, then Date automatically appear in User's GamePlan.

If User & Date have at least 60% Compatibility as determined by cross-referencing the User's Profile and the present invention's Network System and Date has Green Lit the User, then prompt the User to rate the Date. If the User rates the Date Green, display in Date Reel.

If User & Date have at least 60% Compatibility as determined by cross-referencing the User's Profile and the present invention's Network System and User has Green Lit Date, then prompt Date to rate User. If Date rates User Green, display in Date Reel.

If User & Date have at least 70% Compatibility as determined by cross-referencing the User's Profile and the present invention's Network System and Date has Yellow or Green Lit the User, then prompt the User to rate the Date. If the User rates the Date Yellow or Green, display in Date Reel.

If User & Date have at least 70% Compatibility as determined by cross-referencing the User's Profile and the present invention's Network System and User has Yellow or Green Lit Date, then prompt Date to rate User. If Date rates User Yellow or Green, display in Date Reel.

If User has Yellow Lit Date, then Display Date if similarities are 70% or more.

No Users may ever know whether another User or Date has Green or Yellow Lit them. If User double taps picture on Date Reel to send Push Notification to Date, then the Date can assume he or she was not Red Lit.

A further component/process of the present disclosure provides the set of Red Light Properties. If User receives 65% Red Lights, then push Word Based Question Surveys every 25 Green Lights given and encourage reading Helpful Hints & taking more Surveys to increase compatibility.

If User receives 50% Red Lights then push Word Based Question Surveys every 50 Green Lights given and encourage reading Helpful Hints, interacting with Game center Video Mentor Content & taking more Surveys to increase compatibility.

If User is a Date, then Date can only RED light 10% of the Dating Pool.

If Date maxes out of RED lights, then pop up may appear "I'm sorry, you've exceeded maximum amount of RED lights for the Day."

If a Date is Metered, then Date can only RED light 25% of the Dating pool. If User maxes out of RED lights, then POP UP may appear "I'm sorry, you've exceeded maximum amount of RED lights for the Day."

If a Date has 25% of the Red Lights remaining, then a pop up may appear.

If a User who is Red Lit by a potential Date Plans an Outing that is set at 30% superior to what A Date typically averages in points, then User bypasses Red Light function.

If User is Red Lit by a potential 'Metered' Date Plans an Outing 40% superior to what A Date typically earns in points, then The User bypasses Red Light function.

If User is Red Lit by potential Date and is 90% compatible, then bypass Red Light function.

In an exemplary scenario, as illustrated in FIG. 50, priority ranking (stage 5002) may be performed. Based on the ranking, different lighting may be rendered for dates. For example, the application may Green Lit Date where compatibility is greater than that of the Yellow lit Date (stage 5004). Further, the application may Yellow Lit Date where compatibility is 80% or greater (stage 5006). Furthermore, the application may Green Lit Date where compatibility is less than 80% (stage 5008). Additionally, the application may Yellow Lit Date where compatibility is less than 80% (stage 5010).

A further component/process of the present disclosure provides the Meter process. If a Date receives 80% Green Lights from the general community, then 'Meter' is automatically put on Date.

Date must maintain at least 3.0 star averaged User Rating to sustain 'Meter' and Maintain at least 3 invitation request per Online 24 hr cycle.

Meter is based on the population and frequency of Request

Also 3 invitation requests and 5 green lights depending on population of location Must be open Ended to appease population variable If Date does not attend 1 Outing for every 100 invitations, then remove 'Meter'.

If Date does not attend 1 Outing for every 50 invitations, then make Date 100% less visible in Dating Pool LOOP.

If Date does not attend 1 Outing for every 25 Invitations, then reduce Point Value by 25%.

Additional pop up "Uh-Oh We've noticed you have had a lot of requests but have not been accepting any, is everything okay?"

If Date moves outside of Bluetooth Radius, then meter is suspended until Date returns and starts again 2 mins after Date Returns into Bluetooth Radius of User and meter restart time doubles every time Date leaves Radius.

To ensure that the Date is present for the Events of the Outing.

If the metered Date wants to take the User off the meter then this can be done at any point by going to Profile—Settings—Meter by swiping the tab, or can be removed in Gameplan.

Meter represents a certain amount of points being drafted from User per hour and each Outing, within specified time-cycle.

Meter is determined 10% of Date(s) Point Value averaged with the total Outing(s) used to secure Date hourly.

If 'metered' Date removes 'meter' during date, then send Push Notification to User Stating "[DATES NAME]" is enjoying her evening!"

A further component/process of the present disclosure provides the Helpful Hints process. Before every Outing, User and Date are alerted to the others preferences & can sharpen up their game and hone their social interactive skills in the game center. 2 hours prior is the confirmation cut off. Thus, all information should be sent upon confirmation.

Therefore, no later than 2 hours before the beginning of the first event in the Outings should any necessary information be sent.

Same goes for Group as nothing beyond the meter changes in the Group procedure.

Upon 1st booking Date is shown the categories in which Date is Rated & given hints on how to be a good date & achieve a good rating per each category.

Upon 1st booking User is shown the categories in which User is Rated & given tips on how to be respectful & generous to achieve a good rating per each category.

Automatically applies for the first Seven Dates engaged in, and continues for Users with a 2.5 Star Rating or below until average 3 Star Rating is sustained for 10 dates.

Hints can be accessed at any time under Help & Hint frequency settings managed under Settings.

A further component/process of the present disclosure provides Gameplan toggle may be illuminated If a User Green Lit 25 Date(s) or has 70% compatibility with 10 Dates then send to GamePlan.

If User sets spending gauge then all Events and Profiles may be filtered according to the pre-authorized budget.

If User Readjusts Spending Gauge, then readjust Date(s) & Events in real time;

If User has enough or is within a 30% range of Point Request Value in order to 'Finalize' with Date(s) then display in GamePlan Date Reel and based Upon whether a Date Green or Yellow Lit a Date.

If User lowers Spending Gauge, then Events beyond price range (+30%) may disappear. After User double taps Date(s) image in Date Reel Push Notifications are sent to Date(s) displaying Outing in Date(s) GamePlan and via Push Notification.

If User Does Not Readjust Spending Gauge, then illuminate 'Finalize' in Green and Check-Out.

If User satisfies the set Spending Gauge and points, then Dates and Outings can be secured.

If User does not have the points to satisfy the total listed in the Gameplan page, then Joux toggle may illuminate.

If a User Green lights a Date, Date may appear in the GamePlan queue, based on the aforementioned then after double tapping the Date's image, a request may be sent to that date via Push Notification & may show up in Dates GamePlan Page.

If Dates are Green/Yellow Lit then Date Reel's population may be ordered based on: similar 'hearts', Checked Events, Online Status (only online Dates are visible), Points, Average Response Time, Ratings, and the present invention's Network determined compatibility.

If User Green lights a Date and Date has not Green, Yellow, or Red Lit User then Date(s) appear in GamePlan.

If User would like to attend Outing with said Date, then User can double tap Date to Send Push Notification Invitation.

If Date accepts Push Notification Pop Up, which looks like a classy invitation with Who, What, Where, When, How much, etc., then Date's GamePlan where Date views User's invitations are visible one by one. Then, the application may illuminate Users 'Finalize'.

In an instance, the Date may accept an invitation popup by hitting accept. Alternatively, Date may accept invitation by Double tapping User Image. In one instance, the Date may also accept an invitation by clicking 'Finalize' in Date's GamePlan Page (after review of Event Reel). If Date(s) accepts then Green Check may appear on Date Image in Date Reel. Also, Date(s) who have accepted are displayed first and prioritized from Left to Right.

If Date(s) have Green Checks of acceptance, then the Date(s) are prioritized. If the Date(s) have been accepted, then the Date(s) are moved to the far Left of the Date Reel also known as the beginning of the Date Reel.

If User Drag & Drops Green Checked Date(s) then spending Gauge & Points may adjust accordingly in real time.

If User Drag & Drops accepted Date(s) in Drag & Drop Zone, then 'Finalize' may illuminate in Green. In an instance, First User to 'Finalize' with Date(s) may get Outing with Date.

Other Date(s) that were too Late Date(s) may disappear from Late Users GamePlan Date Reel, but may show up again in Users HomePage Map.

Upon User 'Finalize', Date may be locked into Outing and Date cannot receive any more request invitations and temporally disappears from Dating Pool until Outing is complete.

If Date(s) have reviewed the proposed Outing & spending gauge of User and accepted by clicking 'Finalize', then the Date(s) may show up in the Users GamePlan Date Reel with a Green Check in the middle of their photo.

If Date Clicks 'Finalize' then Date disappears from every other User(s) queue except for the one Date Finalized. Thereafter, User can confirm purchase and Push Notification may be sent to both parties displaying Outing & Meet Up Location.

If the Date does not accept within an allotted time frame, then Date may disappear from Users queue.

If Date receives numerous requests per 24-hour cycle, then Date becomes Metered requiring more points and drafts points hourly. This may be comparable to Uber's Price Surging.

If a Date becomes Metered then a meter may appear in bottom right corner of Date(s) picture in GamePlan, the present invention and Dates Profile Page.

If Date Has Meter, then Date may manipulate Meter swipe on and off feature.

If the User has Date(s) green checked in the queue, then User drags and drops one or more Date(s) into drag & drop zone for Finalize. Then, User purchases Outing and after that, both may be notified with Push Notification of Meet Up or pickup LIBER API Location(s).

If User Drags & Drops multiple Date(s) then the application may adjust points for Date(s) & Spending Gauge in Real time.

If User Drag & Drops multiple Dates simultaneously then a display may Pop Up saying "Group Outing?"

If User clicks "Group Outing" then the application may send Push Notifications to Dates notifying Group Outing, which prompts automatic Meter.

If Group Outing is accepted by Dates, then Dates may receive automatic meters for the Outing.

If Date already has Meter and is added to Group Outing, then factor time and a half hourly.

In case of Group Outing, every date may be on a meter and every date may be notified of the group Outing before they agree to attend. All other details of the invitation/GamePlan process may remain unchanged.

If User double taps Date(s) image (in Date Reel) and do not check Events in Event Reel then aggrandize Event Reel.

Events must be prioritized because Events maybe be the core of the proposition to Date(s). Further, events may directly impact Spending Gauge viewed by Date(s) and reward points recuperated.

If User double tap Events in Event Reel then Green Check may appear and directly impact Spending Gauge (CHECKed Events are being "Attended").

If User is yet to satisfy X(Dismiss), 'Heart'(Like), Check (Attend) System in Outings Page then the application may populate Event Reel (GamePlan). Event Reel may be populated by recommending the Events most likely to suit the User Based on the User's Profile Filtering, determined by the present invention's Network System, and factoring in Date's Ideal Outings based upon Date's 'hearted' and 'Checked' Events.

If User did NOT 'check' or 'heart' events in Outings Page then GamePlan's events reels may be populated by the preferences of the Green Lit Dates Past Events Initial Survey Mood Gauge, Trail Preferences, Points, Interaction with Zones, Challenges, GamePlan Icon Interaction and Belt-Level.

Certain trending events may be prioritized based upon partnership agreements, community trail, zone, club and event interaction. This may be an open-ended system to promote affiliated partners and ticketed events available in the present invention's Ticketing Agency.

Select Events may be symbolized by a Golden Bowtie.

Ticketed Events may be promoted in the present invention's HomePage Map through the present invention's Ticketing Agency or application content or trail creators via Web Application method.

In present invention's ticketing, if a ticketed event in events page is selected, the toggles to scroll down may be selected for "section" and "number of tickets".

Seat options may be generated and those available may appear in a third scroll down toggle, i.e., section 3 and 2 tickets may generate options in third scroll such as 3Aa+3Ab $210.00-3Ff+3Fg $180.00 etc.

SEATMAP may be accessible where the map is typically displayed over all events, such as, in the Outings Page, and may be panned and viewed as the regular map does. Thereafter, if User clicks on the upper map area, then map may enlarge, as it does to Pan in regular Outings listings. Further, two dots may appear below the image to switch from external map to internal map.

EXTERNAL MAP may be the location map provided in Outings Page for all events whether ticketed or not.

INTERNAL MAP may be the seating chart for any Events requiring seating selection.

The present invention may also have a Website for the Ticketing Agency to operate out of. If a Ticketed Event is selected, then User may be redirected to the present invention's Ticketing Agency to proceed with the purchase of the Ticketed Event.

The present invention's Ticketing Agency Website is also for Direct purchase, without needing full the present invention arrangements such as in Solo Mode.

If User clicks the check in Outings Page with at least 3 Outings or more that chronologically synchronize, then send to GamePlan or illuminate toggle.

Promotion of more events and Tips and Hints may help secure the perfect Outings for every User of the present invention.

If User is going to finalize a 1 or 2 event evening, the empty event slots may then aggrandize and a popup may appear saying something to try and get the User to book another event or two.

If User & Date have 2 or more identical or similar GamePlan Event Reels then the application may bypass Green & Yellow Lit Unless Red.

If Date is available for Outing (schedule wise) and has no conflicting request, then Date may show up in GamePlan and the present invention Page.

If Date establishes a GamePlan, it may Display Picture of User, one User at a time, Users Spending Gauge, & Events to be Attended with User. If Date has not already accepted Users Invitation Request in Push Notification Invitation, then Date double tap User's image to accept.

All compatibility between User(s) and Date(s) may be predicated on Percentage of similarities based upon User Intake Survey (the initial 5 question picture survey & the Word Based Survey 5 out of 100 questions that pop up every three Outings and every 100 Green Lights that feed back into the GameCenter), Icebreaker Usage, IceBreaker consumption, Rating, Events 'Hearted,' Events Attended, Events 'Checked', Location, Availability, Mood Gauge, GamePlan Icon Interaction, Belt-Level, Trail Interaction whether Online or Offline or Booked, Points required to book Date(s). If User has enough points required to book Date(s) or is within a 30% range, matching is predicated on more than whether a User green or yellow lit a date.

User may turn Uber Date Pick up Toggle On/Off.

Upon first User sign up, the application may have a pop up walk-through of application, including picture based survey and explanation of word based surveys concurrent throughout application.

Percentage compatibility may be displayed in bottom left corner of Date in reference to the User.

Percentage compatibility may be displayed in bottom left corner of User in reference to the Date.

A further component/process of the present disclosure provides the API UX. If a User is new to application, then the application may Initiate SignUp procedure. Then, the application may conduct Initial Intake Survey. Thereafter, the application may prompt the user to submit a Profile picture of themselves in the Approved Profile format, and Verify. Further, the application may commence walk-through.

Further, if a User satisfies walk-through, then open the present invention Page. Thereafter, User may begin to engage in Red, Yellow or Green Lighting profiles.

If a User has satisfied the present invention Page by Lighting 10-50% of Online Dating Pool, then the application may send the User to Outings Page.

If User has exhausted the present invention's Selection, then the application may send User to Outings Page.

If User has exceeded the amount of RED lights, then the application may send User to Outings Page.

If User is in Outings Page, the Outings Page Rating System may be activated.

Further, the application may have CHECK for "Attending", HEART for "Like", and X for "dislike."

If User has Satisfied Outings in the present invention's main page, then the User may open the GamePlan Page to view selected/recommended Events/Dates in the respective reels.

Direct User(s) may double tap Event Reels to lock in Event(s) and Green Check that appears in the middle of Event Image.

If User has satisfied Event Reel, the application may aggrandize Date Reel so that User may double Tap available Date(s) to send invites to Date(s) for Outings. If Date(s) did not respond to invites, then User may open GamePlan page to choose different Date(s) from the Date reel. If Date(s) did not respond to invites, then User may open Homepage Map to rebuild GamePlan If User has Date(s) that have accepted Outing Invites, then the application may apply Green Check in middle of Date photo in Date Reel and Display number of Accepted invites ON GamePlan Toggle.

If User . . . then the application may initiate Picture Based Survey showing 5 questions at a time of the 100 Questions available.

The picture based survey may be initiated after conditions are satisfied such as, if 25 Green Lights are given, or if Red Lights given are exceeded. Aforementioned conditions must also be satisfied for the picture based survey:
  a. DATEs: 10% of the present invention Network Dating pool.
  b. USERs: 10% of the present invention Network Dating pool.
  c. METERED DATES: 25% of the present invention Network Dating pool.
  d. If Low Ratings are received.
  e. If Low Ratings are given.

If Date is available for Outing (schedule wise) and has no conflicting requests or conflicting requests of lesser caliber, i.e. lesser event, less compatible User, or Date lit User with lower rating, then Date may show up in GamePlan.

If Date is a Red Light User, then Date may NOT show up in User(s) Date Reel UNLESS User is spending 30% more than what Date typically earns in Points or have 90% or more compatibility.

A further component/process of the present disclosure provides a Belt-Level. Belt-Levels may be the rating advancement and rewards system set up to draw information from the Users' past history of ArmCandy usage and past Outings, rewards and reviews. The Belt-Level may also be a feedback system and a visible ambassador to the Users Experience and rank. The Belt-Level may signify access and power within the ArmCandy Application Network. The Belt-Level System may be the process of recording the past Usage of all Users to determine their purchasing power, network, and experience within the application. Further, the Belt-Level may be a public view of what is representing the Users Back-End Data. Accordingly, the frequency of Outings may be recorded and used as a factor in the rewards system. Further, the Belt-Level System may consist of 8 levels of application participation represented by belt colors or degrees, such as, 5 levels of ribbons (Female), and 5 levels of bowties (Male). The Belt colors, ribbons and bowties may represent visual manifestations of the status of Users and Dates.

First, the application may have 8 Belt colors to be achieved—White, Yellow, Orange, Purple, Green, Blue, Brown, Red and Black.

Second, for females, the application may follow Ribbons, such as, Bronze, Silver, Gold, Platinum and ONYX. Likewise, for males, the application may follow AC Bowties such as, Bronze, Silver, Gold, Platinum and Black Diamond respectively from the first bowtie attained to the last bowtie attained, which is the highest ranking.

Further, personal information such as ratings, reviews or specifications may remain private, the Belt-Level System being the front representation as a whole.

Belt-Levels may be public to encourage all application users to increase their Belt-Levels. Higher Belt-Levels reward all application users. Accordingly, Users may receive higher percentage returns on all of their purchases. Further, Dates may receive higher percentage returns on all of their Outings. Moreover, events may be held specifically for a status group(s) and promoted in the Outings Page of all users as an advertised incentive for them to increase their status. For example, Users may promote an Event as 'A Black Ribbon Party', showing party descriptions etc. in the Event description. Accordingly, Users and Dates who are rated as Black Ribbon and above have the ability to attend this event in their Event page. However, those under the Black Ribbon status may only be able to view the Event page.

Further, once a User reaches the 'Black Belt' status they may be able to create an event. Additionally, once a User reaches the 'Black Ribbon' status they may create trails. Furthermore, once a User reaches the 'ONYX Bowtie' they may create a challenge, e.g. a selfie contest in a designated zone. Moreover, once a User reaches 'Black Belt' status and ONYX Bowtie they may be able to create a zone for event, challenge, etc.

Additionally, the types and colors of the Belts may affect frequency and standard of rewards received. Every new achievement earned from the white belt to the Onyx Bowtie increases in incentivized returns. However, White Belt may receive no return on their purchases for every Outing they book with ArmCandy.

The following standings may go up by 1% for every new advancement in the ArmCandy Belt system to a maximum of 8% returns.

For Users, this may mean greater returns on AC purchases.

For dates, this may mean higher incentives as a return to them. This may streamline the 'metered date' to become more flexible and neutral to all AC users.

Statistics may be available in the profile page for Black Belt Users and above.

Belts may be achieved (like in a role playing game) for certain activities, events, or ratings. Further, each purchase, activity, program and review may be assigned a value.

The 8 LEVELS and 5 degrees or tears within the ArmCandy Dating pool may impact the events and dates users may see with a 30% upward variance contingent upon spending, application Usage and Ratings.

IF Users are loyal to ArmCandy (belt system), they may be rewarded. Likewise, if they are increasing value in their life through the levels (Point Bank Colors & Degrees), they may be rewarded. Similarly, if they are cool and good to other users (DNA Rating System) and to those who have no voice (GameCenter), they may be rewarded.

If User has white Belt-Level, then User may not see certain Outing possibilities, such as restaurants, select clubs and movies, which are reserved to higher Belt-Levels. Lower level activities may be promoted for lower Belt-Levels such as chill spot or zone challenges. If User doesn't like Date (or vice versa), then User gets to cancel Date and look for another spontaneous Date in the same area where User is currently located.

Further, frequency of rewards & types of rewards received and visibility of recognition may be determined based on a combination of Belt Averages (Frequency of Use), Joux Bank (Level of Points on Store) and DNA Rating Value (How you Treat AC Pool).

Further, a sum of BELTS COLORS and DEGREES, POINTS BANK, DNA RATING SYSTEM may be averaged out and provide access to certain events, ArmCandy Dating pools, and rewards.

After the belts, for females, come the bronze ribbon, the silver ribbon, the gold ribbon, the platinum ribbon, and black ribbon. Likewise, for males, after ribbons, come bronze bowtie, silver bowtie, gold bowtie, platinum bowtie and ONYX bowtie.

A further component/process of the present disclosure provides the Spending Gauge. This helps determines UX for Outings and Dates. If User has Set Gauge, then Events and Profiles within that range may appear in the HomePage Map for browsing.

If User adjusts Spending Gauge Event Reel and Date Reel then automatically filter Events & Dates out of price point, in real time.

The Spending gauge can be increased by 30% automatically should the Users Compatibility and Interests be greater than 80%.

The Spending gauge automatically allows for Events and Dates up to 30% above the Spending gauge If over 80% compatible based on the cross referencing of the present invention's Network System and the User's Profile.

If User adjust Event Reel or Date Reel then automatically adjust Spending Gauge in, real time.

A further component/process of the present disclosure provides the Trail Creation Mode—as shown in FIG. 8 Photo Guide lines, beginning, middle, and end. Otherwise front and within. Shot must represent Icon Gameplan Language Classification, Mood, and Trail.

In an instance, Trail may be a combination of an Icon, Mood and 3 Photos.

Alternatively, User may simply publish their Outings. If User had perfect Outing, then application may provide option to publish.

A system may allow trailblazers organizers and promoters of the community to engage in streamlining organization and automating of events in their localities. Users may be able to publish their best Outings and experiences better. If the Trials that they blazed are sought out and used by others, they may receive points/Joux as well as Belt-Level increase.

Figure 57:
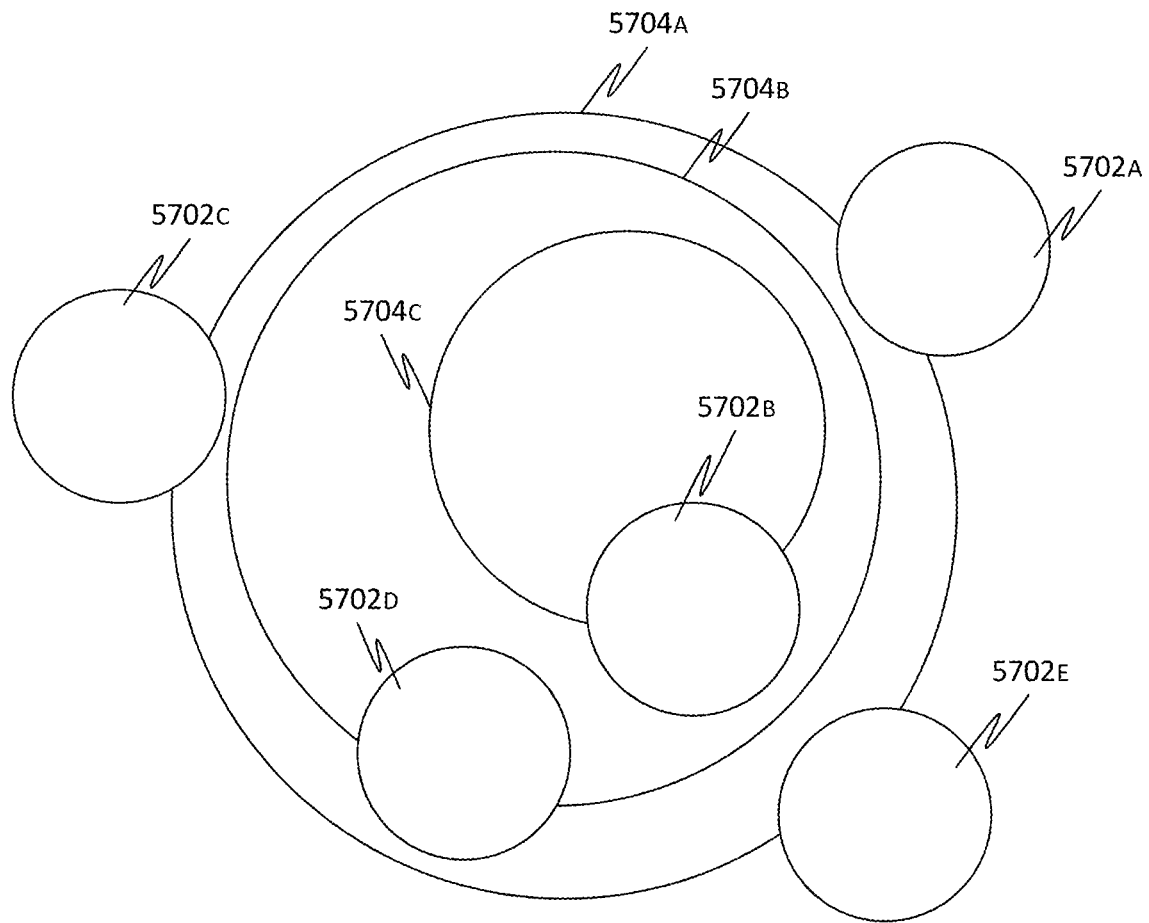
FIG. 57 illustrates a screenshot of a User interface for facilitating social networking based on events depicting a plurality of dates and events based on affinity metrics (i.e. Soul-Phi radius), in accordance with some embodiments.
Figure 58:
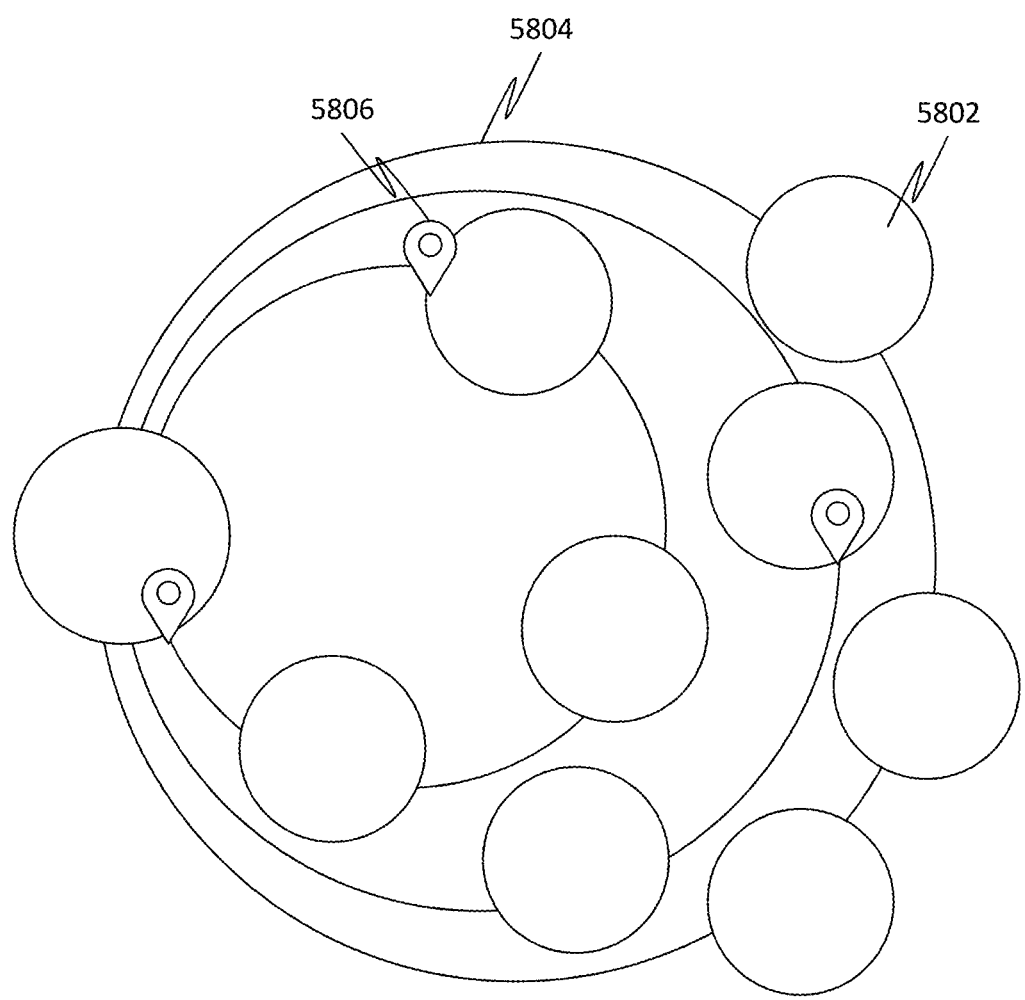
FIG. 58 illustrates a screenshot of a User interface for facilitating social networking based on events depicting a plurality of dates, events and locations based on affinity metrics, in accordance with some embodiments.

Whilst in trail creation mode, users may be invisible to AC dating pool A further component/process of the present disclosure provides the Location Radius/Soul-Phi radius a process in which users may connect and with all preferences, processes, and people within their level of compatibility. For instance, a snapshot of the user interface may be as shown in FIG. 57 and FIG. 58, which depict a plurality of dates (e.g. 5702A-5702C) and events (e.g. 5702D-5702E) based on affinity metrics (i.e. Soul-Phi radius). Accordingly, one or more of an event and a date may be within a "distance" (or Soul-Phi radius) represented by a plurality of rings (e.g. 5704A-5704C). Similarly, as shown in FIG. 58, events 5802, dates 5804 and locations 5806 associated with one or more of the events 5802 and dates 5804 may be displayed. Accordingly, within a glance of the Soul-Phi Radius, Users may determine their location, the location of their, online friends, online allies, or available Dates, User may also determine available events, challenges, and zones, predicated on the by color, patterns luminosity, translucency, volumes, forms, dimensionality, perspective, level, facade and dimensionality of the circular rings. Personal information such stats, metrics, about the User may be found on the most inner circle. On first and inner most ring, there may be an event, zone, action or challenge. Similarly, the second most outer ring may be circle of friends, second ring would be Date(s) and Allies.

The radius and influence of ones Soul Phi Radius may be based upon how they connect and interact with the invention.

If Users and Dates are in same radius, then both may be able to be viewed by the correspondent in ArmCandy Page and HomePage Map.

If User and Date(s) are in same radius then both may be able to be viewed, because of Bluetooth Technology, by the correspondent on Outings Page via Map when on Date.

Default User & Date is 3-mile radius.

User can expand and contract Radius via Pinch & Pull Technology or scroll through miles 1-25 miles.

A further component/process of the present disclosure provides the Homepage Map. If User is yet to satisfy the ArmCandy Red, Yellow, Green Light System, then the application may Populate Events in HomePage Map based upon User interaction with Iconic Gameplan interaction.

Gameplan Icons
  Restaurant
  Cafe
  Movie/Theatre
  ChillSpot
  Recreation
  Events (Tickets Required)
  Group
  Exposition
  Lounges
  Sports
  Relax
  Activity
  Happening (Random Events) (User Organized Events)
  Concerts
  Nature (Hiking & Walking Trails)
  Club/Party (Bottle Pop)
  Monuments
  Workout
  Beach(party)
  Extreme (Rock Climbing, Sky Diving, Motor X, At Your Own Risk)
  X-Club (subscription) e.g. Muscle Car Club, Yoga Club Basketball Club User may activate or deactivate any of the Icons Supra by clicking genie bottle button located on the right middle side of homepage map. As a result, Users may filter or modify Homepage Map events and respectively in turn visible Dates, Friends, and Allies.

Intake Survey
Mood Gauge
Spending Gauge
Belt-Level
Degree of Bowtie or Ribbon
Location
Iconic Gameplan Language
Past Event Attendance
Availability
ONLINE Status of Dates
ONLINE Status of Allies
ONLINE Status of Friends
'Hearted' Events, 'Checked' Events,
Attended Outings.
ALL the information collected about the User may be applied to the Filters within the ArmCandy system.

If User is yet to satisfy the Gameplan Iconic Language, then populate the HomePage MAP based on following:
a. Location
b. Intake Survey
c. Trending events, activities, Outings, and Zone's based on Location
d. Select Events.
e. Direct New Users Towards Chill Zone If User clicks on an Event which the User still has not heart, then click on the Event. Thereafter, User may go to Outings Page to a preview of the Event.

The Outing(s) if checked, may appear in Events Reel in GamePlan.

The Homepage MAP may be populated by a series of profiles, venues and events that show compatibility with the User's desires and preferences (concluded by the ratings the User awards to certain Dates or Outings) and the User's pattern of activity as concluded by the ratings of Past events, Date evaluations, Spending gauge, Type of event etc. Reinforced by gradual evolving color, patterns luminosity, translucency, volumes, forms, dimensionality, perspective, level and façade.

A further component/process of the present disclosure provides the Game center Suggestion to tighten up users and dates predicated on feedback per DNA Rating System while Using AC Dating Pool. The application popup may appear, saying "wanna tighten up your game?" yes or no.

If User or Date replies yes within the helpful hints section or during survey, then Game Center Engine may be initiated.

If User or Date replies no, then Game Center Skips and Event Recommendations, DNA Rating Increasing Recommendations, Upcoming Promotions.

Figure 53:
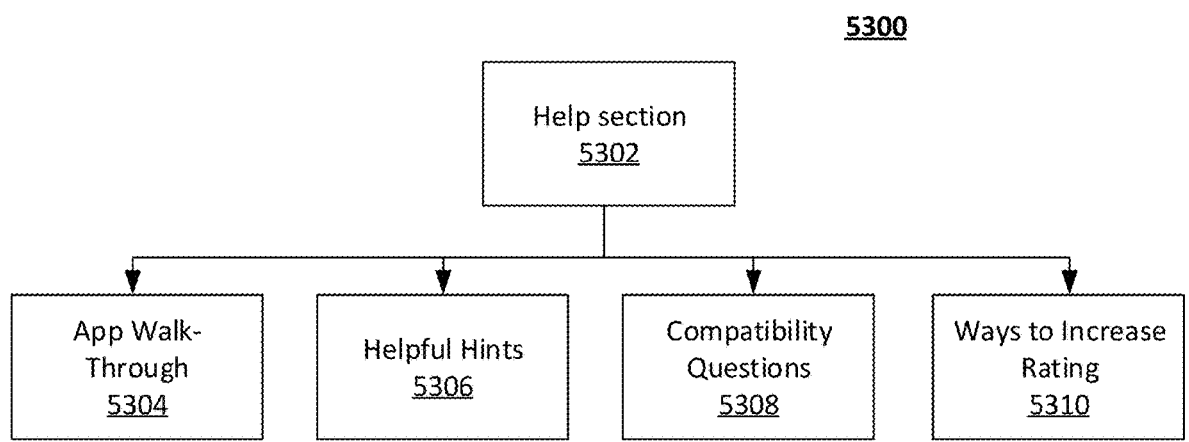
FIG. 53 illustrates a flowchart of a method of facilitating social networking based on events comprising presenting help information to a user, in accordance with some embodiments.
Figure 54:
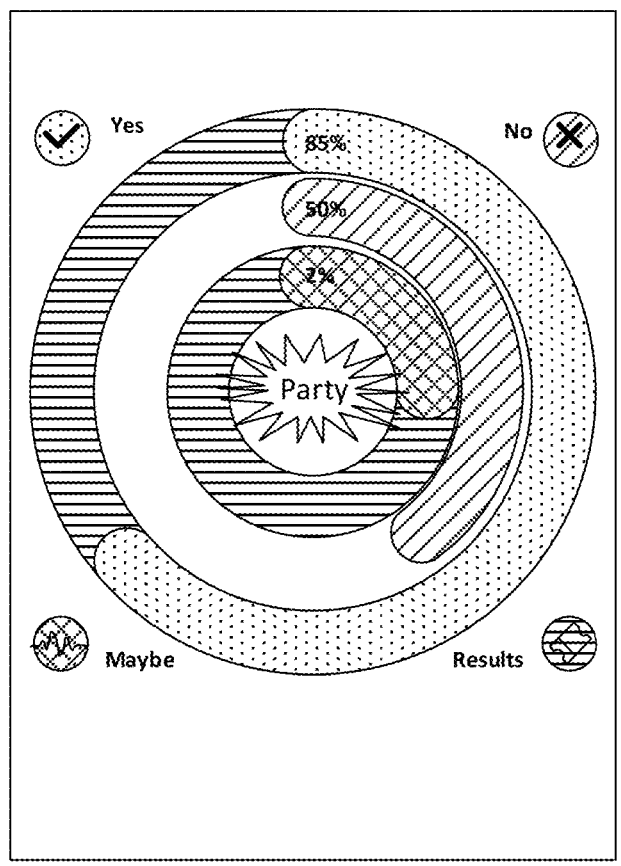

Pick your game center personal video mentor and area of improvement enter challenges to sharpen your game have situations broken down to you step by step we're here for you when you're ready (stage 5306 as shown in FIG. 53).

A further component/process of the present disclosure provides the Profile Page. Tab where User's and Date's can slide to Cancel a confirmed Outing.

If Prior to the 2-hour cancellation cut off.

Tab where Date can slide to Remove Meter during an Outing

Tab where Dates Cash in Points for direct account transfer.

Tab Where User can Purchase Points when credit card information is fulfilled.

If a User 'hearts' an IceBreaker, then this can be found in the 'ICEBREAKER' section in Profile.

If User has similar IceBreaker Usage as other Dates, visible because of each Ice Breaker Push Notification pushed upon attendance at each new Outing which has a 'Heart' 'Check' or 'Dismiss' Feature, then prioritize display in the present invention Page & HomePage Map.

If User has similar event attendance patterns to other Dates, visible because of check in feature at each Outing, then Display in HomePage Map next to events & prioritize in the present invention Page.

If a User attends a past event, or a past date, then this can be found in the 'PAST' section in Profile.

Listed in decreasing chronological order with the "confirmed dates" at the top followed by the "completed dates," with Rating Received listed.

If canceling the ability to cancel a confirmed date may be next to the confirmed dates listed, repercussions after 2 hour cut off.

ETA changes
RideSharing toggle.

If Date establishes GamePlan then it may Display Picture of User, one User at a time, Users Spending Gauge, & Events to be Attended with User. If Date has not already accepted Users Invitation Request in Push Notification Invitation, then Date can double tap User's image to accept.

If Date goes to Gameplan page Date can click all photos to go to their respective pages If User has requested an Outing with Date, it may be displayed IN GAMEPLAN.

Herein follow the steps for the user. Put border around the photos or Shade or fade the photos to 40% opacity to prompt the Date to select their photo to see the invite, or have a notification board accessible by the little number bubble, akin to Apple notification signals, in the upper left section of the screen or have invites posted in the Dates profile page and have the profile toggle illuminated when there are invites unanswered to prompt them to go and check the invites in their profile page, Listed above past Outings, in the Past Outings tab.

A further component/process of the present disclosure provides the Mood Gauge. The Mood Gauge System (MGS) may be incorporated as a filtering system to aid in the selection process of events for AC Outings and in the promotion of incentivized ArmCandy Events. As a result, the ArmCandy User may have a more refined variety of Events, Dates, and incentivized offers to view and select based on the work of the filtering systems of the ArmCandy application. The MGS is pertinent to the filtering and customizable adjustments of the AC system; to effectively be used as an additional filtering component (that collects information of the Users upon their completion of the Mood Gauge Surveys). There are several points of information acquirement and increased purchase by administering mood gauge to each User.

The Mood Gauge System may be launched upon the initial opening of the application for each day that the application is opened by the User. In addition, the MGS may be initiated every time the User opens the application after a time period of 2 hours or 120 minutes has elapsed since last opening the application. The exception to the 2-hour time lapse for re-questioning is if the User has already created an Outing; such as sent invitations, selected Events to attend, under time constraints to make an Outing that the User booked for that particular date (day or night). Alternatively, User hasn't been away from the application for the time elapse period.

Described below are several Events that may have been organized into categories by Intensity of Physical and Social intensity.

Each may be represented by a circle zone and pattern that glows when the activity is hot.

Low Intensity/Highly Passive
  Romantic dinner
  Watch a movie in the theatre
  Have a picnic in a park
  Go to the beach and make a bonfire or go to bonfire mode invite people for cool activities
  Go upon a predetermined Trail
  Chill Spot
Moderate Intensity
  Vernissage in a museum
  Classic concert in a theatre/Jazz festival
  Go to an art conference
  Sightseeing
  Go to a karaoke bar
  Participate in a fundraiser
  Safari Zone/X Club e.g. (Gamer Tournament)
High Intensity
  Go bowling/billiard
  Watch football life at the stadium
  Popping Bottles
  Rent a yacht and throw a party
  Go to a casino
  Rent a bike and go on a tour
  Happening
Very intense
  Bungee jumping
  Dancing in a club
  Go to a festival all day/night
  Go to a theme park
  Participate on a charity marathon
  Group Game
  X-Club American Muscles Club Vs. Imports Club
Screen asks User How is User feeling today (Mood Gauge). Options are:
  1. I feel like moving mountains (Active)
  2. I feel like doing something Low Key (Relax)
  3. Surprise me, I don't know (Surprise Me)
  4. I feel like meeting people (Highly Social)

Figure 52:
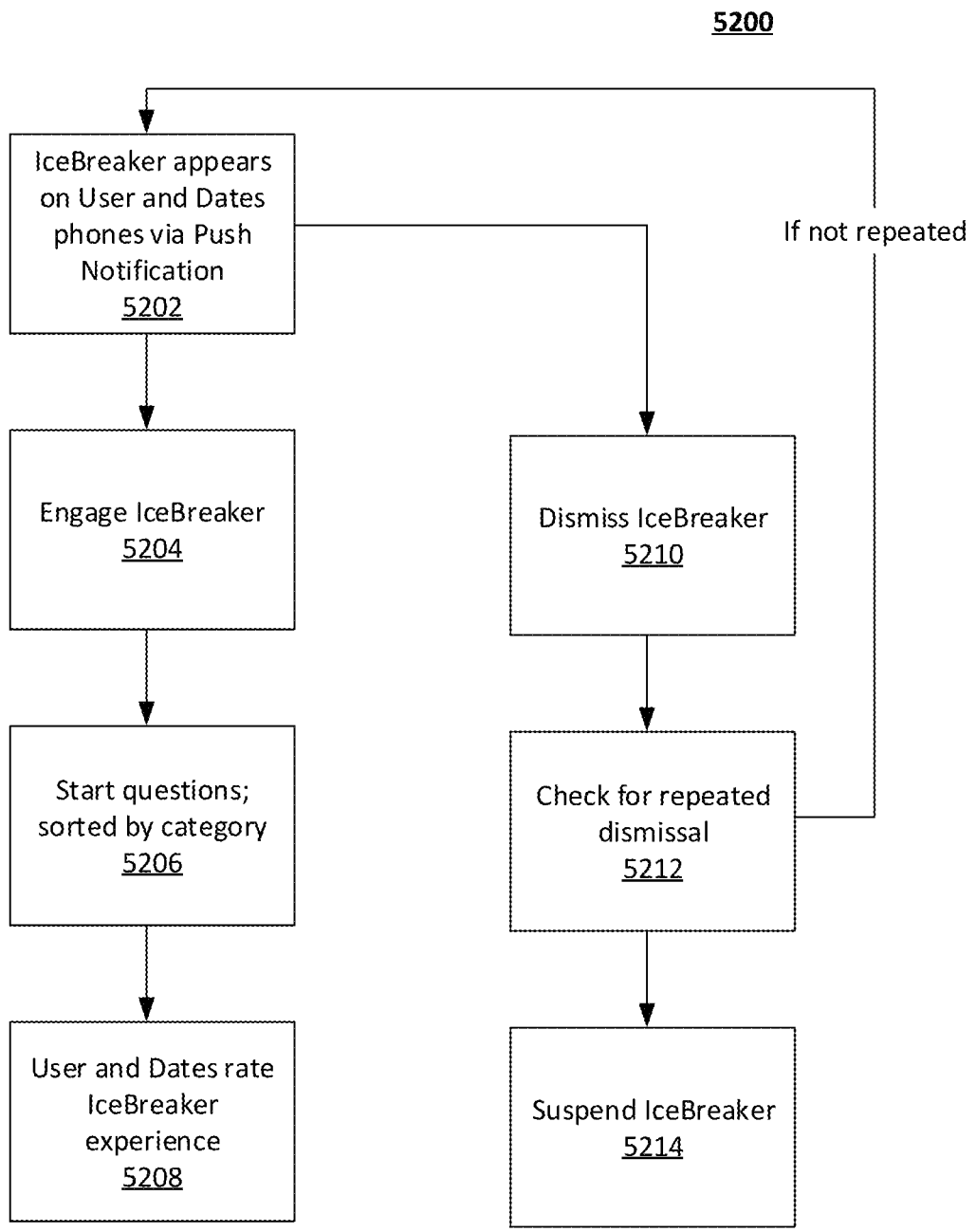
FIG. 52 illustrates a flowchart of a method of facilitating social networking based on events comprising management of an icebreaker, in accordance with some embodiments.

A further component/process of the present disclosure provides the IceBreakers process. This is depicted in FIG. 52. The IceBreaker may appear simultaneously on the User & the Dates phone via Push Notification 15 mins into EVERY Event that can be responded by X or CHECK (stage 5202 as shown in FIG. 52).

X Dismisses the Icebreaker (stage 5210 as shown in FIG. 52).

CHECK engages the Icebreaker (stage 5204 as shown in FIG. 52).

If the User and Date are engaging in the Outing for 15 minutes, then a Push Notification for an IceBreaker may automatically appear.

When IceBreaker Appears it may have a Check for activate or X for dismiss. If Icebreaker is activated, then IceBreaker is used. Further, the questions may be sorted by category (stage 5206).

HEART for enjoyed this IceBreaker and would like to use again or X for dismiss.

If the IceBreaker Is repeatedly dismissed (stage 5212), then IceBreaker may be suspended (stage 5214).

If the User is categorically intellectual & sports based the Date may receive an intellectual or sports based question to ask & Vice Verse. This can be determined through the Users interaction by events 'hearted', events attended, intake survey, & previous IceBreakers 'hearted'.

If Date has no knowledge of User's favorite category, then IceBreaker goes to User's next best preference.

Categories:
  Change.
  Self
  Funny
  Factual
  Silly
  Romantic
  Sexual
  Comedy-Dumb Questions
  Pop Culture—Did you Hear About?
  Sports—Did You See That?
  Games—Never Have I Ever, 21Q, Would you Rather?

Additionally, the User and Dates may rate IceBreaker experience (stage 5208 as shown in FIG. 52).

A further component/process of the present disclosure provides the Bluetooth Technology processes. Bluetooth Smart technology automatically pairs with User & Date when within 15 ft Proximity. A photo of the date may appear as a pop-up on other user's phone when in 15 ft radius, along with the question, "is this the person you booked a date with?"

If NO Date 'cancel option' is revealed. If NO and neither User nor Date cancels, the person who responded NO may be asked again during exit survey, "Did the person you went out with look like their photo?" If NO follow up question may be asked i.e. weight disparity, or looked entirely different If Date wanders out of radius more than twice per Outing or Once or Twice for more than 15 mins then send Push Notification to User "All Is Well With "[DATES NAME]?"

If "All Is Well with "[DATES NAME]?" and User clicks YES then END prompt, If User Answers NO then, Date Survey Prompted (DNA Rating System) with option to automatically cancel and replace Date after User has Rated Date.

If Date averaged below a 2.5 out of 5-star rating and did not cancel OPTION PROMPTED "End Date?" If Yes OPTION, "Select new date?" is prompted If User Selects Yes then Invitation is Sent to All Nearby Available Date(s) via Push Notification.

If Date leaves Users Bluetooth pairing zone 3 times per Outing or for more than 15 mins then send Push Notification "Please enjoy your Outing with your date!"

Date may no longer rank as high in the data pool in the present invention after consistent Dates Ended. With a continuation of cancellations, the User is Suspended.

If Date Is outside Bluetooth Radius of User and Date has 'Meter' running, then Push Notification that meter halts until Date is back within radius.

If 3 out of 7 Dates END DATE with specific User, then ended Dates are prompted to notify the present invention of the issue with that User.

A further component/process of the present disclosure provides the Mapping process. The application naturally determines Search Radius based on Geographical Typography and Urban Environment, User can expand Or contract Radius, or type in miles radius In Settings.

If User or Date is mobile, then Refresh Map every 50 feet in Outings.

A further component/process of the present disclosure provides the Calendar process. The Date can blackout specific dates within month in settings by double tapping unavailable days in settings calendar or Outings Calendar (week range).

Date can also blackout generally unavailable days i.e. Mon-Fri or M, W, F and double tap to make specific days available.

A further component/process of the present disclosure provides the Requests process. Point Request value formula for Dates. Variables may include: Life of Usage, Month, Week, etc. Variables do not average in Book Out Days.

((average point request value during entire usage of application+Monthly average point request value at end of 24 hr cycle+average of specific week of activity)/3)/2=the starting points request value of a Date in the next 24 hr cycle. Blackout days are excluded from averages.

If Date is available schedule wise for Outing and has no conflicting request, then Date may show up in GamePlan.

If Date(s) have more than 2 invitations in 24 hr cycle then increase points required by 10% for each User thereafter that sends Request within 24 hr cycle and limit visibility in the present invention Page to outside Users who have yet to request said Date that have inferior averaged Spending Gauges in comparison to the User in request group who has the highest Spending Gauge, or Users within Point Range to acquire Date, unless Date has similar Outing Requests.

If Date has appreciated by 75%-point value within 24 hr cycle and has at least 70% or more Green Lights from User(s) and Ratings above 2.5 then Date(s) acquires 'Meter'

If Date(s) receive 2 Request for Outings from Users within 5 mins then increase points required by 25%

If Date(s) receive 4 Request for Outings from Users within 5 mins then increase points required by 50% (so on so forth).

If Date(s) increase in Point Request Value required for Outing exceeds Users Points by 50% then Date may drop out of the Users, the present invention Dating Pool.

If Date is not metered, then Date must accept 1 of 10 User invitation requests per active 24 hr cycle. Number must fluctuate as Dating Pool grows.

If Date is Metered, then Date must accept 1 of 20 User invitations Request in order to view more invitations pertaining to 24 hr Cycle. Number must fluctuate as Dating Pool grows.

If Date(s) have over 10 invitations per 24 hr cycle and Date has at least 80% green lights, then Date automatically receives meter.

If a User Green lights a Date in ArmCandy Page or Homepage Map, then Date appears in the GamePlan queue, based on the aforementioned, then after double tapping the Date's image, a request may be sent to that date via push notification and User may show up in Date's Date Reel in Date's GamePlan Page.

If Date accepts User Request, then User may receive a Push Notification & Date(s) image may appear with a green check in GamePlan Date Reel and Date is ready to be Dragged & Dropped for 'Finalize'.

If the Date does not accept within an allotted time time frame of 24 hr Cycle, depending on the buffer of time away from the first Outing then Date may disappear from Users queue.

It is not until the User has Date(s) green checked in the queue, and then drags and drops one or more into drag & drop zone for Finalize & User purchases Outing that both may be notified of Outing Sequence & Location meeting.

A further component/process of the present disclosure provides the Push Notifications process. If User selects a Date out of point range, then more points must be bought in order to send Push Notification to Date in GamePlan. User(s) can send Push Notification to Date(s) by double tapping the picture of Date Reel in GamePlan.

If User receives 60% or more Invitation request for Outings than User sends out via Push Notification and has 60% Green Lights, then User becomes a Date.

If Date receives Inferior to 2.5 average stars then Date receives 5% of total preset Spending Gauge and Push Notification is sent "Uh-Oh you received a Low Rating".

Dates can Increase their average Rating per the present invention Application independent of Users by 2.5% (of Star Rating Scale) every time Date is on time. Date may be informed via Push Notification reminder Date(s) & User(s) can increase their rating (an hour or two before first Outing) and on the 1st, 3rd, 6th, 12th, 24th, Outing and every 6th Outing After. Unless Date is Late, remind Date on Next Outing 2 hrs Before first Outing and every 3rd Outing After.

Dates can Increase their average Rating by 5% per the present invention Application by accepting User within 5 mins of the initial Push Notification from User to Date. The Date may be informed via Push Notification that Date has the option to increase their rating.

If a User cancels after Finalize i.e. because of no show, or Tardiness 15 mins late, then send additional Push Notifications via Pop Ups allowing User(s) to communicate without chatting i.e. "[DATES NAME] is on her way and may be there in (15) mins (5-45 mins sliding scale adjustable by User or Date in Push Notification)." 2.5% of Users and Dates general points are deducted for Tardiness and Rating decreased by 5% and Date is less visible in Dating Pool.

If a User cancels because of their Date during Outing, then User can only be refunded half the points used to acquire Date and User may receive Push Notification Pop Up asking if User wants another Date (Display Dates In Pop Up) and send Push Notification to All Dates User Double Taps in Pop UP. (First Date to Accept replaces annulled Date)

If User wants to go out with another Date, then Display Dates Options for night Out in HomePage Map or GamePlan. If Date accepts User in Push Notification Pop Up or double taps User in GamePlan Date Reel then send Push Notification to both User and Date setting meet location.

If User requests another Date after cancellation Date, then send Location Based Push Notifications to nearby Dates prioritize User Request in Dating Pool and reduce points cost for next Date(s) by 20% to replace User(s) annulled Date.

If a Date is compatible with User by 80% or more based on Location, 'Hearted' & 'Checked' events In Outings, IceBreaker Consumption, IceBreaker Interaction, Points Available, Events Attended & User Survey) and Date clicks 'Check' on a certain event in Outings Page, then send Push Notification to all Users nearby who Green lit the Date and meet compatibility percentage. A Date that accepts Users invitation may be displayed in the Inventions HomePage Map and Gameplan Respectably. Pop Up may state "Do you want to take [DATES NAME] out?"

If Date accepts Push Notification Pop Up (Looks like classy invitation with Who, What, Where, When, How much) then Date's GamePlan Date Reel are visible one by one.

The Date's GamePlan may Display Picture of User, one User at a time, Users Spending Gauge, & Events to be Attended with User. If Date has not already accepted Users Invitation Request in Push Notification Invitation, then Date can double tap User's image to accept.

Promotion of more events and Tips and Hints to help secure the perfect Outings for every User of the present invention.

If User is going to finalize a 1 or 2 event evening the empty event slots, then aggrandize and a popup could say something to try and get the User to book another event or two.

If Date clicks the Check in Outings Page, then send automatic Push Notifications to Users that Green Lit Date or even Yellow Lit if 80% compatibility or more. These action are triggered when Date clicks the 'check' in Outings Page.

It's easier to think of GamePlan as a prepositional event planner. If User(s) selects Event(s) & Date(s) by double tapping which Event(s) Users would like to propose to Date(s) in Event Reel and users double tap Date(s) in Date Reel then send Date(s) Push Notifications.

If User confirms purchase after clicking finalize and processes in shopping cart. Once purchase confirmed by User Push Notification invitation is Pushed to all parties displaying Outing.

If Date(s) 'Checked' an Event in Outings Page that Date would like to attend then Users Date(s) have Red Lit may receive Push Notifications If Red Lit Users Have High Ratings, above 3.5 stars averaged, High Spending Gauge, 30% above what Date has averaged, & Above 70% compatibility.

If User would like to attend Outing with said Date, then User can double tap Date to Send Push Notification Invitation.

It's easier to think of it as a preposition, the User selects a Date & Events then double taps Date(s) in Date Reel to send them Push Notifications after selecting Events in Event Reel.

If a User Green lights a Date, Date appears in the User's GamePlan queue, based on the aforementioned, then after double tapping the Date's image, a request may be sent to that Date via Push Notification and may show up in Date's GamePlan Page.

If 'metered' Date removes 'meter' during date, then send Push Notification to User Stating "[DATES NAME] is enjoying her evening!"

If User has satisfied the Green/Yellow properties, then send to Event Reel to double tap Events User would like to attend and double tap Date(s) User would like to send Push Notification Invitation.

If Date(s) accept after Push Notification, then Dates appear with a green check within GamePlan Date Reel and can be Dragged & Dropped for 'Finalize'. Upon User 'Finalize', Date is locked into Outing and Date cannot receive anymore request invitations and temporally disappears from Dating Pool until Outing is complete.

If Invitation is sent to Date and no response has come from Date prior to the 2 hour Cut off time, then the Gameplan is ready to send NEW invitations to New Dates.

The User may be prompted to send for replacement Dates with high response rate timing for a Last Minute Date request.

If the original Date responds and confirms BEFORE any replacement Dates have responded, then original Date can attend or if User doesn't send invitations to anyone else and original Date responds then User can take original Date out.

If Original Date 'gets the Outing' after the 2-hour time cut off then "late Date" consequences, to encourage prompt responses in the future If User does not satisfy Number of Points to secure Date(s) and Date is within 30% of averaged points spent to secure Date then User can purchase more points to secure Date, send Push Notification to User, "Almost there! Get more points to secure a date with [DATES NAME]". Only Dates who have accepted invitation request and are Green Checked In Date Reel is when User is notified he requires more points for specific Date.

If Date Accepts Outing Request upon Via Push Notification Pop UP, then send to GamePlan.

If User clicks "Group Outing" then send Push Notifications to Dates notifying Group Outing, which prompts automatic Meter.

It's easier to think of it as a preposition, If User has already selected, as in checked, three chronologically synchronized Events in Outings Page then User Need only select Date(s) by double tapping Date(s) in Date Reel to send them Push Notifications. ELSE User has not satisfied Outing Page then User Must double tap Events in Event Reel prior to sending Push Notifications To Date(s).

If purchase processed by User, then Push Notification is Pushed to all parties displaying Outing & Meet Up Location and Date(s) no longer receive invitations.

No users may ever know whether another User or Date has Green or Yellow Lit them. If User double taps picture on Date Reel to send Push Notification to Date, then the Date can assume he or she was not Red Lit.

If a User Green lights a Date, Date may appear in the GamePlan queue, based on the aforementioned, then after double tapping the Date's image, a request may be sent to that Date via Push Notification & may show up in Dates GamePlan Page.

If Date Clicks Finalize then Date disappears from every other User(s) queue except for the one Date Finalized and User can confirm purchase, then Push Notification may be sent to both parties displaying Outing & Meet Up Location.

It is not until the User has Date(s) green checked in the queue, and then drags and drops one or more into drag & drop zone for Finalize & User purchases Outing that both may be notified with Push Notification of Meet Up Location.

If Date accepts Push Notification Pop Up (Looks like classy invitation with Who, What, Where, When, How much) then Date's GamePlan where Date views User's invitations are visible one by one then illuminate Users 'Finalize'.

If User has similar IceBreaker Usage as other Dates (visible because of each IceBreaker Push Notification pushed upon attendance at each new Outing which has a 'Heart' Check or Dismiss Feature) then prioritize display in the present invention Page & HomePage Map.

FOR Each Different event or venue attended during the Outing, one IceBreaker may appear simultaneously on the User & the Dates phone via Push Notification, 15 mins into Event, that can be responded to with X or Heart.

If the User and Date are engaging in the Outing for 15 minutes, then a Push Notification for an IceBreaker may automatically appear.

If Date wanders out of radius more than twice per Outing or Once or Twice for more than 15 mins then Push Notification may be sent to User "All Is Well With "[DATES NAME]?" and send Push Notification to Date asking if all is well or if Date wants to Cancel Date, Report User (Disrespect, Harassment, Other), or Continue Date? If Report User for Disrespect or Harassment 3 times, then Suspend User automatically.

If "All Is Well with "[DATES NAME]?" and User clicks YES then END prompt, If User Answers NO then, Date Survey Prompted (DNA Rating System) with option to automatically cancel and replace Date after User has Rated Date.

If Date averaged below a 2.5 out of 5-star rating and did not cancel OPTION PROMPTED "End Date?" If Yes OPTION, "Select new date?" is prompted If User Selects Yes then Invitation is Sent to All Nearby Available Date(s) via Push Notification.

If Date leaves Users Bluetooth pairing zone 3 times per Outing or for more than 15 mins then send Push Notification "Please enjoy your Outing with your date!"

If a User Green lights a Date, Date appears in the User's GamePlan queue, based on the aforementioned, then after double tapping the Date's image, a request may be sent to that date via push notification and User may show up in Date's Date Reel in Date's GamePlan Page.

If Date accepts User Request, then User may receive a Push Notification & Date(s) image may appear with a green check in GamePlan Date Reel and Date is ready to be Dragged & Dropped for 'Finalize'.

If User engages in IceBreakers, then User can 'Heart' IceBreaker else IceBreaker automatically disappears after 10 mins of idle use or until Next Outing. (Users & Dates may receive an IceBreaker via Push Notification 15 mins After the User and Date are engaging in the Outing).

If the User becomes within the 15 ft proximity the Bluetooth technology may activate and a push notification may be sent to the User(s) for verification.

If User engages Outing, then during and after the Outing Push Notifications sent via DNA Rating System which Rate Locations after each venue and Date at end of Outing.

Each Different event or venue attended during the Outing, one IceBreaker may appear simultaneously on both the User & the Dates phone via Push Notification, that can be responded to by 'Check' for use or 'X' for Dismiss.

If Date receives Inferior to 2.5 average stars then Date receives 5% of total preset Spending Gauge and Push Notification is sent "Uh-Oh you received a Low Rating".

If a User cancels because of their Date then User can only be refunded half points and User may receive Push Notification Asking If User wants to go out with, Display Date Options. If User double taps one Date or more then send Push Notification setting meet location.

If Date accepts Push Notification Pop Up, the Date can then send to GamePlan where Date views Users and can Drag & Drop 'Finalize' & Accept. In the invention's preferred embodiment, the Push Notification Pop Up looks like an elegant, classy invitation with information including but not limited to: Who, What, Where, When, How much, etc.

If Date(s) accept after Push Notification, then Dates appear with a green check within GamePlan reel and can be Dragged & Dropped for 'Finalize'.

If a Date is compatible with User by 80% or more based on Location, 'Hearted' & 'Checked' events In Outings, IceBreaker Consumption, IceBreaker Interaction, Points Available, Events Attended & User Survey) and Date clicks 'Check' on a certain event in Outings Page, then send Push Notification to all Users nearby who Green lit the Date and meet compatibility percentage. A Date that accepts Users invitation may be displayed in the Inventions HomePage Map and Gameplan Respectably. Pop Up may state "Do you want to take [DATES NAME] out?"

If User exhausts the Dating Pool in Green/Yellow Light System, then Send To GamePlan to refine Dates by double tapping Dates, in Dating Reel, and send a Request to Dates, via the aforementioned classy invitation, via Push Notification.

If 'metered' Date removes 'meter' during date, then send Push Notification to User Stating "[DATES NAME] is enjoying her evening!"

If User does not satisfy Number of Points and Date is within 30% of averaged points spent to secure Date then User can purchase more points to secure Date, send Push Notification to User, "Almost there! Get more points to secure a date with [DATES NAME]". Only Dates who are Green Checked in to GamePlan Date Reel can User have option to buy more points for.

If User clicks "Group Outing" then send Push Notifications to Dates notifying Group Outing, which prompts automatic Meter. If Group Outing approved, then Dates receive automatic meter for the evening.

If User has similar IceBreaker Usage as other Dates, visible because of each Ice Breaker Push Notification pushed upon attendance at each new Outing, which has a 'Heart' Check or Dismiss Feature, then prioritize display in the present invention Page & HomePage Map.

If Users & more specifically the Date wanders out of radius a Push Notification with be sent to User "All Is Well?" If "All Is Well" end prompt, If Not, Date Survey Prompted, DNA Rating System, with option to automatically cancel, not without rating the Date first. If Date averaged below a 2.5 out of 5-star rating OPTION PROMPTED "End Date?" If Yes OPTION, "Select new date?" is prompted. ELSE Date is continued and a Push Notification is sent to Date stating "Please enjoy your evening with your date!" Date may no longer rank as high in the data pool in the present invention after consistent Dates Ended with them. With a continuation of cancellations back to back the User or Date is Suspended.

If a Date responds due to cancellation then Dates may receive 20% of Spending Gauge and averaged out with current Rating, and rating received on the Outing. The User or Date may be informed via Push Notification of the option to increase Rating.

Dates can Increase average Rating per the present invention's Application by 2.5%, of Star Rating Scale every time Date is on time. The User or Date may be informed via Push Notification for the option to increase their rating.

Dates can Increase average Rating per the present invention's Application by 5%, of Star Rating Scale by accepting Users within 10 mins. The User or Date may be informed via Push Notification for the option to increase their rating.

All push notifications may be able to be viewed in the notifications section within the application, instead of invitation in profile notification section.

Every Rating is illustrated by 1-5 Star system per each category. There are 4 Categories for Rating Dates which are Respect, Kindness, Loyalty, and Attentiveness. There are two Categories for Dates rating Users which are Respectfulness and Generosity. No Categories for Venues, Partnerships, & IceBreakers just 1-5 Star Pop UP i.e., Rate Venue.

If User is leaving a Venue, then User Can Rate the Venue with 1-5 stars via Pop Up.

If User has 'hearted' 10% of events in data pool, then a POP UP for GamePlan Page is Prompted.

If User has 'checked' represents booking, more than three events in the Outings Page in a (24 hr cycle) then POP UP for GamePlan is prompted.

If Date accepts Push Notification Pop Up, Looks like classy invitation with Who, What, Where, When, How much) then send to GamePlan where Date view User(s) one by one and Users GamePlan may populate Dates Event Reel ELSE can Drag & Drop 'Finalize' & Accept.

If User is a Date, then Date can only RED light 10% of the Dating Pool. If Date maxes out of RED lights, then POP UP may appear "I'm sorry, you've exceeded maximum amount of RED lights for the Day."

If a Date is Metered, then can only RED light 25% of the Dating pool. If User maxes out of RED lights, then POP UP may appear "I'm sorry, you've exceeded maximum amount of RED lights for the Day"

If a Date has 25% of the Red Lights remaining, then a Pop Up may appear.

If Date Accepts Outing Request upon 'Finalize' Via Push Notification Pop UP, then send to GamePlan.

If User or Date double checks event in event reel and drag & drops into drag & drop zone without Date or User and clicks 'finalize' then Display Pop Up 'Enter Solo Mode?' If Yes, then End Prompt If No then direct to Date Reel.

If Date clicks the Check in Outings Page, then send automatic Push Notifications to Users that Green Lit Date or even Yellow Lit if 80% compatibility or more. These actions are triggered when Date clicks the 'check' in Outings Page.

If User drags & drops to 'Finalize' and Date Also clicks 'Finalize' in Date(s) GamePlan then User is prompted to purchase Outing ELSE once purchase confirmed by User, then Push Notification is Pushed to all parties displaying Outing.

A Pop-Up may appear If a User Green Lit 25 Date(s) or has 70% compatibility with 10 Dates whichever happens first then send to GamePlan or Illuminate toggle.

If Date or User accepts invitation request, then User may receive a Push Notification & Date(s) image may appear with a green check in GamePlan Date Reel and Date is ready to be Dragged & Dropped for 'Finalize'.

If Date Clicks Finalize then Date disappears from every other User(s) queue except for the one Date Finalized with and User can confirm purchase, then Push Notification may be sent to both parties displaying Outing.

It is not until the User has Date(s) green checked in the queue, and then drags and drops one or more into drag & drop zone for Finalize & User purchases Outing that both may be notified with Push Notification.

If Date does not attend 1 Outing for every 25 Invitations, then reduce Point Request Value by 25%. Additional POP UP "Uh-Oh We've noticed you have had a lot of requests but have not been accepting any, is everything okay?" This number must fluctuate based on volume of active User base.

A further component/process of the present disclosure provides the Solo Mode process. If User or Date double checks event in Event Reel and drag & drops into drag & drop zone without Date or User and clicks 'Finalize' then Display Pop Up 'Enter Solo Mode' If Yes End Prompt If no, then direct to Date Reel.

In 'Finalize', Shopping Cart Date or User Has option to purchase one or multiple tickets in Solo Modes If User wants to attend a Ticketed Event without the full present invention's usage Experience, then enter SOLO MODE.

The present invention may also Have a Website for the Ticketing Agency to operate out of. If a Ticketed Event is selected, then User may be redirected to the present invention Ticketing Agency to proceed with the purchase of the Ticketed Event.

The present invention Ticketing Agency Website is also for direct purchase, without needing full arrangements, such as in Solo Mode.

Certain trending events are prioritized based upon partnership agreements. This must be an open ended system to promote affiliated partners and ticketed events available in the present invention's Ticketing Agency.

If the present invention's Ticketing Agency doesn't have the Events desired, then redirect them or purchase IN APP in accordance with the agreements set between the affiliated partners. Following a similar procedure to that of the present invention's Ticketing Agency Ticketed Events Purchase INApp, which is the Outings Page, or OUTofApp Link, which is associated with a Website purchase.

A further component/process of the present disclosure provides the All Percentages process. This defines equivalences for the ratings. Each Star is equivalent to 20% thus 5 stars=100%

If a Date averages 5 stars in all categories on an Outing, then the Date receives 15% of total preset Spending Gauge.

If a Date averages 4 stars in all categories on an Outing, then the Date receives 12% of preset Spending Gauge.

If a Date averages 3 stars in all categories on an Outing, then the Date receives 9% of total preset Spending Gauge.

If a Date averages 2.5 stars in all categories on an Outing, then the Date receives 7% of total preset Spending Gauge.

If a Date averages 2.5 stars or below in all categories on an Outing, then Date receives 5% of total preset Spending Gauge and Push Notification is sent "Uh-Oh you received a Low Rating".

If a Date responds due to cancellation, then Dates may receive 20% of Spending Gauge averaged out with current Rating and rating received on the Outing.

If Dates responds OnDemand then Dates may receive 20% of Spending Gauge averaged out with current Rating and Rating during the Outing.

Dates can Increase their average Rating per the present invention Application's by 2.5% (of Star Rating Scale) every time Date is on time.

Dates can Increase their average Rating per the present invention Application's by accepting Users within 10 mins by 5%, of Star Rating Scale.

If Date has 3 Consecutive Outings with Ratings Less Than 2.5 averaged Star Ratings, then move to back of Dating pool queue and Date requires 10% less Point Request Value LOOP.

If Date cancels on back to back Outings, then point value of Date is decreased by 10% and Rating Decreased by 10%.

If a Date cancels after acceptance of a User, then points are deducted and Rating decreased by 10%.

If User requests another Date after cancelling Date, then send Location Based Push Notifications to nearby Dates and prioritize User's Request in Dating Pool and reduce points cost for User by 15% to replace annulled Date.

If Date requires more points than User has then display Dates no more than 30% out of Users averaged Spending Gauge interactions.

If User is a Date, then Date can only RED light 10% of the Dating Pool. If User maxes out of RED lights, then POP UP may appear "I'm sorry, you've exceeded maximum amount of RED lights for the Day."

If a Date is Metered, then Metered Date can only RED light 25% of the Dating pool. If Metered Date maxes out of RED lights, then POP UP may appear "I'm sorry, you've exceeded maximum amount of RED lights for the Day."

If a Date only has 25% of the Red Lights remaining, then a POP UP may appear.

If a Date receives a substantial amount of Red lights, 65%, from the general community, then the Date may be substantially less visible in the present invention's Dating Pool and require less points or none.

If a User receives a substantial amount of Green lights, 70%, from the general community in a short amount of time, and Requests for Outings then the User may become a Date.

If a User becomes a Date then the Date must attend one Outing a week, have 85% Green Lights or more, have a rating above 3 stars, and have 3 or more invitation request per 24 hr cycle then the Date can maintain the 'metered' status and 5 Green Lights.

If a Date receives 80% Green lights from the general community in 72 hours, based on the population and frequency of Request, then the Date may be optioned for a meter.

If User does not satisfy Number of Points and Date is within 30% of averaged points spent to secure Date then User can purchase more points to secure Date, send Push Notification to User, "Almost there! Get more points to secure a date with [DATES NAME]". User only has option to buy more points for Checked Dates.

If a User who is Red Lit by A potential Date Plans an Outing that is set at 40% superior to what A Date typically earns in points, then User bypasses Red Light function.

If User has 90% or compatibility with Date, then bypass Red Light Function.

If Date clicks the Check in Outings Page, then send automatic Push Notifications to Users that Green Lit Date or even Yellow Lit if 80% compatibility or more. These actions are triggered when Date clicks the 'check' in Outings Page.

All compatibility between User(s) and Date(s) may be predicated on Percentage of similarities based upon User Intake Survey (the initial 5 question picture survey & the Word Based Survey 5 out of 100 questions that pop up every three Outings and every 100 Green Lights that feed back into the GameCenter), Icebreaker Usage, IceBreaker consumption, Rating, Events 'Hearted,' Events Attended, Events 'Checked', Location, Availability, Mood Gauge, GamePlan Icon Interaction, Belt-Level, Trail Interaction whether Online or Offline or Booked, Points required to book Date(s). If User has enough points required to book Date(s) or is within a 30% range, matching is predicated on more than whether a User green or yellow lit a date.

If User Green Lit 25 Date(s) or has 70% compatibility with 10 Dates whichever happens first, then Pop-Up may appear to send to GamePlan.

If User Green lights a Date, then Date appear in GamePlan If User & Date have at least 50% similar interest or have a Similar GamePlan or Date has Green or Yellow Lit User.

If User selects a Date within point range but does not have the points to satisfy the Date(s) 'Meter' (only applies to Metered Dates within 30% of Users averaged spending') then after Date(s) accepts Outing, notify User more points are required to secure Outing, after the User has clicked 'Finalize' in shopping cart.

If User receives 70% or more Green Lights, then User automatically becomes Date.

If User receives 60% or more Invitation request for Outings than User sends out via Push Notification and has 60% Green Lights, then User becomes a Date.

If User receives 90% more points than User Spends, Excluding reward system for attending events, then User becomes automatically becomes Date.

If Date Red Lit User, then Date may only show up In User(s) Date Reel If Users Spending Gauge is 30% more than what Date typically earns in Points or if User has 90% compatibility or more.

If Date is inactive 14 consecutive 24 hr Outing cycles or 14 days then Dates points request value, points required for User(s) to finalize with Date, depreciates not points accumulated by 10% LOOP. Calendar Blackout Days do not count toward 14.

If Date is inactive for 7 consecutive days then Push Notification, "we notice you've been inactive. Would you like to update your calendar?" Calendar Blackout Days do not count.

Each Star is equivalent to 20% thus 5 stars=100%

If a Date averages 5 stars in all categories during an Outing, then Date receives 15% of total preset Spending Gauge averaged with current Rating and Rating after the Outing.

If a Date averages 4 star in all categories during an Outing, then Date receives 12% of preset Spending Gauge averaged with current Rating.

If a Date averages 3 stars in all categories during an Outing, then Date receives 9% of total preset Spending Gauge averaged with current Rating.

If a Date averages 2.5 or more stars in all categories during an Outing, then the Date receives 7% of total preset Spending Gauge averaged with current Rating.

If Date receives Inferior to 2.5 average stars then Date receives 5% of total preset Spending Gauge and Push Notification is sent "Uh-Oh you received a Low Rating".

Dates can Increase their average Rating per the present invention's Application independent of Users by 2.5% of Star Rating Scale every time Date is on time. Date may be informed via Push Notification for the option to increase their rating an hour before first Outing and on the 1st, 3rd, 6th, 12th, 24th, Outing and every 6th Outing After. Unless Date is Late, remind Date on Next Outing 2 hrs Before first Outing and every 3rd Outing After.

If 'Metered' Date accepts 1 of first 5 Invitation Requests from Users, then Date can Boost Ratings per the present invention's Application By 20% Averaged with Past Ratings.

If Date accepts 1 of first 3 Invitation Requests Date Receives from Users Date can Boost Ratings per the present invention's Application By 20% Averaged with Past Ratings.

Dates can increase their average Rating by 5% per the present invention's Application by accepting User within 5 mins of the initial Push Notification from User to Date. The Date may be informed via Push Notification for the option to increase their rating.

If Date has 3 Consecutive Outings with Low Ratings Less Than 2.5 averaged Star Ratings, then move to back of Dating pool queue and Date requires 10% less points loop.

If User cancels on back-to-back Outings (Twice) then Date's point value is decreased by 10% and Rating Decreased by 10% LOOP.

If a User cancels after Finalize i.e. because of no show, or Tardiness 15 mins late, then send additional Push Notifications via Pop Ups allowing User(s) to communicate without chatting i.e. "[DATES NAME] is on her way and may be there in (15) mins (5-45 mins sliding scale adjustable by User or Date in Push Notification)." 2.5% of Users and Dates general points are deducted for Tardiness and Rating decreased by 5% and Date is less visible in Dating Pool.

If User requests another Date after cancellation of Date, then send Location Based Push Notifications to nearby Dates prioritize User Request in Dating Pool and reduce points cost for next Date(s) by 20% to replace User(s) annulled Date.

If Dates respond due to cancellation, then Dates may receive 20% of Spending Gauge averaged out with current Rating and Rating on Date.

Date's Home Page may be populated with Users that Date Green Lit, Users with hearted similar events, Date(s) that User(s) accepted but Users did not 'Finalize' with in time, and Users that meet 80% or more compatibility requirements.

If a User or a Date Green Lights or Yellow Lights each other with 80% compatibility or more then User and Date are more likely to show up in one-another's HomePage Map.

If User has 'hearted' 10% of events in Dating Pool, then a Pop up for GamePlan is Prompted.

If User has similar interest expressed of 70% or more 'hearted' or 'checked' events comparable to Date(s) in Dating Pool, then potential Date(s) may be prioritized in Users HomePage Map.

If a Date is compatible with User by 70% or more based on:
1. Location
2. 'Hearted' & 'Checked' events In Outings
3. IceBreaker Consumption
4. IceBreaker Interaction
5. Points Available
6. Events Attended
7. User Survey
8. Trail Interaction
9. Belt-Level
10. GamePlan Icons
11. Spending Gauge Date has Minimum Rating of 3 Stars on DNA Rating Scale. Date clicks 'Check' on any event in Outings Page, then send Push Notification to all Users nearby who Green or Yellow lit Date and meet compatibility percentage. "Do you want to take '[DATES NAME]' out?" If a Date WANTS to go to a particular Event on a certain day, then select the 'Check' in the Outings Page to send a Push Notification to ALL User's who match the appropriate compatibility criteria-Including the price range (with an overhead of a 30% variable increase).

If a Date is compatible with User by 60% or more based on:
12. Location
13. 'Hearted' & 'Checked' events In Outings
14. IceBreaker Consumption
15. IceBreaker Interaction
16. Points Available
17. Events Attended
18. User Survey
19. Trail Interaction
20. Belt-Level
21. GamePlan Icons
22. Spending Gauge Date has Minimum Rating of 3 Stars on DNA Rating Scale Date clicks 'Check' on any event User HEARTed or CHECKed in Outings Page then send Push Notification to all Users nearby who Green lit the Date and meet compatibility percentage. "Do you want to take '[DATES NAME]' out?"

If Date clicks the Check in Outings Page, then send automatic Push Notifications to Users that Green Lit Date or even Yellow Lit if 80% compatibility or more. These actions are triggered when Date clicks the 'check' in Outings Page.

If Date requires more points than User has then display Dates no more than 30% out of Users averaged Spending Gauge interaction.

If User is a Date, then Date can only RED light 10% of the Dating Pool. If Date maxes out of RED lights, then POP UP may appear "I'm sorry, you've exceeded maximum amount of RED lights for the Day."

If a Date is Metered, then Date can only RED light 25% of the Dating pool. If User maxes out of RED lights, then POP UP may appear "I'm sorry, you've exceeded maximum amount of RED lights for the Day."

If a Date has 25% of the Red Lights remaining, then a POP UP may appear.

If User has 80% shared preferences and interests with a Yellow Lit Date, then Yellow Lit Date may supersede Green User in GamePlan Date Reel Unless Green Lit Date is superior in compatibility to Yellow Lit. These preferences and interests are determined by events 'hearted', Location, Interests, Intake survey, and IceBreakers 'hearted' or answered similarly.

If a User receives a substantial amount of Red lights 65% or more from the general community and User has not purchased an Outing, then User may be substantially less visible in the present invention's Dating Pool. If User receives 80% Red Lights then User may be invisible to Dating Pool unless User purchases points or Outings Once A Month, this does not take effect until after the User's first month.

If a User receives a substantial amount of Green lights (70%) from the general community in a short amount of time, and Requests for Outings then the User may become a Date.

A Pop-Up may appear. If a User Green Lit 25 Date(s) or has 70% compatibility with 10 Dates whichever happens first, then send to GamePlan or Illuminate GamePlan toggle.

If User & Date have at least 50% similar interest and only one has only Green Lit another then display in Date Reel if User & Date have 50% or more compatibility.

If User has Yellow Lit Date, then Display Date if similarities are 70% or more.

If a Date receives 80% Green Lights from the general community, then 'Meter' is automatically put on Date. Date must maintain at least 3 star averaged User Rating to sustain 'Meter' and sustain at least 3 invitation request per Online 24 hr cycle. Meter is based on the population and frequency of Request.

A Meter is determined by charging User 10% of Date(s) Point Request Value averaged with the total Outing(s) used to secure Date hourly.

If Metered Date is in group Outing, then Date may receive 15%

If Date does not attend 1 Outing for every 50 invitations, then make Date 100% less visible in Dating Pool.

If Date does not attend 1 Outing for every 25 Invitations, then reduce Point Request Value by 25%. Additional Pop Up "Uh-Oh We've noticed you have had a lot of requests but have not been accepting any, is everything okay?"

Date must attend one Outing per week, excluding calendar blackout, have 75% Green Lights or more, have a rating above 2.5, and have 3 or more invitation request per 24 hr cycle to maintain the 'metered' status, Unless Date Attends First or Second Request.

If User does not satisfy Number of Points to secure Date(s) and Date is within 30% of averaged points spent to secure Date then User can purchase more points to secure Date, send Push Notification to User, "Almost there! Get more points to secure a date with [DATES NAME]". (Only Dates who have accepted invitation request and are Green Checked In Date Reel is when User is notified he requires more points for specific Date).

If User has enough or is within a 30% range of Point Request Value in order to 'Finalize' with Date(s) then display in GamePlan Date Reel and based Upon whether a Date Green or Yellow Lit a Date.

A Pop-Up may appear If a User Green Lit 25 Date(s) or has 60% compatibility with 10 Dates whichever happens first then send to GamePlan.

If a User has satisfied the present invention's ArmCandy Page by Lighting 10-50% of Online Dating Pool, then send to Outings Page.

If Date did not Red Light User, then Date may show up In User(s) Date Reel Unless User is spending 30% more then what Date typically earns in Points or 90% or more compatibility.

If a User who is Red Lit by a potential Date Plans an Outing that is set at 30% superior to what A Date typically averages in points, then User bypasses Red Light function.

If User is Red Lit by a potential 'Metered' Date Plans an Outing 40% superior to what A Date typically earns in points, then The User bypasses Red Light function.

If User is Red Lit by potential Date and is 90% compatible, then bypass Red Light function.

If Date(s) have more than 2 invitations in 24 hr then increase points required by 10% for each User thereafter that sends Request within 24 hr cycle and limit visibility in The present invention's ArmCandy Page and HomePage Map to outside Users who have yet to request said Date that have inferior averaged Spending Gauges in comparison to the User in request group who has the highest Spending Gauge, or Users within Point Range to acquire Date, unless Date has similar Outing Requests.

If Date has appreciated by 75%-point value within 24 hr cycle and has at least 70% or more Green Lights from User(s) and Ratings above 2.5 then Date(s) acquires 'Meter'

If Date(s) receive 2 Request for Outings from Users within 5 mins then increase points required by 25%

If Date(s) receive 4 Request for Outings from Users within 5 mins then increase points required by 50% (so on so forth).

Date(s) with over 10 invitations per 24 hr cycle automatically receive meter If Date has 80% Green Lights or more.

IF User attends 1 Event per Outing THEN User recovers 2.5% of Points Spent ELSE unless Date is metered.

IF User attends 2 Events per Outing THEN User recovers 5% of Points Spent ELSE unless Date is metered.

IF User attends 3 Events per Outing THEN User recovers 7.5% of Points Spent ELSE unless Date is metered.

IF User attends a Select Event or Outing THEN 10% of points spent are recovered ELSE Unless Dates are Metered.

IF User attends 2 Select Events in One Outing THEN User recovers 12.5% of Points Spend ELSE Unless Date is Metered.

IF User attends 3 Select Events in One Outing THEN 15% of Points Spent are recovered in Joux.

Maximum discount cannot exceed aggregated discount 15%.

A further component/process of the present disclosure provides the Compatibility process. The Default Operating Statistic for Compatibility between User(s) & Date(s) is 60%.

If User has Yellow Lit Date, then Date may show up in GamePlan Date Reel If User and Date share 70% Compatibility.

If User and Date Have Green Lit each-other, then automatically display in GamePlan Date Reel and prioritize in HomePage.

If User has Green or Yellow Lit Date and Date has not yet Green, Yellow or Red Lit User then the general operating statistic for compatibility is 60%.

If User & Date have identical GamePlan or have check three of the same events that chronologically synchronize within 24 hrs then display in Game Plan If User or Date have not Red Lit each other.

If User has 'checked' 10% of events in data pool, then a POP UP for GamePlan Page is Prompted. Therefore, User can view all of the Date(s) in Date Reel that would like to attend the events User has 'hearted'.

If User has similar interest expressed by 70% or more 'hearted' or 'checked' events comparable to Date(s) in Dating Pool, then potential Date(s) may be prioritized in Users Home Page Map.

If User shares 70% or more compatibility with Date(s) then become prioritized in the present invention Page and a Yellow Lit Date can supersede A Green Lit Date in GamePlan Page.

If Dates 'Checked' an event that Date would like to attend and have few invitation requests from Users then Users Date has Red Lit may appear If Red Lit Users Have High Ratings of 3 stars or more, and 70% or more compatibility.

If User Green or Yellow lights Date(s), then Date(s) may appear in GamePlan (in order of percentage compatibility, ratings, and IceBreaker Usage, Location, Average Outing Request Acceptance Response Time, Events Date 'Hearted') for further action.

If a Date is compatible with User by 80% or more based on Location, 'Hearted' & 'Checked' events In Outings, IceBreaker Consumption, IceBreaker Interaction, Points Available, Events Attended & User Survey) and Date clicks 'Check' on a certain event in Outings Page, then send Push Notification to all Users nearby who Green lit the Date and meet compatibility percentage.

All compatibility between User(s) and Date(s) may be predicated on percentage of similar interest via User Intake Survey (the initial 5 question picture survey & the 5 out of 100 word based questions that pops up every three Outings, or every 100 Green Lights), Icebreaker Usage, IceBreaker Consumption, Ratings, Event 'Hearted, Events Attended, Events 'Checked', Location, Trail Interaction, Belt-Level, GamePlan Icons, Spending Gauge, Availability (Location whether Online or Offline or Booked), and Points required to book Date.

If User has enough or is within a 30% range, then display in GamePlan and based Upon whether a Date Green or Yellow Lit a Date.

If Date clicks the Check in Outings Page, then send automatic Push Notifications to Users that Green Lit Date or even Yellow Lit if 80% compatibility or more. These actions are triggered when Date clicks the 'check' in Outings Page.

If a User Green Lit 25 Date(s) or has 70% compatibility with 10 Dates whichever happens first, then illuminate Game Plan Toggle and send to GamePlan.

If User Green Lights a Date Date(s) appear in GamePlan If User & Date have at least 60% similar interest or have a Similar (2 of 3) GamePlan Event Reel or have Green or Yellow Lit each-other.'

If Date Red Light User, then Date may show up In User(s) Date Reel Unless User is spending 30% more then what Date typically earns in Points or 90% or more compatibility.

A further component/process of the present disclosure provides the Partnerships process. If a User utilizes one of the partnerships available, then the User may automatically receive 50 points.

If User or Date(s) Checks Event(s) in GamePlan Event Reel and click finalize then POP UP display (solo mode)

then it may give the discount to the User. i.e., If it is a 15% aggregated discount then that may discount may be given to the User.

If a User has their Spending Gauge at the maximum or a substantially large amount, then their discount rate would be much less.

If a User requests a 'metered' User and has the maximum Spending Gauge set, then the 'metered' user may not receive meter wage, because of the percentage from the discount.

If a User has the maximum Spending Gauge set, and requests multiple Dates instead of one, then the Spending Gauge earnings may be split among the multiple Dates and Meter is forfeited.

If a Date receives Excellent and Superb 5 Star Rating from User, then Date earns a higher percentage of Spending Gauge.

If a Date averages 5 stars in all categories during an Outing, then Date receives 15% of total preset Spending Gauge averaged with current Rating and Rating after the Outing.

If a Date averages 4 star in all categories during an Outing, then Date receives 12% of preset Spending Gauge averaged with current Rating.

If a Date averages 3 stars in all categories during an Outing, then Date receives 9% of total preset Spending Gauge averaged with current Rating.

If a Date averages 2.5 or more stars in all categories during an Outing, then the Date receives 7% of total preset Spending Gauge averaged with current Rating.

If Date receives Inferior to 2.5 average stars then Date receives 5% of total preset Spending Gauge and Push Notification is sent "Uh-Oh you received a Low Rating".

If Dates would like to Increase their average Rating per the present invention's Application by 2.5% (of Star Rating Scale) then every time Date is on time 2.5% is averaged into overall percentages.

Dates can Increase their average Rating per the present invention's Application by accepting Users within 10 mins by 5% (of Star Rating Scale).

A further component/process of the present disclosure provides the Invitations process. The User can send out invitation through plug ins Instagram, Facebook, Twitter, Text, Email, Verify Photo, Verify Phone Number, Verify Social Media Accounts.

A further component/process of the present disclosure provides the Help process (5302) as depicted in FIG. 53. This comprises of several sub-processes, including but not limited to: App Walk-Through (stage 5304), Helpful Hints (stage 5306 as shown in FIG. 53), Compatibility Questions (stage 5308), Ways to increase Rating (stage 5310) and also GameCenter methods of social interaction enhancement (stage 5306 as shown in FIG. 53).

A further component/process of the present disclosure provides the optional retrofit dongle. This is an electronic device dedicated to geolocation. In the invention's preferred embodiment, the dongle is approximately the size of a cigarette butt. It may utilize industry-standard geolocation techniques such as WiFi hotspot correlation to narrow the location down to within 5 feet, in the invention's preferred embodiment. Alternative or future embodiments of the invention may utilize Bluetooth and GPS to make the geolocation even more accurate. Importantly, the dongle is closely tied into the AC GNSS system, described later in this disclosure. In addition, the dongle may also have an integrated battery pack. This can aid with the high power drain of the mobile device, and help mitigate the power-draining effects of continually searching and checking for users in proximity even while offline.

A further component/process of the present disclosure provides the optional customized phone case. In the invention's preferred embodiment, this may include geolocation functionality similar to the dongle in the preceding description. In addition, the phone case may also have an integrated battery pack used to recharge the phone, similar to the dongle. As with the dongle, this can aid with the high power drain of the mobile device.

A further component/process of the present disclosure provides the AC GNSS system which ties into many of the aforementioned components, described as follows. This provides the ability to connect with other field sensors that emit format data simultaneously with a GPS, so data from multiple sensors can be incorporated into the data-collection application.

All active Users and Dates of the present invention Application may receive the aforementioned phone dongle designed exclusively for the present invention's Network to enhance the present invention's Application experience.

As mentioned the Dongle may have a slim case to fit around the bottom of the mobile device, and is roughly the size of a cigarette butt in the invention's preferred embodiment. The location of the Dongle on the mobile device enables it to double as a "back-up battery life" by holding a 40% charge for the mobile device to be administered through the connection at the bottom of the mobile device. The Dongle itself can be charged by the USB output for wall charging or the solar cells on the back of it by either being outside or leaving it on a windowsill or a table that receives direct sunlight. An additional model may not have solar panels and merely a connection for a USB charger.

Beyond supplying an additional full battery life, the Dongle may be able to assist in creating the perfect the present invention's experience with the usage of free, offline outer net connection to the GNSS satellite network. The benefits of such a connection are described as follows:

First, there is increased safety. This can be subdivided into categories and sub-processes:

Further provided is Familiarity. The Dongle creates a predictable familiarity when people are engaging in any the present invention's orchestrated Outings. This is recognized first of all by the trademarked phone Dongle that EVERY member of the present invention's Network may have to ensure validation among people who may be meeting for the first time.

Further provided is Predictability. The accurate GNSS system is designed to override the internal GPS on iOS device with the location data coming from the external GPS so all existing apps using internal location services can benefit from the increased accuracy without any changes to the app. This creates an extremely accurate prediction system for arriving Dates and the orientation of meeting-up with people to engage in the present invention's Outings.

There are Parameters. The accurate GNSS system may be able to map out the interior of all Event locations being attended by emitting and receiving data from the satellite networks as well as any devices also on the network. These Parameters are essential to the safety and predictability of the application to ensure that no one gets lost either in the venue or separated from their Date.

Further provided is a Separation Radius: The present invention's application enforces the agreement of set radii used during all Outings orchestrated by the present invention. The Dongle is essential for this feature by maximizing the accuracy of the location relative to the radius of the User/Date agreement.

Further provided is an Outing Cessation. To aid in the Safety of the application the Dongles also ensure that the Date has ended and that everyone had a good time.

Next, there is the category of Functionality Within the Application.

Further provided is a Precise Search Radius. The present invention's Page is filtered by a search radius and the more accurate the location the more efficient the application becomes. This is most notable with people who are traveling and need their radius updated by the second.

Further provided is a Moving Network. As the GNSS Detects movement (traveling) of the Mobile Device the Dates may automatically be filtered as they move into or out of the selected radius set ensuring that only Dates with the proper proximity to the User may be shown.

There are New Events: Events may be constantly updated as the mobile signal moves into new areas of the map depending on the proximity to locations for ticketed events as well as businesses affiliated with the present invention.

Further provided is Movement Communication: A Push Notification to state that the search radius for the present invention's Events and Dates had been adjusted because the GNSS system detected a substantial difference in location. "We noticed you've been traveling! You may see NEW Events and Dates for your current Location!" Then Promoted to select "OK" or "Take me Home" which may allow the regular Dates and Events in their Home Location to remain on the feed (assuming that they are heading back home or booking in advance)

Notably, the Filtered Events and Dates may constantly be filtered dependent on movement and other factors. However, the push notification may ONLY show up when a substantial distance has been traveled such as to a new city. Within the City limits, e.g., from East side to West side. The feed may automatically sync without notification.

Further provided is Accurate Mapping Data: The GNSS System is integrated into the present invention's Ticketing agency to create accurate parameters and mapping solutions. This is useful both within the application during Event booking and in action for the duration of the Event to provide directions, parameters and suggestions.

Further provided is support for Interior Mapping: Interior maps are made for the stadiums, platforms, booths and elite reservations which the ticketing agency may be selling tickets as well as the mapped out interiors of all business locations promoted on the present invention to ensure that the purchaser gets what they are looking for through clear communication about the Event.

Further provided is Exterior Mapping. Exterior mapping shows the street maps around the precise location of every Event available on the present invention's Application.

There are Location Directions. As a result of Exterior mapping and the location of the mobile device directions can be provided through the application so that the Event can be found with ease.

Further provided is a Personal Radius process: The Radii set between the Date(s) and User(s) whilst on an Outing to ensure that they don't become separated. Should they do so the safety notification may pop up to ensure that everything is okay and everything is going well on the mobile devices of all parties involved.

Further provided is Push Notification Activation. Push Notifications are activated throughout the day and throughout the duration of any the present invention's Outing. The Dongle may recognize the movement from one location to another, the meeting or separating of peoples as well as the initial arrival and the final separation. As a result, Icebreakers, periodically, Safety Notifications, regarding Date Radius, Arrival Times, location and suggested arrival time and Suggestions, proximity to other Events, Directions, Advertisement etc. may all be activated depending on the data emitted.

There are IceBreakers. These are the same IceBreakers described earlier in the disclosure. IceBreakers are initiated at the beginning of every Outing and the Arrival of every event unless they have been manually shut off by both parties. The location of the mobile signals may enable the system to know when to initiate the push notifications for the IceBreakers.

Further provided is Arrival Communication. As the Outing is about to begin and the Date is coming to meet the User, Or the User arriving to pick up the Date the arrival time may be sent and the image of the other person may pop up in the application so there may be no problem finding the other if this is a first time Outing.

Further provided is Direction. As a result of Exterior mapping and the location of the mobile device directions can be provided through the application so that the Event can be found with ease.

Further provided is Safety. The Radius's set between the Date(s) and User(s) whilst on an Outing to ensure that they don't become separated. Should they do so the safety notification may pop up to ensure that everything is okay and everything is going well on the mobile devices of all parties involved.

Further provided is Event Promotion. Events in the proximity of the signal of the mobile device can be promoted during the initial search. But also, push notifications can be sent during an Outing if they don't have the "complete Outing" of three Events. For instance, if a User has booked one Outing at a restaurant and the Application recognizes that based on the GNSS signal they are in very close proximity to a great evening Event the application system may then promote this Event to prolong the evening should the parties be having a good time. The Date would have to accept the additional Event.

Further provided is Quality Assurance. Push Notifications after every Event may be requesting an evaluation of the Event a "Later" button is also available on the push notification. At the end of the evening a full evaluation is prompted for the other party and any unevaluated Events attended.

Further provided is Survey Initiation. Surveys are activated upon the cessation of an Event, the movement around or between Venues and upon Outing completion. Depending on the Data Emitted.

Further provided is Event Survey. Push Notifications after every Event may be requesting an evaluation of the Event a "Later" button is also available on the push notification. To evaluate the quality of the Event location.

Further provided is Date/User Evaluation. At the end of the evening a full evaluation is prompted for the evaluation of all Users and Dates that attended the Outing to evaluate the outcome. These evaluations are pivotal in the calculation of the User/Date's ratings and points.

There are Safety Backup Surveys. The Radius's set between the Date(s) and User(s) whilst on an Outing to ensure that they don't become separated. Should they do so the safety notification may pop up to ensure that everything is okay and every thing is going well on the mobile devices of all parties involved.

Further provided is Boredom Recognition. If someone is not notably moving too much and the data mining is collecting signals of mindless browsing, boredom recognition may be activated and promotions or push notifications may be initiated.

There are Location Signals. Based on the GNSS signals of the Mobile device the location can be determined, this aids in the filtering of Dates and Events in the present invention's HomePage Map.

Further provided is a Movement Monitor. The amount of movement detected may help to determine whether someone is sedentary in one place and possibly "bored".

Further provided is Data Tracing. In conjunction with data collection of phone usage and "mindless browsing" the application system can determine the availability of the individual or whether or not they may be "bored".

Further provided is Event Promotion. This may stimulate push notifications to promote new events and suggestions for Outings that evening.

Further provided is Selective Promotion. Based on movement patterns and data mining regarding data usage the promotions may be pre-selected to what is most likely to be successful.

Further provided is a DNA Rating system. This is the same DNA Rating system from earlier; it allows check in check out of locations' push notification.

Further provided is WiFi and Network Positioning. For any GPS to work the antennae needs a clear view of the sky. Users of smart phones may frequently be in "urban canyons" or indoors. This is where WiFi and cellular network positioning become necessary. Both of these methods are used by smart phones as indoor positioning systems.

Generally, WiFi positioning is more accurate than cellular network positioning. It uses wireless access points and measures the intensity of the received signal from one or more networks to find the position. Interestingly it doesn't require your device to be WiFi enabled to work. Bluetooth dongle disconnection may trigger geolocation processes.

IV. Platform Architecture

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 600-900 and 4300-5300 have been described to be performed by a computing device 6500, it should be understood that, in some embodiments, different operations may be performed by different networked elements in operative communication with computing device 6500.

Embodiments of the present disclosure may comprise a system having a memory storage and a processing unit. The processing unit coupled to the memory storage, wherein the processing unit is configured to perform the stages of methods 600-900 and 4300-5300.

Figure 59:
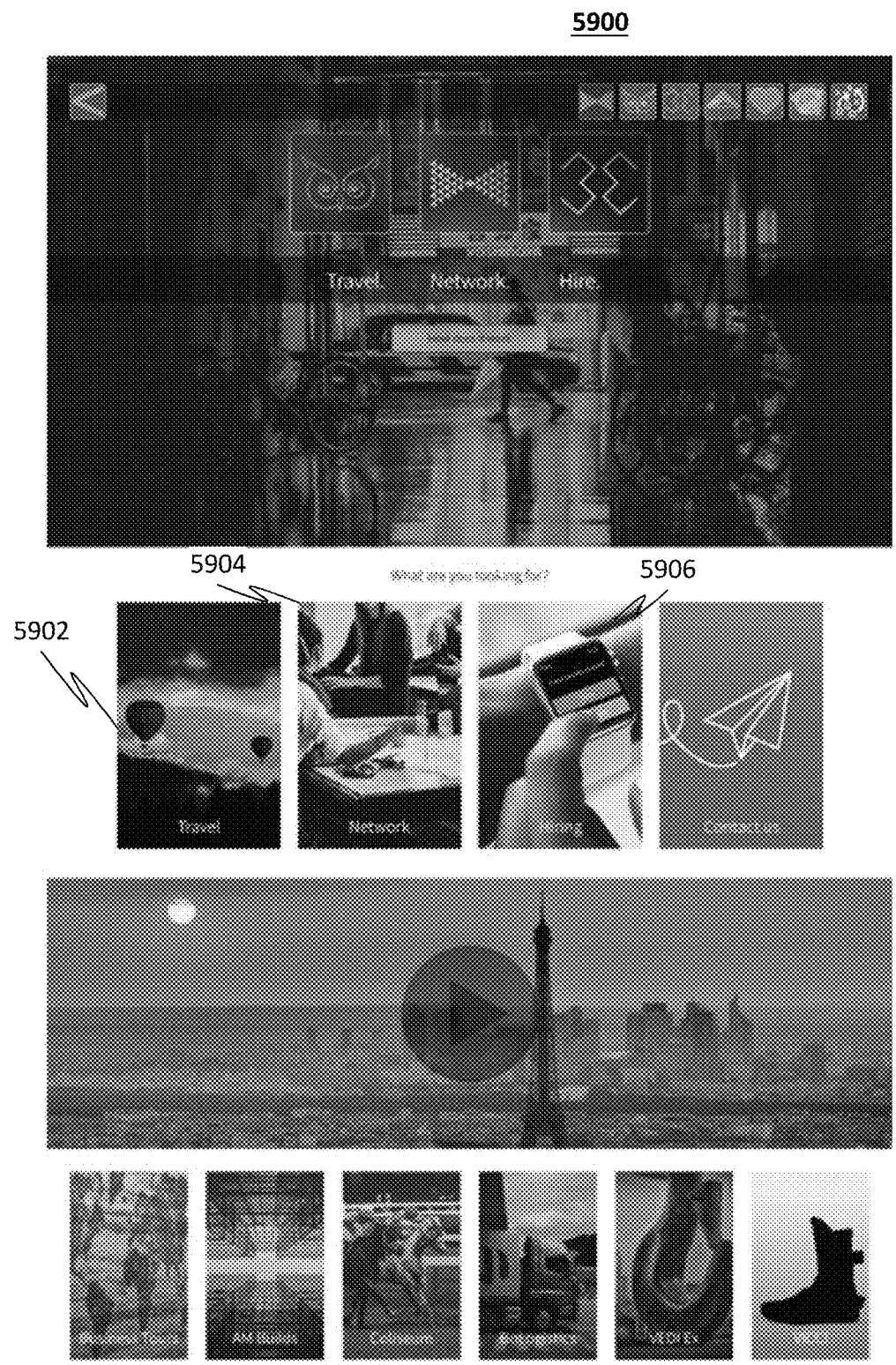
FIG. 59 is a snapshot of an exemplary user interface of a system for facilitating provisioning of social networking data to a mobile device, in accordance with some embodiments.
Figure 60:
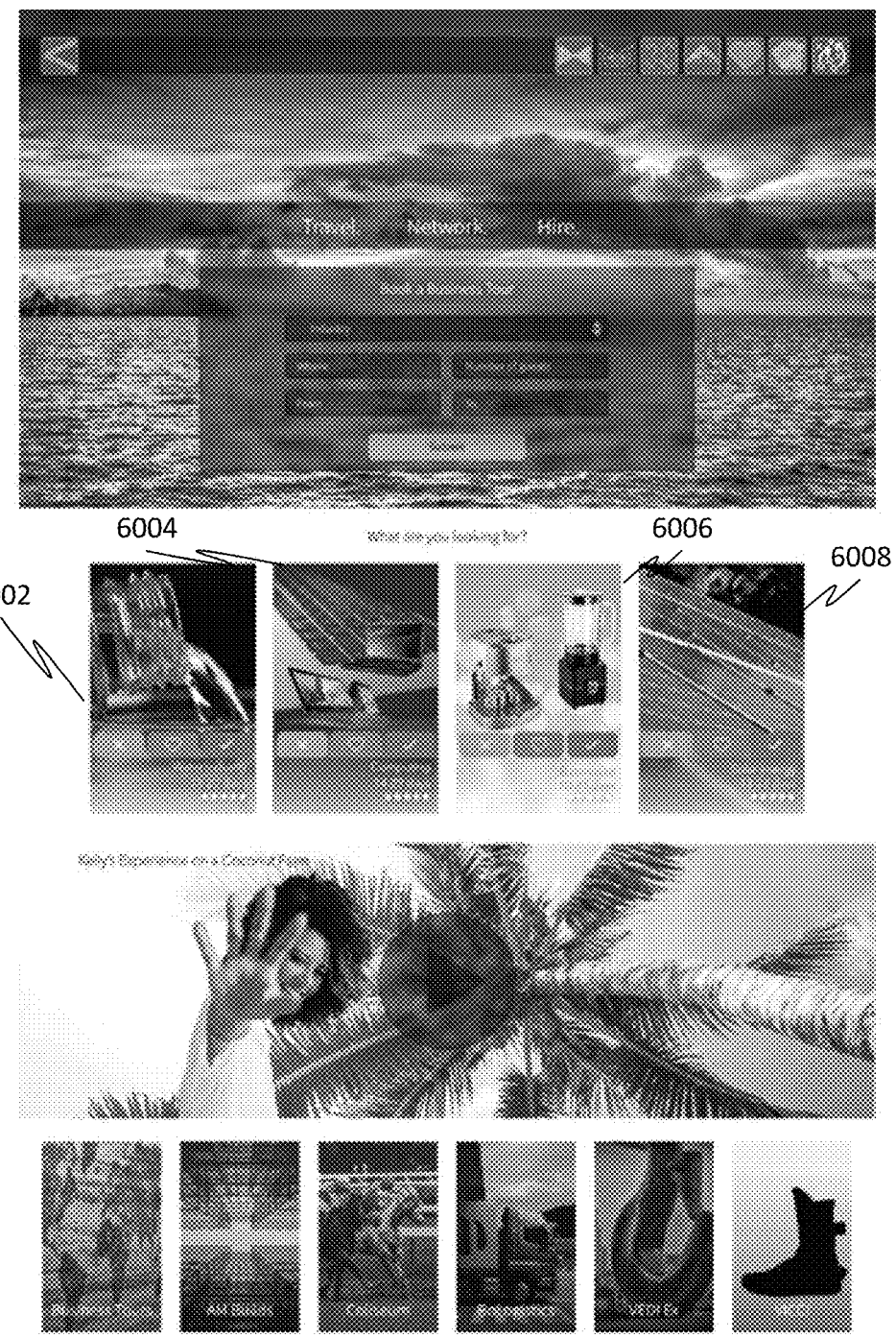
FIG. 60 is a snapshot of the user interface of the system for facilitating provisioning of social networking data to the mobile device including travel options related to one or more industries, in accordance with some embodiments.

FIG. 59 is a snapshot of an exemplary user interface 5900 of a system, such as the system 200, for facilitating provisioning of social networking data to a mobile device, in accordance with some embodiments. Further, the user interface 5900 may include one or more options, such as but not limited to travel 5902, network 5904, and hiring 5906. For instance, as shown in FIG. 60, upon interacting with travel 5902, the user may be able to view travel options related to one or more industries, such as water industry 6002, computing 6004, electronics 6006, and solar energy 6008.

FIG. 61 is a snapshot of an exemplary user interface 6100 of a system for facilitating provisioning of social networking data to a mobile device, in accordance with some embodiments. Further, the user interface 6100 may show a network 6102 of a user.

Figure 62:
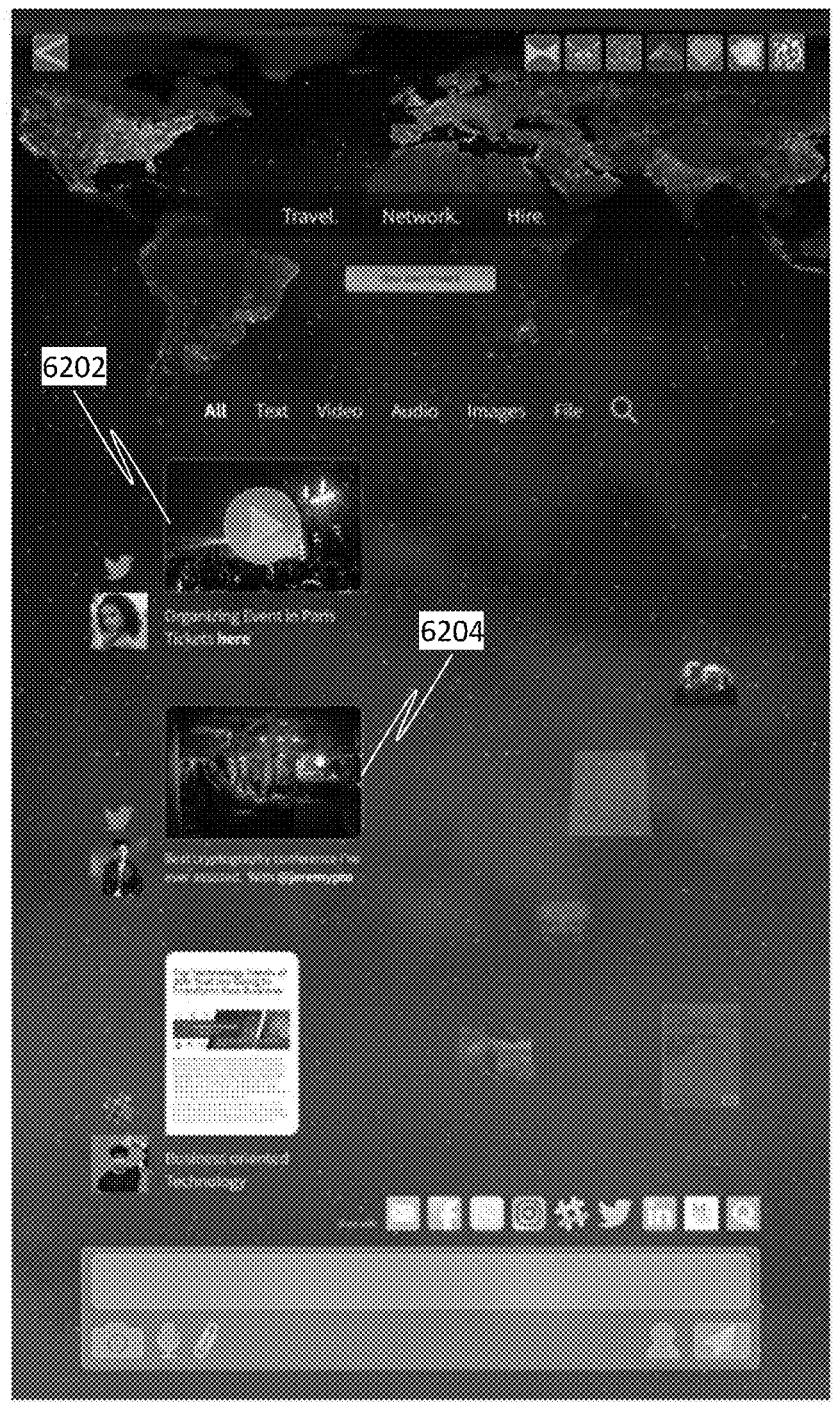
FIG. 62 is a snapshot of an exemplary user interface of a system for facilitating provisioning of social networking data to a mobile device showing events, in accordance with some embodiments.

FIG. 62 is a snapshot of an exemplary user interface 6200 of a system for facilitating provisioning of social networking data to a mobile device in accordance with some embodiments. Further, the user interface 6200 may show one or more events, such as an event 6202, and event 6204 that a user may attend while travelling.

Figure 63:
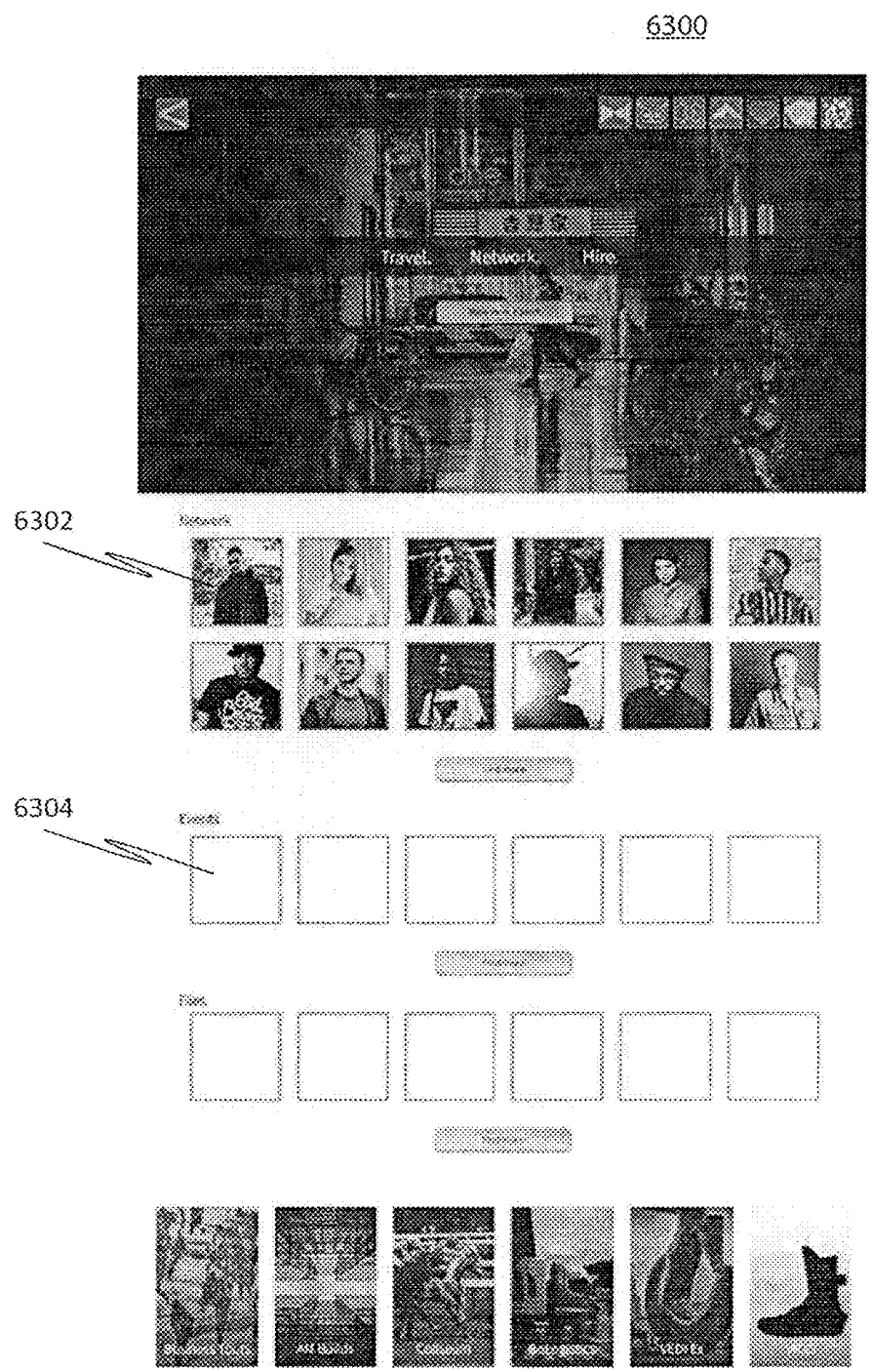
FIG. 63 is a snapshot of an exemplary user interface of a system for facilitating provisioning of social networking data to a mobile device showing vents that a user may attend, in accordance with some embodiments.

FIG. 63 is a snapshot of an exemplary user interface 6300 of a system for facilitating provisioning of social networking data to a mobile device in accordance with some embodiments. Further, the user interface 6300 may include one or more individuals, such as a user 6302 to add to a network. Further, the user interface 6300 may include one or more events, such as an event 6304 that a user may attend.

Figure 64:
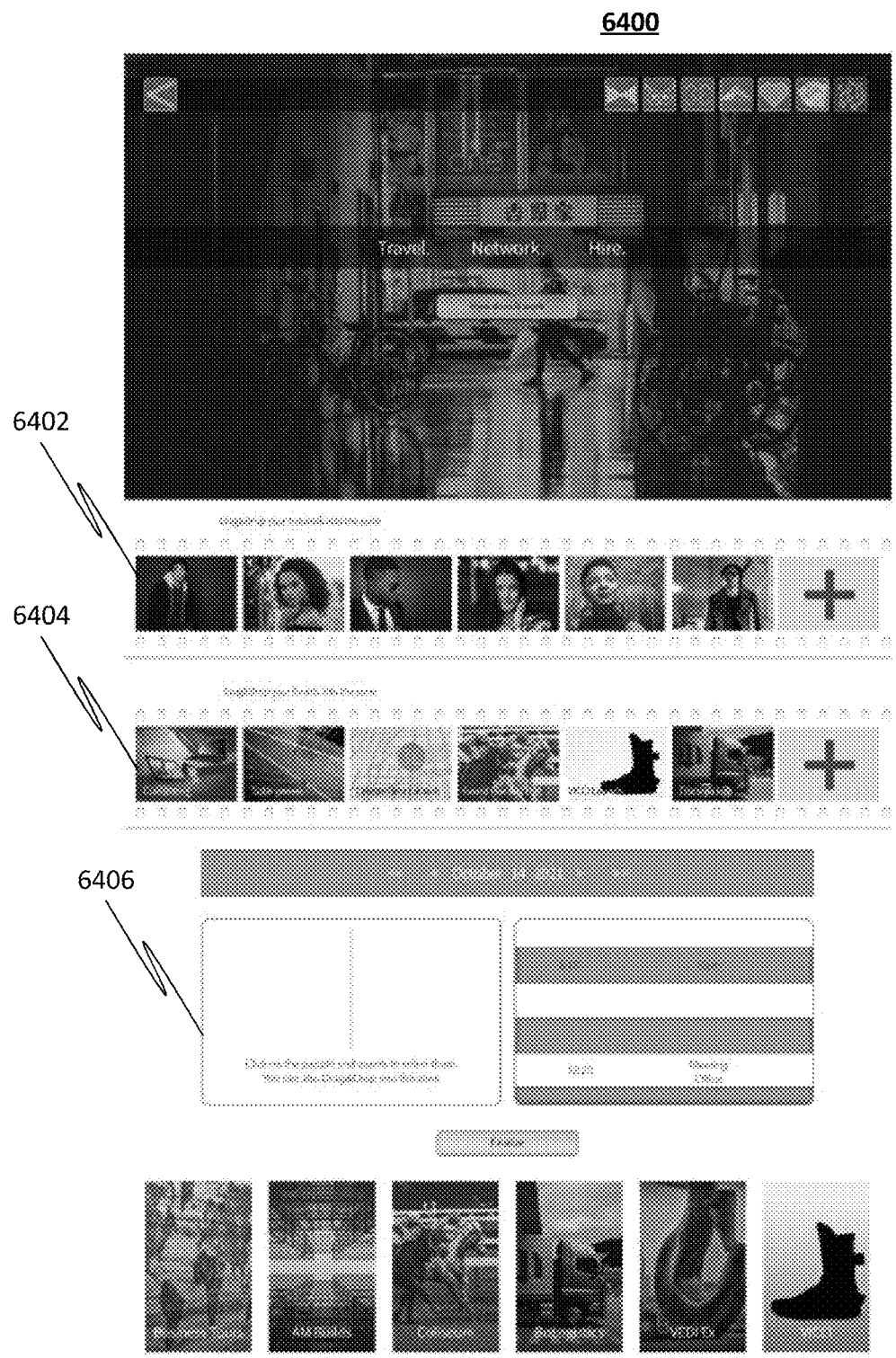
FIG. 64 is a snapshot of an exemplary user interface of a system for facilitating provisioning of social networking data to a mobile device showing a travel itinerary, in accordance with some embodiments.

FIG. 64 is a snapshot of an exemplary user interface 6400 of a system for facilitating provisioning of social networking data to a mobile device in accordance with some embodiments. Further, the user interface 6400 may include one or more individuals, such as a user 6402 that a user may add to a network. Further, the user interface 6400 may include one or more events, such as an event 6404 that the user may attend.

Further, the user may add one or more individuals, and one or more events to an scheduler 6406 to create a travel itinerary.

Figure 65:
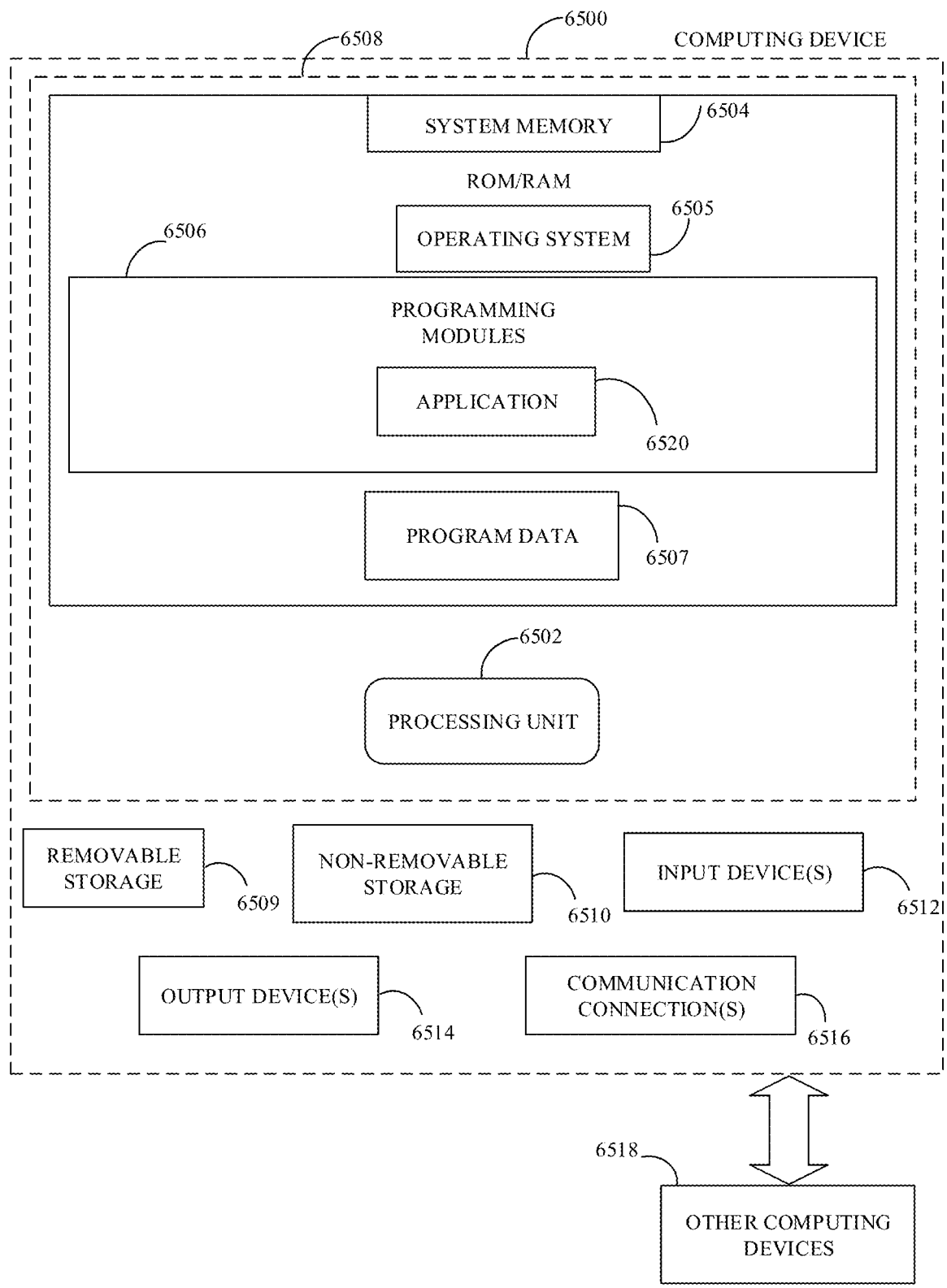
FIG. 65 illustrates a block diagram of a system for facilitating social networking based on events, in accordance with some embodiment.

FIG. 65 is a block diagram of a system including computing device 6500. Consistent with an embodiment of the disclosure, the aforementioned memory storage and processing unit may be implemented in a computing device, such as computing device 6500 of FIG. 65. Any suitable combination of hardware, software, or firmware may be used to implement the memory storage and processing unit. For example, the memory storage and processing unit may be implemented with computing device 6500 or any of other computing devices 6518, in combination with computing device 6500. The aforementioned system, device, and processors are examples and other systems, devices, and processors may comprise the aforementioned memory storage and processing unit, consistent with embodiments of the disclosure.

With reference to FIG. 65, a system consistent with an embodiment of the disclosure may include a computing device or cloud service, such as computing device 6500. In a basic configuration, computing device 6500 may include at least one processing unit 6502 and a system memory 6504. Depending on the configuration and type of computing device, system memory 6504 may comprise, but is not limited to, volatile (e.g. random access memory (RAM)), non-volatile (e.g. read-only memory (ROM)), flash memory, or any combination. System memory 6504 may include operating system 6505, one or more programming modules 6506, and may include a program data 6507. Operating system 6505, for example, may be suitable for controlling computing device 6500's operation. In one embodiment, programming modules 6506 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 65 by those components within a dashed line 6508.

Computing device 6500 may have additional features or functionality. For example, computing device 6500 may also include additional data storage devices (removable and/or non-removable) such as, for example, magnetic disks, optical disks, or tape. Such additional storage is illustrated in FIG. 65 by a removable storage 6509 and a non-removable storage 6510. Computer storage media may include volatile and nonvolatile, removable and non-removable media implemented in any method or technology for storage of information, such as computer readable instructions, data structures, program modules, or other data. System memory 6504, removable storage 6509, and non-removable storage 6510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 6500. Any such computer storage media may be part of device 6500. Computing device 6500 may also have input device(s) 6512 such as a keyboard, a mouse, a pen, a sound input device, a touch input device, etc. Output device(s) 6514 such as a display, speakers, a printer, etc. may also be included. The aforementioned devices are examples and others may be used.

Computing device 6500 may also contain a communication connection 6516 that may allow device 6500 to communicate with other computing devices 6518, such as over a network in a distributed computing environment, for example, an intranet or the Internet. Communication connection 6516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 6504, including operating system 6505. While executing on processing unit 6502, programming modules 6506 (e.g., application 6520) may perform processes including, for example, stages of one or more of methods 600-900 and 4300-5300 as described above. The aforementioned process is an example, and processing unit 6502 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A system for facilitating provisioning of social networking data to a mobile device, wherein the social networking data is related to a tour of a user of the mobile device, the system comprising:
   a communication device configured for:
      receiving at least one location information corresponding to the tour;
      receiving at least one selection corresponding to a plurality of filtering icons corresponding to a filtered social networking data; and
      transmitting a travel plan to the mobile device;
      transmitting an initial survey comprising a plurality of questions to the mobile device;
      transmitting a plurality of pictures to the mobile device, wherein the plurality of pictures corresponds to a plurality of answers to the plurality of questions; and
      receiving at least one selection of the plurality of pictures from the mobile device; and
   a processing device configured for:
      filtering social networking data based on the at least one location information and at least one personal characteristic to generate the filtered social networking data, wherein the social networking data comprises a plurality of event indicia corresponding to a plurality of events, a plurality of venue indicia corresponding to a plurality of venues and a plurality of member indicia corresponding to a plurality of members of a social network associated with the user;
      generating the travel plan based on the at least one selection corresponding to the plurality of filtering icons; and
      identifying the at least one personal characteristic of the user based on the at least one selection of the plurality of pictures, wherein the at least one personal characteristic comprises at least one of a perceived personality, an interest, and an intention of the user.

2. The system of claim 1, wherein the travel plan includes one or more events in the plurality of events, one or more venues in the plurality of venues and one or more members in the plurality of members of the social network associated with the user for the tour.

3. The system of claim 2, wherein the processing device is further configured for booking the one or more events, booking the one or more venues and booking meetings with the one or members.

4. The system of claim 3, wherein the processing device is further configured for using a multi-currency wallet for making payments for booking the one or more events, booking the one or more venues and booking meetings with the one or members.

5. The system of claim 4, wherein
   the communication device is further configured for:
      receiving an indication of hiring a member in the one or members, and transmitting a smart contract to the mobile device; and
   the processing device is configured for generating the smart contract based on the indication.

6. The system of claim 1, wherein the processing device configured for performing the filtering social networking data based on a user preference, wherein the user preference comprises at least one rating previously provided by the user in relation to at least one of the plurality of events, the plurality of venue indicia and the plurality of member indicia.

7. The system of claim 1, wherein the communication device is further configured for receiving an acceptance of a challenge from the mobile device, wherein the challenge is related to the filtered social networking data.

8. The system of claim 7, wherein the challenge comprises attending at least one event.

9. The system of claim 1, wherein the communication device is further configured for:
   receiving a game-plan comprising indication of a selected event, a selected venue, at least one selected member; and
   transmitting at least one invitation associated with the game-plan to at least one user device associated with the at least one selected member.

10. A method for facilitating provisioning of social networking data to a mobile device, wherein the social networking data is related to a tour of a user of the mobile device, the method comprising:
   receiving, using a communication device, at least one location information corresponding to the tour;
   filtering, using a processing device social networking data based on the at least one location information and at least one personal characteristic to generate a filtered social networking data, wherein the social networking data comprises a plurality of event indicia corresponding to a plurality of events, a plurality of venue indicia corresponding to a plurality of venues, and a plurality of member indicia corresponding to a plurality of members of a social network associated with the user;
   receiving, using the communication device, at least one selection corresponding to a plurality of filtering icons corresponding to the filtered social networking data;

generating, using the processing device, a travel plan based on the at least one selection corresponding to the plurality of filtering icons;

transmitting, using the communication device, the travel plan to the mobile device;

transmitting, using the communication device, an initial survey comprising a plurality of questions to the mobile device;

transmitting, using the communication device, a plurality of pictures to the mobile device, wherein the plurality of pictures corresponds to a plurality of answers to the plurality of questions;

receiving, using the communication device, at least one selection of the plurality of pictures from the mobile device; and identifying, using the processing device, the at least one personal characteristic of the user based on the at least one selection of the plurality of pictures, wherein the at least one personal characteristic comprises at least one of a perceived personality, an interest, and an intention of the user.

11. The method of claim 10, wherein the travel plan includes one or more events in the plurality of events, one or more venues in the plurality of venues and one or more members in the plurality of members of the social network associated with the user for of the tour.

12. The method of claim 11 further comprising booking, using the processing device, the one or more events, booking the one or more venues and booking meetings with the one or members.

13. The method of claim 12 further comprising making payments, using the processing device, using a multi-currency wallet, for booking the one or more events, booking the one or more venues, and booking meetings with the one or members.

14. The method of claim 13 further comprising:
receiving, using the communication device, an indication of hiring a member in the one or members;
generating, using the processing device, a smart contract based on the indication; and
transmitting, using the processing device, the smart contract to the mobile device.

15. The method of claim 10 further comprising filtering, using the processing device, the social networking data based on a user preference, wherein the user preference comprises at least one rating previously provided by the user in relation to at least one of the plurality of events, the plurality of venue indicia and the plurality of member indicia.

16. The method of claim 10 further comprising receiving, using the communication device, an acceptance of a challenge from the mobile device, wherein the challenge is related to the filtered social networking data.

17. The method of claim 16, wherein the challenge comprises attending at least one event.

18. The method of claim 10 further comprising:
receiving, using the communication device, a game-plan comprising indication of a selected event, a selected venue, at least one selected member; and
transmitting, using the communication device, at least one invitation associated with the game-plan to at least one user device associated with the at least one selected member.

* * * * *